(12) United States Patent
Murray et al.

(10) Patent No.: US 7,937,294 B1
(45) Date of Patent: May 3, 2011

(54) SYSTEM, AND ASSOCIATED METHOD, FOR CONFIGURING A BUYING CLUB AND A COOP ORDER

(75) Inventors: Thomas G. Murray, Denton, TX (US); Joseph L. Murray, Jamestown, RI (US)

(73) Assignee: Telegrow, LLC, Denton, TX (US)

( * ) Notice: Subject to any disclaimer, the term of this patent is extended or adjusted under 35 U.S.C. 154(b) by 1220 days.

(21) Appl. No.: 11/468,457

(22) Filed: Aug. 30, 2006

Related U.S. Application Data

(63) Continuation of application No. 10/917,250, filed on Aug. 11, 2004, now abandoned, and a continuation-in-part of application No. 10/734,724, filed on Dec. 11, 2003, now abandoned, said application No. 10/917,250 is a continuation-in-part of application No. 10/125,097, filed on Apr. 17, 2002, now abandoned.

(60) Provisional application No. 60/495,023, filed on Aug. 13, 2003, provisional application No. 60/347,958, filed on Jan. 12, 2002, provisional application No. 60/432,451, filed on Dec. 11, 2002.

(51) Int. Cl.
*G06Q 30/00* (2006.01)
(52) U.S. Cl. .................................... 705/26.2
(58) Field of Classification Search .............. 705/26, 705/27
See application file for complete search history.

(56) References Cited

U.S. PATENT DOCUMENTS

| | | | |
|---|---|---|---|
| 4,799,156 A | 1/1989 | Shavit et al. |
| 5,319,542 A | 6/1994 | King, Jr. et al. |
| 5,740,425 A | 4/1998 | Povilus |
| 5,799,289 A | 8/1998 | Fukushima et al. |
| 5,893,093 A | 4/1999 | Wills |
| 5,918,214 A | 6/1999 | Perkowski |
| 5,960,411 A | 9/1999 | Hartman et al. |
| 5,991,739 A | 11/1999 | Cupps et al. |
| 5,995,943 A | 11/1999 | Bull et al. |
| 6,014,644 A | 1/2000 | Erickson |
| 6,052,670 A | 4/2000 | Johnson |
| 6,055,519 A | 4/2000 | Kennedy et al. |
| 6,064,979 A | 5/2000 | Perkowski |
| 6,081,789 A | 6/2000 | Purcell |
| 6,085,170 A | 7/2000 | Tsukuda |
| 6,101,484 A | 8/2000 | Halbert et al. |
| 6,131,087 A | 10/2000 | Luke et al. |

(Continued)

FOREIGN PATENT DOCUMENTS

JP 2001-155067 A1 8/2001

(Continued)

OTHER PUBLICATIONS

Egan, S.C. et al., "Japan's Changing Apparel Market," Apparel Industry Magazine, vol. 60, No. 10, pp. 78-79, Oct. 1999.*

(Continued)

*Primary Examiner* — Nicholas D Rosen
(74) *Attorney, Agent, or Firm* — Scheef & Stone, L.L.P.; Jack D. Stone, Jr.

(57) ABSTRACT

A catalog of products is received electronically from each of a plurality of suppliers of products. Each catalog is then compiled into a master supplier catalog that is made accessible to one or more buying entities through an on-line web server, through which server the buying entities may then select and order products shown in the master supplier catalog.

5 Claims, 93 Drawing Sheets

U.S. PATENT DOCUMENTS

| | | | |
|---|---|---|---|
| 6,148,289 A | 11/2000 | Virdy | |
| 6,188,994 B1 | 2/2001 | Egendorf | |
| 6,249,772 B1 | 6/2001 | Walker et al. | |
| 6,249,773 B1 | 6/2001 | Allard et al. | |
| 6,249,774 B1* | 6/2001 | Roden et al. | 705/28 |
| 6,260,024 B1 | 7/2001 | Shkedy | |
| 6,263,317 B1 | 7/2001 | Sharp et al. | |
| 6,269,343 B1 | 7/2001 | Pallakoff | |
| 6,272,472 B1 | 8/2001 | Danneels et al. | |
| 6,285,986 B1 | 9/2001 | Andrews | |
| 6,336,100 B1 | 1/2002 | Yamada | |
| 6,338,050 B1 | 1/2002 | Conklin et al. | |
| 6,351,738 B1 | 2/2002 | Clark | |
| 6,405,176 B1 | 6/2002 | Toohey | |
| 6,418,441 B1 | 7/2002 | Call | |
| 6,442,544 B1 | 8/2002 | Kohli | |
| 6,484,150 B1 | 11/2002 | Blinn et al. | |
| 6,490,567 B1 | 12/2002 | Gregory | |
| 6,493,724 B1 | 12/2002 | Cusack et al. | |
| 6,499,052 B1 | 12/2002 | Hoang et al. | |
| 6,553,346 B1 | 4/2003 | Walker et al. | |
| 6,553,350 B2 | 4/2003 | Carter | |
| 6,574,608 B1 | 6/2003 | Dahod et al. | |
| 6,578,030 B1 | 6/2003 | Wilmsen et al. | |
| 6,584,451 B1 | 6/2003 | Shoham et al. | |
| 6,604,089 B1* | 8/2003 | Van Horn et al. | 705/26 |
| 6,684,369 B1* | 1/2004 | Bernardo et al. | 715/205 |
| 6,714,922 B1 | 3/2004 | Sansone et al. | |
| 6,876,983 B1 | 4/2005 | Goddard | |
| 6,934,690 B1 | 8/2005 | Van Horn et al. | |
| 6,963,847 B1 | 11/2005 | Kennedy et al. | |
| 7,124,098 B2* | 10/2006 | Hopson et al. | 705/26 |
| 7,177,825 B1* | 2/2007 | Borders et al. | 705/26 |
| 2001/0014878 A1 | 8/2001 | Mitra et al. | |
| 2001/0027431 A1 | 10/2001 | Rupp et al. | |
| 2001/0032162 A1 | 10/2001 | Alsberg et al. | |
| 2001/0032163 A1 | 10/2001 | Fertik et al. | |
| 2001/0044758 A1 | 11/2001 | Talib et al. | |
| 2002/0023123 A1 | 2/2002 | Madison | |
| 2002/0029193 A1 | 3/2002 | Ranjan et al. | |
| 2002/0042756 A1 | 4/2002 | Kumar et al. | |
| 2002/0082887 A1 | 6/2002 | Boyert et al. | |
| 2002/0087332 A1 | 7/2002 | Como | |
| 2002/0087522 A1 | 7/2002 | MacGregor | |
| 2002/0133415 A1* | 9/2002 | Zarovinsky | 705/26 |
| 2002/0133425 A1 | 9/2002 | Pederson et al. | |
| 2002/0138412 A1* | 9/2002 | Englert | 705/38 |
| 2002/0161646 A1 | 10/2002 | Gailey et al. | |
| 2002/0188689 A1 | 12/2002 | Michael | |
| 2003/0018536 A1 | 1/2003 | Eggebraaten et al. | |
| 2003/0055723 A1* | 3/2003 | English | 705/14 |
| 2003/0055744 A1 | 3/2003 | Walker et al. | |
| 2003/0061114 A1 | 3/2003 | Schwartz et al. | |
| 2003/0088556 A1 | 5/2003 | Allen, III | |
| 2003/0101107 A1 | 5/2003 | Agarwal et al. | |
| 2003/0142797 A1 | 7/2003 | Troy et al. | |
| 2004/0225569 A1 | 11/2004 | Bunnell | |
| 2004/0249676 A1* | 12/2004 | Marshall et al. | 705/2 |
| 2005/0076297 A1 | 4/2005 | Tanaka | |
| 2005/0125251 A1 | 6/2005 | Berger et al. | |
| 2006/0047583 A1 | 3/2006 | Jacobs | |

FOREIGN PATENT DOCUMENTS

| | | |
|---|---|---|
| WO | WO9950771 | 10/1999 |
| WO | WO0043928 | 7/2000 |
| WO | WO0075839 A2 | 12/2000 |
| WO | WO0101315 A1 | 1/2001 |
| WO | WO0102992 A2 | 1/2001 |
| WO | WO0140904 A2 | 6/2001 |
| WO | WO0175628 A1 | 10/2001 |
| WO | WO0195224 A1 | 12/2001 |
| WO | WO0221398 A1 | 3/2002 |
| WO | WO0223445 A2 | 3/2002 |
| WO | WO03058540 A1 | 7/2003 |

OTHER PUBLICATIONS

Anon., "Household Direct.com Announces the 'Grand Opening' of Its Online Shopping Portal Featuring Direct Manufacturer to Consumer Pricing," PR Newswire, Feb. 1, 2000.*

Robert J. Pickford; An Organizers' Manual for Cooperative Food Buying Clubs, Federation of Ohio River Cooperatives; 1981.

Edmund G. Brown, Jr.; How to Form a Pre-Order Co-op, California Dept. of Consumer Affairs; 1982.

Ozark Cooperative Warehouse; Buying Club Manual, Ozark Cooperative Warehouse; 1990.

Deb Maynard; Linking Buying Clubs and Retails for Co-op Development; Feb. 1997.

Deb Maynard; Northeast Cooperatives: Website Development Proposal; Jun. 3, 2002.

Robert J. Kauffmann and Bin Wang; New Buyers' Arrival Under Dynamic Pricing Market Microstructure: The Case of Group-Buying Discounts on the Internet; Fall 2001.

Robert J. Kauffmann and Bin Wang; Bid Together, Buy Together: On the Efficacy of Group-Buying Business Models in the Internet-Based Selling, May 16, 2001.

Mobshop; The Value of Demand Aggregation in Public Marketplaces; 2001.

WWW.PCguide.Com; Group Buying Clubs; 1997.

Hudson Valley; Hudson Valley Federation of Food Cooperatives: Oct. 28, 2001.

Ozark Cooperative Warehouse's Ordering Software; Instruction Manual; Jun. 1, 2002.

Ozark Cooperative Warehouse's Ordering Software; Supplemental Pages; Apr. 4, 2002.

Ozark Cooperative Warehouse's Ordering Software; Updated Software Memo; Jun. 18, 2002.

United Northeast, LLC.; FoodLink Electronic Ordering Form; Date unknown.

United Northeast; Member. Setup and Use of FoodLink Ver 4.5 or 5.0 Member Mode; Date Unknown.

United Northeast; FoodLink: Frequently Asked Questions; Dec. 11, 2001.

Blooming Prairie; PrairieNet.txt; Sep. 30, 1999.

Blooming Prairie; Member. Setup and Use of FoodLink; Aug. 3, 2004.

Blooming Prairie (Aaron Pierce, Coordinator); FoodLink for Members; 2001.

Blooming Prairie; Frequently Asked Questions; Jul. 13, 2001.

Blooming Prairie; FoodLink Users' Guide; May 3, 2001.

Tucson Cooperative Warehouse; Instruction Manual (and web order form attached); 2003.

Foodclub.org; Frequently Asked Questions; Date Unknown.

Foodclub.org; Statement of Purpose; Date Unknown.

Foodclub.org; E-mail Notifying of System Membership; Jan. 31, 2002.

Foodclub.org; Frequently Asked Questions (Updated); Date Unknown.

Foodclub.org; Administration; Date Unknown.

Foodbuying Club.com; Demo Food Buying Club Order Split Sheet (Menu Choices); Jun. 2, 2003.

Foodbuyingclub.com; Demo Food Buying Club Administration (Administration); Jun. 4, 2003.

* cited by examiner

SYSTEM, AND ASSOCIATED METHOD, FOR CONFIGURING A BUYING CLUB AND A COOP ORDER

CROSS-REFERENCE TO RELATED APPLICATIONS

This application is a continuation of application Ser. No. 10/917,250, filed Aug. 11, 2004, which is a continuation-in-part of application Ser. No. 10/125,097, filed Apr. 17, 2002 (hereinafter the '097 patent application), application Ser. No. 10/917,250 claims the benefit of provisional Application No. 60/495,023, filed Aug. 13, 2003, application Ser. No. 10/125,097 claims the benefit of provisional Application No. 60/347,958, filed Jan. 12, 2002; and this application is also a continuation-in-part of application Ser. No. 10/734,724, filed Dec. 11, 2003, which claims the benefit of provisional Application No. 60/432,451, filed Dec. 11, 2002; all of which applications are hereby incorporated herein by reference, in their entirety. This application is also related to, and hereby incorporates herein by reference, in their entirety, the following U.S. patent applications, all of which were filed on Aug. 11, 2004: (1) U.S. patent application Ser. No. 10/916,803, entitled "Optimization System and Method For Buying Clubs" (hereinafter the '803 patent application), (2) U.S. patent application Ser. No. 10/916,694, entitled "Supplier Management System and Method For Buying Clubs" (hereinafter the '694 patent application), and (3) U.S. patent application Ser. No. 10/916,693, entitled "Inventory Management System and Method for Buying Clubs" (hereinafter the '693 patent application).

TECHNICAL FIELD

The present invention relates in general to electronic commerce and, more particularly, to a method and system for expediting the processing and management of buying clubs that are ordering products from suppliers.

BACKGROUND

Along with the development of mass production of goods, the distribution of goods from providers to consumers has become well established. Suppliers have developed at various levels in the supply chain, including the producer (e.g., a grower, rancher, or farmer in the food area), the manufacturer, and the distributor, all working together to move goods to the retailer and then the consumer. Only to a limited extent do producers and manufacturers now sell products directly to consumers. Typically, most products are delivered via distributors which traditionally act as intermediaries between manufacturers and retailers (or businesses) to aggregate large volumes of low margin goods in order to minimize unit transportation costs. Distributors typically operate on very narrow profit margins, carefully balancing product selection, availability, price, volume, and geographic area as needed to achieve a level of profitability that can sustain service delivery to the intended target market or markets. The improvements in production and distribution have enabled yesterday's small corner retail shop to evolve into today's huge mass merchandising retailer that offers products from literally thousands of vendors.

With the advent of the computer and an increasingly large portion of the populace using the Internet and other communications technologies, consumer purchasing has also evolved to include direct purchasing of products or services from or through remote vendors such as Amazon™, E-Bay™, Yahoo™, Expedia™, and Travelocity™. Products are often shipped through third party delivery companies, such as United Parcel Service™ or Federal Express™. Services are provided through on-line interfaces to other systems, including reservation systems. Although Internet sales of products and services have grown dramatically and continue to grow at high rates, heretofore consumers have predominantly utilized the Internet to order either products such as books and specialty products, or to arrange for services such as airline reservations or other travel arrangements. Internet sales to date have not evolved to the stage where large quantities of consumer packaged goods such as groceries, cleaning supplies, dairy, or health & beauty aids are purchased. Nor have Internet sales expanded significantly in food & beverage areas such as meat, beer, liquor or wine, seafood, or produce (e.g., fruits and vegetables). Heretofore most of these products have been provided to customers by retailers, including highly efficient mass merchandisers such as Wal-Mart or Target or large warehouse outlets such as Sam's Club or CostCo. There are several reasons for this, as discussed below.

Internet sales have not expanded significantly in the aforementioned areas because Internet sales currently include a number of deterrents to the purchaser and the supplier. Remote suppliers will often levy a shipping charge for transporting products which can constitute a significant proportion of the total value of the transaction, or simply be a deterrent to purchases due to shipping being an explicit additional cost. Another constraint is the lack of suitable information and logistical arrangements for remote suppliers to deliver products in larger volume to consumers. A further constraint is the lack of an efficient, intuitive, and effective technology and system for offering multiple products from distributors, manufacturers, or producers which may be readily incorporated into bulk shipments to consumers. A further constraint is the fact that distributors will typically sell products by the case, whereas consumers will seek to purchase products for less than case quantities, or even single unit increments. A further constraint are laws that prohibit interstate sales of certain products, such as, for example, wine, beer, liquor, and the like.

Buying clubs (also known as coops, food coops, food buying clubs, buyer groups, buying groups, groups, and the like) are an alternative distribution mode utilized for remote buying of consumer goods, most prevalently practiced in the sourcing and purchasing of organic foods. Buying clubs are usually formed to acquire products directly from suppliers (typically distributors) at better prices than are generally available through retail outlets and/or to purchase products that are not otherwise available through local retailers.

Buying clubs typically comprise a group of consumers who become members, and may include five to twenty or more households. A buying club, also referred to as a customer, consists of members who jointly purchase products from suppliers and receive deliveries and make pickups of products within a common local area. Most typically one member will handle the bulk of the duties, and such person is referred to herein as the Buyer Coordinator, who is also most typically a member of the club. Club members are generally located within a certain geographical, or physical, proximity to each other, which allows for a central pickup point to be identified that is reasonably convenient for all members. Typically club members include larger families with more than one or two children. Thus members who manage households tend to be extremely busy and also tend to operate on more limited financial means (saving money is one reason that they have joined a buying club). While club members do not typically possess great technical expertise with computers, they are usually familiar with the Internet and e-mail. Of critical importance to club members is the ability to quickly and easily finalize whatever arrangements are necessary to conclude purchases of products for their families as they are purchasing higher quality products at better prices.

Although computers, e-mail and the Internet have assisted buying clubs, the growth of buying clubs has been hindered by a number of formidable challenges. As a result, buying clubs conventionally transact only a fraction of one percent of all consumer purchases. Based on the relatively small level of acceptance of buying clubs, despite their cost benefits and potentially broad market application, it is clear that an efficient and effective system to meet club member needs with a minimum of difficulty and effort does not yet exist. Reference is made to co-pending U.S. patent application Ser. No. 10/125,097 describing in further detail additional logistical, financial, and operational requirements of buying clubs which description is herein incorporated by reference.

To establish and operate a buying club, the first step each buying club must undertake is to define what kinds of products the club wishes to purchase, and then to locate and form purchasing relationships with one or more appropriate suppliers. It is not easy to locate suppliers and suppliers are often located by word of mouth as even internet based keyword searches often fail to identify suitable suppliers. There is no system that provides a central registry to enable contact between buying clubs and suppliers that conveys to buyers what products or types of products are available from suppliers within a given geographic area. Even after finding a supplier, clubs may purchase from multiple suppliers, practicing selective sourcing based on the need for a diversity of products or better pricing, service, and/or availability of products from one supplier versus another supplier. Although members of clubs will purchase a variety of products as diverse as meats, produce, cleaning supplies, groceries and other consumables, as noted there is no central facility that provides information as to which suppliers will supply products by geographic area to buying clubs, and also what kinds of products suppliers will provide to buying clubs. Furthermore, persons interested in forming a buying club also do not have ready access to critical information such as product availability, seasonality restrictions, delivery times or conditions, minimum dollar order requirements, or other restrictions that are specific to receiving products or services from suppliers to buying clubs. In addition, there is no web site where a buying club may register themselves with suppliers should the buying club meet supplier requirements and desire to purchase products from them.

A further and very difficult complication results from the diverse product data structures under which suppliers sell products. Suppliers range from those who supply as few as 1 to 10 products (such as single product line suppliers like poultry producers or vendors of a single fruit such as apples) to full line distributors who supply up to 5,000 to 20,000 products. Suppliers sometimes provide printed catalogues or may allow viewing of product lists over the Internet. However, rarely are products able to be ordered directly over the Internet, and in any event catalogues are prepared by the individual suppliers and contain widely diverse product data structures. Since buying clubs are interested in sourcing from multiple suppliers and in optimizing their purchases, there exists a need to display suppliers and product catalogues in a consistent means for buying clubs so members are not required to master diverse product data structures.

A further need arises for consistent data structures so that optimizations may be calculated to enable placement of valid orders with suppliers. The need for optimization (and the pre-cursor step of aggregation) to place valid orders is based on the fact that whereas buyers typically wish to purchase units of a product, suppliers often only sell some products in predefined and relatively large number of unit increments (such as cases) for efficiency purposes. Therefore, although some products are available in single unit quantities, many suppliers often require customers (whether buying clubs or retailers) to purchase sufficient quantities of each product to meet a specific case quantity. Such case quantity sales include a number of units in a case, such as 6, 10, or some other number of units of the product for each case. Products may also be sold in different formats besides simply being available by the case or by the unit which can additional order processing and recordkeeping challenges.

As is generally well known, a Stock Keeping Unit (SKU) is, or refers to, a multi-digit number associated with a product for inventory purposes. By way of example, an SKU numbered 33445 for Quick Rolled Organic Oats may be sold in each variety of units per case of 5#, 10#, 25#, and 50# increments (wherein the "#" symbol is used herein to designate a pound or pounds), thereby effectively having four different case quantities for that single SKU from that supplier. Such a single SKU may be viewed by the buyer as four different products based on whether the buyer wishes to purchase in one or more 5#, 10#, 25#, or 50# increments. Another supplier may list those same products with the same weight divisions, but instead of listing them under a single SKU, they might list them by 4 different SKU numbers. For example, using the above Quick Rolled Organic Oats just cited, they might be sold as SKU 33421 for 5#, 33422 for 10#, 33423 for 25#, and 33424 for 50#. An additional data structure occurs when price breaks are offered based on purchases of 1-4 units at $5.00 each, 5-8 units at $4.50 each, and 9-12 units at $4.00 each. As is disclosed in co-pending U.S. patent application Ser. No. 10/125,097, it is of critical importance to buying club members that appropriate quantities be achieved for the buying clubs so that orders may be placed on behalf of all members for the buying club, and that members will be able to aggregate and optimize their orders. Accordingly, a system and method is needed so that such diverse product data structures can be included in the ordering process for buying club members.

For the purpose of discussion, the foregoing information associated with placing an order for a product, such as a SKU number (e.g., 33455), a product description (e.g., Nature's Peanut Butter), units per case (e.g., 12), unit label (e.g., 15 oz. jar), price per case (e.g., $25.00), and the like, shall be referred to herein as "quantitative" information.

In addition to quantitative information, members of buying clubs often desire additional information about products, referred to herein as "qualitative" information, such as a product's ingredients, nutritional information (e.g., serving sizes, calories, fat grams and the like), packaging information, an expanded product description, key characteristics (e.g., organic, genetically modified, kosher, and the like), an image of the product, and the like. Qualitative information may also include other intangibles relevant to the selection decision such as, for example, the type of workforce employed by a manufacturer (e.g., local versus international), wage levels paid to workers (e.g., below or above living wage levels), the ownership structure of a company (e.g., small family-owned versus large public company), methods of production (e.g., sustainable vs. non-sustainable), specific countries of origin of the product or the ingredients to the product, and the like.

There is, however, a general lack of product qualitative information from suppliers in catalogues, which is information that many buying club members would value. Many suppliers do not even offer such information in catalogues or, if they do, such information is typically incomplete. Conventionally, each supplier maintains their own catalogue in their own design with marked variations in format and completeness.

Not only is there a general lack of product qualitative information in suppliers' catalogues, but moreover, most of the foregoing qualitative information is not readily available to, or stored by, distributors. Even if it were, for distributors to maintain such qualitative information in a Master Catalogue for all products that they carry, (which could be up to 15,000 or even more) and for each manufacturer (which could be hundreds), would be a very large burden. Distributors generally carry such large numbers of products that providing such information for all products, particularly when such information would need to be sourced from dozens or hundreds of manufacturers or growers, would become a very resource-intensive task.

Similarly for manufacturers and producers to update all their product outlets (which also could range in the hundreds or thousands) would be a very large burden as well. Producers and manufacturers typically sell products through a wide variety of outlets comprising hundreds of customers which may include distributors, retailers, or direct customers (consumers). Therefore, a system is needed so that such qualitative information can easily and properly be included in the catalogue that is accessed by members of buying clubs.

There are still further limitations to the information conveyed by suppliers for buying clubs in the area of ordering. Suppliers will often set specials prices which are products discounted for sale over certain time periods, or until they are sold out in the case of discontinued products. However, there is a marked lack of uniformity and access to information in the area of specials prices for members while they are placing their orders. For example, some suppliers offer special prices on products based on orders received by a certain date (e.g., from July 1 to July 31). Another supplier may offer specials based on the date orders are shipped. Furthermore, no supplier to buying clubs offers immediate access and notification of specials to members at the same moment and in the same ordering screens as where members are placing their orders for products. Additional product attributes that are of interest to members while placing orders relate to the extent to which a product's price is discounted, whether it is being discontinued, and whether a product is being superseded by a new improved product. Members are often highly interested in being shown new products that are being offered when such products are available while they are placing their orders.

A further limitation of conventional systems is that members, when placing orders, are not informed if products are in or out of stock and/or when products may be in stock in the future. There is also no means of storing a back order for such a product during the on-line ordering process, nor is there any means for members of buying clubs to obtain such information from suppliers on-line. A telephone call or another means of accessing such information would be required, but this is impractical and inconvenient as buying club members often prefer to place orders after business hours when family related responsibilities subside.

An additional constraint of conventional systems is that it is highly inefficient to provide customizable pricing in the catalogue to customers, and thus suppliers tend to provide a "one size fits all" single set of prices for all customers regardless of the attractiveness of the customer or the supplier's costs that are associated with servicing the customer.

Further needs for suppliers are logistics and transportation planning and communications functions for buying clubs. Suppliers that deliver to buying clubs remotely establish route systems and drop points (also known as delivery points) around which schedules for order cutoffs and deliveries are set. It is not easy for suppliers to manage and communicate to buyers the appropriate truck route, delivery point (also referred to as drop point), and schedule changes or to update members as to exactly which supplier order cutoffs apply while orders are placed by different modes. This is made even more complex when multiple truck routes and delivery points may occur within a given geographic locale. As one example there may be one cutoff for a fax order, another for a telephone order, and a third that is based on mailing in an order, indicating that suppliers may not be using a common system for processing orders but have different systems that apply based on how the order is being received. Furthermore a supplier's ordering system and shipping systems are typically handled by different departments and are not integrated between each department and the buying club customer. Thus, while placing orders, clubs are not automatically provided with the delivery point, truck route, supplier order cutoff and delivery date information, but must search and obtain such information from other sources, typically a paper catalogue or a content only web page.

Additionally, suppliers have different minimum dollar order amount requirements for placement of an order. For example, a supplier may require a minimum order of $1,000 but vary this if a club is situated on an existing route, whereupon the minimum amount is only $500. Another supplier may set a $350 minimum order for a buying club. Still another may set a minimum order of $100 for produce and a minimum total order of $750. The minimum required dollar amounts are not monitored as part of the member's online ordering process to indicate whether or not the buying club has achieved the supplier minimum amount or not. In addition, a supplier may require other information such as one or more contact names or phone numbers to coordinate ordering or delivery of the products with the buying club.

There are a number of occasions where a product shipment that is delivered to a club has a discrepancy between what was ordered and what has been shipped or charged. Conventionally, members of clubs must fill out paperwork to indicate such problems, which are referred to as credits, or product credits. Members are typically required to complete this paperwork and fax it or otherwise have it delivered to the supplier within a relatively narrow time period. This is a time-consuming, tedious, and error-prone means of handling product credits, many of which originated from errors or omissions on the part of the supplier. A more efficient and easy means of processing these credits is strongly needed.

Another limitation of existing supplier offerings for buying clubs is the inability for manufacturers or other suppliers to offer electronic coupons to buying club members while they are purchasing the supplier's products. A further limitation is the lack of ability of suppliers to advertise products to buying clubs while members are placing orders via the electronic catalogue.

Without easy access to each supplier's ordering requirements and methods, and an easy ability to present and process product offerings, product availability, product pricing, and logistical and service arrangements offered by suppliers, buying clubs are required to undertake tedious activities of searching for, compiling, and organizing this information for each supplier. Given the daily activity levels and personal or family commitments of most club members, efforts to overcome the various limitations described herein fall well outside what is practical for club members.

Therefore, what is needed is a method and system for enabling members of buying clubs to readily access and utilize on-line systems that meet their needs and overcome the aforementioned drawbacks with conventional systems with a minimum of difficulty and effort.

SUMMARY

The present invention accordingly provides a system and method for facilitating the operation and management of buying clubs by automating the selection and ordering of products by buying clubs from suppliers and automating the processing of club functions between members of a buying club and between the buying club and the supplier, as preferably provided through a web server. Each supplier will preferably store and maintain their catalogue in a Master Catalogue database from which customers may place orders. Each catalog is then compiled into a master supplier catalog that is made accessible through a web server to customers.

In a further embodiment of the invention, a system is disclosed having a plurality of supplier computers, each of which supplier computers provides for updating database defining a respective catalog of products provided by a respective supplier of a plurality of suppliers. The plurality of supplier computers are connected through a network to a master computer configured for receiving from each supplier computer the respective catalog of products supplied by each of said respective suppliers. Computer program code executable by the master computer, is provided for compiling each of the respective catalogs into a master supplier catalog, to thereby define an on-line supplier management system on a web server, through which a buying entity computer connected through the network to the web server may receive the master supplier catalog and display products in the master supplier catalog and other club details to buyers who may then select and order such products through their buying club.

By the use of the present invention, buying clubs and their members are afforded access to a system which will efficiently include many elements such as: catalogues of diverse product data structures, qualitative and quantitative product information, contextual login, inventory storage and sales, messaging, payments, promotional selling terms and arrangements (including specials and advertising), orders and ordering requirements, information on product availability, customized catalogues and favorites lists, customized pricing, minimum dollar requirements, geographic and product suitability identification and screening, and delivery locations and delivery timing, all of which are preferably updated in real time by suppliers and club members situated remotely, thereby facilitating purchasing and commerce by and between members, buying clubs, and suppliers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
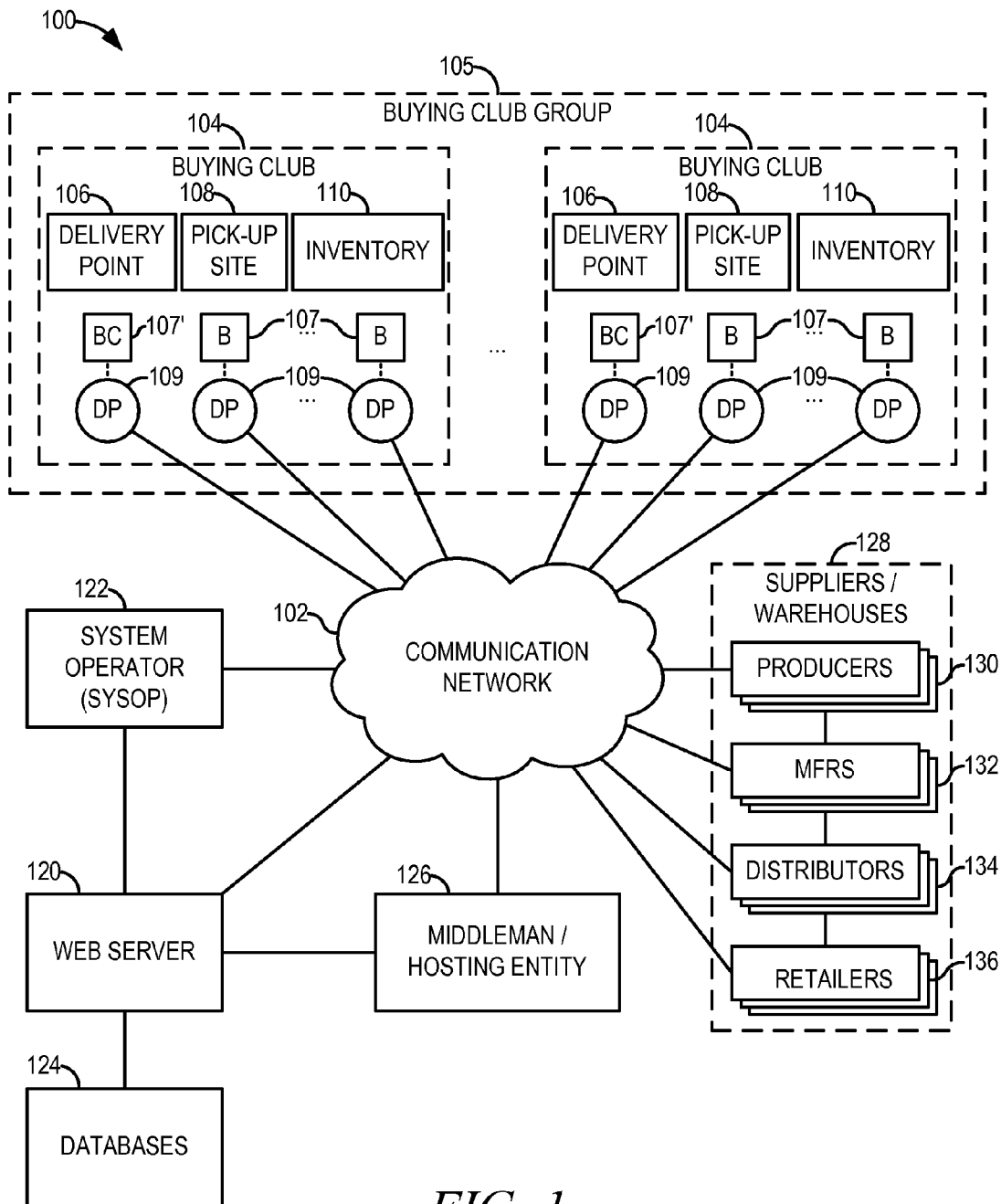
FIG. 1 is a high level flow diagram illustrating a general physical structure of a supply chain, buying club levels, and participants, and the flow of information to and from a Master Catalogue in accordance with features of the present invention.

In the following discussion, numerous specific details are set forth to provide a thorough understanding of the present invention. However, it will become clear to those skilled in the art that the present invention may be practiced without such specific details. In some instances, well-known elements have been illustrated in schematic or block diagram form in order not to obscure the present invention in unnecessary detail. Additionally, for the most part, details concerning computers, browsers, the Internet, communication networks, e-mail, network protocols and technologies (e.g., HTTP, HTML, XML, XML Schemas, XSLT, SOAP, CORBA, DCOM, RDBMS, SQL), database design elements (e.g., join tables, keys, indexes, and/or attributes such as company name, SKU, product description, product categories), and the like have been omitted, except insofar as necessary to describe the present invention, inasmuch as such details are not considered necessary to obtain a complete understanding of the present invention, and are considered to be within the skills of persons of ordinary skill in the relevant art.

It is noted that, unless indicated otherwise, all functions described herein are performed by a data processor in accordance with code. As used herein, the term "data processor" shall include and be used to refer to any one or more of a microprocessor, a microcontroller, an application-specific integrated circuit (ASIC), a device (e.g., a personal digital assistant (PDA), a mobile telephone, or the like), an electronic data processor (EDP), a computer, a personal computer (PC) and/or the like. Furthermore, as used herein, the term "code" shall include and be used to refer to any one or more of program code, software, integrated circuits, read-only memory (ROM), and/or the like, effective for instructing the data processor how to perform such functions. Still further, it is considered that the design, development, and implementation details of all such code would be apparent to a person having ordinary skill in the art based upon a review of the present description of the invention.

For the purposes of discussion and explanation, as used herein, the term "quantitative data" refers to "hard" data that is used for ordering a product, and would thus include information such as a SKU number (e.g., 33455), the product's description (e.g., Nature's Peanut Butter), units per case (e.g., 12), unit label (e.g., 15 oz. jar), price (e.g., $1.56), a start time point for which the price is effective (and perhaps an end time point as well), and the like. The term "qualitative data" is used herein to refer to "soft" data, such as a product's ingredients, nutritional information (e.g., serving sizes, calories, fat grams and the like), packaging information, an expanded product description, characteristics (e.g., organic, genetically modified, kosher, and the like), an image of the product, and the like. Qualitative information may also include intangible characteristics such as, for example, the type of workforce employed by a manufacturer (e.g., local versus international), wage levels paid to workers (e.g., below or above living wage levels), the ownership structure of a company (e.g., small family-owned versus large public company), methods of production (e.g., sustainable vs. non-sustainable), specific countries of origin of the product or the ingredients to the product, and the like.

The term "unit" in the context of retail products preferably refers to the smallest indivisible package (e.g., a bag of cereal, can of tomatoes, bottle of ketchup, and the like) that may be sold from a retail outlet such as, for example, a grocery store. The terms "case", "caselot", "case lot", or "case load" may be used interchangeably, and are used herein to indicate a bulk quantity of units of a given product as it is preferably shipped in bulk to a retail business or to a buying club. Therefore, as used herein, the terms "case", "caselot", "case lot", or "case load" preferably designate a bulk quantity increment.

The physical container for some products may be a pallet of goods, a truck load, a railroad car, container, bargelot, or shipload, but most typically will be a cardboard carton containing a pre-defined quantity of units of a product such as 12, 24, 30, or 144 units. In consumer packaged goods, typically these are sized by volume and weight to conveniently fit in a carton that can be easily lifted by an average individual person and is conveniently stocked by a retail outlet. For bulk markets such as grains or cargo, these are often defined by the barge lot, container, or rail car.

For many products offered by suppliers, unless a sufficient quantity of units are ordered to achieve at least one case, an order for a product is not typically filled by the supplier. In some instances, a certain minimum quantity of units are required to achieve one or more price discounts for that product with break points which are preferably set at case quantities of units. It should also be understood that, for those instances when only a pre-defined number of units (such as a case) of a product may be purchased, and buyers in the aggregate order such pre-defined number of units of a product (even in excess of say a single case quantity of units), then only the integer multiples of the pre-defined number of units that exactly achieve the pre-defined quantity increments for the group of buyers will create a valid order quantity. For example, to satisfy members with an aggregated preferred order quantity of 17 units, when the case quantity for ordering that product is 12 units, requires that the aggregated order must either be decreased by 5 units to 12 or increased by 7 units to 24 to achieve a valid order quantity that can satisfy those members. Where a product is sold by the case (or caselot, case lot, caseload, case load quantity of units and the like) then any integer multiple of the number of units in a case designates a "valid order quantity" for that product.

Some products are available on a unit (also known as "each") basis and thus a cases minimum is not a restriction on placing orders for these products, although a price break is typically offered for a case quantity of units that are ordered for a product, as compared to the price when the product is sold by the unit (or each). Where both cases and unit quantities of a product are sold, purchasing only unit quantities typically results in significantly higher prices than when purchasing a case quantity of units of that product. Where a product is sold by both the unit and by a larger quantity such as a case in which a case achieves one or more price breaks at one or more breakpoints of unit quantities, then valid order quantities are preferably defined as those quantities of units which, when ordered, obtain a price break for that product, although an order may be able to be filled by a supplier for any quantity of units since the product is available in units. For example, it is possible that price breaks might be offered for more than one quantity increment of units such as 1-3, 4-6, 7-9, and 10-12. In such an instance, the valid order quantities are preferably 4, 7, and 10 as, at each of these increased quantities of units, a further price break (discount) is offered, although an order for 1 unit may nonetheless be validly submitted to the supplier.

The terms "product" and "SKU" may be used interchangeably, each referring to a specific product that may be ordered by a buyer. "Product" preferably refers to a brief narrative description such as "Corn Flakes" or "Pinto Beans". As is generally known, SKU (Stock Keeping Unit) is, or refers to, a multi-digit number associated with a product for inventory purposes and is unique for each product of a supplier. As noted above, the acceptable quantity of a product that is required either to enable a purchase of a product and/or to achieve a price discount is termed a "valid order quantity". If a product is only sold by the case, and a case is 12 units, then a valid order quantity must consist of 12, 24, 36, or any other integer multiple of 12 units. A valid order quantity thus includes a case, case lot, caselot, case load, and caseload as well as integer multiples of cases.

It is also noted that many suppliers of goods at the wholesale level impose a minimum total dollar order requirement per order and perhaps a minimum frequency for orders (such as once per month). To make it easier to reach the minimum dollar order or frequency, or to achieve the case requirement for a given product for a given buying club, a buying club may elect to collaborate with at least one additional buying club to aggregate and optimize orders across all buyers of the group of collaborating buying clubs, provided that the collaborating clubs are preferably using a common supplier, common supplier cutoff date/time, common supplier product credit request cutoff date/time, and common delivery point when placing their collective aggregated order. This collaboration of buying clubs as a group can better achieve the minimum dollar requirement and perhaps gain further volume to achieve greater volume price discounts by increasing the total dollar amount of their order. In addition, the more buyers who participate in an order cycle, the greater the probability that valid order quantities will be achieved for buyers for each product, when those products are available only by the case. Such collaboration may also help achieve greater quantities of units to achieve successively higher price breaks for the higher quantities of orders of a given product.

Referring to FIG. 1 of the drawings, the reference numeral 100 generally designates a network system embodying features of the present invention. The system 100 comprises a communication network 102, such as a wide area network (WAN), the Internet, an intranet, a virtual private network (VPN), and the like, effective for effectuating data communications between data processors. The network 102 is coupled to each of one or more groups of buyers, referred to herein as buying clubs 104, which may optionally be organized into one or more buying club groups 105, via a plurality of terminals 109, each of which terminals comprises at least one data processor (not shown) with input and/or output capabilities.

The buying club 104 is also referred to as a "food coop", "food club", "buyer group", "buying group", and the like. A buying club is defined herein to refer to a collection of buyers 107, which includes a Buyer Coordinator 107'. A buying club is also referred to as a customer, and buying club and customer as defined herein also preferably include retailers or distributors who use the system 100 for making purchases from suppliers 128. Buyers 107 are also referred to as "members" or "consumers", and associate together to purchase products which are aggregated into a collective order (also referred to as a "coop order" or "aggregate order" and sometimes referred to as an "order cycle"), and receive a shipment of the collective order delivered to, or retrievable within, a geographic area accessible by all the buyers of the buying club. Because buyers are effectively associated together for the common purchase, they are often referred to as members, whether or not a membership fee is assessed by the club. The buyers 107 are preferably attendant to a respective input node of a terminal 109, and may place orders, revise orders, and/or obtain other information relative to orders and the club, as discussed in further detail below.

In a preferred embodiment, at least one buyer 107 of each buying club 104 assumes a role as a Buyer Coordinator 107' designated herein as a Buyer Coordinator, or "BC," 107' to handle and manage functional aspects of the invention, such as the order, payment, delivery, pickup and storage of products. A Buyer Coordinator 107' is often both the coordinator of the club and an actual buyer of products of the buying club 104 in which they fill the coordinating role. It is noted that there is no inherent reason why a Buyer Coordinator 107' cannot coordinate more than one buying club 104, although it is not presented as such in FIG. 1.

As discussed further below, the buying clubs 104 preferably have access to, control, or own a delivery point 106 where purchased goods are delivered, a pickup site 108 where goods are picked up by consumers, and inventory (not depicted but information related to which is preferably stored in databases 124) representing surplus goods that were prior purchased for consumption or re-use. The delivery point 106, pickup site 108, and/or location of the physical inventory may be one and the same location as may occur if a retailer were the Buyer Coordinator of a buying club. There is no prohibition, and in fact several advantages to a retailer acting as the buyer coordinator 107 of buying club 104. Although only two buying clubs 104 are presented in FIG. 1, it is understood that any number of buying clubs 104 may be encompassed by the system 100, or in one or more buying club groups 105.

A web server 120 is also coupled to the network 102, and one or more suppliers 128 are coupled to the network 102 for providing product data and other information to the web server 120, for use in, by way of example, a Master Catalogue 240, described further below with respect to FIG. 2. The suppliers 128 preferably comprise one or more of producers (e.g., farmers, growers, ranchers, and the like) 130, manufacturers 132, product distributors 134, retailers 136, and/or the like. If the retailer is acting as a supplier, then effectively the retailer will preferably assume some or all functions of the buyer coordinator 107'.

The web server 120 preferably comprises one or more computers coupled to the network 102. If the web server 120 comprises multiple computers, then the multiple computers may be grouped using web server management technologies (such as clustering, network load balancing, and the like) to effectuate more efficient and/or properly-scaled processing. The web server 120 is preferably operated and maintained by a system operator ("SYSOP") 122 or, alternatively, by a third party, such as a middleman/hosting entity 126 and/or a supplier 128, and is effective for facilitating data communication and processing of information for buyers 107 of the buying clubs 104, the middleman/hosting entity 126, and the suppliers 128 so that a number of functions may be managed by the web server 120 as discussed further below. Functions of a web server 120 preferably include online data storage in various electronic media formats (such as a hard drive, mirrored storage drive, random access memory, RAID, and the like), data intensive calculation and processing, off-line backup of data, network communication, execution of software programs, storage of final and intermediate calculations and data, and communications by various modalities between any number of buying clubs, producers, manufacturers, distributors, retailers, buyers, suppliers, warehouses, system operators, middlemen/hosting entities, or other parties that may access or utilize the system 100.

One or more databases 124 are preferably coupled to the web server 120 for facilitating storage of data and processing which must be performed by the server 120. The web server 120 and databases 124 preferably include substantially all data and information which is necessary to perform the functions and processes required by the system 100 in accordance with the present invention.

The middleman/hosting entity 126, preferably comprises an agent, broker, franchisee, or the like, or alternatively, may be a supplier 128 (e.g., a retailer 136, distributor 134, manufacturer 132, or producer 130 as alternative embodiments). Furthermore, the middleman/hosting entity 126 preferably includes a computer or other data input and/or output device coupled to the network 102 and to the web server 120, as discussed further below. The middleman/hosting entity 126 may also perform the same activities as a Buyer Coordinator 107' in buying clubs 104. Hence, the middleman or hosting entity 126 may alternatively be replaced or supplemented in one or more selected functions, or even in all functions, by one or more of a Buyer Coordinator 107', retailer 136, distributor 134, manufacturer 132, producer 130, or by another middleman 126 (e.g., broker, agent, or franchisee). It is noted that the middleman/hosting entity 126 may be coupled to the web server 120 either directly (bypassing the network 102), or indirectly via the network 102. For example, a direct connection to the web server 120 may be preferred for any supplier 128 (e.g., producers 130, manufacturers 132, distributors 134, or retailers 136) that is also acting as middleman or hosting entity for a number of their own buying clubs.

It should be appreciated that the system 100, including the web server 120, thus provides a "front end" real time, on-line order aggregation and optimization capability which can meet the needs of virtually any number of buying clubs 104, which are either purchasing, or desiring to purchase, products from any supplier 128, whether a producer 130, manufacturer 132, distributor 134, or retailer 136. The system 100, including the central web server 120, thus preferably serves one or more buying clubs 104, or buying club groups 105, whether the system is implemented by a supplier 128, a retailer 136, middleman/hosting entity 126, or an independent third party.
Databases As discussed above, it is advantageous for buying clubs 104, comprising a number of buyers 107, to be able to purchase products from any one or more of a number of suppliers 128 that may operate at any level in the supply chain. To that end, and with reference to FIG. 2, in the operation of the present invention, at a high level, information (e.g., relating to products and pricing) needed for effectuating such purchases is preferably disseminated (i.e., flows) from the suppliers 128, via communications network 102, to a web server 120 in which databases 124 are preferably maintained, including preferably Master Catalogue 240. In addition to supplier 128 communication of their catalogue data to web server 120, and the Master Catalogue 240 in databases 124, other supplier information is preferably communicated to web server 120 and stored in databases 124 includes shipping schedules, delivery points and areas, truck routes, supplier inventory, messages, notices, customers, order requirements, customer types, pricing structures, orders, invoices, payments, credits and other data relevant for a supplier servicing buying clubs 104. Thus a wide range of relevant data is preferably communicated to and from web server 120 via communications network 102 and stored in databases 124 by suppliers 128.

From databases 124 and web server 120, information is preferably disseminated and received (i.e., flows), via communications network 102, to and from one or more computers (not shown) at one or more buying clubs 104 (exemplified in FIG. 2 by an independent buying club 250, a retailer buying club 260, and a supplier buying club 270) and, ultimately, to individual buyers 107. Thus, preferably all the relevant product and other information available from suppliers 128 is available through web server 120 and databases 124 to the buying clubs 104 and buyers 107 utilizing suppliers 128 via communications network 102. Supplier information in databases 124 is preferably maintained in real-time through online real time integration or periodic or batch updates to and from web server 120.

In addition to supplier information, information related to buying clubs 104 with respect to club inventory, supplier pricing, member catalogue, membership, messages, notices, orders, payments, credits, and the like that are specific to each club are stored in databases 124 on central web server 120. Information stored in databases 124 depicted as Club Data 252, 262, and 272 includes the Member Catalogue as re-cast in format for the members and based on the associated data from Master Catalogue 240. All such club information is accessible through communications network 102 to buyers 107 through their membership in their respective clubs using data processor 109.

Figure 2:
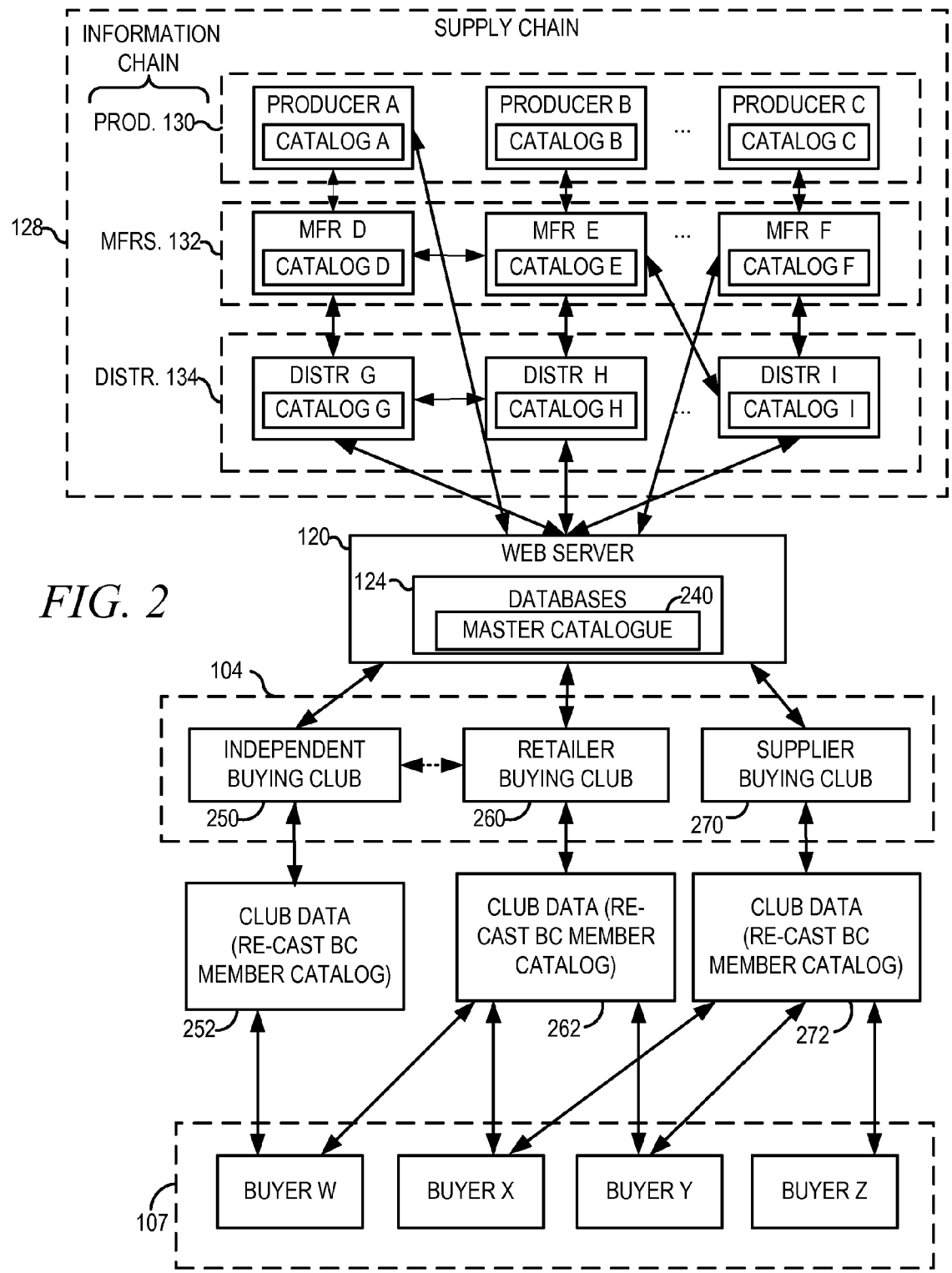
FIG. 2 exemplifies logical data relationships between selected entities of FIG. 1, illustrating the flow of information between supply chain participants, the web server and associated databases (including the Master Catalogue) and buying clubs and buyers.

As more specifically depicted in FIGS. 1 and 2, the suppliers 128 comprise a level of producers designated collectively by the reference numeral 130, a level of manufacturers designated collectively by the reference numeral 132, a level of distributors designated collectively by the reference numeral 134, and/or a level of retailers designated collectively by the reference numeral 136 (retailers not depicted in FIG. 2). As retailers are most commonly considered not to be part of the supply chain (representing instead the primary outlet for suppliers), retailer 136 is not graphically presented alongside suppliers 128 in FIG. 2. However, if a buying club 104 is managed by a retailer and if a buying club 104 were considered to be an additional step in the product distribution chain, then a retailer may be considered to be part of the supply chain, between the distributor 134 and the web server 120 (FIG. 2) to the buyer, and hence the retailer 136 has been included as a supplier 128 in FIG. 1. For the purpose of presentation hereafter, the retailer 136 will not be assumed to be defined within the supply chain.

As more specifically depicted in FIG. 2, the level of producers 130 comprises a number of individual producers, three of which are exemplified as a Producer A, a Producer B, and a Producer C, which represent the earliest stage of a product's inception, and thus the most fundamental level at which information about a product is generated. The level of producers 130 may provide information related to its respective products to each of the levels of manufacturers 132, distributors 134, and Master Catalogue 240. The Master Catalogue 240 is accessed by any of buying clubs 104 and their respective buyers 107.

Each supplier 128 provides a supplier catalogue of information which, by way of example, preferably includes, for each product offered by a respective supplier, the product's SKU (or SKUs), units per case, unit label, price, and occasionally a minimum order quantity. Such supplier catalogues will preferably include information pertaining to tiers that are hierarchical (eg grocery>>baked goods>>cakes>>vender name>>product name), using supplier specific classifications of products that make product identification and searches for products offered by that respective supplier 128 expeditious for purchasers (e.g., buyers 107). As noted above, suppliers 128 preferably specify what number of units are required to constitute a case or that may obtain more favorable pricing for a product. It has also been noted that suppliers 128 use diverse data structures in selling their products and that buying clubs 104 are benefited from purchasing from a number of different suppliers 128. To facilitate such product purchase from multiple buying clubs 104, the Master Catalogue 240 is configured, as discussed in further detail below, to accommodate each data structure encompassed by the various products in the product catalogues of the suppliers 128 for access by buying clubs 104. The ability of the Master Catalogue 240 to accommodate diverse data structures is fundamental to enable order aggregation and optimization functions of buying clubs 104 to be performed accurately.

As may be appreciated from FIG. 2, the buying clubs 104, such as the buying clubs 250, 260, and 270, and buyers 107 are only able to source (i.e., purchase) products provided that the data for the products is stored in formats that may be aggregated and optimized, and then readily accessible from, the Master Catalogue 240. Therefore, in accordance with principles of the present invention, data from supplier catalogues of levels 130, 132, 134, and 136 is stored in the Master Catalogue 240 utilizing diverse data structures. Because of this suppliers 128 of different levels, whether producers 130, manufacturers 132, distributors 134, or retailers 136 can utilize the invention to add their own catalogues and upload each of their own specific catalogue information into the Master Catalogue 240 with great flexibility with respect to the data structures employed for SKUs in the suppliers' own catalogues. Furthermore, buying clubs 104 and buyers 107 may also access the Master Catalogue 240 for the purpose of obtaining information on products offered by the suppliers 128 at each of levels 130, 132, 134, and 136.

Product Data Structures

Described below, by way of example and not limitation, are three data structures (abbreviated as DS; e.g., DS-1, DS-2, DS-3) typically used by suppliers 128 to quantify information needed for aggregating and optimizing the placement of collective orders of buyers 107 of buying clubs 104. To illustrate an application with consumer goods, products are exemplified as common food and consumable items. These data structures include some of the more common relationships under which suppliers provide SKUs, units per case, unit label, minimum order quantity, and price information for a product.

In a first example of a data structure, a selected product may be sold under multiple SKU's, depending on the number of units of the product that are sold at a time. Thus, a single product may be sold under one SKU when it is sold as a single unit, and under one or more different SKUs wherein each of the different SKUs encompass a difference in the units per case. This data structure thus includes those products either sold by the unit only, or where a single SKU is sold only by the case. It also includes multiple SKUs for the same product where each SKU represents different numbers of units per case. Examples of these data structures are noted below.

In a first example of a data structure, depicted below with seven fields, a single unit of a SKU 22345, Organic Apple Shampoo, with a single unit price for the purchase, and where a designation of a minimum order quantity may be defined as not meaningful ("N/M"). This is the simplest structure offered by a supplier 128. As may be noted by the second SKU listed, this structure may also include a minimum order quantity (e.g., 4 in this example) as shown for SKU 22667, Natural Apple Cider.

| SKU | Description | Units Per Case | Minimum Order Quantity | Unit Label | Unit Price |
|---|---|---|---|---|---|
| 22345 | Organic Apple Shampoo | 1 | N/M | 12 oz. | $1.23 |
| 22667 | Natural Apple Cider | 1 | 4 | 6 oz. | $2.34 |

The following example of a data structure having six fields (dissimilar from the fields of the preceding example) illustrates a single product under a single SKU that must be purchased in cases only. Therefore, 12 units, or any integer multiple thereof (such as 24, 36, 48 and so on), are required for a buying club 104 to purchase SKU 4456 by the supplier 128. Each unit is a single 15 oz. can or jar of Eden Pizza sauce, as noted by the unit label.

| SKU | Description | Units Per Case | Unit Label | Case Price | Unit Price |
|---|---|---|---|---|---|
| 4456 | Eden Pizza Sauce | 12 | 15 oz. | $13.95 | $0.93 |

The next example below illustrates a number of SKUs of different units per case, all for the same product as defined by the same description and unit label, but having a different number of units per case.

| SKU | Description | Units Per Case | Unit Label | Case Price | Unit Price |
|---|---|---|---|---|---|
| 344560 | Oats Rolled Quick OG1 | 1 | Lb. | $1.99 | $1.99 |
| 344390 | Oats Rolled Quick OG1 | 10 | Lb. | $15.02 | $1.51 |
| 173815 | Oats Rolled Quick OG1 | 25 | Lb. | $28.62 | $1.15 |
| 334565 | Oats Rolled Quick OG1 | 50 | Lb. | $45.00 | $0.90 |

It should be noted that the immediately preceding example, which shows a number of related SKUs, offers material price benefits to buyers 107 when the buyer through the buying club 104 is able to participate in larger quantity purchases and is also able to equal the supplier's specific quantity requirements by means of membership in the buying club and use of the invention. A family purchasing this product can prospectively reduce their per unit cost of food by over 50% for this product. A minimum order quantity for any SKU may be stipulated under this structure as well (not shown in the above table). However, the minimum order quantity is most commonly associated with the smallest units per case in order to set a lower bound on the number of units that are sold by the supplier.

In another example of a data structure, shown below having seven fields, a selected product is sold under one SKU but offered in that one SKU at different unit quantities and (virtually always) at different prices.

| SKU | Description | Units Per Case | Minimum Order Quantity (MOQ) | Unit Label | Case Price | Unit Price |
|---|---|---|---|---|---|---|
| TTO-26310 | Tea Tree Oil | 1 | 5 | oz. | $0.96 | $0.96 |
| TTO-26310 | Tea Tree Oil | 25 | N/M | oz. | $20.75 | $0.83 |
| TTO-26310 | Tea Tree Oil | 50 | N/M | oz. | $34.43 | $0.69 |

A minimum order quantity may also be included in this data structure as well. For example, the supplier of TTO-26310 above requires purchase of a minimum of 5 of the 1 oz. size in order to fulfill the order.

In another example of a data structure, shown below having seven fields, a SKU is sold in single units, but a range of units leads to a discount on prices where the units purchased achieve the higher quantities. The table below exemplifies this data structure. While there is not intended to be a limit to the number of ranges, only four are shown in the table below (namely, 1-3, 4-6, 7-9, and 10 or more).

| SKU | Description | Unit Label | Price Per Unit | | | |
|---|---|---|---|---|---|---|
| | | | 1-3 units | 4-6 units | 7-9 units | 10+ |
| 640-AAR | Rhubarb Root | lb. | $7.20 | $7.00 | $6.85 | $6.70 |

Unit Label Adjustor

The unit label, which typically defines the size, weight, or count by which each unit is sold, may not always be identical across the same product. As presented above, both certain data structure examples show a single product that is sold in different units per case increments, but for each product there is a common unit label for the individual product. However, it is also possible (although uncommon) for a single product to be sold under divergent unit labels. To enable optimization to occur in such instances, in one embodiment an additional field called a unit label adjustor (ULA) is provided to allow adjustments of quantities to a standard unit label on which aggregations and optimizations may be performed. To create an integer unit label adjustor, it is preferably to determine the least common multiple of the unit labels and then determine the number of units that will comprise that least common multiple based on the unit label. The following exemplifies different unit labels applied to a single product that is sold by different SKUs.

| SKU | Description | Units Per Case | Unit Label | Unit Label Adjustor (ULA) | Case Price | Unit Price* |
|---|---|---|---|---|---|---|
| 544561 | Nature's Raisins | 1 | 4 Lb. | 12 | $4.00 | $4.00 |
| 644393 | Nature's Raisins | 10 | 12 Lb. | 4 | $35.00 | $3.50 |
| 773815 | Nature's Raisins | 25 | 48 Lb. | 1 | $28.62 | $1.15 |

For a buying club 104 that wishes to access a supplier 128 using the above data structure and wishes to optimize sales of Nature's Raisins (using the above table as an example), a unit label adjustor (ULA) may thus be added to the above. The ULA records that 1 of SKU 773815 equals 4 of SKU 644393 and that 1 of SKU 773815 equals 12 of SKU 544561. The ULA thus provides information that a buying club 104 utilizing system 100 on web server 120 would require for aggregation and optimization purposes when the unit label varies in the data structure of a product, by allowing orders for the product to be optimized beyond that which is conveyed by any of the unit labels. (The detailed descriptive means by which this optimization may be achieved is further disclosed in the '803 patent application.) Alternatively, the same result may also be achieved by ascribing further granularity to the unit label (for example, by delimiting 4 lb. as one field of 4 and another field of lb.). While feasible, this alternative approach is not believed to be the best mode of the invention, primarily due to the rare usage of different unit labels for the same product by a single supplier (which thus do not require a ULA) as well as the extra system and user overhead that are introduced under the alternative approach.

Random Weight

The units in which a product is sold may not always be integers. An attribute which may be associated with a data structure is the capability for sale of a product by random weight (also sometimes referred to as fractional weight). To allow for this, the units that may be ordered by members may be any number, preferably carried to two decimal places such as 0.50, or 2.61 (or alternatively presented as fractions ½ or 2⅝). One common example of this is for products most commonly falling in the categories of bulk (such as grains), dairy (as for example cheeses), or produce (where a high valued product may be sold in portions of a pound). In the table noted below, SKU 453-476 is noted as carrying a random weight designation with units per case of 5.00 pounds. Therefore, the supplier sells this product in 5.00 lb increments, but one may receive a variation of the quantity actually delivered such as 4.95 lbs or 5.12 lbs. The ability to accept random weight designations is encompassed under the diverse data structures described by the invention. Although units are exemplified herein as having two decimal places, any desired and appropriate number of decimal places (or fractional increments) may be used.

The following table design is preferably encompassed by Master Catalogue 240 so as to exemplify the aforementioned elements wherein the diverse data structures described above are stored in a consistent data structure which may be optimized. Each row is assumed to be uniquely associated with a supplier, although this supplier identification field is not shown in the table below.

| Key | Set | SKU | Description | Units Per Case | Unit Label | Unit Label Adjustor | Case Price | Unit Price | MOO |
|---|---|---|---|---|---|---|---|---|---|
| 1 | 1 | 22345 | Organic App. Sh. | 1 | 12 oz. | n/a | $1.23 | $1.23 | n/a |
| 2 | 2 | 22667 | Natural Apple Cr | 1 | 6 oz. | n/a | $2.34 | $2.34 | 4 |
| 3 | 3 | 4456 | Eden Pizza Sauce | 12 | 15 oz. | n/a | $13.95 | $0.93 | n/a |
| 4 | 4 | 344560 | Oats Rlld. Qk OG1 | 1 | Lb. | n/a | $1.99 | $1.99 | n/a |
| 5 | 4 | 344390 | Oats Rlld. Qk OG1 | 10 | Lb. | n/a | $15.02 | $1.51 | n/a |
| 6 | 4 | 173815 | Oats Rlld. Qk OG1 | 25 | Lb. | n/a | $28.62 | $1.15 | n/a |
| 7 | 4 | 334565 | Oats Rlld. Qk OG1 | 50 | Lb. | n/a | $45.00 | $0.90 | n/a |
| 8 | 5 | TTO-26310 | Tea Tree Oil | 1 | oz. | n/a | $0.96 | $0.96 | 5 |
| 9 | 5 | TTO-26310 | Tea Tree Oil | 25 | oz. | n/a | $20.75 | $0.83 | n/a |
| 10 | 5 | TTO-26310 | Tea Tree Oil | 50 | oz. | n/a | $34.43 | $0.69 | n/a |
| 11 | 6 | 544561 | Nature's Raisins | 1 | 4 Lb. | 12 | $4.00 | $4.00 | n/a |
| 12 | 6 | 644393 | Nature's Raisins | 10 | 12 Lb. | 4 | $35.00 | $3.50 | n/a |
| 13 | 6 | 773815 | Nature's Raisins | 25 | 48 Lb. | 1 | $28.62 | $1.15 | n/a |
| 14 | 7 | 640-AAR | Rhubarb Root | 1 | lb. | n/a | $7.20 | $7.20 | n/a |
| 15 | 7 | 640-AAR | Rhubarb Root | 2 | lb. | n/a | $14.40 | $7.20 | n/a |
| 16 | 7 | 640-AAR | Rhubarb Root | 3 | lb. | n/a | $21.60 | $7.20 | n/a |
| 17 | 7 | 640-AAR | Rhubarb Root | 4 | lb. | n/a | $28.00 | $7.00 | n/a |
| 18 | 7 | 640-AAR | Rhubarb Root | 5 | lb. | n/a | $35.00 | $7.00 | n/a |
| 19 | 7 | 640-AAR | Rhubarb Root | 6 | lb. | n/a | $42.00 | $7.00 | n/a |
| 20 | 7 | 640-AAR | Rhubarb Root | 7 | lb. | n/a | $47.95 | $6.85 | n/a |
| 21 | 7 | 640-AAR | Rhubarb Root | 8 | lb. | n/a | $54.80 | $6.85 | n/a |
| 22 | 7 | 640-AAR | Rhubarb Root | 9 | lb. | n/a | $61.65 | $6.85 | n/a |
| 23 | 8 | 453476 | Farmer's Cheese | 5.00 | lb. | n/a | $5.25 | $1.05 | n/a |

With reference to the above table, the leftmost column is referred to as a key, and uniquely identifies each row (or record) of the table. The Master Catalogue 240, although utilizing the same SKU as provided by the supplier 128, utilizes the key field to ensure that each row is separate and distinct thereby uniquely identifying each row to prevent incorrect cross-references when two suppliers might coincidentally adopt identical SKU numbers. (Alternatively, this level of granularity may be achieved by concatenation of a unique supplier number and the SKU number of the supplier).

For purposes of grouping related products under these diverse data structures, it is preferable for a unique number to be established which denotes each related set of SKUs across which aggregations and optimizations may be run. This grouping of SKU's is referred to as a Set and is the next (second) column of the table. A Set represents the rows across which aggregations and optimizations may be achieved for a given product. Each Set is preferably associated with a supplier 128.

The next columns represent commonly understood attributes of product catalogues, including the SKU (third column) and product description (fourth column). The fifth column represents the units per case, which is most particularly important in optimization calculations. The sixth column represents the unit label, which defines what a single unit (each) of that product comprises.

The seventh column represents the Unit Label Adjuster (ULA), which is preferably used as noted above when SKUs of a Set have different unit labels. Set 6 illustrates an example of how the ULA may be utilized in this table. The remaining columns of the table represent the supplier's case price, unit price, and MOQ which are fields that have been described above.

The very last row of this table, Farmer's Cheese, (23 in the key column), shows a product that is sold by random weight and, accordingly, the units per case are carried to two decimal places, as a suitable number of decimal places for this product from this supplier.

Figure 3:
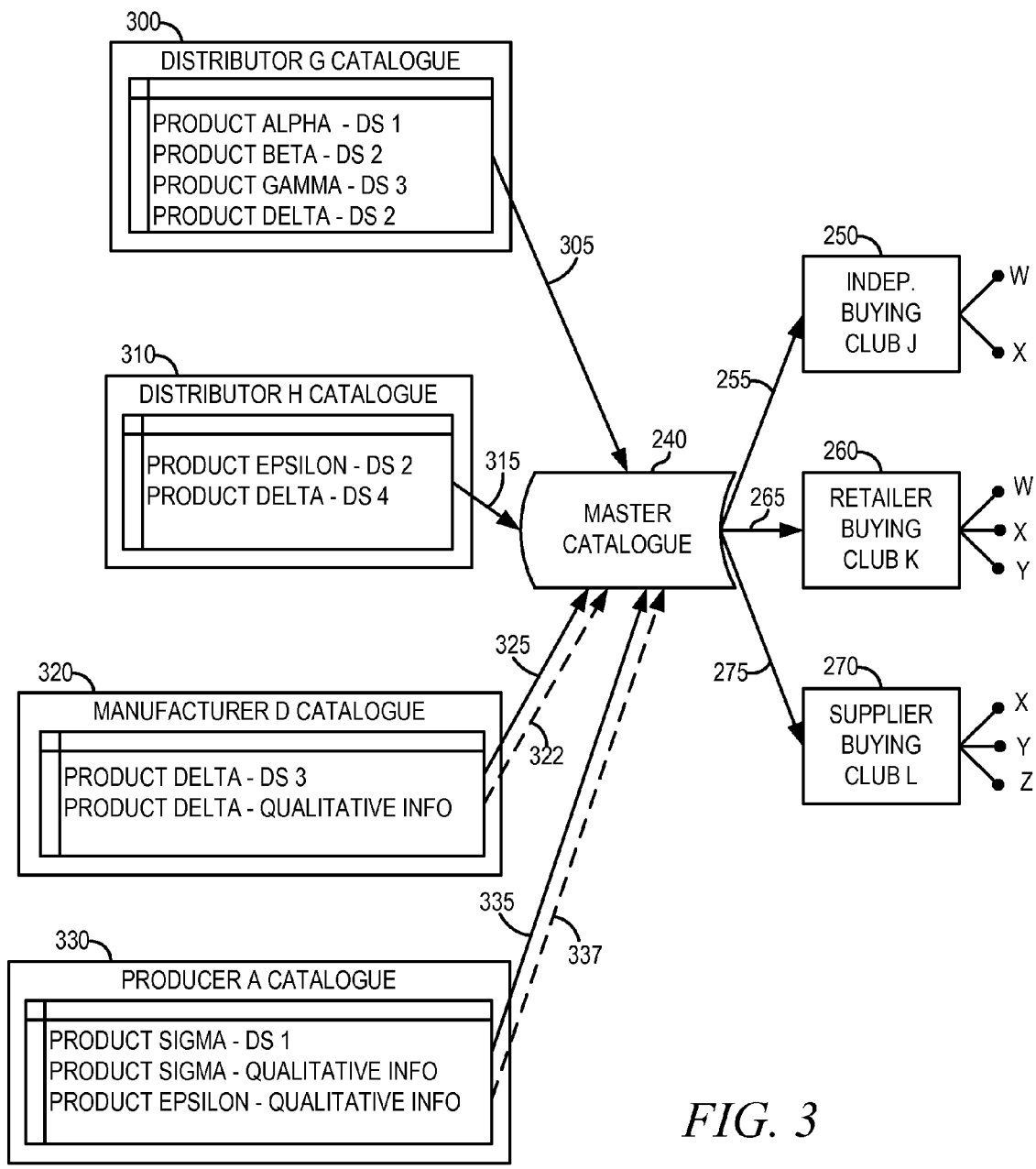
FIG. 3 is a high level flow diagram illustrating flows of quantitative information from Distributors and qualitative information from Manufacturers for selected products to a Master Catalogue.

FIG. 3 exemplifies a flow of data from selected suppliers 128 to the Master Catalogue 240 for communicating the foregoing diverse data structures. FIG. 3 utilizes catalogues of very few SKUs which nonetheless include diverse data structures to illustrate the flow of product information to the Master Catalogue from the catalogues of selected suppliers 128, including distributors 134 (represented by the distributors G and H having catalogues 300 and 310, respectively), manufacturers 132 (represented by the manufacturer D having a catalogue 320), and producers 130 (represented by the producer A having a catalogue 330). Rather than present long lists of data which tends to obfuscate rather than illustrate the invention, the data structures of each product are simply labeled DS1 for Data Structure 1, DS2 for Data Structure 2 and so on. The important point to note is that such Data Structures 1, 2, and 3 are different from one another but that they are all readily encompassed within Master Catalogue 240. With further respect to FIGS. 3, 4, and 5, it is also noted that solid arrow lines from suppliers 128 to the Master Catalogue 240 represent the flow of "quantitative" information (e.g., selling data, such as units per case, unit label, pricing and the like), and dashed arrow lines represent the flow of "qualitative" information (e.g., ingredients, nutritional information, and the like), as discussed further below.

FIG. 3 exemplifies how the diverse data structures of the suppliers 128 may be transmitted between the respective supplier catalogues 300, 310, 320, and 330 and the Master Catalogue 240. Accordingly, Distributor G Catalogue 300 contains 4 products (Alpha, Beta, Gamma, and Delta), one of which is sold under a Data Structure 1, two of which are sold under a Data Structure 2, and another of which is sold under a Data Structure 3, and each of which are updated to Master Catalogue 240 by means of quantitative communication link 305. The three different data structures for products offered by Distributor G in the Distributor G Catalogue 300 are converted to a common data structure as utilized by the Master Catalogue 240 and stored therein in databases 124 so that the computers 109 of the buying clubs 250, 260, or 270 may access through the Master Catalogue 240 products offered in the Distributor G Catalogue 300, perform aggregations and optimizations without a loss of accuracy, and place orders for products, even when a single supplier 128 (exemplified herein as Distributor G) sells products under more than one data structure (exemplified herein as three data structures). The aggregation and optimization calculations performed herein are preferably performed in accordance with the '803 patent application. The conversion of diverse data structures to a common data structure utilized by the Master Catalogue 240 is described in further detail below with respect to FIG. 4.

Further in FIG. 3, Distributor H Catalogue 310 contains two products, one of which is Product Delta, which as noted above, is also sold in Distributor G Catalogue 300. Of particular note, Product Delta is presented in Distributor G Catalogue 300 for sale under Data Structure 2, but in Distributor H Catalogue 310 it is presented for sale under Data Structure 4. Quantitative information relating to products Epsilon and Delta of Data Structures 2 and 4 respectively are each communicated from Distributor H Catalogue 310 to Master Catalogue 240 by means of quantitative communication link 315. Product Delta therefore portrays an example of a sale of the same product sold by two different suppliers 128 who nonetheless utilize diverse data structures for sale of that exact same product. By converting these diverse data structures into a common data structure in the Master Catalogue 240, accurate aggregations and optimizations may be performed by any of the Buying Clubs 250, 260, or 270 for purchases of Product Delta from either Distributor G or Distributor H.

Still further, FIG. 3 also illustrates the sale of Product Delta, not only by the Distributors G and H, but also by the Manufacturer D directly (i.e., bypassing a distributor). The Manufacturer D Catalogue 320 communicates quantitative (e.g., selling) data about Product Delta (which is manufactured by Manufacturer D) to be offered in Master Catalogue 240 under Data Structure 3 through link 325, thus illustrating a third alternative sale of the same price under a different data structure. It should be evident from the example that there is no limit on the number of different data structures that may be accommodated in the sale of a product through Master Catalogue 240.

The Manufacturer D Catalogue 320 also passes qualitative information (e.g., ingredients, nutritional informational, and the like) on Product Delta to the Master Catalogue 240 via dashed link 322. This qualitative information on Product Delta provided by Manufacturer D of Product Delta is preferably automatically associated with the catalogues of Distributor G, Distributor H, or Manufacturer D as will be described in further detail below with respect to FIG. 4. Then, when any or all of Buyers W, X, Y or Z of buying clubs 250, 260, or 270 access products of Distributor G, Distributor H, or Manufacturer D through the Master Catalogue 240, the qualitative information on Product Delta provided by Manufacturer D is then made available. There is thus eliminated a requirement for Distributor G or Distributor H to update qualitative information on Product Delta because that information has already been provided by Manufacturer D through qualitative communication link 322.

Still further, FIG. 3 shows Producer A Catalogue 330 providing the sale of Product Sigma via link 335 to Master Catalogue 240. Product Sigma is sold under Data Structure 1 and such (quantitative) data is communicated to Master Catalogue 240 via link 335, and product (qualitative) information on Product Sigma is communicated via link 337.

It should be noted therefore that FIG. 3 illustrates the passing to the Master Catalogue 240 of quantitative information from Distributors G and H, Manufacturer D, and Producer A via respective links 305, 315, 325, and 335, and the passing to the Master Catalogue 240 of qualitative information from Manufacturer D and Producer A via respective links 322 and 337. The buying clubs 250, 260, and 270 each have access (via web server 120 not depicted) to the quantitative and qualitative information via links 255, 265, and 275, respectively, and may thereby purchase Product Delta from any of Distributor G, Distributor H, or Manufacturer D without special consideration of the different data structures, DS-2, DS-3, or DS-4. This is because, for member ordering purposes, all data structures are presented as unit quantities for buying clubs so a common ordering modality can be utilized by all buying clubs regardless of the data structure selected for any product by a supplier. Also buying clubs 250, 260, and 270 may, via links 255, 265, and 275 to Master Catalogue 240, purchase Product Sigma from Producer A. Thus, Buyers W, X, Y and Z can place orders for these products through each buying club 104 of which they are respectively members and have full access to not only the quantitative information necessary for ordering but also gain access to qualitative information provided by the suppliers to learn more about the products being presented for sale.

Suppliers 128 thus have full flexibility in selling products under diverse data structures which encompass their specific product sales approach, and buyers 107 of buying clubs 104 may purchase products from any supplier 128 with confidence that the aggregation and optimization processes will nonetheless be accurate as suppliers' diverse data structures are accommodated in a fashion that will enable accurate aggregation and optimization.

The above example with respect to FIG. 3 exemplifies some of the data structures that are common to many suppliers 128, and a process whereby data contained in those diverse structures are communicated to a Master Catalogue 240. However, it should be understood that the foregoing represents neither a complete listing of selling data structures nor the only means for communicating and updating a Master Catalogue or data collection with diverse structures. The above illustrates that diverse data structures can be created and stored in a broader, "universal" structure that has the attendant benefit that any supplier 128 (whether a producer 130, manufacturer 132, or distributor 134) may provide the requisite information needed by the buying clubs 104 so that aggregations and optimizations can be performed which satisfy each supplier's sale terms for each of their products and also maximize each club member's purchasing options and satisfaction.

Manufacturer Product Information Update

As noted above, suppliers' product catalogues may contain diverse data structures encompassing quantitative information such as a SKU number, a brief product description (e.g., natural fiber oats), units per case, unit label, and price. As discussed above, upon uploading such quantitative information into a Master Catalogue 240, the quantitative information is converted into a "universal" format that is suitable for performing aggregation and optimization calculations for orders from buyers 107 of buying clubs 104. In addition to providing quantitative information to buyers 107 of buying clubs 104, it is preferable to also provide qualitative information that can more fully describe a product for buyers.

Distributors 134 are generally not the originators, but are rather the recipients of qualitative information which they usually receive from manufacturers 132 and/or producers 130 of products. Additionally, distributors typically source from many suppliers, hundreds even, and maintaining such information would be burdensome. Thus ingredients, nutritional information and the like are much more likely to be available to and provided by the product's manufacturer 132 or producer 130 (as used hereinafter, the term "manufacturer 132" shall include the producer 130). The manufacturer 132 generally has the qualitative information that the buyers 107 desire, and the manufacturer 132 desires to present as much information about their products as possible to entice buyers 107 to buy their products. Since each manufacturer 132 usually both has such qualitative information and also has a strong vested interest in updating such information, it is most expeditious for each manufacturer 132 to be able to access the Master Catalogue 240 directly to update the qualitative product information directly and independently of any distributor 134 or other third party that is selling that manufacturer's products.

An initial step for uploading qualitative product information for a manufacturer 132 preferably includes providing a manufacturer 132 with a login name and password that ensures that only the manufacturer of that product can update the qualitative information related to that product. It is also critical that a reliable association be established between the qualitative information about the product provided by the manufacturer 132 and the quantitative information related to each distributor 134 selling that manufacturer's product. Then each distributor 134 who has included these products in their own catalogue (and then by extension into the Master Catalogue 240) will be able to provide all qualitative product information available from the manufacturer 132, as well as the quantitative information provided by the distributor 134 to the buyers 107 of the buying clubs 104 that are sourcing from the distributor 134. A critical link in achieving the above capability is the establishment of a unique "one-to-many" relationship between the qualitative product information ("one") of a manufacturer's product and each distributor's quantitative information ("many") that has included that manufacturer's product in the Master Catalogue 240. There are a number of ways to establish such a relationship, some of which are exemplified below with respect to FIG. 4.

One preferred means by which the link between a manufacturer's qualitative product information and each distributor's quantitative information may be established is based on the codifications provided for products in the decade of the 1970's. Such codifications include the Universal Product Code (UPC as defined by the Uniform Product Code Council) and the European equivalent, the EAN (European Article Numbering). These codifications are non-hierarchical, bar coded, sequence types of numbers with the key characteristic of uniquely defining (if used properly) each manufacturer's product. An alternative means of achieving the same result is to create a unique number by providing an ability to the manufacturer 132 to manually link that manufacturer's products with those products of each distributor 134 that has listed that manufacturer's products in the Master Catalogue. A third means of achieving this link is for the manufacturer 132 to pass a unique number (such as a proxy UPC) to the distributor 134 that may then be used by that distributor 134 and passed to the Master Catalogue 240. There are a number of ways that a unique link may be established between a product of manufacturer 132 and distributors 134 which sell that product but all of these must utilize some ability to associate the product between its manufacturer and any company selling this product. Therefore, disclosed is a "Manufacturer's Unique Number" (or "MUN") for establishing a desired association between a manufacturer's qualitative product information and each distributor's quantitative information.

Figure 4:
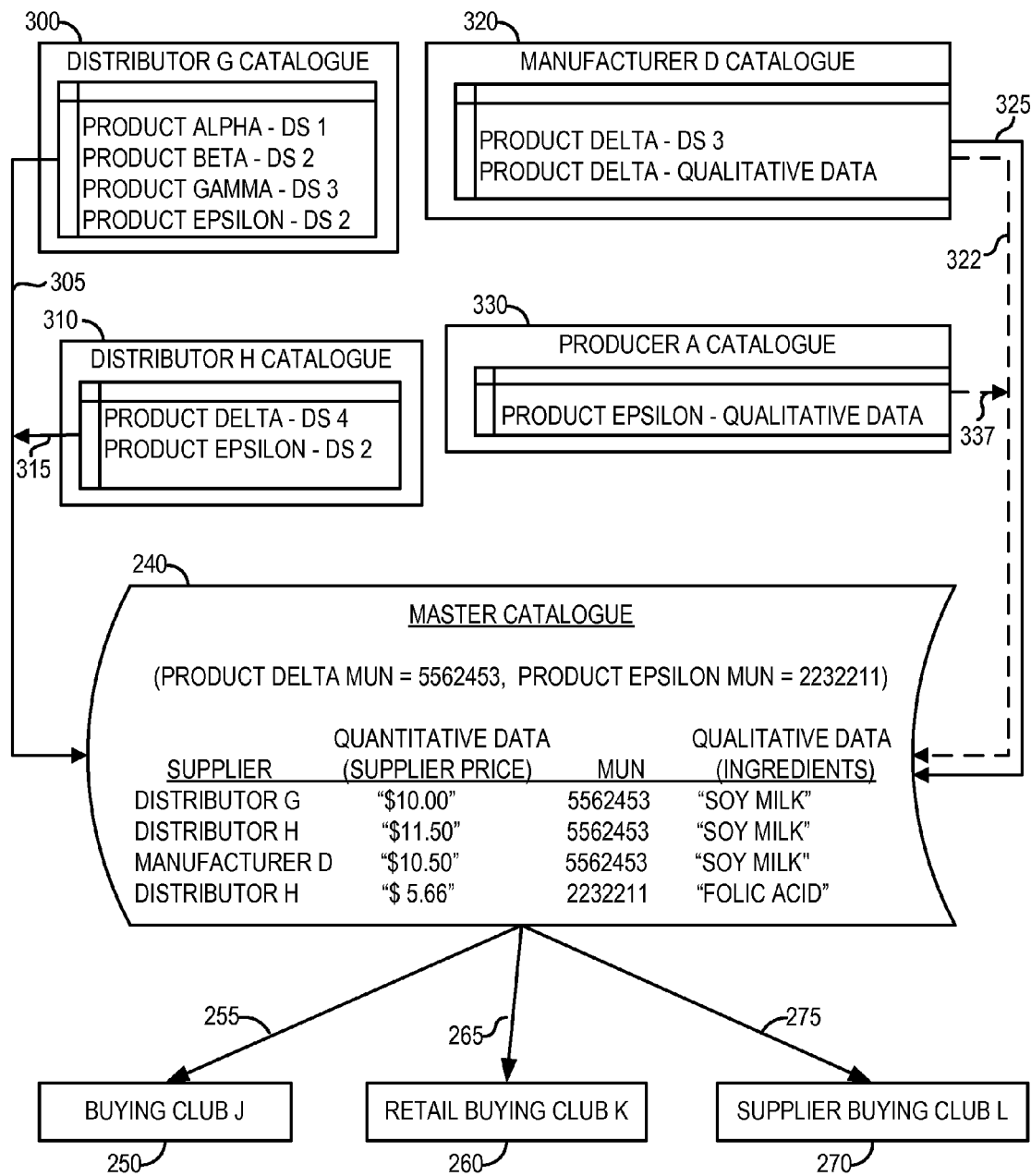
FIG. 4 is a more detailed flow diagram showing a specific association of quantitative and qualitative information between Distributors and Manufacturers respectively, of selected products in a Master Catalogue.

FIG. 4 exemplifies how a Manufacturer's Unique Number (MUN) may be used to associate quantitative data and qualitative data to the Master Catalogue 240. Accordingly, selected data from distributors and manufacturers depicted in FIG. 3 are tabulated below:

Distributor G Catalogue 300—Data Structure 2:

| MUN | Product | Unit Price |
|---|---|---|
| 5562453 | Delta | $10.00 |

Distributor H Catalogue 310—Data Structure 4

| MUN | Product | Unit Price |
|---|---|---|
| 5562453 | Delta | $11.50 |

Manufacturer D Catalogue 320—Data Structure 3

| MUN | Product | Unit Price |
|---|---|---|
| 5562453 | Delta | $10.50 |

Manufacturer D Catalogue 320—Qualitative Information

| MUN | Product | Ingredients |
|---|---|---|
| 5562453 | Delta | Soy Milk |

Distributor H Catalogue 310—Data Structure 2

| MUN | Product | Unit Price |
|---|---|---|
| 2232211 | Epsilon | $5.66 |

Producer A Catalogue 330—Qualitative Information

| MUN | Product | Ingredients |
|---|---|---|
| 2232211 | Epsilon | Folic Acid |

As shown in FIG. 4, the Distributor G Catalogue 300 submits via the link 305 quantitative information to the Master Catalogue 240, which data indicates a Price=$10.00 for MUN 5562453 (Product Delta) from Distributor G. Similarly but separately, Distributor H Catalogue 310 submits via the link 315 quantitative information including Supplier Price=$11.50 for MUN of 5562453 (Product Delta) from Distributor H. Similarly but separately, the Manufacturer D Catalogue 320 submits to the Master Catalogue 240 for MUN 5562453 (Product Delta) qualitative information via the link 322 indicating Ingredients=Soy Milk, and also quantitative information via the link 325 to indicate Price=10.50 from Manufacturer D. Master Catalogue 240 accepts quantitative and qualitative information from all of links 305, 315, 322, and 325 and associates the information using MUN 5562453 in a manner that would be apparent to person skilled in the art upon a reading of the present disclosure. Each of the Buying Clubs 250, 260, and 270, when accessing the Master Catalogue 240 via the links 255, 265, and 275 for purchasing from Distributor G Catalogue 300, will receive a Supplier Price=$10.00 and Ingredients=Soy Milk for Product Delta, and for purchasing from Distributor H Catalogue 310, will receive a Supplier Price=$11.50 and Ingredients=Soy Milk for Product Delta, and for purchasing from Manufacturer D Catalogue 320, will receive a Supplier Price=$10.50 and Ingredients=Soy Milk for Product Delta.

In a second example, the Master Catalogue 240 is updated via link 315 from Distributor H Catalogue 310 for Product Epsilon with MUN of 2232211 and with quantitative information of Supplier Price=$5.66, and via link 337 from Producer A Catalogue 330 for Product Epsilon having MUN of 2232211 with Ingredients=Folic Acid. Each of the Buying Clubs 250, 260, and 270, when accessing the Master Catalogue 240 via the links 255, 265, and 275 for purchasing from Distributor H Catalogue 300, will receive a Supplier Price=$5.66 and Ingredients=Folic Acid for Product Epsilon.

Links 255, 265, and 275 thus denote communication of both quantitative and qualitative information to buying clubs 104 (e.g., 250, 260, and 270). Note that because the distributors and the manufacturer provide updated information using a common MUN, there is no need for the product to be sold by both entities under the same name, and thus manufacturers 132 and distributors 134 may use different names for the same product, and buyers will view whichever name is chosen by the supplier 128 (manufacturer 132 or distributor 134) whose catalogue the buyer is accessing. The invention thus allows distributors to update quantitative information for a product, and manufacturers to update qualitative information for the same product, and to establish a reliable association between the types of information and the sources for a product that can then be accessed for purchase by members of buying clubs 104.

In a preferred embodiment, only properly authenticated parties will be enabled to validate and access the above information. For example, only Distributor G can update Master Catalogue 240 with the information pertaining to Distributor G. Similarly, Buying Club 250 will only be able to access via Master Catalogue 240 the Distributor G Catalogue 300 if Buying Club 250 has appropriate rights to access the Distributor G Catalogue 300. And buying clubs 250, 260, and 270 may only access information in Master Catalogue 249 if permitted to do so by supplier 128.

The foregoing describes a system and a method for updating the Master Catalogue 240 with both a manufacturer's qualitative information and a distributor's quantitative information about a product. The system and method may also be applied when a further level is introduced between the suppliers and buyers. For example, a farmer (i.e., a type of producer 130) produces a product (such as a grain) that is contained in a manufactured product (e.g., cereal) that is then sold to a distributor, and that product is then depicted in the Master Catalogue 240. The farmer may update the Master Catalogue 240 directly with qualitative information which may be linked to the end product. In such a situation, a unique association may be made by collaboration between the farmer and the manufacturer of the product to ensure that the association to the manufactured product is accurate based on the specific sourcing employed by the manufacturer and by further associating specific lots of the product produced by a manufacturer and each farmer which has provided a product which is an ingredient of that product in that lot.

General Operation

Figure 5:
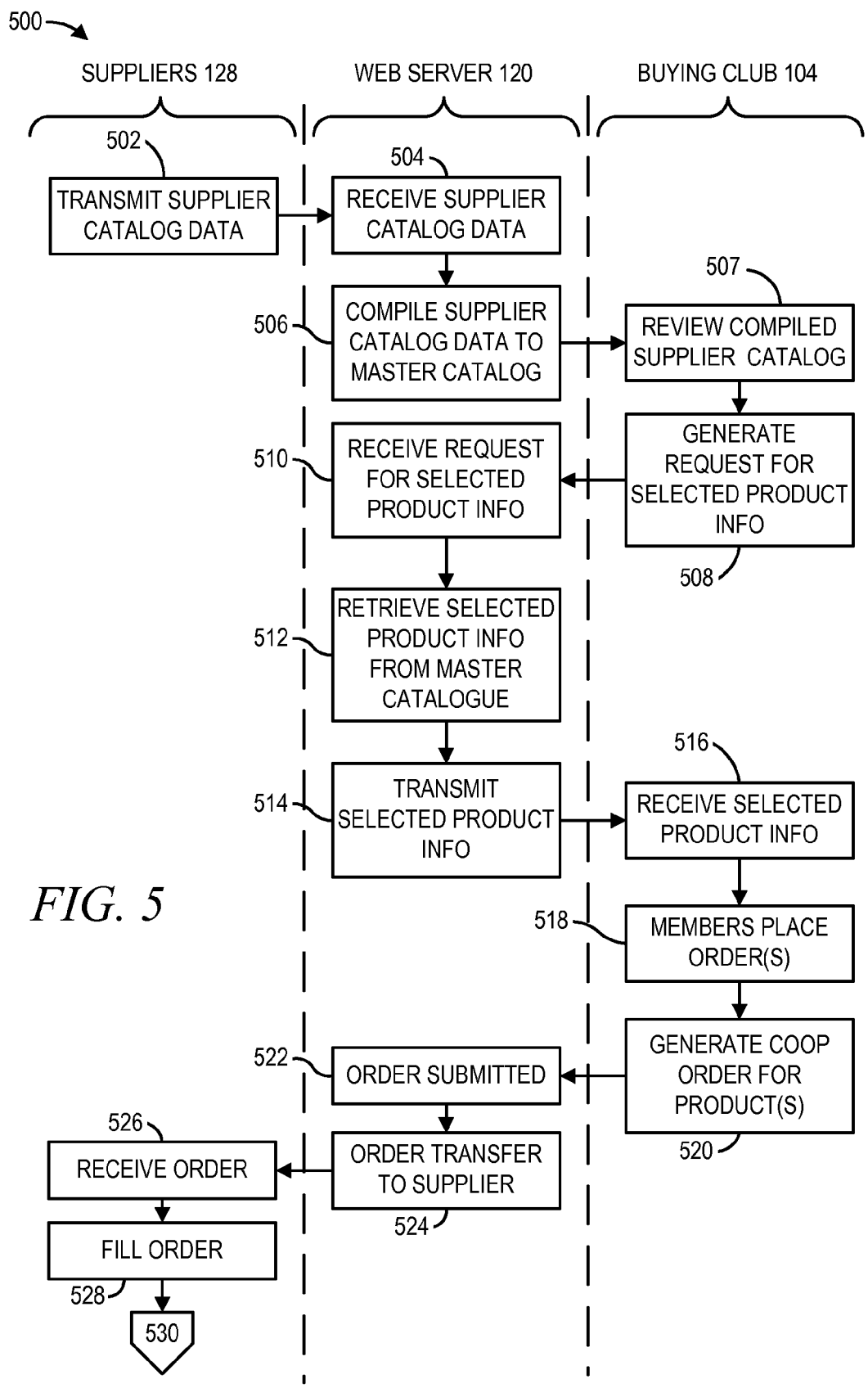
FIGS. 5-6 are a high level flow diagram illustrating the process for updating catalogue information and processing orders based on catalogue data.

FIG. 5 depicts a flowchart 500 of control logic implemented by the system 100 for facilitating the selection and ordering of products by members of buying clubs in accordance with the present invention. In step 502, a supplier 128 transmits catalog data as described above with respect to FIG. 3. In step 504, the web server 120 receives the catalog data from the supplier 128 and, in step 506, the web server 120 compiles the supplier catalog data into the Master Catalogue 120 as described above with respect to FIG. 4, thereby enabling that catalogue data to be accessed by buying club 104 and buyer 107. In this activity, the web server 120 then awaits a request from a buying club 104 (or buyer 107) for product information from the Master Catalogue 120. As will be noted below web server 120 may also engage in a myriad of other activities such as are described below with respect to FIG. 9 and beyond as noted herein and in all co-pending and herein referenced patent applications.

In step 507, a member of a buying club 104 will review the compiled supplier catalogue from Master Catalogue 240 as prospectively modified by BC 107" as will be described in FIGS. 7 and 8 and under which requests for product information from the Master Catalogue 240 will be processed as part of the order processing functions. In step 508, a buying club 104 generates such a request for selected product information from the Master Catalogue 240 and transmits it to the web server 120. As noted above, product information may comprise both qualitative and quantitative information for one or more products available for purchase by the buying club 104 from a certain supplier. In step 510, the web server 120 receives the request from the buying club 104 and, in step 512, the web server 120 retrieves the requested product information from the databases 124 and specifically from Master Catalogue 240. In step 514, the requested product information is transmitted to the buying club 104. In step 516, the buying club 104 receives the requested product information.

In step 518, the product info is reviewed by one or more buyers 107 of the buying club 104, and one or more products to be ordered are selected based on the selected product information received in step 516. In step 520, the buying club 104 the aggregations and optimizations having already been undertaken on web server 120, at the proper time generates a coop order (which is functionally similar to a purchase order in other applications) for the one or more products selected in step 518 with valid orders, and transmits the coop order to the web server 120.

In step 522, the web server 120 receives the coop/purchase order and, in step 524, forwards the coop/purchase order to the supplier 128, which, in step 526, is received by the supplier 128. Alternatively, a buying club 104 may transmit the coop order to the supplier 128 by means of a telephone call, fax, e-mail, postal mail or other means, thereby bypassing the web server 120 and steps 522 and 524. In step 528, the supplier 128 preferably fills the coop/purchase order. While not shown, it is understood that, between steps 524 and 526, the supplier 128 may hold the coop order as a back order, and fill it subsequently, if the product is not immediately available.

Figure 6:
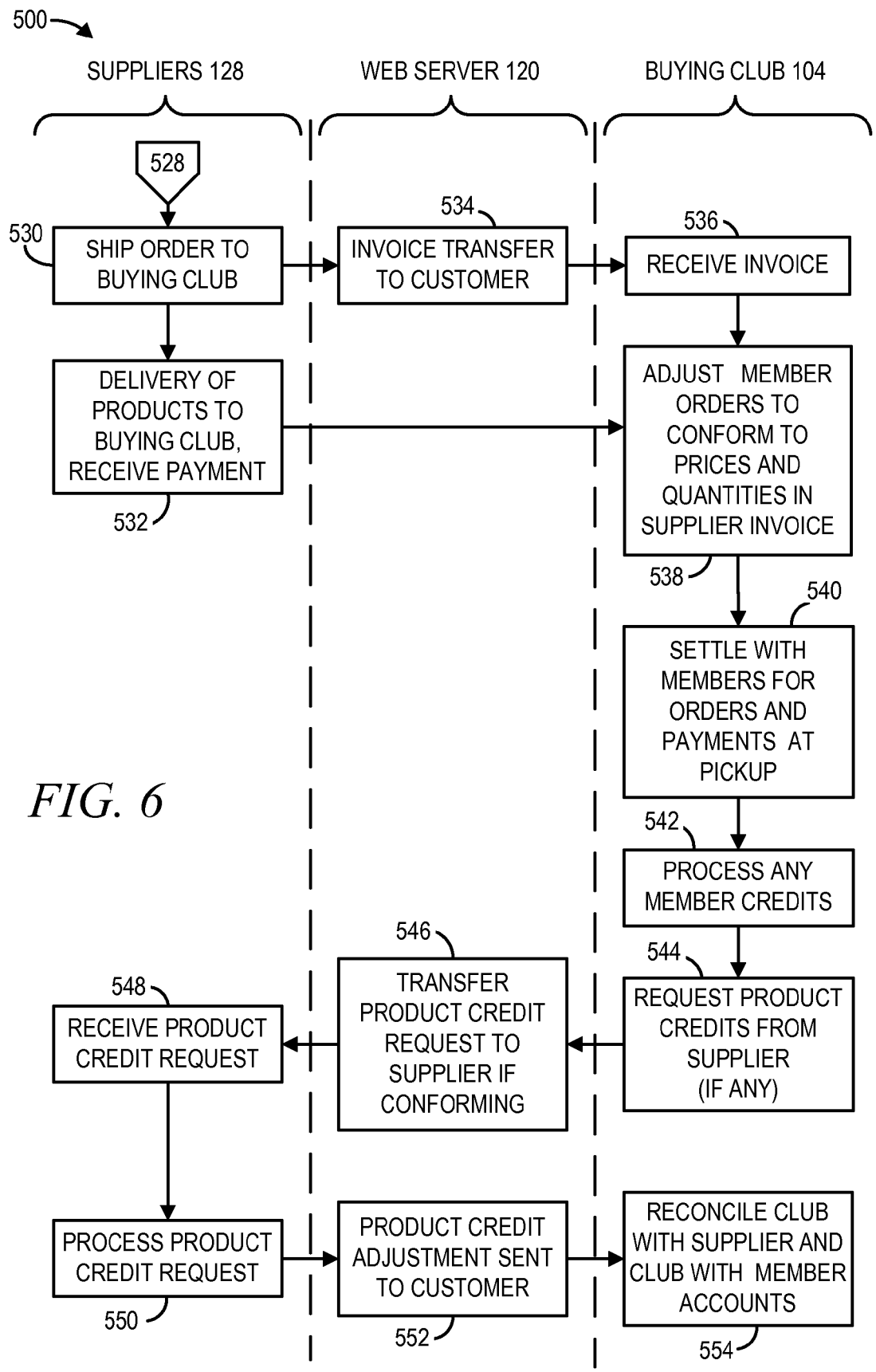

Continuing in FIG. 6 with the flow chart 500, in step 530 the order is shipped to the buying club 104 and in step 532, the order is delivered to and received by the buying club for delivery to, or pickup by, one or more buyers 107 and payment to supplier 128 may be made concurrent with the delivery. Concurrently with shipping prior to the delivery of the order in steps 530 and 532 respectively, in step 534 the supplier 128 will preferably generate and transfer via the web server 120 an invoice for the ordered products. In step 536, the invoice is preferably received and in step 538 the products are received and the member orders are adjusted to conform to prices and quantities and any other adjustments for add-on charges as may be indicated in the supplier invoice. In step 540, the BC (buyer coordinator 107') settles with members of the buying club 104 for orders and payments at the time of product pickup.

In step 542, if there are any member credits, these are received and recorded (preferably on web server 120 although not shown). In step 544, if there are any supplier credits due from the supplier 128 as may be related to the member credits, then appropriate supplier credit requests are generated by the buying club 104. The supplier credit requests are forwarded to the supplier 128 via the web server 120 in step 546. In step 548, the supplier credit requests are received and, in step 550, they are processed by the supplier 128. A supplier credit adjustment, if granted by supplier 128 is transferred from the supplier 128 via the web server 120 in step 552 to the buying club 104. In step 554, the buying club 104 receives the supplier credit adjustment and reconciles this credit with the accounts of the buying club 104, members, and with the supplier 128.

Figure 7:
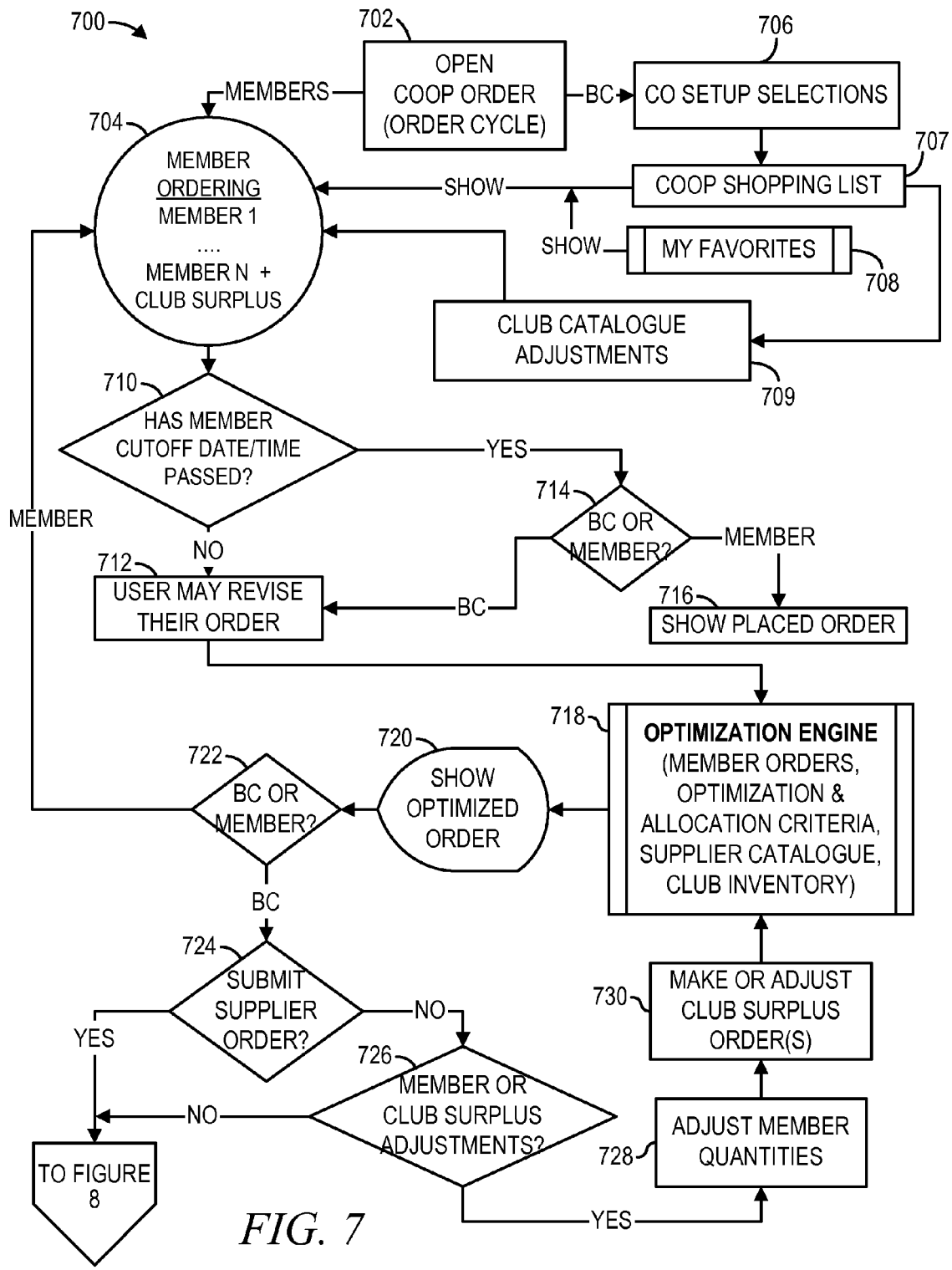
FIGS. 7-8 are a high level flow diagram illustrating generally the order process with cutoffs and tasks and steps for triggering associated decisions and calculations, and generally presenting the reconciling and adjustment processes that occur with members.

FIG. 7 depicts a flow chart 700 showing the preferred steps for a Buyer Coordinator (BC) and members from inception to conclusion for undertaking a Coop Order (CO). In step 702, a Coop Order or CO (also referred to as an order cycle) is opened by the BC. The preferable first step 706 is for the BC to undertake the CO setup process so as to select a supplier, and select or review the associated delivery information (delivery point, truck route, delivery date and times), supplier dates, and to add a pickup location and select a member cutoff, pickup and close dates and times, and set the CO settings for the CO as described later in this specification. In step 706, the BC decides which products will be made available for members as a pre-prepared list which will preferably appear to members on member login or access to that CO. Separately a member's own favorite products, which are maintained by members independently of the Coop Shopping List, are then preferably combined with the Coop Shopping List as noted in step 708 for presenting to members seeking to place orders. The BC may also update the Club Catalog as noted in step 709 with any changes which the BC wishes to make to the supplier catalogue to re-define the products to be presented in a format more suitable with respect to member needs or club capabilities. This completes the setup of the Coop Order and then allows members of this buying club upon login to place orders in this Coop Order.

Once the (CO) Coop Order has been opened by the buyer coordinator (BC), any member may then place orders for products in the CO as denoted in step 704. Each member may place orders up to the member order cutoff date as denoted in step 710. In step 710, a determination is made whether the cutoff date and time for the member to place an order has passed. If the cutoff date and time has not passed, then execution proceeds to step 712, discussed below; otherwise (if the cutoff date and time has passed) execution proceeds to steps 714, wherein a further determination is made whether the member is also the BC. If the member is not also a BC, then the order placed by the member is displayed, but the member is precluded from revising their order as noted in step 716; otherwise (ie the member is a BC) execution proceeds to step 712.

In step 712, a member may revise their order as desired. In step 718, the order placed by the member is aggregated and optimized using allocation criteria, with consideration given to the Master Catalogue 240, club inventory, optimization criteria defined by the club and the members orders as is more fully described in the '803 patent application. In step 720, the member's order is displayed and, in step 722, a determination is made whether the member is also a BC. If the member is not a BC, then execution returns to step 704 to allow a member to place additional orders or revise existing orders. If the member is a BC, then execution may alternatively proceed to step 724, in which following the member cutoff a further determination is made as to whether the BC wishes to submit the supplier order as denoted in step 724. If the BC does not wish to submit the supplier order, the BC may alternatively proceed to step 726 in which a determination may be made as to whether any adjustments need to be made to either or both of the member orders or to the club surplus for purposes of improving the balance of orders on behalf the members and the club (club surplus orders are orders for the club inventory) as denoted by step 726. If it is determined that adjustments need to be made then execution proceeds to step 728, in which quantities of the member order of the BC may be adjusted as desired, and to step 730 in which club surplus orders are adjusted as necessary. While steps 728 and 730 are presented in sequence, there is no requirement as to the sequence which is necessary for these steps. After either the member's order or the Club Surplus orders are placed, execution then returns to step 718. If, in step 724, it is determined to submit the supplier order at the current time, or if in step 726, it is determined that no adjustments need to be made to the member of club surplus orders, then execution proceeds to step 805 of FIG. 8. Although not shown, it is preferable that the supplier order not be submitted prior to the member order cutoff date and time.

Figure 8:
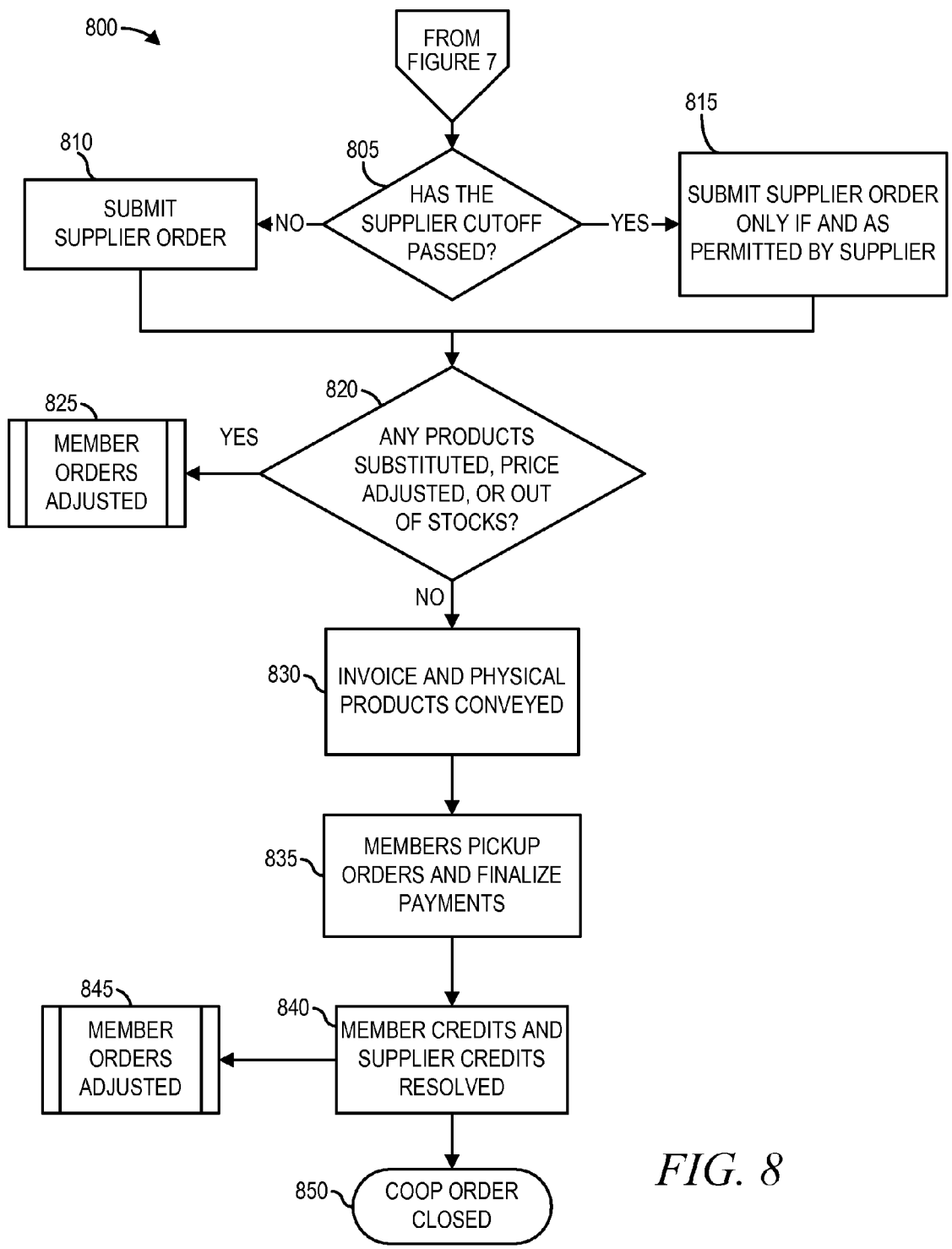

Turning to FIG. 8, step 805 denotes a determination as to if the supplier order cutoff date and time has passed. If not then the supplier order may be submitted as denoted by step 810. If the supplier order cutoff date and time has passed, then the supplier order may only be submitted if permitted to do so by the supplier as denoted by step 815 and more fully described in the '694 patent application. In step 820, a determination is made whether substitutes are needed for any products ordered, or whether any prices for any products ordered should be adjusted, or whether any products ordered are out-of-stock and, if so, then, in step 825, member orders are adjusted accordingly to remain in balance with the supplier order. Otherwise, execution proceeds to step 830, in which the invoice and physical products ordered are conveyed to the buying club and respective members. In step 835, members pick up their respective orders, and preferably will finalize their payment for the products picked up along with any past balances. In step 840, member credits and supplier credits are processed and, if appropriate in step 845 member orders are adjusted accordingly. In step 850, all products having been delivered and paid for and all accounts reconciled, the CO then is closed once the close date and time have passed.

As will become evident numerous functions are provided to users to improve the ordering experience for members in buying clubs, and for the BC to manage the buying clubs most efficiently. To organize these functions by means in which they may be accessed most efficiently and logically for the user, a preferable system of tabs and menu choices underneath the tabs, are disclosed. Alternative organization or designations may be used, and the tabs and menu choices described here are intended to be illustrative and not in any way limiting of alternative embodiments of accessing these functions, as may be readily known to one of reasonable skill in the art.

Figure 9:
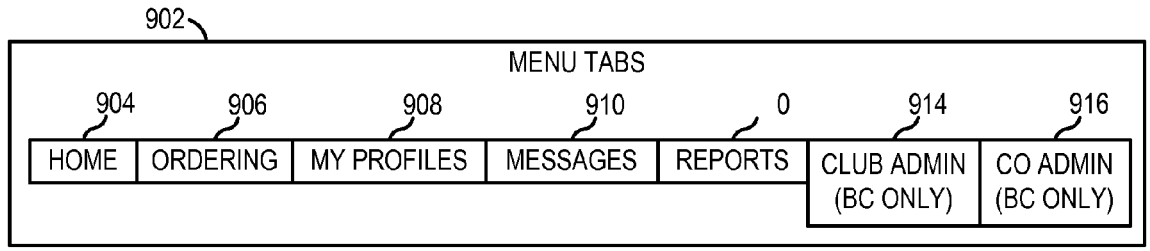
FIG. 9 exemplifies a menu tab arrangement adaptable for use in one preferred embodiment of the present invention.

FIG. 9 depicts, at a high-level, menu choices, or tabs, 902 that are preferably made available on the Members home page. As shown therein, and as described in further detail below with respect to FIGS. 10-16, seven tabs are preferably provided, including, a "Home" tab 904, an "Ordering" tab 906, a "My Profiles" tab 908, a "Messages" tab 910, a "Reports" tab 912, a "Club Admin" tab 914, and a "Coop Order (CO) Admin" tab 916. As may be noted, tabs 914 and 916, Club Admin and CO Admin respectively, are preferably only accessible and displayed to a person who is a BC of that club.

Figure 10:
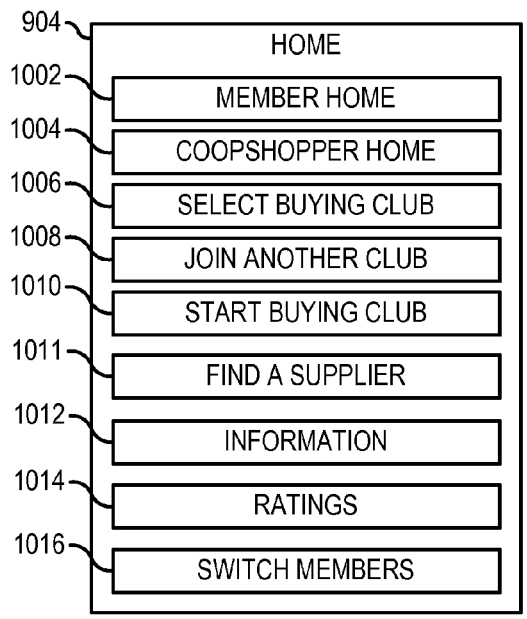
FIGS. 10-16 exemplify drop-down menus adaptable for use in connection with tabs of FIG. 9.

FIG. 10 (see also FIG. 21) exemplifies options that are preferably available to a member subsequent to selecting the "Home" tab 904. Accordingly, through Option 1002, a member may go to a Member Home web page for accessing open CO's of clubs in which the user is a member, and requesting a BC to open a CO for a club in which the user is a member, but which has no open CO. If the member is a BC of a club, then the member preferably has the ability to start a CO by accessing the CO Setup wizard described further in FIGS. 24 through 26 on the Member Home page.

Through Option 1004, denoted "CoopShopper Home", a member may find a club, join a club, and/or start a club. For example, if a member desires to find a club, he may do so by inputting his zip code, and thereby be presented with clubs and characteristics of each club. A member may then select a club based on a number of factors, such as the club's location, the types of products the club orders, and the willingness of a club to take new members as is described more fully in FIGS. 18 through 20. Alternatively or in addition, a member may elect to start a new club, add members to it, and the like as described more fully in FIG. 23.

Through Option 1006, denoted "Select Buying Club", a member may identify and switch to another of buying club to which they belong, and/or set a buying club as a default selection on login. By doing this, the member is able to easily access all the functions offered pre-selected to the desired club so that choosing a club in each function will not be required. By setting a default club, then the member is automatically accessed to this club upon login.

Figure 18:
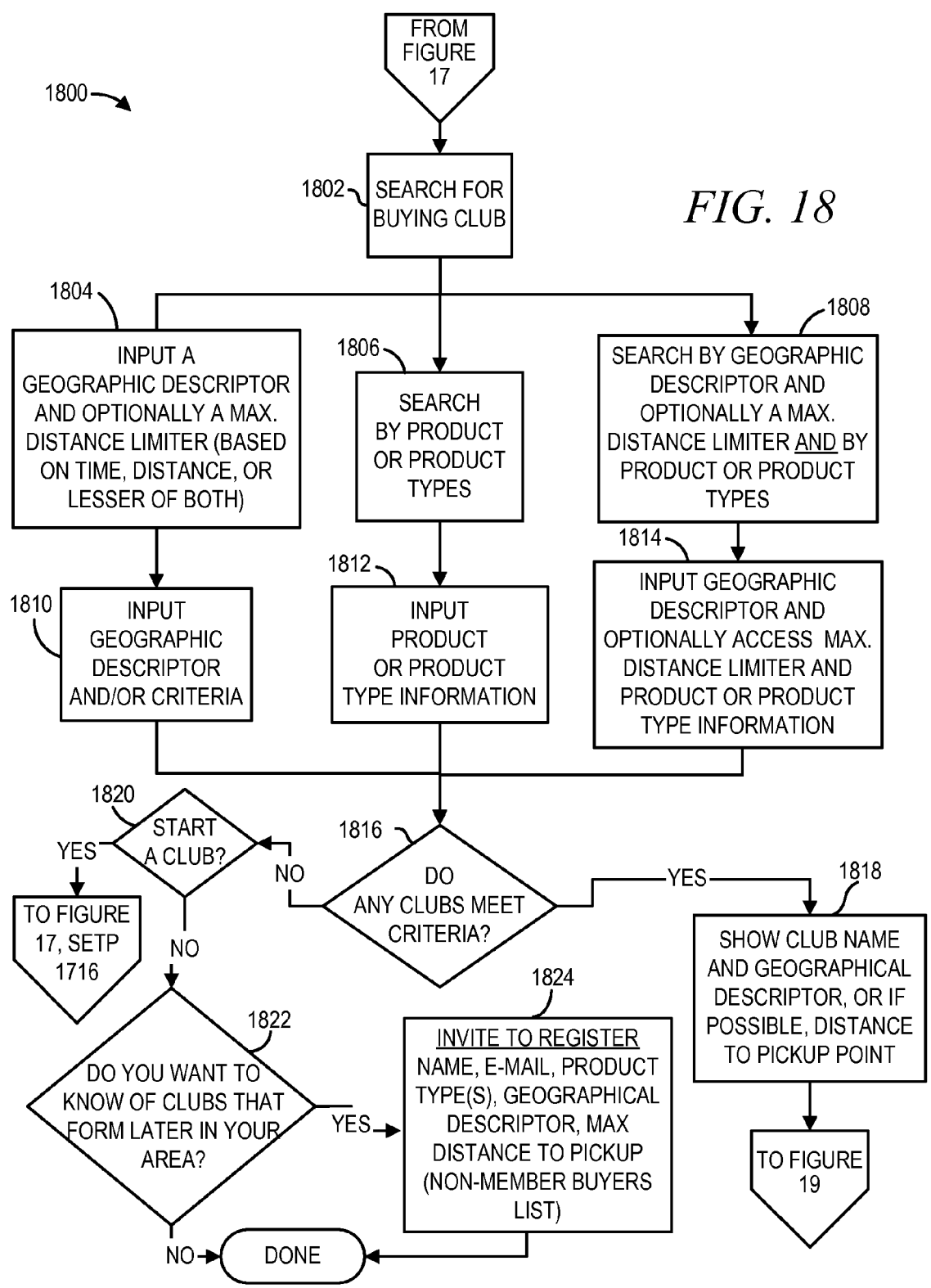
FIGS. 18-20 is a flow diagram exemplifying functionality available for enabling a user to find and enroll in a buying club.
Figure 19:
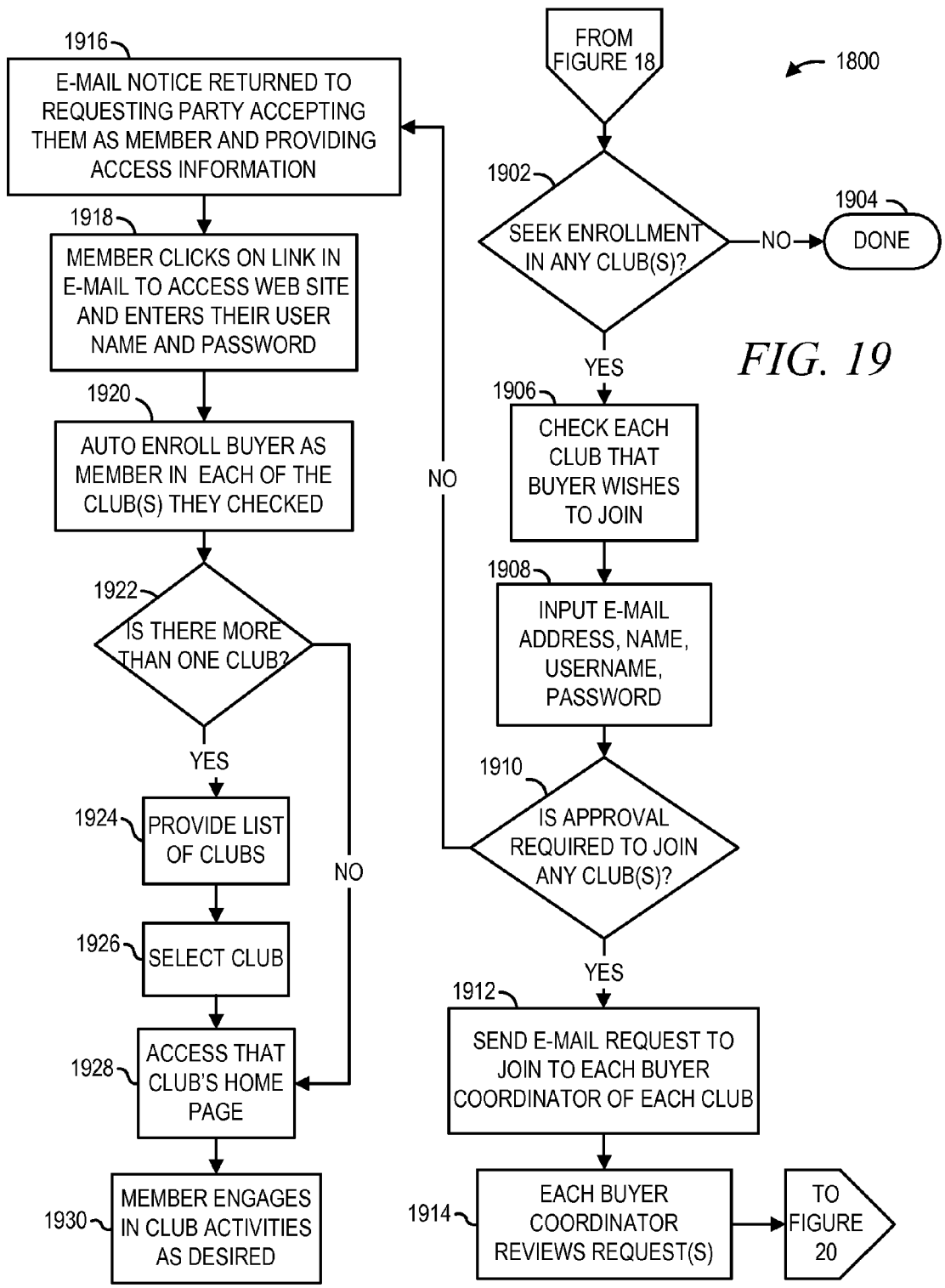
Figure 20:
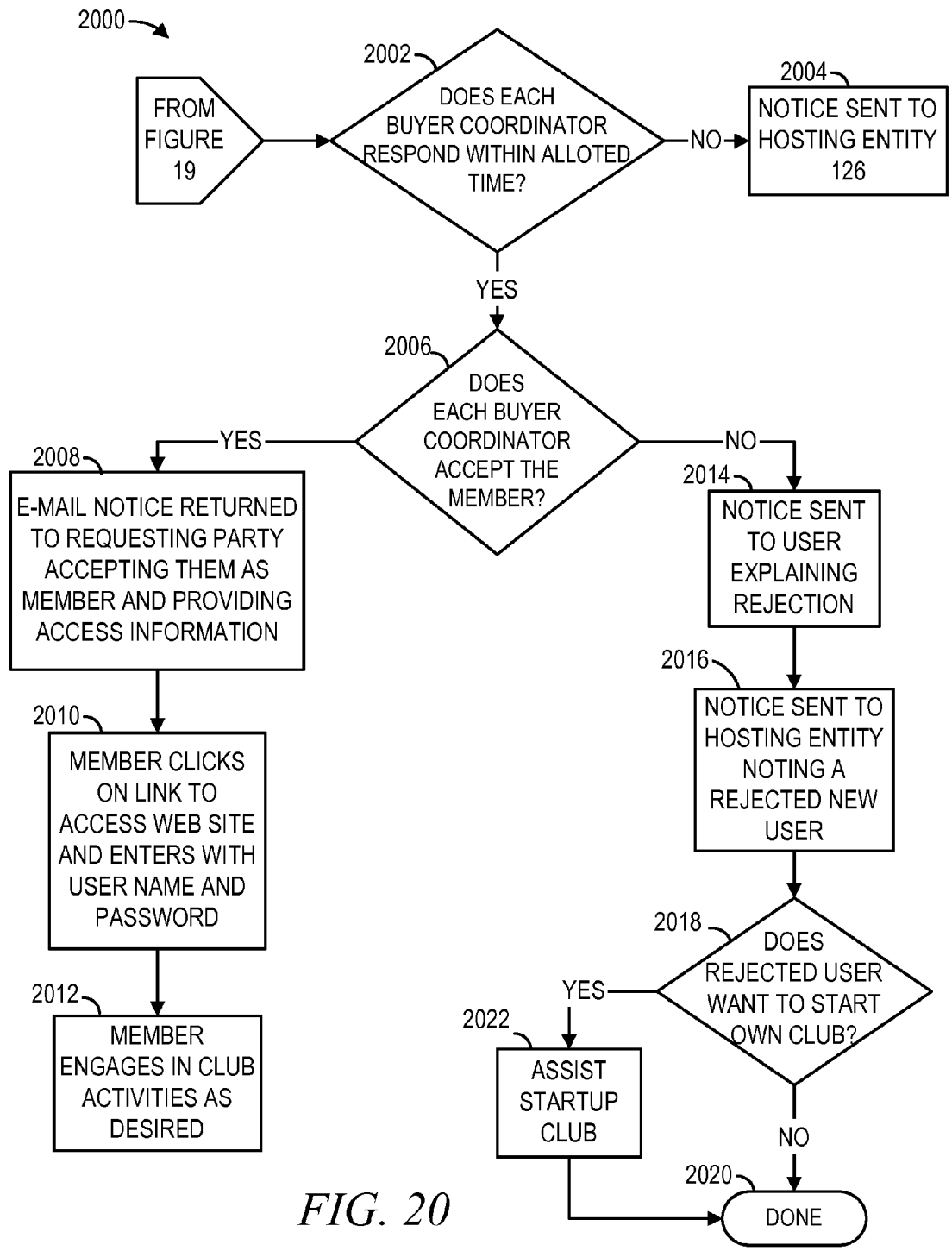

Through Option 1008, denoted "Join Another Club", a member may search for a club based on zip alone, club product categories (e.g., wherein a member may select from category listing, such as organic foods, grass fed beef, wine, and the like), the distance to club pickup point (using least distance routing by club in zip or near zip and/or product category), club characteristics (e.g., types of products, willingness of club to add members, club ratings, and the like), combinations thereof, and the like as more fully described in FIGS. 18 through 20. If there is not a suitable club for the member, then the member may be queried whether he would desire to start a new club.

Through Option 1011, denoted "Find a Supplier", a member may add a supplier to the list of suppliers from which members of a buying club may order products. Suppliers may be selected based on the industry they are in, the type of products they offer, and the like. The process of finding a supplier is described in further detail below with respect to FIG. 22.

Through Option 1010, denoted "Start Buying Club", a member may enter a club name, the name of a Buyer Coordinator, names of members, and e-mail addresses of members. While this amount of information is sufficient to start a buying club, a member may optionally, also access the Club Setup Wizard and a CO Setup Wizard, discussed further below with respect to FIG. 23 and FIGS. 24 through 26 respectively to enter all the additional information required to both start a club and actually initiate a Coop Order to purchase products.

Through Option 1012, denoted "Information", a member may review information related to a club or supplier. For a club, information such as club policies, number of members, year founded, news, activities, suppliers and products carried, pickup locations, and other club specific information. Also the number of COs provided, and such can be presented to prospective new persons to provide information that may be beneficial to a prospective new person for making a decision as to whether or not that person might be interested in ordering through the club. Similarly information for a supplier may include the products offered, number of buying clubs serviced, the years service to buying clubs, payment and ordering policies and such.

Through Option 1014, denoted "Ratings", a member may submit and view ratings on a number of areas including a buying club, buyer coordinator, supplier, product, and the like by one or more criteria. Users may thus provide ratings on some scale of, for example, from 1 to 5 for multiple criteria related to each of a buying club, buyer coordinator, supplier, and product. Buying Club criteria preferably includes, the frequency and timeliness of COs, the accuracy of orders, attractiveness of pricing, the predictability of pickups, promptness and satisfaction processing product credits, and such. For supplier ratings criteria preferably include, desirability of pricing, quality of product, in-stock of catalogue items, promptness of deliveries, ease of customer service, supplier product credit and such. Product criteria may preferably be evaluated based on quality, price, and other characteristics (such as taste, organic or non-organic, for food products). Buyer coordinators may be evaluated based on flexibility, timeliness, accuracy, courtesy, and other criteria.

Through Option 1016, denoted, "Switch Members", a BC may access (or "Switch" to) accounts of members that have provided permission to the BC to allow them access to the member's account. This enables BCs to manage members who may not have access to computers or data processor 109 or who prefer to place orders by alternative means (telephone, fax, or other). To allow a BC to return to their own account, a "Switch Back" feature is also enabled (not shown) while the BC is in the account of the member.

Figure 11:
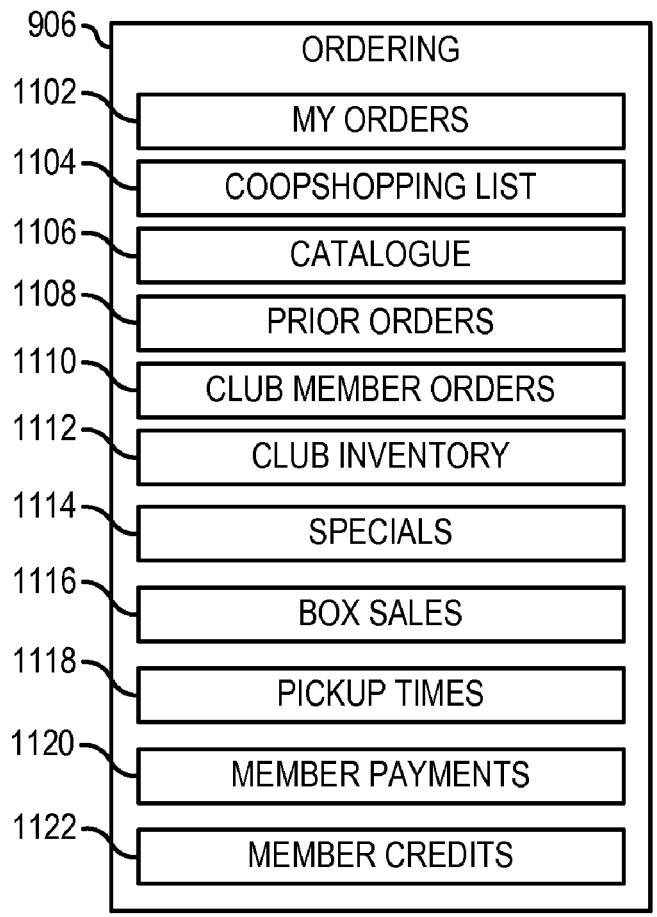

FIG. 11 exemplifies options that are preferably available to a member subsequent to selecting the "Ordering" tab 906. Most of these menu choices are available only if a CO is underway so that if there is no CO underway these are preferably grayed out and not accessible to the member. The Ordering tab offers multiple options for placing orders by allowing pre-selected lists of products to be generated and easily selected by a user. A "My Orders" 1102 screen summarizes all ordered products by that member in that CO. A CoopShopping List 1104 shows products pre-selected by a BC that may be ordered in that CO, which preferably includes a list of that member's "My Favorites" which was defined by the member. A "Catalogue" 1106 access function enables the user to search each catalogue for a product and then order that product in the CO (or view products if no CO is open). A "Prior Orders" list 1108 enables a user to search through listings of all prior orders that the user has placed in the past to identify and order a prior ordered product in this CO. A "Club Member Orders" list 1110 shows all products ordered by all members in the CO so that orders of others may be easily supplemented. A Club Inventory list 1112 enables members to order from the club inventory. A Specials list 1114 shows products which may be ordered which are selling for discounted prices. A "Closeouts/discontinued" list (not shown) shows products that are being terminated available to be ordered in that CO, which is preferably accessible under the Specials list as well. A "New Products" list (not shown) shows new products recently introduced available to be ordered in that CO, which is preferably accessible under the Specials menu choice as well. A "Box Sales" list 1116 in which certain pre-selected packages of items may be purchased as a group in that CO. A "Pickup Times" function 1118 in which members may specify when they preferably are available for making pickups. A "Member Payments" function 1120 for allowing members to manage the payments related to their orders. A "Member Credits" function 1122 related to members requesting and receiving credits on products that they have ordered.

A number of input and other features are preferably made available for ordering screens. The following represent certain common elements which are preferably found in the functionality of the invention for the ordering screens, accessed preferably by means of the aforementioned menu choices described in FIG. 11. These elements are provided to make the process easier for users or to prevent errors or incorrect entries from occurring. Unless otherwise specified all of the features and functions mentioned below are available to all members in all the ordering screens. In addition, all of these functions are preferably provided to the member in real time. Thus at the moment of placing an order, a member is preferably presented with the disclosed information. When such information is based on collaborative processes with other members, then the necessary information is preferably generated as disclosed in the '803 patent application.

When presenting lists of products, it is preferable to group products by product category, with the product categories listed in alphabetical order, and the products within the product category listed alphabetically. Each time a listing of products is displayed, then any quantities of units ordered by that member are preferably auto-populated in the appropriate field for each product ordered.

Related products are preferably defined herein as any product which has a substantially identical product description and unit label with another product, but different quantities for units per case and, because of this distinction, is presented in a catalogue and sold under two different SKU numbers. When related products are presented, they are preferably grouped together and demised in a way that is easily conveyed, such as a box around all the related products. It is also preferable that they be listed in sequence from least to largest units per case. Multi-case products, wherein a single SKU is sold in more than one unit per case increment, are also preferably defined by a similar grouping and demising modality as are related SKUs.

Similar to related products, specials are preferably presented in a way that makes them easily distinguished from other products. One preferred mean is to present these under a different background color, such as yellow or pink. Products that are on "special" are thus preferably shown in a highlighted (color) format. Furthermore, where a special and a regular price are available for a product, both the special price and the regular price are preferably shown, along with the appropriate (discount or increased) percentage for the (lowered or increased) relative price. Thus, for a "special" product, both the special and the regular prices are preferably displayed.

A "Summary Header Area" preferably appear on all ordering pages and preferably displays the buying club name, a CO-number, an order cutoff date/time, a pickup date/time for the CO, a specific pickup date/time (if a pickup date/time has been selected by, or assigned to, the member), a pickup location, and total cost thus far incurred for filled orders. If there is more than one pickup date/time, a user may preferably see these, or access these in a list by activating a link to display these multiple pickup dates and/or times.

A filter is provided for filtering the listing of orders that is presented on the screen. Three selections are preferably allowable: All My Orders, Filled Orders, and/or Unfilled orders. All My Orders are all orders placed for that list, filled or unfilled for that member in that CO. Filled Orders are only those orders placed under that list that are able to be ordered for that member in that CO. Unfilled orders are only those orders which are not able to processed for some reason (not making case, product not available or any other reason) for that member in that CO. For the Club Member Orders screen, an additional filter called All Unfilled Orders is preferably offered and defaulted to for members accessing this screen. All Unfilled Orders shows all orders by all members in the club which are not able to filled for some reason for that CO.

Each time a listing is generated (other than for Club Inventory) one or more of the SKU, description, brand, unit label, units per case, and number of Members ordering a product are preferably displayed. The ordering screens preferably also allow for a member to specify minimum ("min"), preferred ("pref"), and/or maximum ("max") units to order. All input screens are preferably provided with input rules regarding the min, pref, and max fields. For example, the minimum field may be tested to ensure that the value inputted is less than or equal to the preferred and maximum fields. The maximum field is tested to ensure that the value inputted is greater than or equal to the preferred and minimum fields. Rules are established for determining how to proceed when a member enters units for only a minimum order, or only a preferred order, or only a maximum order, or combinations thereof, such as minimum and preferred only, or preferred and maximum only, or minimum and maximum only.

A rule is preferably put in place to ensure that if r a member placing an order does not want to split cases with other members then they will not be required to do so. For example, although the default is preferably to allow each order to be split among members, by un-checking a box on the row for that product a member is able to only receive the case quantity or quantities as cases, that that member ordered. Thus that person's un-splittable case(s) will not be available to be shared with other members. Members are also preferably informed whether a case is splittable or not as designated by the BC, who may specify that a product is only available to be ordered by the case.

A member is preferably informed whether a product order will or will not be filled and, if not, then how many more units must be ordered to make the nearest case quantity that will allow the order to be filled. A member is preferably informed about the actual number of units that will be filled for that member and the associated pricing based on the available information and calculations at the time the member is placing their order, the for which a preferred mode of reaching such determinations is described in the '803 patent application.

If a product order is filled, then the member is preferably shown whether the product is filled from a supplier or filled from club inventory. A "Print View" command is provided to enable a member to print out what is displayed on each ordering screen as relates to the orders for that CO. A member may preferably access and have displayed the product details (both all the quantitative and qualitative information), including ingredients, nutritional information, and an image or picture of a product, and in the same screen as they are placing an order in a CO for one or more of the min, pref, and/or max specified units of that product.

From any row on a list of SKUs in a displayed screen, a member may access in one step (click) a listing in rows of all members who have ordered that same product in that CO. (For purposes of this specification, the following narratives describes functionality that in aggregate is referred to as a Member Product Allocation Grid.) In that listing is preferably displayed the quantity of min-pref-max orders placed by each member. However the pricing of the product to the other members is preferably not displayed, but only the pricing to the member activating the Member Product Allocation Grid is preferably displayed. In this Member Product Allocation Grid, input of units is preferably provided for placing an order for a product but only by that member that has activated it. Although the quantities of min, pref, and/or max units are input by the member, the member has the ability to pre-calculate the outcome for themselves and for all members of the club (preferably as performed using the aggregation and optimization process described in the '803 patent application prior to submitting the order. A member may be informed in narrative form whether units of a product will be ordered, and if so, how many units will be ordered, whether they are from inventory or from the supplier, and the cost of the product.

When ordering in a CO, a member may add the product to their "My Favorites" list, and if allowed by BC under CO Settings, the member may add the product to the CoopShopping List (CSL). A member may access all the products displayed in a single list to determine if those products are on the CoopShopping List or on their My Favorites list. The Member may also check a box beside each product listed to add that product to the CoopShopping List (if allowed by the BC) or add the product to their My Favorites list.

Products may be ordered by adding them as one or more SKU numbers. The number of how many skus to add is preferably determined by the person ordering. An error check is preferably performed against each SKU number input to determine if the SKU is found in the catalogue, and, if there is an error, an error message is preferably displayed. That error message preferably may be printed. When ordering products by a SKU number, members may also add the product to their "My Favorites" list, and if allowed by the BC under CO Settings, members may add the product to the CoopShopping List (CSL) in the same step as the product is being ordered for the CO.

In each ordering screen, the member may add comments that are associated with the CSL. The comments are preferably free form text that is associated with the CO and preferably provided to the BC as part of a consolidated listing of all messages from members for that CO. The messages may be attached to a product order so that a BC may view all messages in that CO that relate to a specific product.

Each quantity of units input by the member is preferably checked to determine that it exceeds the minimum member quantity (MMQ). The minimum member quantity is the minimum amount of units the BC allows to be ordered for a product. The BC is preferably allowed to define whether an MMQ for a CO or a club is set to "hard" or "soft". If the setting is set to "hard", then the member is preferably not allowed to order below the MMQ and a message is preferably displayed to any member that attempts to do so at the time of the input. If the setting is set to "soft" then a message is displayed saying that the order may not be filled, but the order is allowed to be inputted.

Referring to FIG. 11, the following describe generally the options under which members may place orders in a CO. In each of these screens a member is preferably able to add, delete, or change an order up to the point in time of the member order cutoff, as set by the BC for that CO.

Through Option 1102, a member may go to a "My Orders" page, and view, and add to or delete from, the current listing of all products the member has ordered in that CO.

Through Option 1104, a member may go to a "CoopShopping List" page, and order from a CoopShopping List and/or from their own Favorites List. A display is provided for each SKU on the CoopShopping List screen if it is on the Coop- Shopping List, on the Favorites List, or on both lists, and preferably in the display, and preferably in the vicinity of the SKU display, it is so noted as to on which or both lists the SKU is found.

Figure 35:
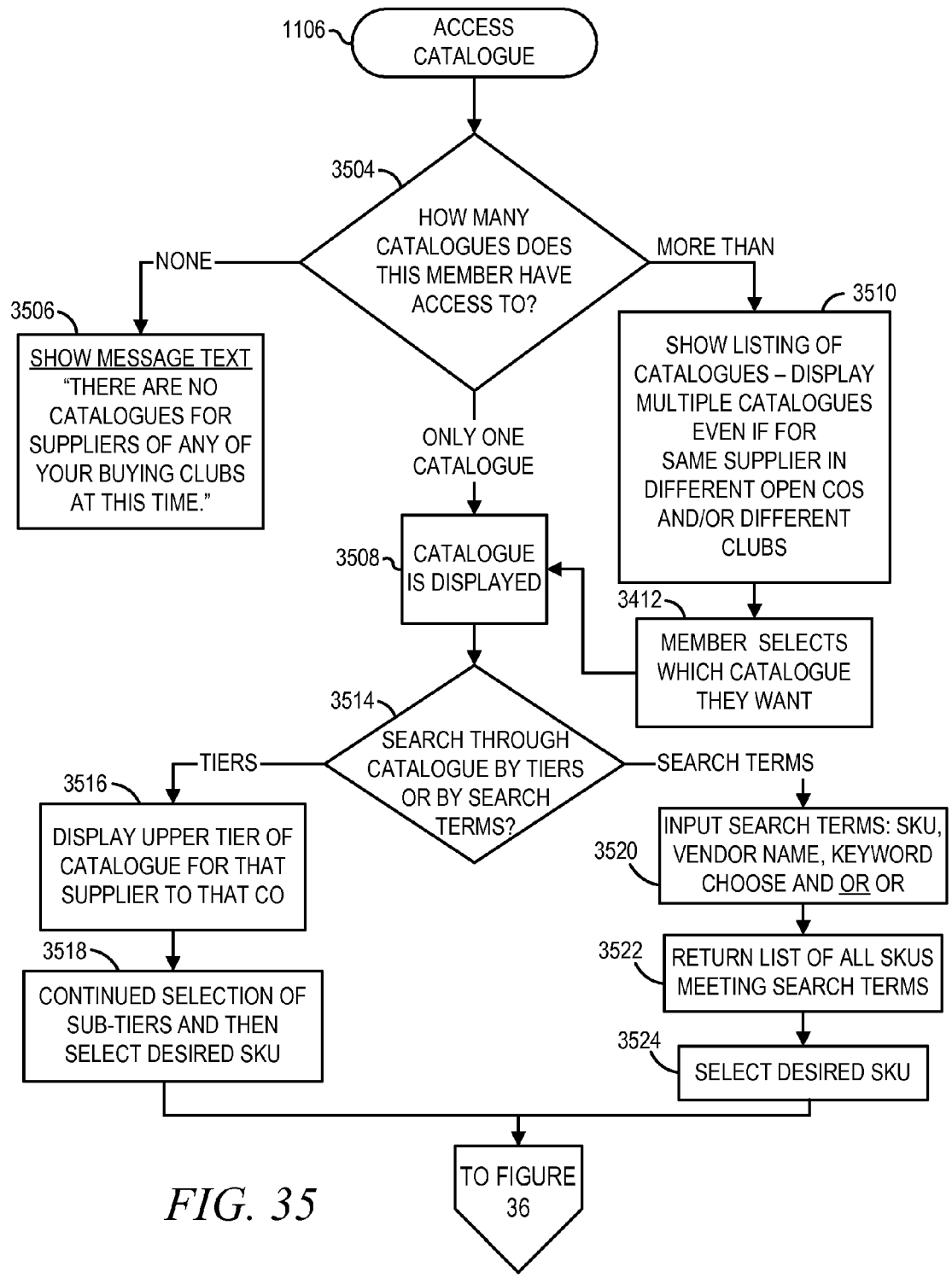
FIGS. 35-36 exemplifies a process for enabling a member to view and order from a catalogue.
Figure 36:
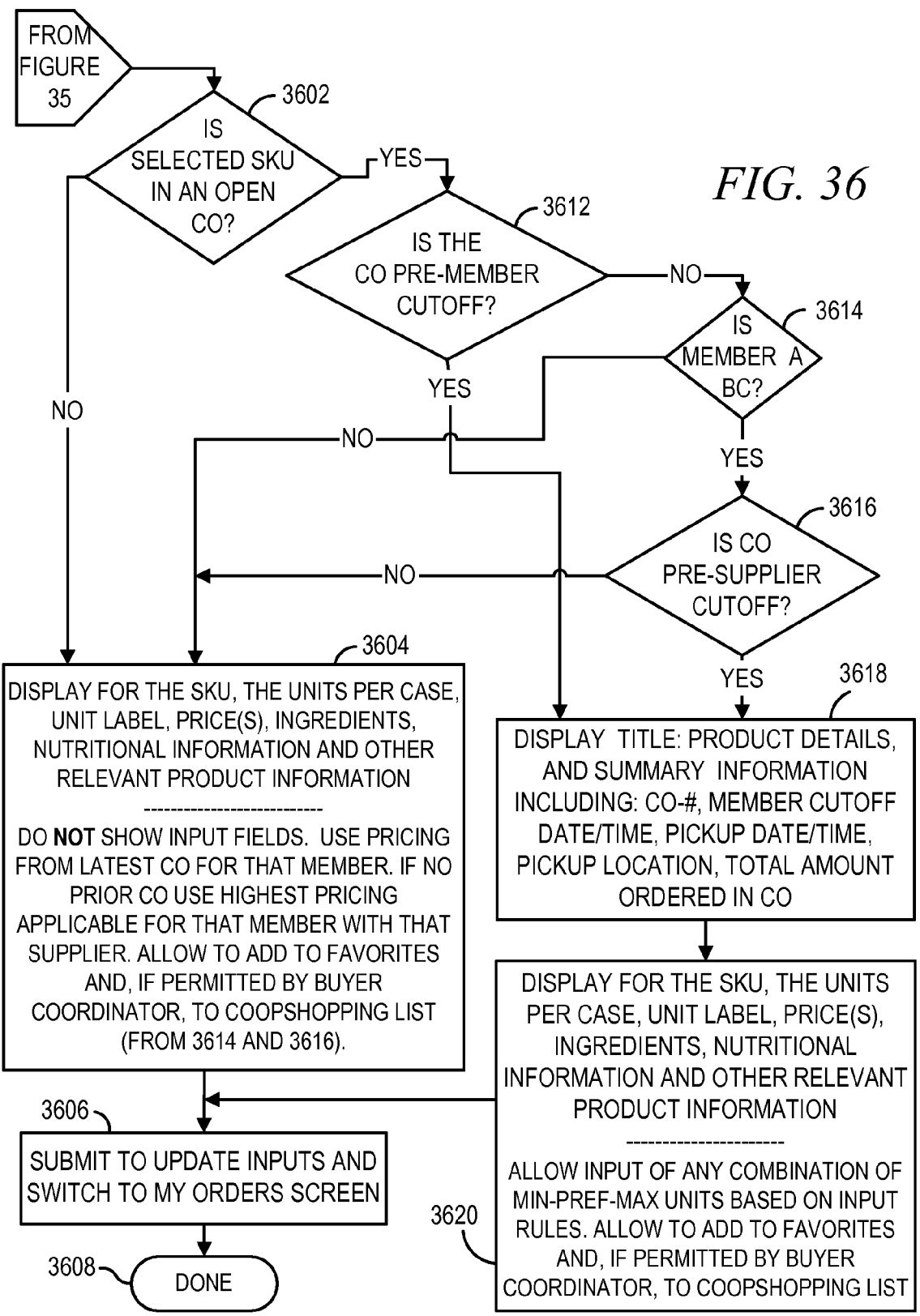

Through option 1106, a member may go to a "Catalogue" page, through which the member may order a product by searching through the Supplier's catalogue, preferably by searching through multiple tiers associated with the catalogue or by keyword, vender name, or SKU, as described more fully in FIGS. 35 and 36. If the user is not in a CO, then multiple catalogues are preferably displayed by the catalogue name. If the catalogue displayed is not part of a CO, then the member will preferably view the pricing that is applicable from the latest CO, which would also constitute the default for that member for that club with that supplier. If no prior CO exists for that supplier with that member, then the member will preferably view the highest applicable pricing for that member based on the associated markups for that member.

Through option 1108, a member may go to a "Prior Orders" page, through which the member may preferably order products from a listing of products previously ordered as narrowed by filtering by (the top tier or) product category if desired. Otherwise all products ordered in the past (excluding discontinued products) are presented. A member is also provided with the ability to expand each product category selection and see how many products fall in each category and then to select a lower tier below the product category, which is typically the top tier of a catalogue.

Through option 1110, a member may go to a "Club Member Orders" page, which allows a member to view and order products ordered by others that need more units to round out case orders. As noted above, the member will preferably view and be able to order from the listing of All Unfilled Orders for all members of that CO. In this way, members may work together cooperatively to supplement each other's orders and help to order case quantities of units with the most products possible, thereby allowing an order to be filled, or providing for better pricing or both.

Through option 1112, a member may go to a "Club Inventory" page, to see and order any of the "sellable" inventory that is available in the Club Inventory. Sellable inventory is preferably determined to be all inventory which is on-hand less any units that are committed to be sold to other members. Any units ordered by a member that exceed the sellable inventory are preferably allocated to the order which is to be placed to the supplier. A member is preferably able to view how many are allocated to them by the aggregation and optimization process described in co-pending US application called "Optimization System for Buying Clubs" when accessing Club Inventory. When that product is still able to be associated with a supplier (that is the product has not been discontinued) then all the qualitative information (such as ingredients, nutritional information, and a picture) should be able to be accessed in one click at the same time as the member is placing their order.

Through option 1114, a member may go to a "Specials" page, through which a member may order from Specials (i.e., discounted products). Preferably both the regular price and the specials prices, with a percent discount, are displayed. Similarly, a member could order products from a discontinued products list, or from a listing of new products. These lists are preferably further defined by product category and the number of specials (or discontinued or new products) in each product category is preferably displayed in parens ( ) so that the user will know how many fall in that category. The user is preferably able to view the list by setting a number limit on the SKUs to view via paging, or by such other means as may make viewing lists of hundreds of SKU more practicable.

Through option 1116, a member may go to a "Box Sales" page, through which the member may preferably order a Box Sale product, and make deviations from it (see Box Sales defined in further detail below with respect to BC's).

Through option 1118, a member may go to a "Pickup Times" page, if required by the BC for a CO, and under CO Settings, choose from among the scheduled pickup times, such as their best, acceptable, worst, and not available preferences for pickup times for a CO using a best, okay, worst, and not available designator for each time slot. The choices made by a member may be saved to update the member's preferred pickup time settings.

Through 1120 The member may pay for his or her order by alternative payment methods (discussed further below with respect to My Payment Profile, FIG. 45, step 1208). A member may preferably request credit from the BC from among a list of reasons set forth, or for a reason that they have chosen (e.g., poor quality, miscount, not ordered, and the like) as described more fully in FIG. 43.

Figure 44:
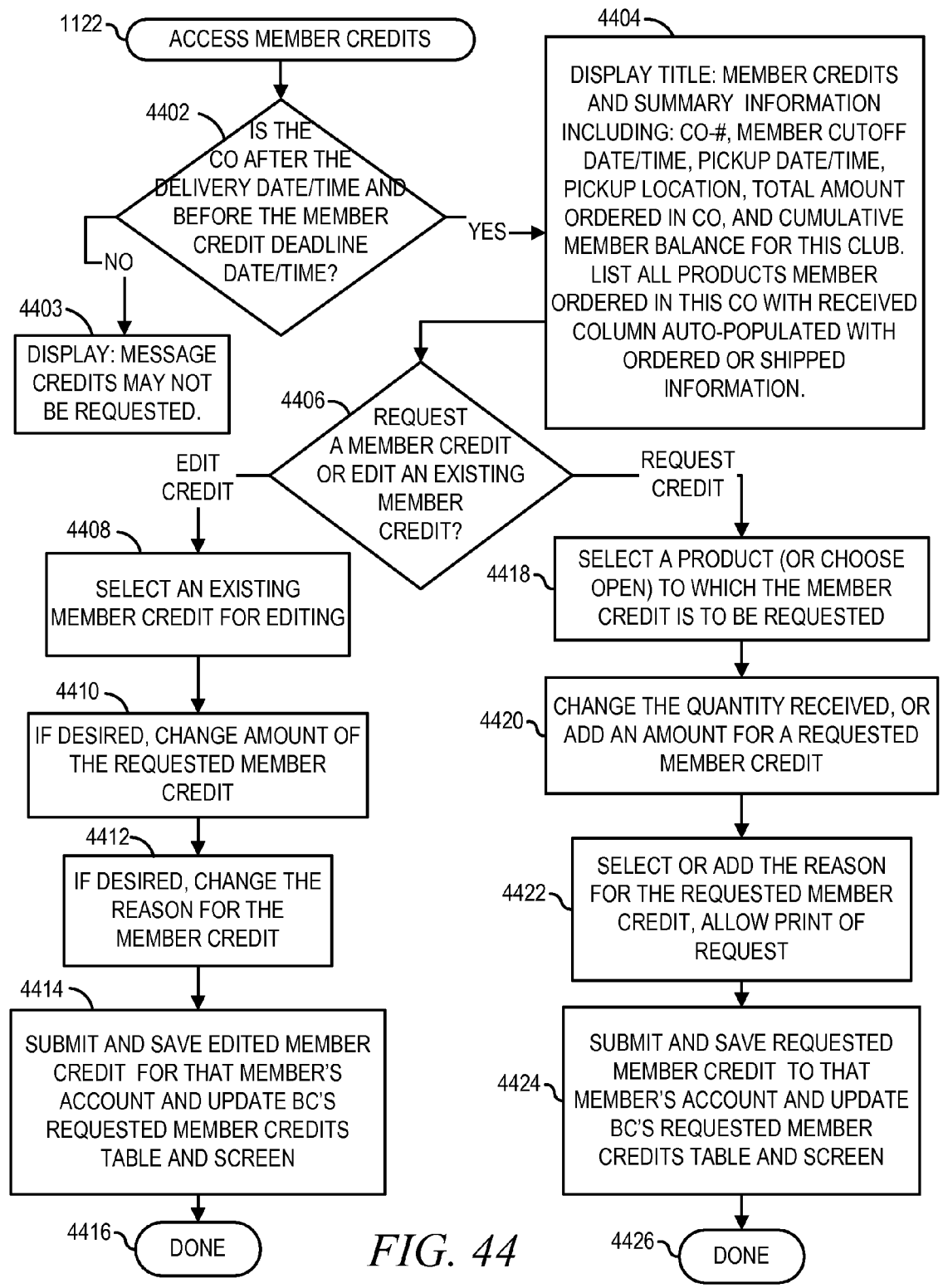
FIG. 44 exemplifies a process for enabling a member to request or edit member credits.

Through 1122, a member may access member credits in and request a credit on a specific product in the CO as described more fully in FIG. 44.

Figure 12:
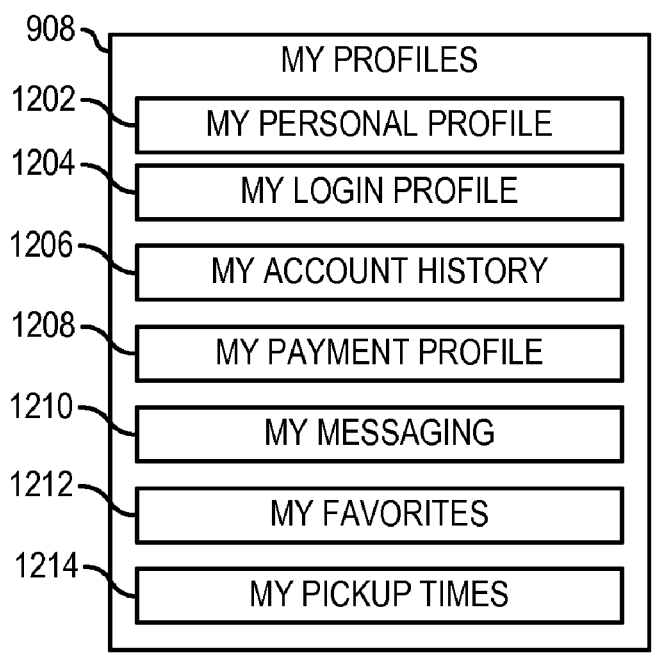

FIG. 12 (also described more fully in FIG. 45) exemplifies options that are preferably available to a member subsequent to selecting the "My Profiles" tab 908.

Through Option 1202, denoted "My Personal Profile", a member may store and/or edit in the database 124 information such as their name, address (e.g., street, city, state, zip, country), and one or more telephone numbers and e-mail addresses. For each club in which a member is not a BC, the member may select a setting to enable the BC to access their account and place orders for them, or by not selecting this setting, prevent the BC from ordering for them or being able to access their account. A member may also check a box for each club in which they are a member to de-activate their membership in that club, although such setting may later be reversed provided the BC has not separately de-activated the member from that same club.

Through Option 1204, denoted "My Login Profile", a member may store and/or edit in the database 124 their username and password.

Through Option 1206, denoted "My Account History", a member may select a date range and for the selected date range a summary listing of date, CO, and the total amounts for orders, payments, and credits is displayed as sorted by date (most recent preferably on the top) from which the user may select one and then access the historical record of all order, payment and credit activity for that CO.

Through Option 1208, denoted "My Payment Profile", a member may store and/or edit in the database 124 their payment information, such as one or more of a credit card, debit card, bank account (ACH), food stamp, and any third party payer. A member may store and/or edit information related to a third party payment source (such as Paypal) to pay for their order. A member also preferably designates a preferred payment method for their orders in this screen.

Through Option 1210, denoted "My Messaging", a member may set notifications by various means (e.g., e-mail, telephone, or the like) for each catalogue name and/or supplier based on trigger events. Trigger events may include, for example, the opening of a CO, products not meeting case, truck delivery time change, a change in pickup location or pickup time, a message from a BC, and the like. Additionally, a member may specify that e-mail messages be selectively blocked from sites based on the source and type.

Through Option 1212, denoted "My Favorites", a member may define for each supplier a list of products which will be displayed for any COs which utilize that supplier. Products may be added to the Favorites list from searching through the supplier's product catalogue maintained on Master Catalogue 240. Products may also be added to the My Favorites list by inputting one or more SKU numbers. Products may also be deleted from the member's My Favorites list.

Through Option 1214, denoted "My Pickup Times", a member may indicate days of the week and times when he or she is available to pick up an order. These selections are preferably updated when, during the process of placing an order in a CO, the member adjusts their pickup times for that CO. (Members are prompted to select a desired pickup time once they place their order, if the BC has required this when the BC set up the CO.) A member may preferably set his or her default preferred pickup times for each day and time slot throughout the week using an indicator, such as "Best", "Okay", "Worst", and "Not available", and optionally also provide a text explanation for the selected indicator.

Figure 13:
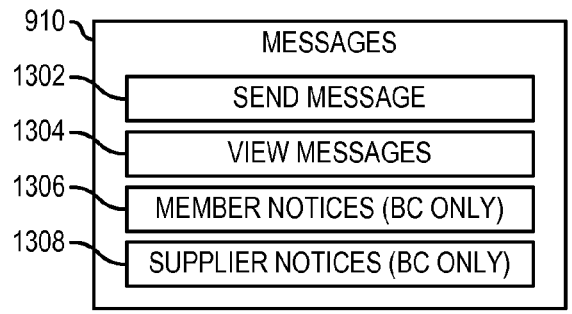

FIG. 13 exemplifies options that are preferably available to a member subsequent to selecting the "Messages" tab 910.

Through Option 1302, denoted "Send Message", a member may create and send a message. To do this, a "From" field is displayed with the name of the member, which is preferably not editable. In a "Send To" field, a member preferably selects the category of recipients to whom he desires to send a message. Such categories of recipients include "My CoopOrder(s)" (i.e., all members of open COs preferably listed by buying club), selected member(s) of club(s) (all members of all my clubs), CoopShopper members, a public forum, and the like. When selecting members, it is preferable to allow check boxes to denote which members are to be designated recipients and an option is preferably provided to allow to check the buying club name, which automatically selects all members in that club in that listing. Also a select all and deselect all capability is preferably provided for whatever members are displayed. In a subject line, a member may add a new subject, or add to an existing subject. A member may specify that the message be sent as an e-mail, and also specify whether a message is to be sent to one's own inbox and/or one's own e-mail address (which is preferably displayed in a non-editable format).

Through Option 1304, denoted "View Messages", a member may view messages he or she has received from other members according to a number of different criteria. For example, a member may specify that only the subject of a message be displayed, or the member may specify that both the subject and content of a message be displayed. Messages may be filed (archived) or displayed, and messages may be filtered based on where they were sent, such as, for example, messages sent to "My Buying Club(s)", "Me" as an individual, "My Coop Order(s)", "Coop Shopper Members", "Public Forum", "All Messages", "My Filed Messages". A member may limit the number of messages displayed per page, and may move from one page of messages to another page of messages. If there are new messages which have not been viewed by a member when the member logs on to the central web server 120, then a link is activated on the login page which a member may immediately click on to view such message(s).

Options 1306 and 1308 are preferably available only to BC's. Through Option 1306, denoted "Member Notices" or "Club Notices", a BC may create and/or edit pre-programmed notices, such as, a Member Invite Notice, a CO Open Notice, Order Cutoff Date/Time, Order Cutoff Extended, Pickup Times and Amounts, Pickup Time Changes, Pickup Location Directions, Send CoopShopping List, and any User Defined Custom Notices. With respect to User Defined Custom Notices, a BC may type in custom text and use pre-programmed information of variables, view the format of the created notice, and/or delete the text, and save the Custom Notice for future re-use.

To send a Club Notice, a BC first selects the CO for the Notice, then selects the Notice Type to be sent (e.g., Member Invite Notice, Pickup Time and Amounts, Pickup Location Directions, and the like), and then selects the desired member(s) to whom the Notice is to be sent. A BC must then specify when the Notice should be sent, such as immediately, a specified time in the future, or the BC may specify that the Notice not be sent until the BC should specify that it be sent. A BC may also specify that a Notice not be sent until the occurrence of a trigger events, such as an open CO, a Cutoff, receipt of an Invoice, Delivery of an order, Pickup, and for each Notice, before and after options (e.g., hours and minutes) may be offered.

Through Option 1308, denoted "Supplier Notices" (also preferably limited to use by BC's), a BC may establish the notices which are to be received based on supplier events or actions. For example notices may be sent whenever a supplier order cutoff change occurs, an invoice is upload, a change of delivery dates/times occurs, or there is a change of the drop point location for that club. The BC may also specify that such notices be sent to the BC via e-mail, telephone, and/or fax as part of this process. If notifications are sent via telephone and or fax, then the BC may choose the specific time of day and hour that such a telephone notification would occur, or may specify that the notification be sent as soon as it occurs. E-mails may be denoted as to be received separately or combined daily into one composite e-mail.

Figure 14:
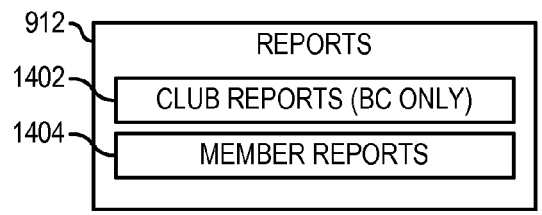
Figure 50:
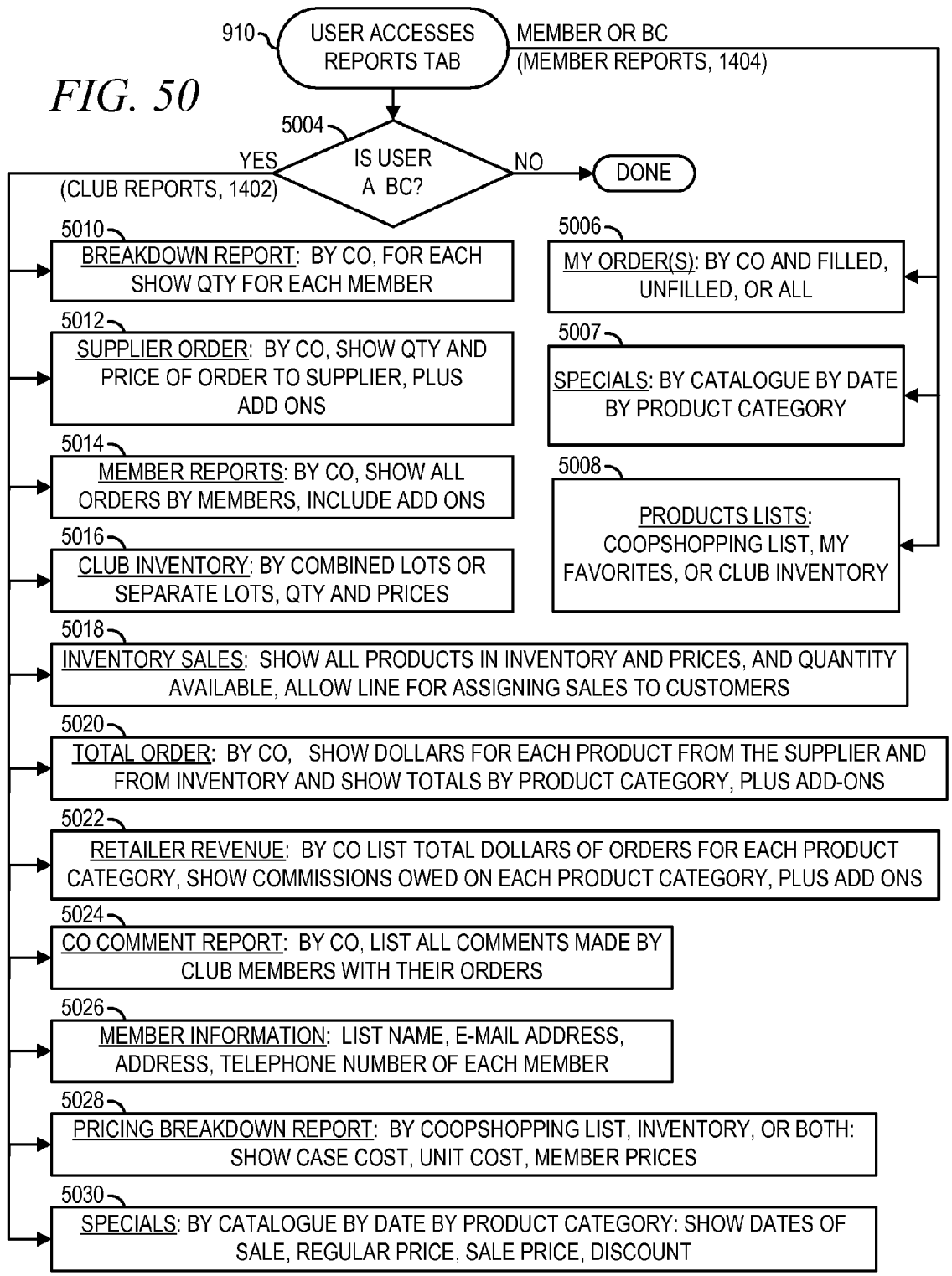
FIG. 50 exemplifies a process for enabling a member and the Buyer Coordinator to generate and view reports.

FIG. 14 exemplifies options that are preferably available to a member subsequent to selecting the "Reports" tab 912, and is discussed in further detail below with respect to FIG. 50. Through Option 1402, denoted "Club Reports", a BC alone will preferably be able to invoke the generation of many reports in connection with club data, such as a product breakdown, supplier orders, member orders, club inventory, inventory sales, total orders, retailer revenues, CO comments, member information, pricing breakdown, special prices, and the like, at the Member level or at the Club level. Through Option 1404, denoted "Member Reports", a member may invoke the generation of reports in connection with club data, such as the member's order, product lists, special prices, and the like.

Figure 15:
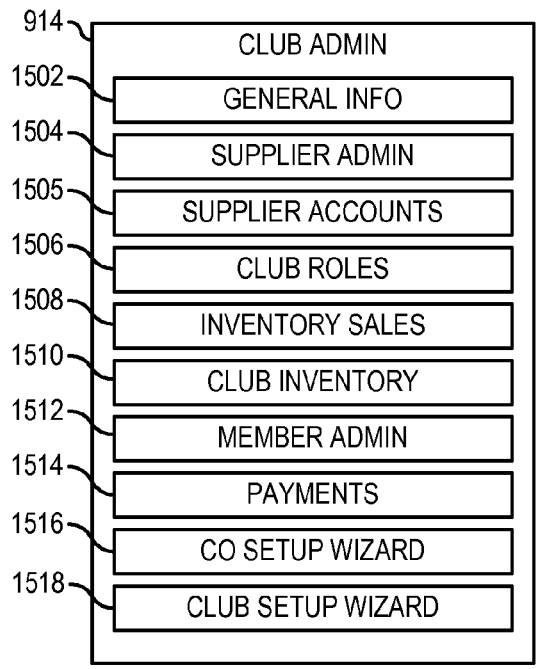

FIG. 15 exemplifies options under the "Club Admin" tab 914 and these are preferably available only to the BC of the buying club. These options are presented as menu choices and relate to functions that pertain to the BC's management of the buying club.

Through Option 1502, denoted "General Info", a BC may charge members a club membership fee, either periodically or as a one-time fee. A BC may upload, store and present to members policies related to a buying club, with member's required to accept the policies to be members in the club. A BC may set a regular club markup percentage to add to the supplier cost for calculating and adding to present the member prices, and set markups by member group and assign members to each group. A BC may add one or more pickup locations. A BC may indicate whether he desires additional members, and may set required approval whether or not a club is open to new members. If a club is open to receiving new members, then the BC may set a review step for new members before allowing them to order. A BC may set a maximum limit of members for the club. A BC may provide information for prospective members on the new club, such as, pickup location general description, types of products, frequency of ordering, number of members, minimum member dollar order (if applicable), and add a welcoming note to prospective new members.)

Figure 16:
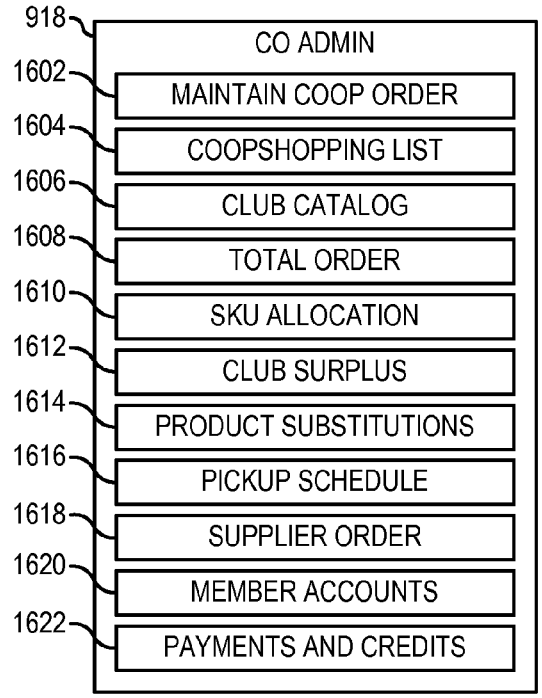

Through Option 1504, denoted "Supplier Admin", a BC may add a new supplier from a list of available suppliers that are available to the geographic area of the buying club, or they may add a supplier they know of and wish to add themselves. A BC may set a markup percentage for a third party (such as a retailer) to receive (varied) commission percentages (e.g., by product category or for all categories) and associate this markup by supplier. A BC may set whether or not a supplier and/or retailer is active, thereby impacting whether or not such supplier and/or retailer may be selected when beginning a new CO under Maintain Coop Order, discussed in further detail below with respect to step 1602 (FIG. 16). A BC may set a catalogue name that is to be associated with the supplier and this may or may not be the supplier's name. Such catalogue name will be presented to members as appropriate when they are placing orders or accessing their reports. A BC may view the minimum order amount (if any) required by a supplier. A BC may view the account ID assigned to the buying club. A BC may view the club credit limit (if any) allowed by a supplier. A BC may select (or input) a delivery point (also referred to as a "drop point") that will apply to that supplier for that buying club. A BC may view the applicable truck route that is assigned by the supplier to that customer.

Through Option 1506, denoted "Club Roles", a BC may establish for club members roles that are associated with certain functions (e.g., new membership, ordering, pickup, accounting, distribution, and the like), and associate a responsible party to delivery pickups.

Through Option 1508, denoted "Inventory Sales", a BC may add units to members or non-members for products sold from inventory, whether such products were sold to members as part of a CO or outside a CO. Such a list is preferably generated by (1) selecting some or all products, (2) selecting some or all buyers (including buyers using cash), and (3) allocating units of products to buyers. A BC may reduce an amount ordered by a buyer to a lower amount ordered by that buyer by inputting a negative number for the units ordered. A BC is preferably able to view during this allocation process the numbers of units already allocated to each member. A BC should be able to allocate to buyers any units that have been ordered for the Club Surplus so that the members will receive the units and the amount allocated to Club Surplus will be reduced in that same CO. Such allocation requires including in Sellable Units the Club Surplus units ordered, as well as the on-hand units, less the committed units. When viewing the inventory sales screen, the BC should be able to add and/or edit a list of members and/or a list of products to the inventory sales screen without losing any values prior inputted on the screen.

Through Option 1510, denoted "Club Inventory", a BC may choose to present products by individual lots or combined lots. Products in inventory may be listed by each supplier or by all suppliers. Products may be added directly to Club Inventory from a supplier's catalogue. Products may be added directly to Club Inventory by inputting SKU numbers which may be inputted in a separate area or on separate rows of the Club Inventory listing. Products may be added to Club Inventory by inputting products directly by name only along with other associated information such as number of units, unit label and price (with no association to a supplier). Products added to inventory are preferably stored in separate lots, and may be referenced as individual lots, based on the date and time in which products are added. Products are preferably grouped in inventory and displayed by product category. In the Club Inventory, the system 100 will preferably track the SKU, description, units per case, unit label, dates (e.g., suggested sell-by dates), on-hand quantity, unit cost, total cost for a product in inventory, and number of lots. With respect to quantity, system 100 will preferably track inventory that is on-hand, on-order, and committed, and display the Final Quantity (on-hand plus on-order less committed) as noted in the '693 patent application. The BC may also reduce the on-hand quantity of products in inventory. The BC may set a percentage discount that may be applied to each specific product sold from Club Inventory, which discount will be applied to the final price to lower the price to purchasers. The total cost of all products in inventory is also preferably displayed along with the costs for the products in each category.

Through Option 1512, denoted "Member Admin", a BC may view a listing of all members and their current balances, date joined club, as well as other information about each member. For example, a BC may view and edit a member's e-mail address, view a member's account data, including past orders, credits, and payments, both by each ordering, payment, and CO event and in summary form. The cumulative total balance for a member is preferably calculated and displayed. The BC may set a starting balance and starting date for the member from which the balances are then calculated. The BC may view details of a member's past orders (unless such orders have been archived). Payments or credits may be added to a member's account (open or associated with a CO). The BC may view a member's favorite products, the member group that that member is assigned by the BC, and the date that a member started with the club. A BC may set a member as to active or inactive status wherein an inactive status prevents a member from accessing the club and receiving e-mail messages, thus effectively deleting a member from the club, although the status may be reversed to re-activate a member. Inactive members may be displayed or not displayed. The member list may be sorted in a number of different ways, such as by first name or last name, balance owed, or date of addition to the club.

Through Option 1514, denoted "Payments" a BC may manage the acceptable forms of payment and the processing of payments to and from members and suppliers.

Figure 24:
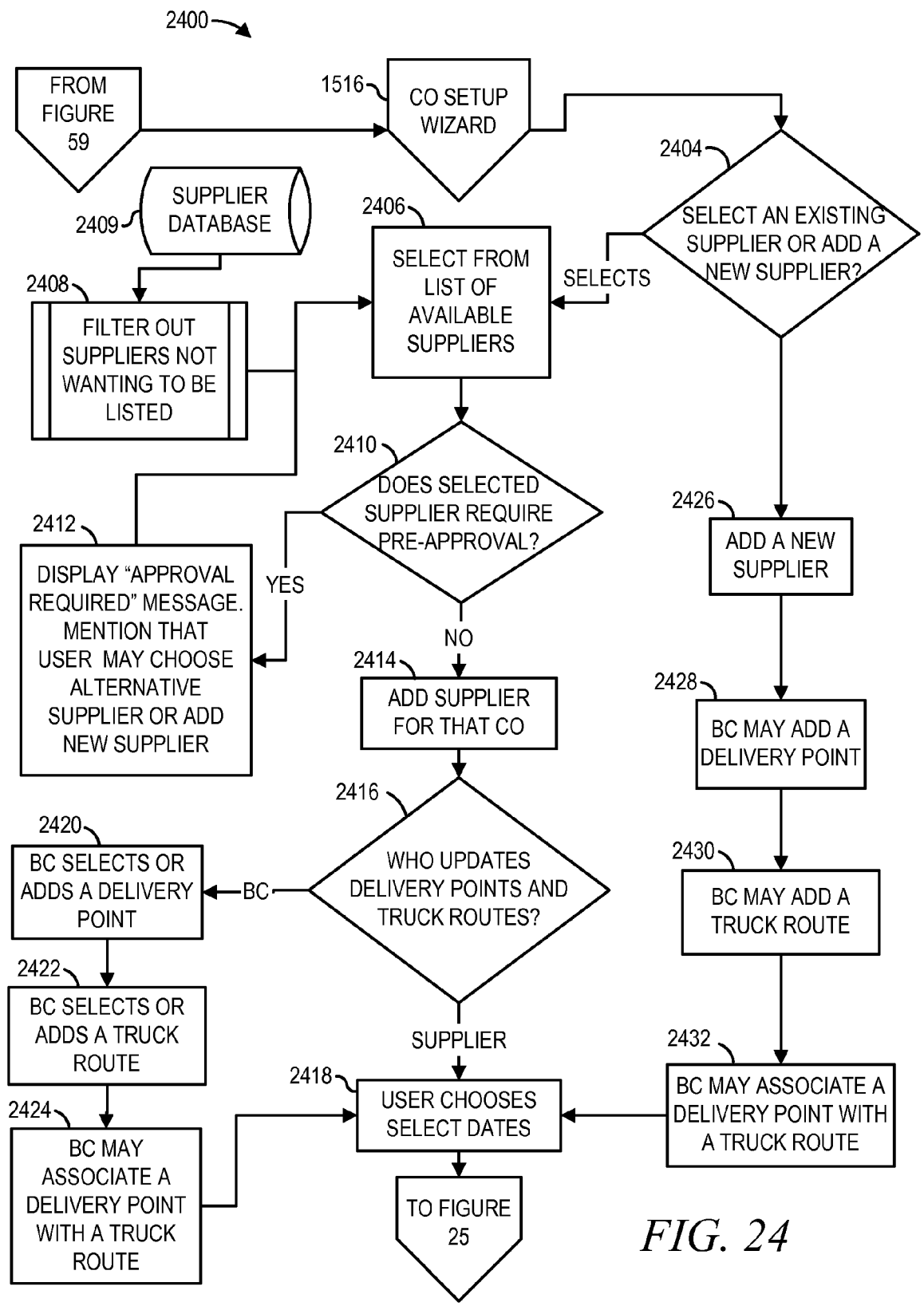
Figure 25:
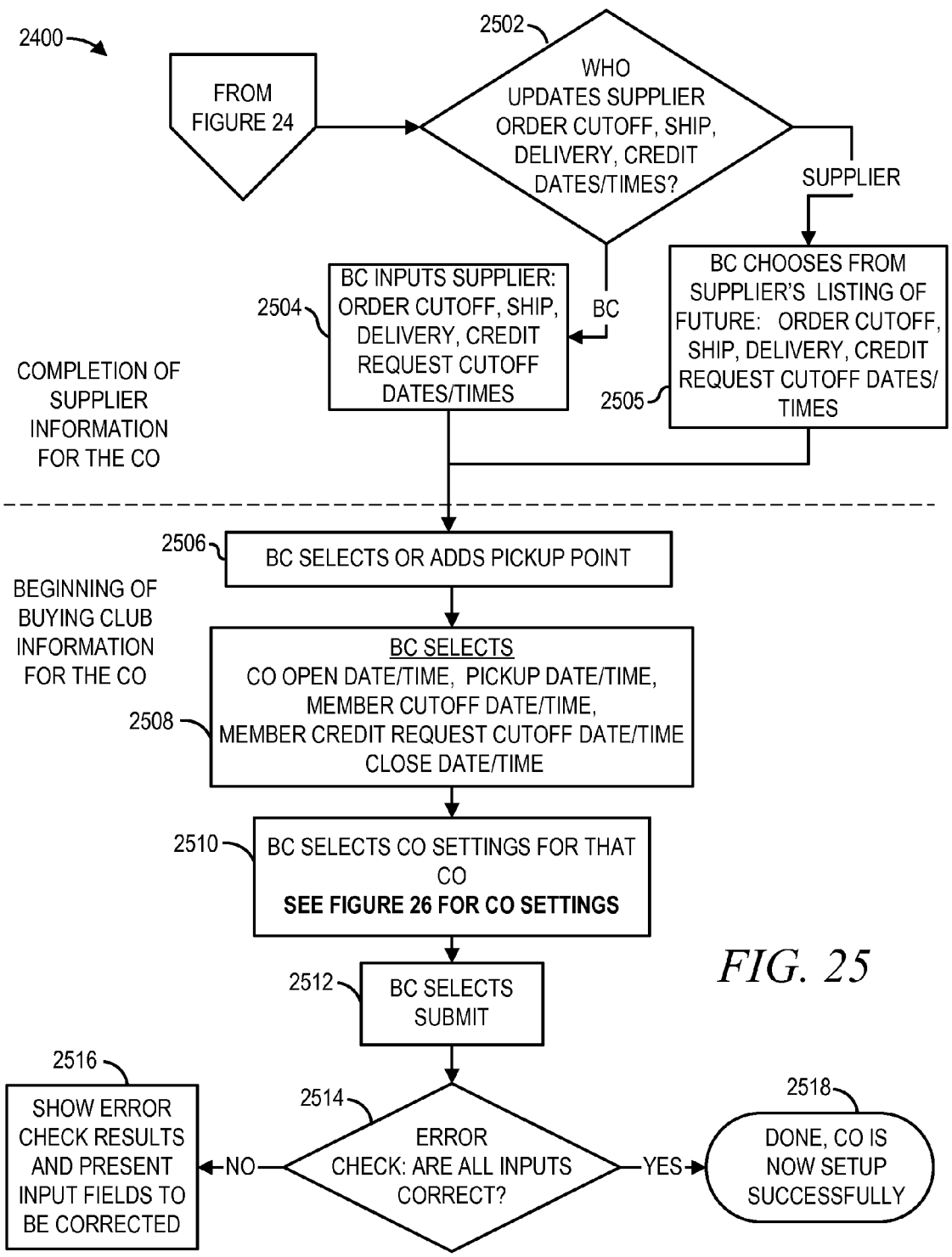

Through Option 1516, denoted "CO Setup Wizard" a CO may be opened as discussed with respect to FIGS. 24-25.

Figure 23:
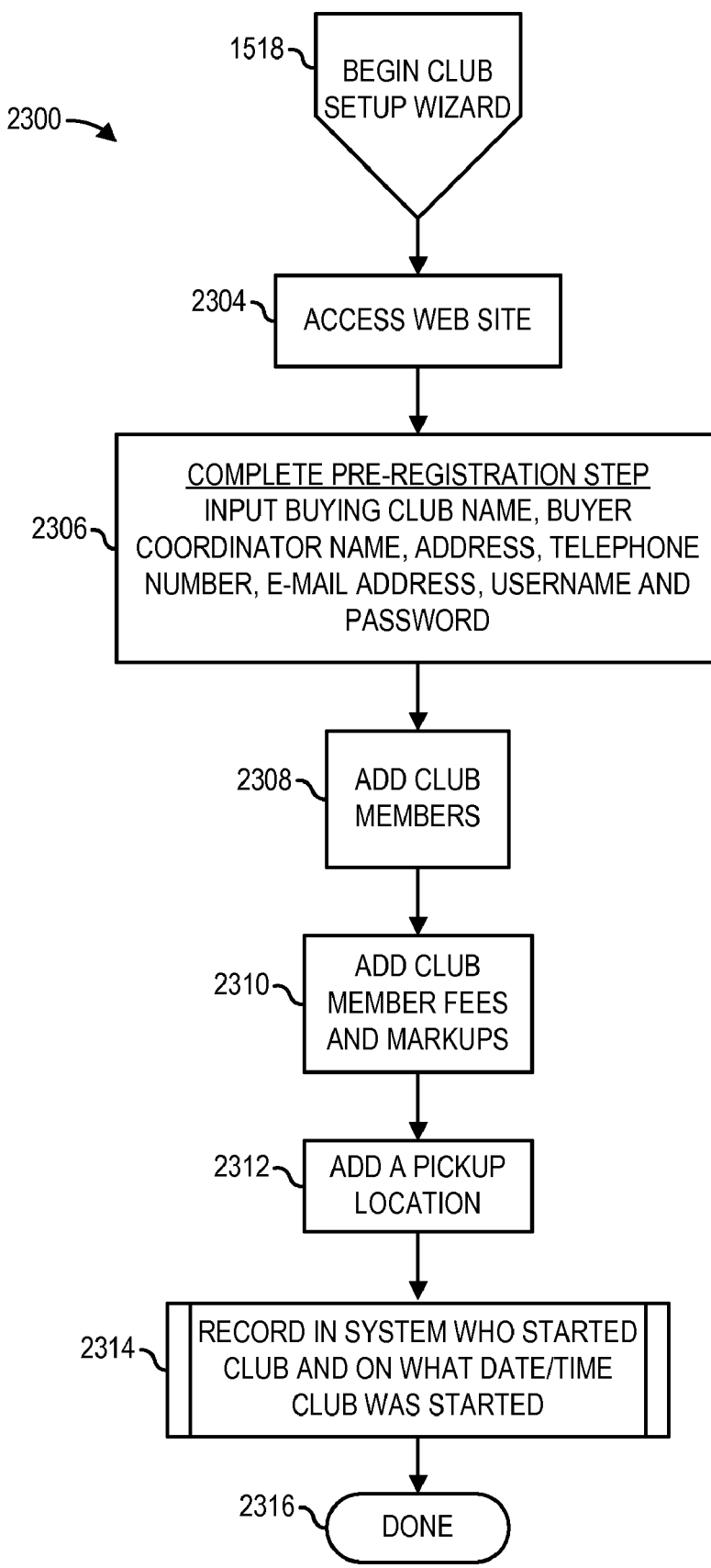
FIGS. 23-25 is a flow diagram exemplifying logic for enabling a user to set up a buying club.

Through Option 1518, denoted "Club Setup Wizard" a Club may be opened as discussed with respect to FIG. 23.

FIG. 16 exemplifies options that are preferably activated only for COs which the BC has opened and are referenced with respect to menu choices which appear under the "CO Admin" tab 918. These menu choices relate to functions that pertain to the BC's management of coop orders (CO's).

Most of the discussion below pertains to when a CO has already been opened by a BC. When no CO is open, then a message indicating that "No CO is open at this time" is preferably displayed in screens accessed from the CO Admin Options 918 (e.g., CoopShopping List, Club Catalogue, Total Order, SKU Allocation, Club Surplus, Product Substitutions, Supplier Order, Pickup Schedule, Member Accounts, and Payments & Credits). Furthermore, it should also be noted that once a supplier order has been placed, the BC should be prevented from accessing orders in a CO through the Ordering tab. If a member order cutoff has passed and member orders have been placed for a CO but the supplier order has not yet been placed, then it is preferable to remind the BC for each CO in which this state exists and enable the BC through, for example, a pop-up window, to place the supplier order immediately.

As with the member ordering screens a number of the same functionalities are preferably common to these screens in the CO Admin area. For example, products are preferably listed in alphabetized product categories, and listed within product categories alphabetically by product name. Similarly related SKUs/multi-case SKUs are preferably bordered and products on special are preferably highlighted. Error checks on inputs for min-pref-max units are preferably enacted as well.

The menu choices noted herein lead to screens which in turn are activated and populated based on the BC's desired selection from a pull down list box in which the CO's are listed. Thus the functionality of the selected screen may be associated with a specific CO. Other than the Maintain Coop Order screen, which allows access to all COs including those which are closed, these screens will preferably only be able to be invoked (ie thus selected) when those CO's are open. Thus for closed CO's these screen are preferably not able to be selected and will not appear in the pull down list boxes.

Through Option 1602, denoted "Maintain Coop Order" a BC may invoke a number of features adapted for maintaining coop orders. These include most generally, Supplier Information (such as locations and dates for the supplier) CO Information (such as locations and dates for the club), and a variety of CO Settings (variables which can be adjusted based on desired club operating arrangements)

Preferably, the nine date/time inputs the BC makes are checked to ensure that their conformity to the following sequence: Coop Order Open Date/Time, Member Cutoff Date/Time, Supplier Cutoff Date/Time, Supplier Ship Date/Time, Delivery Date/Time, Pickup Date/Time, Member Credit Request Cutoff Date/Time, Supplier Cutoff Credit Request Date/Time, and Close Date/Time. Also, if a CO Setting is changed that is incorporated into a calculation or operating of that CO, then all the variables that are affected by that setting are preferably re-calculated or the activities are reset as though the variable was set to the new selection from the very beginning of the CO.

As will be noted later in more detail, dates and times of events are preferably used for tracking the status of the CO through various phases, and may affect other areas if changed. For example, if a supplier order has been submitted, then no CO Settings may be changed that relate to the period of time prior to that supplier order cutoff/date time. As another example, if a CO is pre-supplier cutoff date/time, and if the member cutoff date/time is then re-set to a date/time later than the current moment, and thus the supplier cutoff date/time must be set for later than the current date/time, then the Supplier Order Status for a CO should be reset from "Past Supplier Cutoff" to "Pre-Member Cutoff" and the supplier order is thus restricted from being able to be submitted (since a supplier order is preferably restricted from being submitted prior to the member cutoff date/time). The above status setting are viewable in the Supplier Order Preview screen as noted later in FIGS. 74 through 81.

Further to Option 1602, a BC preferably may select a CO from a pre-generated filtered listing of all CO's, pre-cutoff, post-cutoff, or closed. A new coop order may be opened by clicking a "Begin New Coop Order" button, wherein a number of options become available to the BC for starting the CO. For example, a supplier may be selected, a delivery point displayed (if supplier provides same), a pickup location may be selected or added, and the dates may be added. For the given selected delivery point, assuming these have been provided most preferably by the supplier, then a scheduled delivery date may be selected from a list of each future delivery date, supplier cutoff date, and shipment date that the supplier has scheduled for that delivery point. Alternatively, if no schedule is uploaded by the supplier, the user may then input all the dates as relates to the supplier for their CO as best as they may be determinable. For the club, a BC may set one or more pickup dates and one or more start and stop times (for each pickup date), and may set the close date (i.e., make it no longer accessible for editing by the BC and close out the accounts).

In addition to the Supplier and Club dates and locations, a number of additional settings may preferably be configured when initiating a CO. For example, a BC may (1) select an optimization based on lowest cost, nearest to preferred, or any optimization level between cost and preferred. If optimization is chosen, then a balance is preferably set between preferred and cost (defaulted to 50/50). A BC may (2) set a fixed fee per order, a markup percentage, the higher of both, or neither. A BC may (3) set pricing across member orders by item or on average price basis for the non-case orders. A BC may (4) allow a case price markup (i.e., preferably a lower markup than a regular or member markup for case orders). A BC may (5) set whether a case price markup applies to non-splittable quantities only or if it applies to all orders for quantities which span case quantities (in addition to non-splittable orders). A BC may (6) set whether or not supplier volume discounts are passed on to members. A BC may (7) set whether pickup times are required of members placing orders and, if so, determine pickup time slot increments and determine the max number of members per time slot. A BC may (8) set whether a minimum member quantity is an absolute limit on the minimum quantity for products or is an advisory limit (e.g., soft vs. hard MMQ, also referred to herein as minimum order quantity as set by the supplier). A BC may (9) set a substitution methodology for substituting one product that is provided in the place of a different product. A BC may (10) set whether members are allowed to add products to the Coop-Shopping List. A BC may (11) set whether or not the CO is open to being an MCP (multi-club purchase). A BC may (12) set when payment is due (e.g., on order, on delivery, certain time post delivery, on pickup, certain time post pickup). A BC may (13) set whether the CO accepts payments through the CS. A BC may (14) set whether sales from inventory should be allocated to preferred level, or to the member's maximum allowed units. A BC may (15) set whether the algorithm used to create case quantities will push persons to their maximum sequentially LIFA-MAX or increment persons by a number and increase that number for each person (LIFA-LADP) as disclosed in co-pending '097 patent application. A BC may (16) create a "Box Sale" consisting of single choices which includes x units of product A, y units of product B, and z units of product C, all sold for a single price of $GG. Deviations by members off of Box Sale quantities may be permitted to automatically add to or decrease the price $GG. The prices of units for each component SKU of a Box Sale may or may not be displayed. A name may be created to uniquely define each Boxed Sale. Each Box Sale name may be permitted to be selected for other COs. A BC may (17) determine whether to flex the minimum units down to 1 or set it as the member's preferred unit input if the minimum was not specified by the member (this is called Flex Minimum). A BC may (18) set whether to pass through the freight charges to members or not. The BC may determine whether each of the foregoing CO settings should be carried forward to the next CO by a check box to be checked for each one to carry it forward. The BC may also cancel a CO, and thereby delete all orders and make the CO non-existent.

Through Option 1604, denoted "CoopShopping List" (CSL), a BC may create and maintain a preferred listing of products to order (CoopShopping List or CSL) which are associated with the CO. Products may be added to the CSL via selection from the catalogue. Products may be added to the CSL by denoting a of one or more SKUs by number. When a SKU is added to the CSL, the SKU may also be added to the BCs "My Favorites" list. Products may be deleted from the CSL singly, by checked groups, or all together (select all/deselect all followed by delete). A check box may be checked to permit products to be displayed to Members. Thus a BC may also determine for each product on the CSL whether it should be displayed (show) or not in the CO. (A BC may thus elect to maintain a product on the CSL but not show it to members in a specific CO while they are placing orders). A check box may also be provided to indicate for each product whether or not the BC permits it to be split. Information that is displayed about each product for the BC would preferably include the SKU, description, brand, units per case, unit label, split case, supplier unit price, member unit price, and the like, and a check box provided to permit the product to be deleted. Functionality is preferably provided for retrieving a CSL from a prior CO or from all COs of that supplier. A BC may thus elect to import an entire CSL (preferably by appending this list to any SKU in the existing CSL list) from another CO, or all COs, and the show/now show settings for those imported SKUs will preferably be retained.

Option 1606, denoted "Club Catalogue", presents an opportunity for the BC to re-cast the information that has been provided in the supplier's catalogue into a form that is more suitable for the club. Through the "Club Catalogue", a BC may create and maintain a customized club catalogue that may be used to present information to members that differs in the way that catalogue information has been presented to the club from the supplier. For example, a product may be sold by the supplier to the club as a 1 40 pound bag, but the BC does not want to sell that product in 40 1 pound increments as would otherwise be allowable in the system 100. Therefore the BC may define that product as 8 5 pound bags. Then when a case (or more accurately the bag) is ordered from the supplier the order to the supplier will be for the 40 pound bag, but the members will receive a sub-divided unit of 5 pound bags (as many of these as they ordered). Preferably included in this functionality is logic that, if a product in the Club Catalogue has either been ordered in that CO or is in inventory, then the units per case of such product, unit label of such product, or MMQ (also referred to as MOQ from the supplier) of such product may not be changed, but rather are preferably presented as grayed out when these products are listed.

Edits in the Club Catalogue are preferably associated with a CO. To generate a listing to edit the BC may elect to select from one of: all the SKUs in the CSL, My Favorites, Specials, Catalogue, Altered Products (i.e., products where prior changes have been made to them in the Club Catalogue), and Associated Products (i.e., products which are either Related SKUs or Multi-case SKUs). Each SKU is preferably presented in two sections one above the other. In the top section is preferably displayed the Member's catalogue information, and in the bottom section is preferably displayed the supplier's provided information. The Member's catalogue information is preferably defaulted with whatever is provided from the supplier (unless the carryforward button has been checked).

For each SKU on the list, the BC may edit, and thus re-define for presenting to the members, the product description, minimum member quantity (MMQ) which is defaulted to be the same value as the MOQ from the supplier, units per case, unit label, supplier case price, supplier each price, and member price. Editing the Member Price thus is effectively overriding the calculations which are used to otherwise generate the member price. A product may be flagged (e.g., marked via a check box) to indicate that they are in the CSL, whether to Show them, Member Weight (ie that the product is available to be sold in less than integer increments such as 2.36 pounds versus simply 2 pounds) which is defaulted to the random weight from the supplier, Split Case (ie whether the BC will allow the product to be splittable) defaulted to allow split condition, and carryforward (i.e., whether or not to carry forward these settings to subsequent CO's with this same supplier). For each product a button is preferably presented to allow the settings to members to revert to the supplier settings. New margins and units per case may be calculated based on new inputs without requiring the new calculations to be saved, so they may first be viewed and tested. A BC may also determine which members have ordered a product thus far, and view information on a product itself (e.g., by clicking on the SKU or the supplier description). Changes for each SKU may be submitted by clicking a Submit button for that SKU. A number of changes may be made at once for a number of SKUs and then clicking on a "Global" submit accepting all the changes made for all SKU's.

Through Option 1608, denoted "Total Order", a BC is able to view in a snapshot screen, all the products ordered from the supplier and from inventory, as listed in product categories and providing the total quantities ordered and the dollar amounts from the supplier, from inventory and to the members. To generate this list, a BC selects the CO to be associated with that Total Order. The aggregation of all the units and dollar amounts of each product that has been ordered by all the members to that club in that CO are then preferably viewed in the screen. A filter may be used to show all SKU's, only unfilled SKU's, or only filled SKU's. There is preferably for each product the SKU, description, units per case, unit label, number of Members ordering that product, total of all min's, pref's, and max's specified for that product, whether order is filled, and if not, how many are needed, actual units ordered, and how much is supplied from supplier, from inventory, and the total supplied. The Club Cost and Members Sales for each of supplier, inventory, and total amounts are preferably displayed for each product. The total quantity from supplier, total cost from inventory, total cost from supplier, and total cost from both inventory and supplier for each product are preferably displayed. The total member sales from inventory, total member sales from supplier, and total sales for both inventory and supplier for all products are preferably displayed. From the Total Order screen the BC may preferably access the SKU allocations to each member for any SKU, and any fields for members that do not allow ordering for them are preferably grayed out, and those members that allow for ordering by the BC are preferably editable in the actual quantities columns (one for inventory one for supplier if inventory stocked for that product).

Functionality is preferably provided to enable a BC to order for members (that allow it) other products not yet ordered in that CO. Products not yet ordered may be identified through a catalogue "drill-down" to the product. Each member is preferably associated with editable unit quantity fields for quantities to order (though any member's field quantities that do not allow ordering for them may be grayed out). Quantities may then preferably be input to create a member's orders for a SKU. Functionality is preferably provided to link to the club surplus for placing an order that will be added to the Club Inventory.

Option 1610, denoted "SKU Allocation", is a screen which is generated which lists for each product all the members that have ordered the product. This screen, which may be termed the Main SKU Allocation screen, is critical to enable the BC to see and adjust the quantities to order so that products will make case that otherwise would not be filled. A filter is preferably provided to show all SKU's, only unfilled SKU's, or only filled SKU's. Use of the filter enables the BC to reduce what could have been a list of some 80 to 100 SKUs or more, down to a more manageable number if the choice selected is only unfilled SKUs and the CO has relatively few of these.

For each SKU a header area preferably displays the SKU, product description, units per case, unit label, Regular Price, and units in inventory. Below the header is a grid for each member ordering the product in a separate row. Preferably displayed in the grid for each member are the, SKU, Min, Pref, Max, Supplier Actual (units), Member Price, Supplier Amount (monetary), Inventory Actual (units), Total Actual (units), and Total Amount (monetary). Members are preferably listed from earliest at the bottom to latest at the top with Club Surplus preferably listed in in the very top row. Each member's price is thus shown in the ordering grid and the min, pref, and max units are preferably displayed in the grid. A member's min, pref, and max units are preferably precluded from being edited but only the supplier actual and inventory actual columns associated with that member are preferably editable for the BC and only then if so permitted by the member.

In the pre-cutoff period, for each product ordered by members, it is preferable to allow the BC to adjust the actual unit quantities to members and to order units for Club Surplus. However, any changes to orders placed by members during this pre-cutoff period will preferably cause amounts placed in the "Actual" columns (whether supplier or inventory) by the BC to be overridden as the optimization algorithm preferably takes precedence in the pre-cutoff period.

The BC preferably reviews all the orders for each SKU and adjusts quantities down or up to fill in even case quantities. Actual units may preferably not be ordered for a member that exceeds a member's maximum, unless the respective member has authorized same in their member profile. The BC may not set a value for ordering actual that is less than a member's minimum unless the member has authorized same in their member profile and the flex minimum has been invoked by the BC. As noted previously, the actual input fields for members that do not allow ordering for them are grayed out.

When the member order cutoff has passed and where case quantities are not able to be achieved, the BC may order for Club Surplus. To minimize the amount ordered for Club Surplus but still allow cases to be achieved, a BC may put a 1 in the minimum column of Club Surplus and the exact number of units per case for that product in the preferred column. In a very simplified sense, the optimization algorithm will then preferably order as many as possible for members and what is needed to be make case will be added to the Club Surplus account. However a preferable and more complete description is presented in the '803 patent application.

Alternatively, once the member cutoff has passed, then a choice preferably displays just below the header for each sku: "Edit Club Surplus" or "Edit Actual". Choosing "Edit Club Surplus" enables the BC to enter units in the min-pref-max fields for Club Surplus and lets the optimization system do the work of determining the best outcome. In the other setting, "Edit Actual" preferably grays out the min-pref-max fields for club surplus and only allows the BC to input values in the supplier actual and inventory actual columns for Club Surplus and all members who permit this.

To avoid displaying information that is not relevant, some rules for presenting the headers and displays are preferably invoked. If a SKU that is being displayed does not have any inventory, then the on-hand or available inventory information is not displayed in the header or in the grid. Thus, the following fields are removed for such SKU's: the Supplier Amount field, the Inventory Actual field, the Inventory Price field, the Inventory Amount field, and the Total Actual field. The fields which should then preferably show are the SKU (Units per Case if a related or a multi-case SKU), Min, Pref, Max, Supplier Actual, Member Price, and Total Amount fields.

If a SKU is "normal" (i.e., is non-related and non-multi-case), then there is shown preferably in the header of a screen, the SKU, description, units per case, unit label, MMQ (if other than 1), Club Cost, Regular Price for the product and, if there is inventory, then also show the units on-hand and available inventory.

If a SKU is either a related SKU or multi-case SKU, then there is shown preferably in the header of a screen, the SKU and description and then in a table in the same header area for each related or multi-case SKU, the SKU (preferably not repeated for a multi-case SKU), units per case, unit label, Regular Price, Club Cost, MMQ. If there is inventory, then the On-hand and Available Units will preferably be displayed in columns in the right portion of the screen.

During the pre-member cutoff date/time period Calculate, Submit and Clear functions is enabled for each SKU, preferably activated by buttons placed under the grid for each SKU. Calculate will trigger the optimization process for the SKU based on the inputs in the min-pref-max columns but will not save the result. Submit will save the results of whatever is found in the actual column(s). Clear will clear all entries and restore the results prior to any overrides. During a post-cutoff period, an Auto-fill & Submit function is enabled and displayed by means of a button preferably positioned in the vicinity of the Calculate, Submit, and Clear buttons under each grid for a SKU. Auto-fill & Submit raises or lowers the member's orders, and places the balance in Club Surplus to make case and submits the results. It thus preferably allocates the maximum or minimum number of units as may be ordered to members within their proscribed limits while still enabling a case quantity to be achieved, and the balance to the Club Surplus, and save the result, so that in one button a product may be deemed to be ordered by means of the optimization algorithm decision logic. For each SKU below the grid, a narrative form is preferably provided which indicates whether or not an order is filled, and how much is from the supplier and how much is from Club Inventory.

At the bottom of the screen in which all the SKUs are listed, is preferably provided a function called "Global Auto-fill" which will only preferably display after the Member Cutoff Date/Time and before the Supplier Order Date/Time has been placed. A Global Auto-Fill function does for each order not being filled what the individual Auto-fill and submit does for orders being filled; however, the Global Auto-Fill function further includes a confirming screen which shows for each SKU the amount to be ordered for club surplus, and also provides a check box to confirm that the BC wishes to order this amount for Club Surplus for a product in this CO. The Global Auto-Fill function also displays the other products being ordered for Club Surplus and generates a Grand Total for the Club Surplus order for this CO based on whichever boxes have been checked by the BC and whatever else was ordered for Club Surplus for this CO. A submit button at the bottom of the Global Auto-Fill confirmation screen saves the orders for whatever boxes have been checked by the BC and thus the orders will be placed to the supplier for those SKUs.

After the supplier order has been shipped, units are not allowed to be increased beyond what the supplier has shipped, although re-allocations of units between members are preferably permitted provided that the totals remain what has been shipped from the supplier.

Through Option 1612, denoted "Club Surplus", a BC selects a CO through which to order products to be ordered as Club Surplus (that is to be added to the Club Inventory) and then indicates whether he/she is interested in viewing All Orders, Filled Orders Only, or Unfilled Orders Only of the CO. Separately, the BC may select the list of sources of products from which to order including: the CoopShoppingList, Specials, Club Member Orders, Catalogue, or Prior Orders. These functions work similarly to those described in the Ordering tab for members with the distinction that the pricing displayed for the products is the cost incurred by the club, rather than the price for a member. A number of parameters of the products are preferably displayed, such as the SKU, Description, Brand, Unit Label, Units Per Case, # MB, Min, Pref, Max, Split Case option, Order Status, Actual, Member Price, Member Amount, Club Cost, and Club Amount. For all products ordered under Club Surplus for this CO, the total based on the Member Amount (which preferably uses the regular markup to calculate an imputed member price) and the Supplier Amount is displayed. Any ordered products in Club Surplus may be deleted. A BC may choose to add one or more products by SKU to Club Surplus. When adding SKUs to a CSL, the BC may also add to CSL by check box and to their My Favorites list as well. Comments may also be included with the order.

Through Option 1614, denoted "Product Substitutions", a BC may substitute a new product for one which is not able to be sourced from the supplier. This feature saves the BC substantial time because, otherwise a BC would have to delete all the orders for a product for all the members, and then have to choose all the members who had ordered that products, and then add the other product and all the member's quantities for that product. In the meantime, the BC may forget who ordered what or how much they ordered. This feature enables a BC to view and address all these issues from a single screen. In operation, a BC preferably first selects the CO, and then selects a "FROM" SKU based on the list of all the products which were ordered in that CO. Functionality is preferably also provided to enable the BC to remove the selected SKU from the CoopShopping List. Information on the selected SKU, such as a Description, Units per Case, Unit Label, Supplier Case Price, Unit Price, MOQ are displayed in the grid. Also displayed in the grid are the Member's name, Min, Pref, Max, Supplier Actual, and Supplier Amount for each member that ordered that product. The BC then preferably selects the "TO" SKU either by finding a SKU in the catalogue, selecting a product from the inventory, or adding a SKU number. After the SKU is selected, then the information on the selected "TO" SKU, such as Description, SKU, Units per Case, Unit Label, Supplier Case Price, Unite Price, MOQ is preferably displayed in a grid below the "From" SKU information. (The BC may then also add the TO product to the CSL by a check box.) The same members are displayed as ordered before, plus Club Surplus is included as rows in the "TO" SKU grid. The units min, pref, and max are selected for each member receiving the units. One or more members may be added to the list of persons on the "TO" side for the member's receiving the units for any members that permit the BC to order for them. Functionality is provided for automatically performing calculations that may be presumed for the switch, but does not save them, only providing a preferred or logical outcome. A Submit function saves the substitution as it has been entered whether by the BC or using the semi-automated functionality.

Through Option 1616, denoted "Pickup Schedule", a BC may assign pickup times for member who have ordered products through a Coop Order. For the member the specific assigned time of pickup is preferably shown on the Member Order report and the Placed Orders screen (e.g., seen by members on login after the CO is past the member cutoff). To assign a pickup time, a BC first selects a Coop Order. Functionality is provided to then enable a BC to automatically have the system allocate to each user (based on the best, then okay, then worst, and excluding not available) time slot available to them based on Members' preferences as well as the sequence in which they placed their order (in case of a conflict). Preferably, no more than the maximum permitted number of persons is assigned to a time slot. The BC selects a time slot from among a range of scheduled pickup dates and times for that CO for the purpose of assigning members. For the selected time slot, any unassigned members that may be assigned to that time slot are displayed and then these may be assigned by the BC to that selected time slot. The BC may also view member selections over the range of the day of week covered by the pickup dates and times for that CO so as to determine when a member is most likely to want to make the pickup. Member's specific preferences and the reason are preferably also displayed. The member's assigned pickup time for that CO is preferably displayed in the Placed Orders screen which appears if the member has ordered and accesses the CO after the member cutoff date/time for that CO. If a member's message profile permits, then a message is sent out indicating the assigned pickup time for that member as well as the products ordered and the estimated amount.

Option 1618, denoted "Supplier Order", is the screen in which the BC submits the order for the CO to the supplier. Upon accessing the menu choice called supplier order, the BC is preferably reminded as to any CO's that are past the member cutoff date/time and before the Supplier Cutoff date/time where member orders have been placed but in which the supplier order has not yet been submitted. Each CO meeting these criteria is preferably displayed in a list in a window including a select hand to select the CO, and the CO-#, the supplier name, the amount of the supplier order, the number of members ordering, and the supplier cutoff date/time. The BC may select any one of these and commence the process for placing the order with the supplier.

If the BC does not have any overdue supplier orders, or wishes to instead access supplier order directly, then a Supplier Order Preview Screen facilitates selection of each Supplier Order for each CO for a buying club. The Supplier Order Preview Screen includes an option to select a Supplier, CO-number, Status, Date Order Submitted, Ordered Amount, Date Received By Supplier, Date Shipped, and Shipped Amount to view the underlying detail information pertaining to that supplier order. The Supplier Order Preview Screen shows the status of supplier orders for each CO in an easy to view listing. The supplier order status (in sequence) is preferably the following: (1) No Member Orders (2) Pre-Member Cutoff, (3) To Be Submitted, (4) Past Supplier Cutoff, (5) Submitted to Supplier, (6) Retrieved by Supplier, (7) Invoiced, (8) Shipped, (9) Invoiced & Shipped, (10) Delivered, (11) Closed. A BC may select a specific CO for the Supplier Order screen to be accessed A Supplier Order Screen displays in a header the CO, Supplier Name, and Status of a Supplier Order. Under the header are preferably displayed in rows for each SKU, the SKU, Description, Manufacturer, Units Per Case, Unit Label, Ordered Quantity, Ordered Price, Shipped Quantity, Shipped Price, Received Quantity, and Received Price for each of the products ordered. The Ordered column reflects what was ordered by the Buying Club from the supplier. The shipped column reflects what the supplier indicates it has shipped, and the received column indicates what the BC records has been actually received from the supplier. The ordered column is auto-populated (and not editable) with the buying club's order, and the shipped column is preferably updated by the supplier based on what is shipped. The received column is preferably not editable until the supplier order has been submitted. The received column preferably defaults to whatever information has been provided by the supplier in the shipped. It is preferable that such orders to the supplier and the invoice received from the supplier are transferred electronically, whereupon the column changes and updates noted above are preferably automatically executed by the system 100.

After selecting a CO to submit for which to submit a supplier order, the supplier may submit that order to the supplier by clicking on a button which implements this action. Even after the Supplier Order has been submitted, a BC may add a new product to the supplier order by (1) retrieving a product which did not make case and adding the product to the Supplier Order by ordering the extra for Club Surplus or a member; (2) adding a new product by the SKU number or (3) searching for and retrieving a product from the catalogue. After the product is added, the SKU Allocations may be selected and the product may be allocated to each club member via a View SKU Allocations button that retrieves all orders for products in the CO and lists them in a format that directly parallels that used in the SKU allocation screen. An additional function preferably allowed though is a separate button for each SKU called "Add Member Orders", which adds all members to a SKU that are in the Club so that units may be allocated to them, even if they did not order that product before the supplier order was placed.

After the BC has submitted the order to the supplier, then preferably the received column is then activated (ie no longer grayed out) to enable the BC to record what was actually shipped from the supplier (so that the member's orders may then be updated based on what was actually shipped by the supplier). If the supplier's invoice has not been automatically updated on the system 100, (in which case the actual quantities are preferably auto-populated in the received column already), then the appropriate adjustments may be made by the BC to the pricing or quantities of products based on what was actually received by the BC from the supplier in the received column. For example, if 5 cases were ordered but only 3 were shipped, then the BC may input in the received column 3 cases. Or if a product was ordered for a case price of $23.50 and actually cost $24.75, then the BC may preferably enter the actual price in the received column.

If there is a difference between the price of what was ordered and what was received, then the BC may preferably select whether the prior price or the new price will be charged to the members. If there is a difference in the quantities, the BC may view and change the SKU allocations of each product to members, although no more may be allocated than was actually ordered or received. If less units are allocated to member than what was actually shipped, then the balance is preferably allocated to Club Surplus (and updates Club Inventory). Products may be allocated to more members than just members that ordered that product by the aforementioned "Add Member Orders" functionality.

Members may request credits for poor quality product, under-ships (less received than supplier says was shipped), over-ships (product shipped and invoiced but not ordered), and mis-ships (a product shipped that was not ordered in an attempted replacement) or other factors. These may also be requested from the Supplier by the BC. These are preferably by viewing all requested credits for the club (including those requested by members and those requested for the club itself) and then denoting those which will be passed on as requests for product credits request from the supplier. The BC is preferably able to view all member credit requests and denote by a check box, which of these are accepted for the member, as well as which of these are to be forwarded to the supplier as a product credit request. These then preferably become associated with the CO. Members are not able to request credits after the Member Credit Request Cutoff Date/Time and Buying Clubs are not able to request credits after the Supplier Credit Request Cutoff Date/Time.

There are certain functionalities preferably attendant in the Supplier Order area some of which have been noted, others of which have not been noted. As noted above, edits are preferably prevented to the quantities or prices in the BC's Received Column until the supplier order has been submitted. Updates to the catalogue, and thus to the member's orders, are preferably terminated when the supplier invoice is uploaded. Once information is updated by the BC in a field in the received column in the Supplier Order screen, then changes are preferably no longer updated from the Supplier catalogue to the Member's for the information in that field (preferably the BC is preferentially taking precedence). As noted above, any extra amounts shipped versus what was ordered are preferably allocated to club surplus. If no amounts are shipped, then they are deleted from all member orders. In circumstances where amounts shipped are less than ordered, they are preferably deducted from member orders based on who ordered last. Member's prices are updated based on those supplier prices that have been provided by the supplier, unless the prices have been overridden by the BC. In the View SKU Allocations portion of the Supplier Order screen, adjustments are preferably only allowed to the Actual quantities and only to the extent that such Actual quantities do not increase the quantities of units to more than were ordered or received from the supplier.

Through Option 1620, denoted "Member Accounts", a BC is able to process adjustments of orders, payments and credits for each member who has ordered in a CO. To do this, a BC selects a CO, and then selects the member. For the selected CO and Member, the Orders, consisting of the SKU, Description, Unit Label, Units Per Case, Ordered Quantity, Delivered Quantity, Reason (if difference), Price, and Amount are displayed. Changes may be made to the Delivered quantity, and a reason may be posted for the change. The product of the price and quantity may be extended to all amounts for each SKU. A total is preferably calculated for the orders. Separately, and if applicable, sales taxes, a shipping charge, deposit fee, volume discount and pickup discount (collectively referred to as "Add-On Charges and Discounts") are added to any other charges for that CO to calculate a total amount owed for that CO. Payments and Credits separately are tallied such as any payments made for that CO, product credits granted to the member for that CO, credits provided for a member providing services to the club for that CO. Then a total net amount for the CO is calculated by taking the total charged for orders and deducting the amount of payments and credits. The total amount for the CO is preferably added to the outstanding balance of all other transactions for this Member to create a cumulative balance. Specific adjustments may be allocated to each member's account for orders, credits, or payments.

Through Option 1622, denoted "Payments and Credits", allows payments to be processed using a selected method for processing each member's payment for a given CO. Payment methods may include credit card, ACH, debit card, or e-check. This screens provides a highly efficient means for a BC to enter a significant number of checks in one step for each member of a CO and have those amounts update the member's accounts. Payments made by members that were rejected (e.g., bounced checks, turned down credit cards) may be viewed. Also Member Credits requested by a selected member or for all members may be viewed. Member Credits may also be accepted and/or rejected, and Product Credits may be passed back to a supplier as in the supplier order screen.

Figure 17:
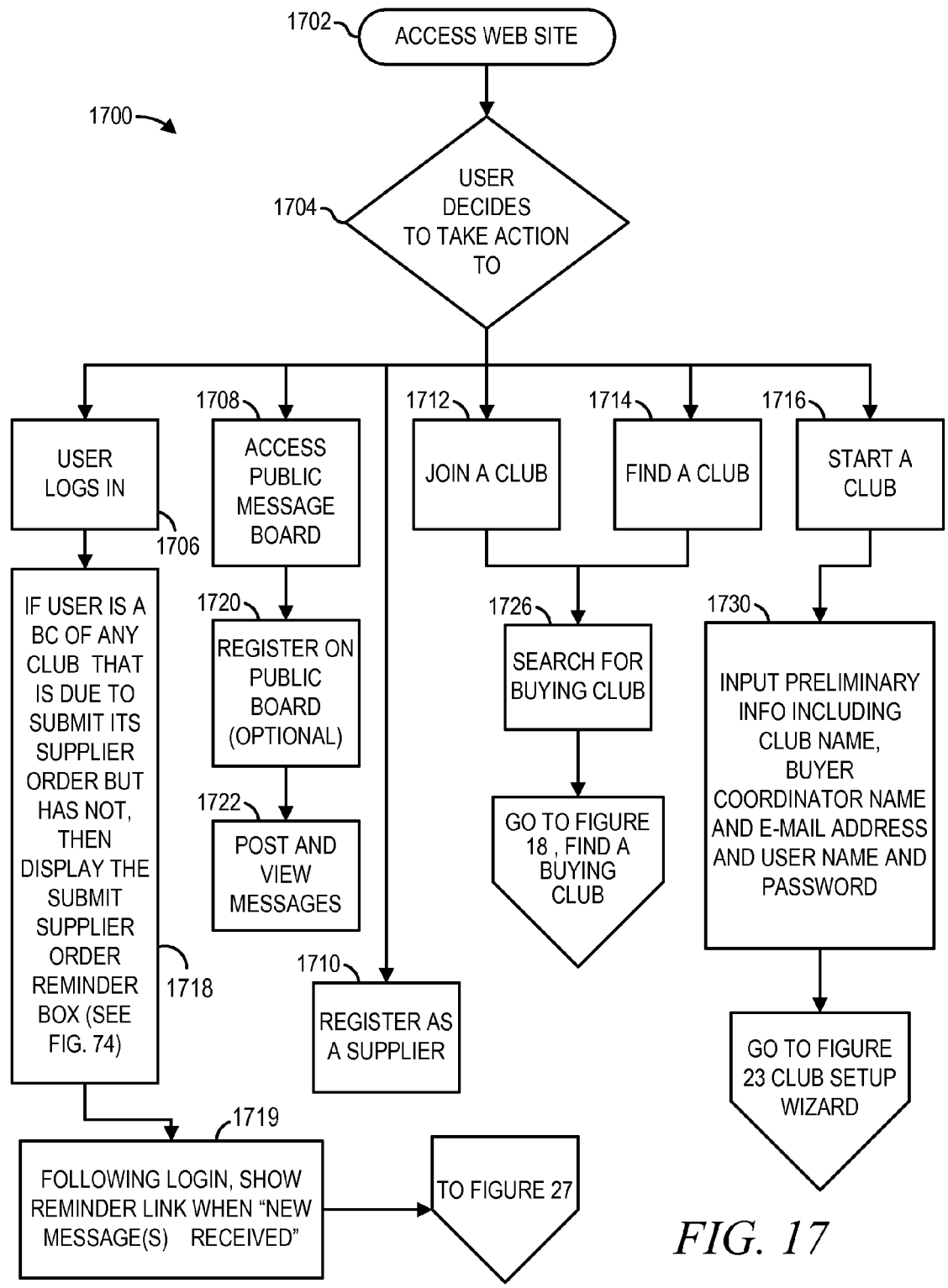
FIG. 17 is a flow diagram exemplifying functionality available via a Coop Shopping Home (web) Page

FIG. 17 illustrates an overview of a preferred embodiment of the invention subsequent to access by a user (either a member or non-member) of the central web server 120. Accordingly, at step 1702, a user accesses the web server 120 via a conventional web site. At step 1704, the user selects one of a number of hyperlinks, such as, logging in at a hyperlink 1706, accessing a public message board at a hyperlink 1708, registering as (ie adding) a supplier at a hyperlink 1710, joining a buying club at a hyperlink 1712, finding a club at a hyperlink 1714, or starting a buying club at a hyperlink 1716.

If a user selects hyperlink 1706 to log in, then in step 1718, if user is a BC of any club that is due to submit its supplier order, but has not submitted its supplier order, then a submit supplier order reminder box is displayed, as was discussed above in the supplier order discussion for step 1618 and in further detail below with respect to FIG. 74. Execution then proceeds to step FIG. 27.

If a user selects hyperlink 1708 to access a public message board, then in step 1720, the user is prompted optionally to register on a public message board and, in step 1722, the user may post and view messages.

If a user selects hyperlink 1712 to join a buying club, or hyper link 1714 to find a club, then execution proceeds to step 1726, wherein a search is initiated for a buying club meeting criteria of the user, as discussed in further detail below with respect to FIG. 18.

If a user selects hyperlink 1716 to start a buying club, then in step 1730, the user is prompted to enter preliminary information, such as a buying club name, the identity of a person who will assume responsibility as a buyer coordinator (BC), and an e-mail address, user name, and password of the BC. Setting up a club is discussed in further detail below in FIG. 23.

FIG. 18 illustrates a flow chart 1800 depicting logic for searching for and finding a buying club 104 subsequent to selecting the hyperlink accessed following step 1726 (FIG. 17). In step 1802, a user indicates the type of criteria he would like to employ in finding a buying club. For example, in step 1804, a user may indicate a desire to find a buying club by first selecting a geographic descriptor, such as a zip code, city, state, or the like which denotes the user's geographic area of interest. Optionally, such a geographic descriptor may also include a maximum distance limiter such as, by way of example, a distance, travel time, or the lesser of either, from the geographic descriptor, which effectively denotes a radius from a defined location within the geographic descriptor. In step 1810, the user enters the geographic descriptor and/or criteria. Execution then proceeds to step 1816, discussed below.

In step 1806, a user instead selects a search for a buying club based on the product or types of products that a buying club offers to members. In step 1812, a user enters one or more products or types of products that he or she desires. Execution then proceeds to step 1816, discussed below.

In step 1808, a user selects a search for a buying club based on both a geographic proximity identifier (optionally including a radius identifier), and based on the product or types of products that a buying club tends to buy. In step 1814, a user enters a geographic descriptor (and optionally the maximum distance limiter) as well as one or more products or types of products that he or she desires. Execution then proceeds to step 1816, discussed below.

In step 1816, it is determined if there are any clubs that meet the criteria under which the search was undertaken. If no clubs meet the criteria, then the user is preferably offered the opportunity to start a club as denoted in step 1820, in which case execution proceeds to FIG. 17, step 1716. If the user does not want to start a club then execution proceeds to step 1822, in which the user is preferably asked if they wish to be informed of any clubs that may form in the future that meet the user's desired criteria. If the user chooses not to be informed then the processing is ended. If the user is interested in being informed about clubs that might form in their area, then the user is invited to register themselves as denoted in step 1824. Such registration preferably includes the user's name, e-mail address, product type(s) of interest, the geographical descriptor, the maximum distance to the pickup location from the geographical descriptor, all of which is preferably stored in a non-assigned buyers database (not depicted).

If in step 1816 there are one or more clubs which meet the search criteria of the user, then preferably displayed are the club name, the geographical descriptor of the pickup location or if possible the distance from the user's geographic descriptor to the geographical descriptor of the pickup location as denoted in step 1818. Processing next proceeds to FIG. 19.

Continuing in FIG. 19 from the flow chart 1800, in step 1902, the user is queried whether he wishes to seek enrollment in a buying club. If the user does not desire to enroll in a club, then execution of the process is terminated at step 1904; otherwise, execution proceeds to step 1906 wherein the user identifies each club that he or she wishes to join. In step 1908, the user enters identifying information, such as his/her email address, username, and a password. In step 1910, a determination is made whether any buying club that the user expressed an interest in joining requires approval prior to joining. For each buying club for which approval is not required, execution proceeds to step 1916; otherwise, for each buying club for which approval is required, execution proceeds to step 1912, discussed further below.

At step 1916, a message is emailed to the user (also referred to herein as a "requesting party") indicating that he/she has been accepted as a member of each buying club which does not require approval to join, and information (e.g., a hyperlink) for accessing each such club is preferably provided to the user. In step 1918, the user as an approved member of one or more clubs, may click on the link (e.g., a hyperlink) preferably provided in the email message of step 1916 to access the web site of system 100 and the selected buying club(s) by then entering his/her username and password. In step 1920, the member is auto-enrolled in the club(s) and in decision block 1922 it is next determined if the buyer has become auto-enrolled in more than one club. If not processing proceeds to 1928 wherein the buyer, now enrolled as a member in that club, accesses the club's home page and proceeds to engage in club activities as desired as denoted in step 1930. If alternatively, in step 1922 it was determined that the buyer was seeking enrollment in more than one club, then the buyer is provided with a listing of the clubs as denoted in step 1924, and selects the club to access as denoted in 1926, whereupon processing proceeds to 1928 wherein the buyer, now enrolled as a member in that club, accesses the club's home page and proceeds to engage in club activities as desired as denoted in step 1930.

For each buying club for which it was determined in step 1910 that approval is required to join, in step 1912 a request is emailed the BC of each such buying club requesting that the user may join the club. In step 1914, each BC reviews the request to join a respective club and, if desired, may respond to the request appropriately.

Continuing in FIG. 20 with the flow chart 2000, in step 2002, then a determination is made whether the BC responded within a predefined period of time determined by the hosting entity (e.g., such time period may be set for hours, days or weeks, but preferably is set for approximately 2 to 4 days). If it is determined that a BC did not respond within the predefined period of time, then in step 2004, a notice is sent to the hosting entity, which may be the middleman/hosting entity 126 who has a vested interest in seeing buyers added to the system 100; otherwise, execution proceeds to step 2006, wherein a further determination is made whether each BC accepts the user as a new member. For each BC that accepts the user as a new member, then execution proceeds to step 2008; otherwise, execution proceeds to step 2014, discussed below.

In step 2008, a message is preferably e-mailed to the user notifying the user that he/she has been accepted as a new member of the buying club, and providing new member with information (e.g., a hyperlink, and username and password) enabling the new member to access the club. In step 2010, the new member may click on the hyperlink to access the buying club web page and enter his/her username and password to enable the new member to, in step 2012, engage in club activities as desired.

For each BC that, in step 2006, does not accept the user as a new user for his/her buying club, then in step 2014, a message is sent to the user explaining to the user why he/she was not accepted. In step 2016, a message is sent to the hosting entity which may be the middleman/hosting entity 126 who has a vested interest in seeing buyers added to the system 100; notifying the hosting entity of the rejection of the user. In step 2018, the user is queried whether he/she would desire to start their own buying club. If the user responds that he/she does not desire to start their own club, then the process for finding a club is terminated at step 2020. If the user responds that he/she would desire to start their own club, then in step 2022, the user is provided with prompts and guidance for starting a buying club, as discussed further below with respect to FIG. 23, and the process for finding a club is then terminated at step 2020.

Figure 21:
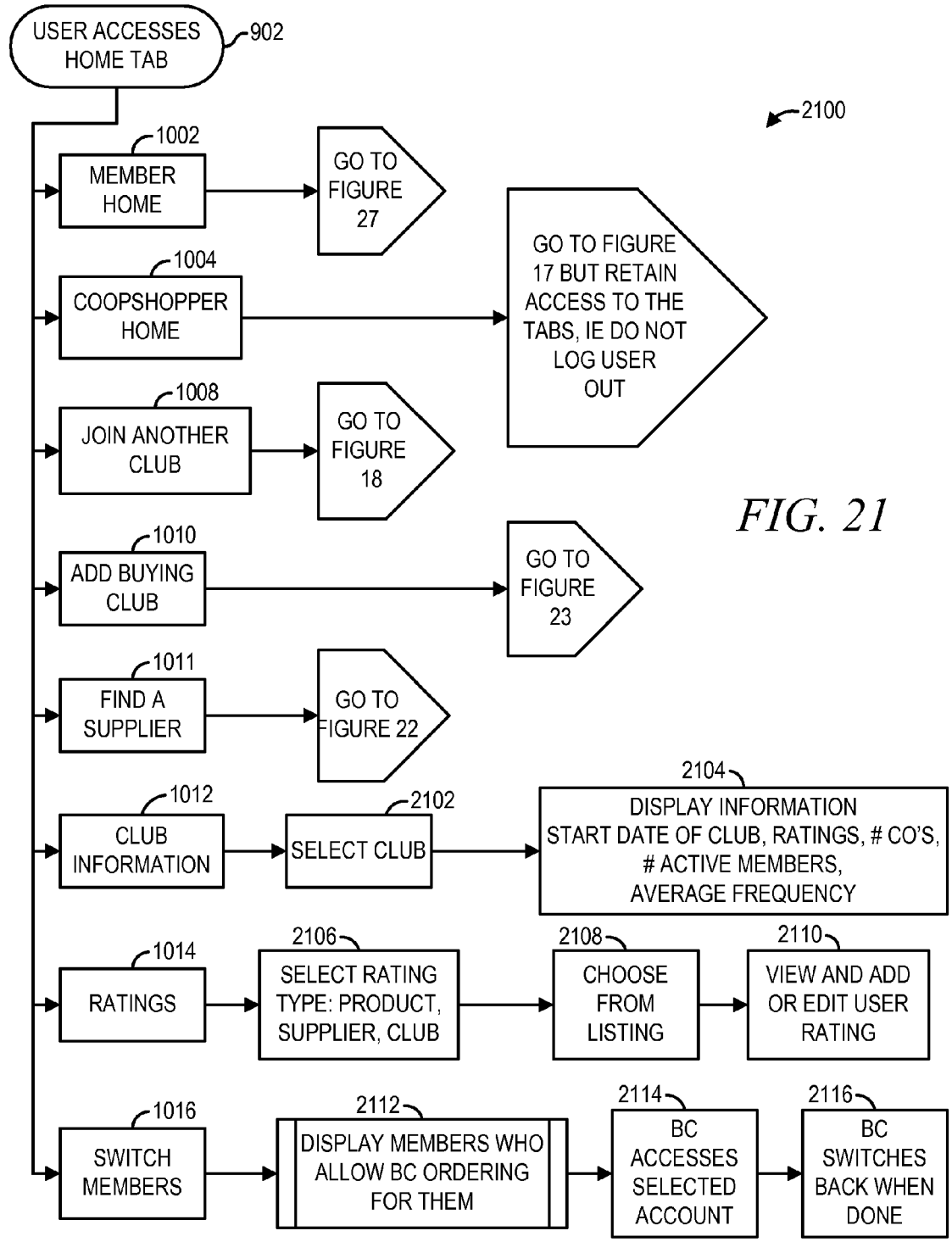
FIG. 21 is a flow diagram exemplifying functionality for a member home page.

FIG. 21 illustrates using a flow chart 2100, the functionality described above with respect to FIG. 10. As shown, if a user selects member home 1002, execution proceeds according to FIG. 27. If a user selects CoopShopper Home 1004, then execution proceeds according to FIG. 17, discussed above, but the user is preferably not logged off so that he/she may retain access to the tabs 902. If a user indicates desire to join another club (1008), then execution proceeds according to FIG. 18, discussed above. If a user indicates desire to add a buying club (1010), then execution proceeds according to FIG. 23, discussed below. If a user indicates desire to find a supplier (1011), then execution proceeds according to FIG. 22, discussed below. If a user requests information about a club in step 1012, then in step 2102, he selects a club, and in step 2104, information about the selected club is displayed, such information including, for example, the date that a club was started, ratings of the club, the number of CO's the club has filed, the number of active members in the club, the average frequency with which CO's are initiated, and the like. If a user would like to rate a product, a supplier, or a club, as per step 1014, then in step 2106, he indicates the type of rating he would like to enter, in step 2108, he is provided with a list of products, suppliers, or clubs and selects which he would like to rate and, in step 2110, he may view, add, or edit ratings. If a BC per step 1016 would like to access (or "Switch" to) an account of one or more members that permit the BC to order for them and manage their account, then in step 2112, members who permit such switching are displayed, in step 2114, the BC selects a desired member, and in step 2116, the BC may switch to back to the BC's own account when the desired action is completed in the other member's account.

Figure 22:
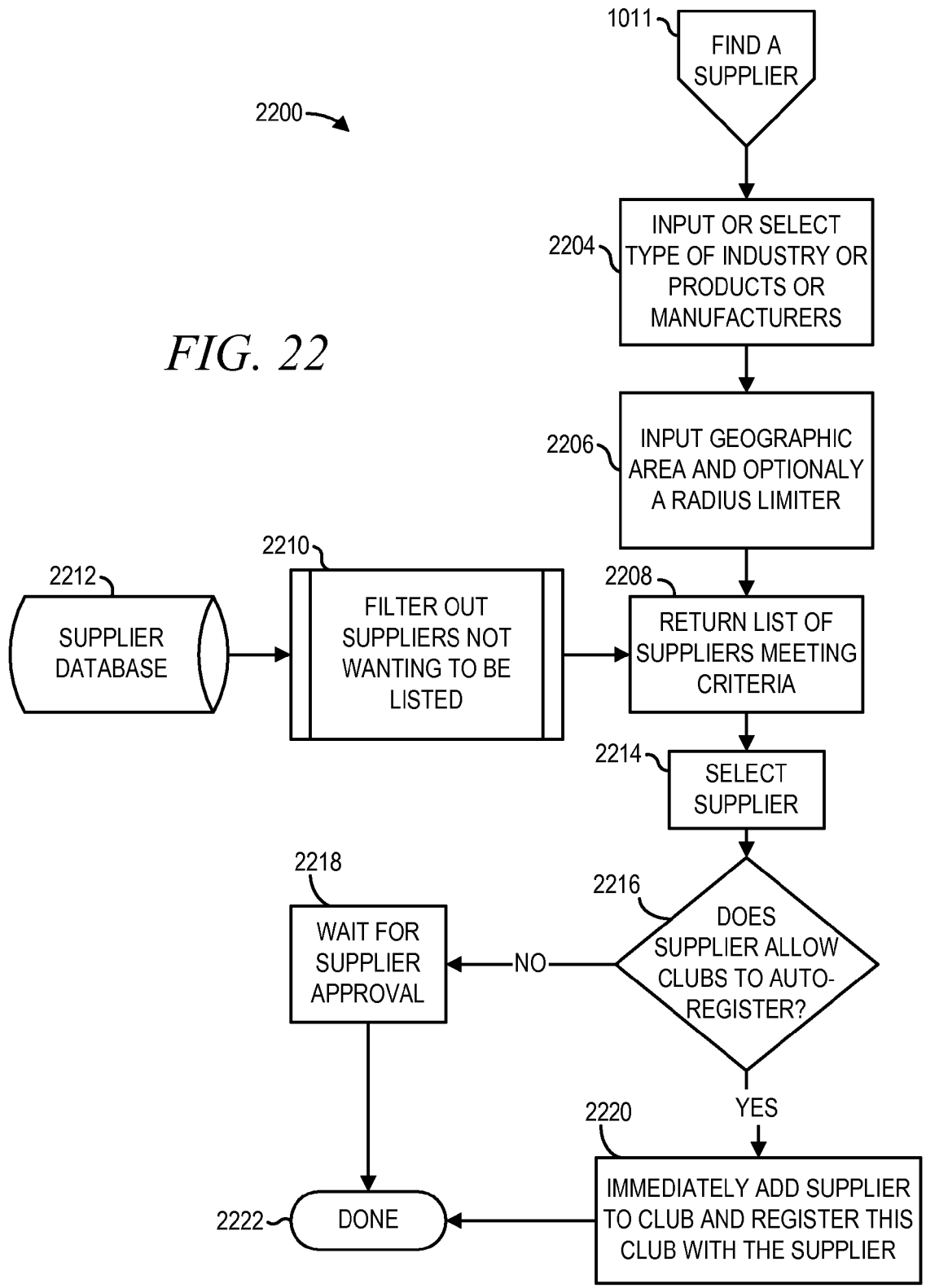
FIG. 22 is a flow diagram exemplifying functionality available for enabling a user to find a supplier.

FIG. 22 illustrates a flow chart 2200 depicting in further detail step 1011 (FIG. 10) for enabling a BC to find a supplier 128 (e.g., a producer 130, a manufacturer 132, a distributor 134, or the like) of products that a buying club 104 may desire to order. Accordingly, in step 2204, a BC may indicate an industry or types of products or manufacturers for which he/she would desire representation from a supplier and, in step 2206, the BC may indicate a geographic area that he/she would prefer that a supplier be located or be able to deliver products. In step 2208, the web server 120 retrieves from a database 2212 of the database 124 (FIG. 1) a list of suppliers 128 that in step 2210 meet the criteria indicated by the BC and are willing to be viewed by the buying club public as such over the internet. In step 2214, the BC selects a supplier from the list generated in step 2208. In step 2216, a determination is made whether the selected supplier allows clubs to register without prior approval from the supplier. If the supplier does permit registration of a club without prior approval, then in step 2220, the supplier is immediately added (i.e., made available) to the club, the club is registered with the supplier and, in step 2222, execution is terminated. If, in step 2216, it is determined that the supplier does not allow clubs to register without prior approval, then in step 2218 the BC awaits approval and, in step 2222, execution is terminated. Supplier approval being external to the process, is not shown, but as may be readily understood a supplier granting approval will preferably automatically cause that supplier to become available to that buying club with no further action required by the BC.

FIG. 23 illustrates a flow chart 2300 depicting in further detail step 1518 (FIG. 15) for enabling a BC to set up a buying club. Accordingly, in step 1518, a BC selects the function as described above with respect to FIG. 15 and, in step 2304, a BC is directed to a web site configured for enabling the BC to set up a buying club. In step 2306, a BC is queried for information needed to complete registration of the new buying club, such as the name of the buying club and, with respect to the BC for the club, the name, residence address, telephone number, email address, username, and password. In step 2308, one or more persons are entered as members of the buying club. In step 2310, club member fees and regular markup for the club are entered by the BC. In step 2312, a pickup location is entered, at which products are received (or "picked up") by buyers (i.e., members) of buying clubs. In step 2314, as an administrative matter, a record is made of who started the buying club and the date and time that the buying club was started. Set up of the buying club is completed and execution of the process for starting the buying club is terminated at step 2316.

FIG. 24 illustrates a flow chart 2400 depicting in further detail step 1516 (FIG. 15) for enabling a BC to set up a CoopShopping order (CO). Accordingly, after a BC has indicated that he wants to set up a CO in step 1516, then execution proceeds to step 2404 wherein a BC indicates whether he wants to select an existing supplier or add a new supplier. If a BC indicates that he wants to select an existing supplier, then execution proceeds to step 2406, wherein a BC selects a supplier from a list of available suppliers with a filter step 2408 enacted to prevent suppliers which do not wish to be presented to buying clubs through the internet. The list of available suppliers is provided from the supplier database 124 (FIG. 1) and the suppliers that do not want to be listed as available are filtered out in step 2408 before they are displayed in step 2406. In step 2410, a determination is made whether the selected supplier requires pre-approval. If a determination is made that pre-approval is required then in step 2412 a message indicating that approval is required is displayed to the BC, and that the BC may choose an alternative supplier or add a new supplier, after which execution returns to step 2406. If, in step 2410, a determination is made that the supplier selected by the BC does not require pre-approval, then execution proceeds to step 2414, wherein that supplier selected by the BC is added for that CO. In step 2416, a determination is made whether the BC or the supplier updates delivery points and truck routes. If it is determined that the supplier updates delivery points and truck routes, then execution proceeds to step 2418, wherein the BC selects on which of the specific dates listed by the supplier dates the BC would like products delivered, after which execution proceeds to step 2502, discussed in further detail below with respect to FIG. 25. If, in step 2416, it is determined that the BC updates delivery points and truck routes, then execution proceeds to step 2420, wherein the BC selects or adds delivery point. In step 2422, the BC selects or adds a truck route and in step 2424, the BC may also associate a delivery point with the truck route, and then execution returns to step 2418.

If, in step 2404, a member indicates that he would desire to add a new supplier, then execution proceeds to step 2426, wherein a new supplier is added. In step 2428, a BC may add a delivery point, and in step 2430, the BC may add a truck route. In step 2432, a BC may associate a delivery point with the truck route, after which execution proceeds to step 2418.

With reference to FIG. 25, the flow chart 2400 continues at step 2502, wherein a determination is made as to whether a BC or the supplier updates the supply order cutoff, the ship dates, and/or delivery dates. As disclosed in the '694 patent application, this determination is made by the supplier 128. If the BC should update the supplier order cutoff, ship, delivery and other dates/times, then execution proceeds to step 2504 wherein the BC enters the indicated dates and times. If, in step 2502, it is determined that the supplier should update the supply order cutoff, ship and delivery dates, then execution proceeds to step 2505, wherein the BC chooses from the suppliers' listing of cutoff dates and times for future orders, shipping, delivery, and credit requests. Completion of either step 2504 or step 2505 constitutes the completion of entry of all supplier information for the CO, and execution then proceeds to step 2506, wherein the BC begins entry of buying club information for the CO.

Accordingly, in step 2506, the BC selects or adds a pick-up point, and in step 2508, the BC selects the CO open date and time, the member cutoff date and time, the pick-up date and time, the member credit request cutoff date and time, and the CO close date and time. In step 2510, the BC selects the CO settings for that CO, as discussed further below with respect to FIG. 26. In step 2512, BC submits the CO and in step 2514 an error check is conducted to determine whether all inputs are correct. If, in step 2514, it is determined that there are errors in the input, then, in step 2516, a report is generated identifying all the input errors and presenting the input fields having the errors that need to be corrected. If, in step 2514, no errors are identified in the inputs, then execution proceeds to step 2518, wherein the successful set up of the CO is acknowledged and execution of the CO set-up process is terminated.

Figure 26:
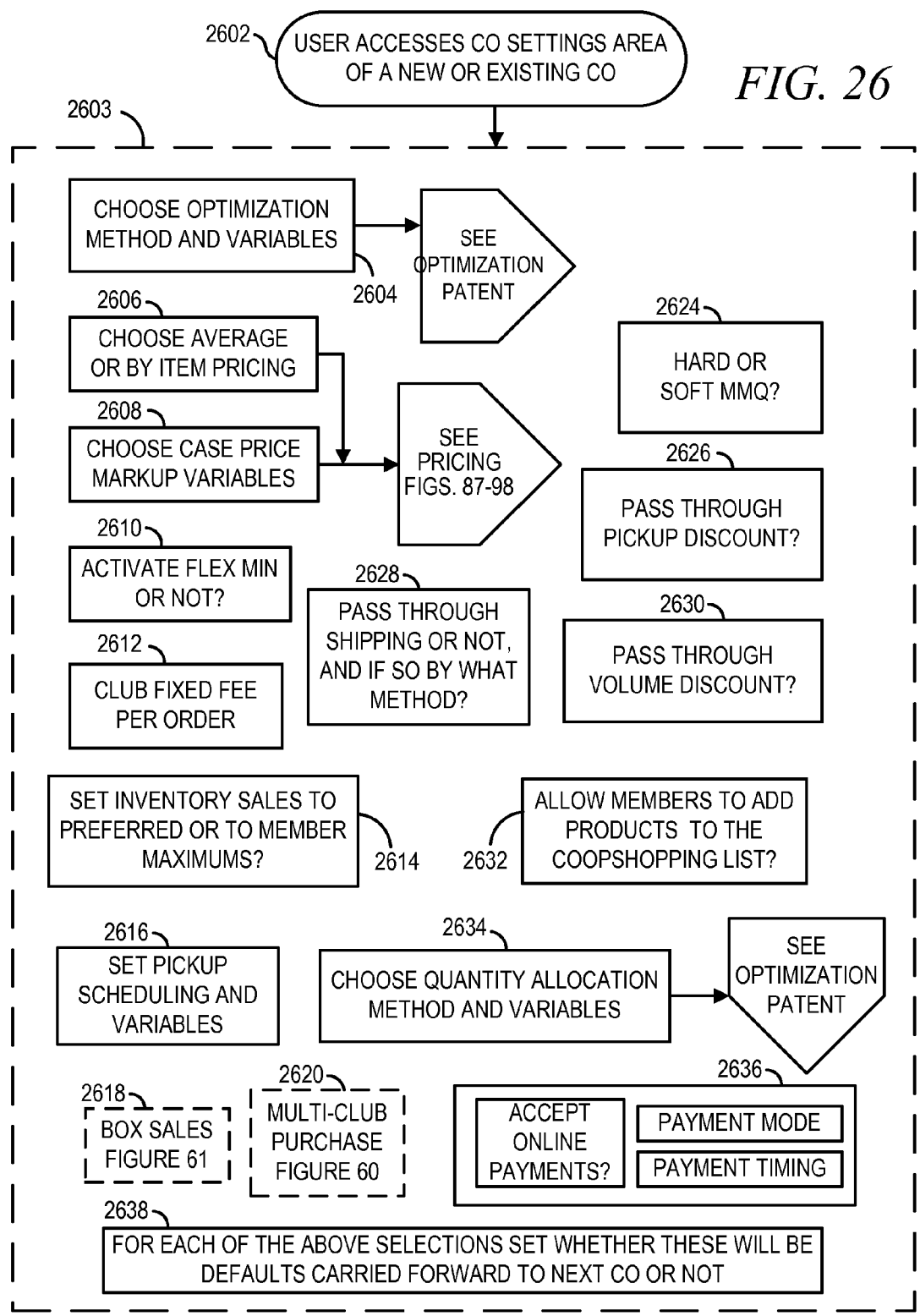
FIG. 26 exemplifies settings that may be set for coop order.

FIG. 26 depicts a number of CO settings 2603 which may be accessed by user. For example, after access in step 2602 to CO settings 2603, then in CO setting 2604, a user may choose an optimization method and variables to use in that method, as discussed in further detail as disclosed in the '097 patent application and the '803 patent application. In CO setting 2606, a user may choose pricing by average or by item for non-case orders and, in CO setting 2608, a user may choose case price markup variables as are further presented in FIGS. 87-98. CO settings 2606 and 2604 are discussed further below with respect to pricing FIGS. 87-98. In CO setting 2610, a user may indicate whether or not a CO should activate the Flex Minimum or not. (A Flex minimum was discussed above and provides the ability to flex a member's minimum down to 1 units if needed to allow a case to be ordered). In CO setting 2612, the user indicates whether the club uses a fixed fee for an order which is a fixed charge that is added to the total order of a member each time the member participates in ordering in a CO. In CO setting 2614, a user indicates whether inventory sales should be made to meet a member's preferred quantity order or to a member's maximum quantity order. This preferably increases the order for a member up to their maximum units if the club has inventory of a product ordered by the member. In CO 2616, a user may set pickup scheduling and variables which include if a pickup time preference is required to be completed by a person placing an order in the CO, the duration of the time slot in minutes (10, 15, 20, 30 or 60), and the maximum number of person allowed in a time slot, CO setting 2618 allows for box sales, as discussed further below with respect to FIG. 61. CO setting 2620 allows for multi-club purchases, as discussed further below with respect to FIG. 60. CO setting 2624 allows a user to select hard or soft MMQs as has been discussed previously. CO setting 2626 allows a user to indicate whether there should be a pass-through of the pickup discount to the member's accounts. CO setting 2628 allows the user to indicate whether to allow for pass-through of the shipping charges and, if the pass-through of shipping charges to members is allowed, to indicate by what method to allow pass-through the shipping (proportional by dollars ordered or by person). CO setting 2630 allows a user to indicate whether volume discounts are passed through to members. CO setting 2632 allows a user to indicate whether members are permitted to add products to the Coop-ShoppingList. CO setting 2634 enables a user to select a quantity allocation method and variables, as discussed further in the '097 patent application and the '803 patent application. CO setting 2636 allows the user to indicate whether on-line payments are acceptable and also to indicate payment modes and payment timing are required. Item 2638 notes that a user may set any of the aforementioned CO setting selections to the defaults that are carried forward to subsequent COs.

Upon logging in a member is preferably able to undertake a number of optional capabilities with respect to accessing one or more COs which are open at the time of the login, beginning a new CO (if they are a BC), or requesting that a CO may be opened for any buying club of which they are a member but which does not have an open CO. Alternatively, when only one CO is open then the member is preferably presented with the Coop Shopping list for that CO if one exists. There are in fact many, many possible alternatives to present to the member upon login and a preferred process for channeling the member through these possibilities are described in greater detail in relation to FIGS. 27 through 30 below.

While many alternatives are available to a member logging into the system 100, the member is preferably presented with the most expeditious means by which they may progress through various activities. As will become evident, the most expeditious means for progressing will depend on the state of a number of conditions associated with the user in light of the following variables, among others. Are they a member of only one club or more than one club? For each club are they a be or a member? Are there any open COs? Are there any clubs which they are a member with no open COs? Are there any clubs which they are a BC with no open COs? To present the most expeditious path for a member on login, a pre-planned logic sequence is presented as denoted in FIGS. 27 through 30.

Figure 27:
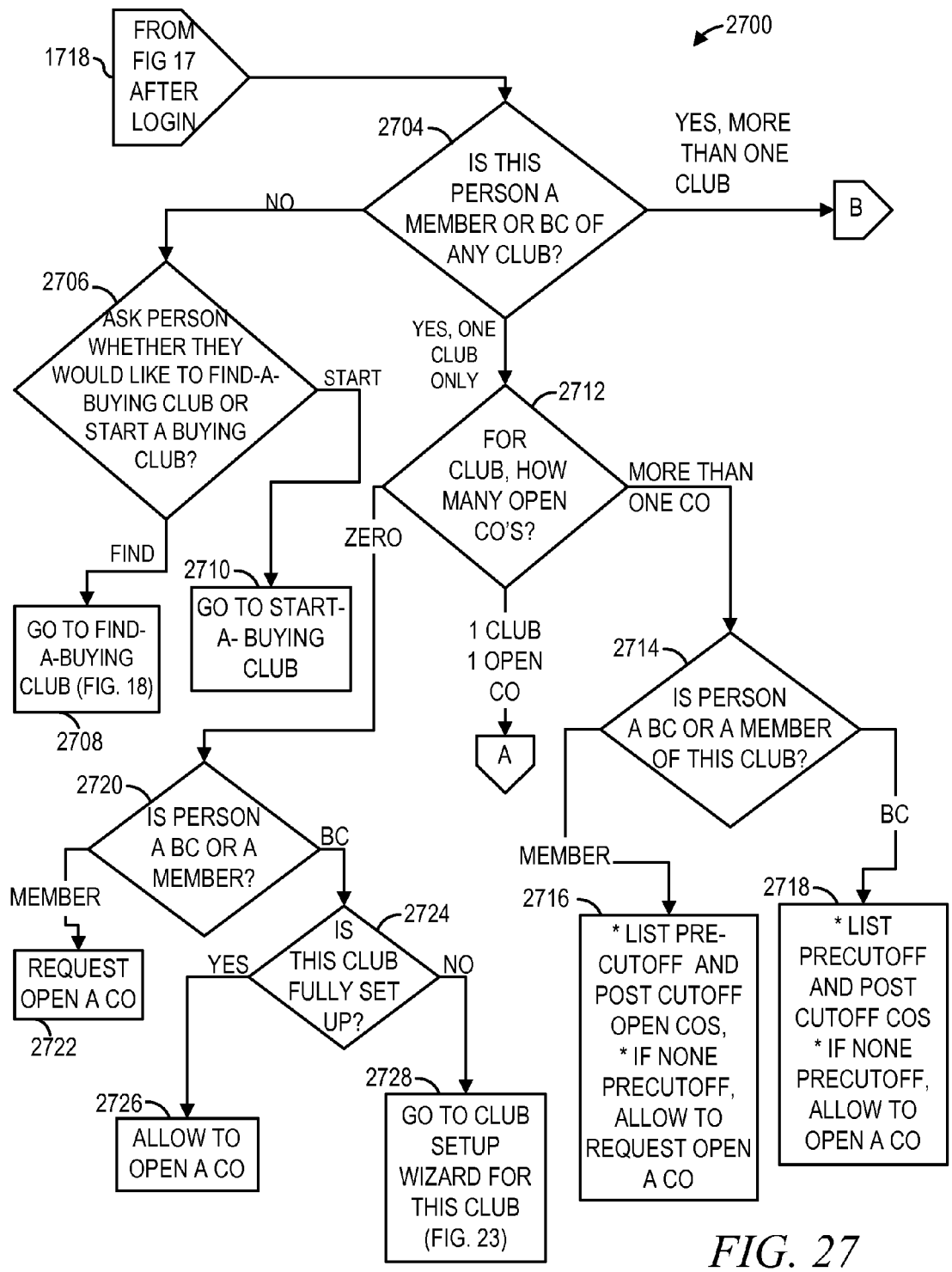
FIGS. 27-30 exemplifies buying club member login sequence and presentation.

FIG. 27 is a flow diagram in which member and BC access is streamlined based on various circumstances. The key considerations are that member access for placing orders for one or more COs that are pre-cutoff must be easy and therefore disclosed is a one step process for selecting from among more than one pre-member cutoff COs thus affording easy access to members for placing orders from among the alternative pre-member cutoff COs. Similarly, if the person logging in is the Buyer Coordinator (BC) of one or more buying clubs and the BC does not have an open CO for any buying club of which they are the BC, then the person logging has a one-step process for beginning the process of opening a CO for each buying club of which they are the BC which does not have an open CO. The process for requesting to open a CO is preferably as simple as pressing a button or clicking on a link that is presented for that Club to the member. Similarly the process for starting a CO is presented as a button or a link so that the person can immediately start a CO for any club in which that person is the BC.

Each of the above functions, whether selecting from a list of one or more COs for ordering or selecting from a list of one or more clubs for starting a CO, is preferably presented to the user as a single easily delineated viewing event (i.e., not requiring further screens to be opened before seeing the full context of all clubs and COs of which the user is a BC or a member), depending upon, among others, the variables of whether COs are open or not, whether there are multiple clubs or not, and whether the person is a BC or a member of those clubs which do or do not have open COs.

A Coop Order (CO) is preferably defined as an event in which members may place orders within the club up to a given member order cutoff (although the BC may preferably place orders up to the supplier order cutoff), which then also preferably has an associated scheduled pickup date and time to receive such orders and preferably also has an associated final close date in which all orders and matters for the CO are considered to be closed that have not been prior addressed. A CO is preferably associated with orders to be submitted to a specific supplier, although such supplier can provide products to the CO that the supplier themselves will source from a number of manufacturers, growers, or other providers to that supplier. A CO is considered Open after it has been opened up and it is considered Open up until the final date and time, which is called the Close date. A CO is considered pre-member cutoff if members are allowed to place orders and this lasts up the date and time of member order cutoff. A CO is preferably opened only by a BC. It should be generally understood that when presenting cutoffs and delivery dates and other such time based events, a proper and appropriate level of granularity is assumed with respect to days, hours, minute and seconds. For example in member cutoffs, it is typically assumed that such cutoffs will be expressed in day, month, year, hour, minute (seconds is generally not required and may be burdensome or confusing to the user), and AM/PM designations (as well as time zone if appropriate), as is common in the United States.

FIG. 27 depicts logic for enabling a person (not shown) to login and order products and/or start COs. In step 1718, the person logs in and, in step 2704, a determination is made of how many buying clubs 104 the person is a member or a buying coordinator (BC). If the person is a member or BC of more than one buying club, then execution proceeds to step 2902, discussed in further detail below with respect to FIG. 29. If the person is not a member of any buying club, then execution proceeds to step 2706, in which the person is queried whether he/she would like to find a buying club or start a buying club. This may occur for example as when a solicitation (whether through on-line or off-line media) has generated a response from a person who has registered under one or more pre-established codes or one or more other pre-qualifying designators, which then affords that person a pre-registered access to the ordering process. If the person who is not a member of a club would like to find a buying club, then in step 2708 execution proceeds to step 1802, discussed in further detail below with respect to FIG. 18. If the person would like to start a buying club, then, in step 2710, execution proceeds to FIG. 23, wherein a person may start a buying club by entering fundamental information, such as the buying club name, his/her name, e-mail address, and the names of any other members of the club which is sufficient to begin the buying club registration process as is more fully disclosed in steps 1716, 1730 and thereafter. A person who starts a buying club is assumed to be the initial Buyer Coordinator (BC) of that club, although such designation may later be re-assigned as a role to another person in the club. The BC carries the key responsibility for ensuring the activities of the club proceed properly on behalf of the members of the buying club. The BC carries all the rights of being a member, but has additional rights as are needed to undertake management and coordination of the activities of the club.

If, in step 2704, it is determined that the person is a member or BC of one and one only buying club, then execution proceeds to step 2712, in which the club is ascertained and a determination is made as to how many Coop Orders (CO's) are open. If no CO's are open, then execution proceeds to step 2720, in which a determination is made whether the person is a member or a BC. If the person is a member, then execution proceeds to step 2722 in which a request is made to open a CO. This entails sending an e-mail and/or message to the Buyer Coordinator of the club in which the member requests that the Buyer Coordinator (BC) open a CO so that the member may begin placing orders. If the person is a BC, then execution proceeds to step 2724 in which a further determination is whether the buying club has been fully set up. If the buying club has been fully set up, then execution proceeds to step 2726 in which the person is allowed to open a CO; otherwise, execution proceeds to step 2728 in which execution proceeds to a series of prompts which allow the person to set up the club as described in FIG. 23.

Generally, setting up a clubs includes entering further information related to the club, including the markups and/or fees associated with the club, member groups, pickup locations, and prospective member information. Prospective member information includes information such as whether the club wishes additional members, whether approval is required to join the club, the frequency of COs (weekly, every two weeks, monthly, every two months, quarterly, or by user requests), a general pickup location description, and a prospective new member message. Having completed the information related to the buying club, it is then sufficiently completed to begin the process for creating a CO.

If, in step 2712, it is determined that for the buying club there is one (and only one) open CO, then execution proceeds to step 2802, discussed in further detail below with respect to FIG. 28. If, in step 2712, it is determined that for the buying club there is more than one open CO, then execution proceeds to step 2714, in which a determination is made whether the person is a buying coordinator (BC) or is only a member of the club. If, in step 2714, it is determined that the person is a member of the club (but not a BC), then execution proceeds to step 2716 in which the pre-member and post member cutoff CO's are preferably listed so that the member may choose any pre-member cutoff CO for placing orders, or may choose a post-member cutoff CO for viewing Placed Orders (but not for placing orders). If there are no pre-member cutoff CO's for that member, then the member may request to open a CO as was described in step 2722 above.

It is again noted that a CO is defined herein as being "open" after the CO is "started" (i.e., when the CO is begun by the BC), but before "close" (i.e., before the last close date and time of the CO). However, the member cutoff (after which member cannot place further orders on a CO) occurs after the start and before the close of a CO. As a consequence, there is a period of time after the member cutoff, extending up to the close, where a member cannot order products from a supplier in that a CO. If a member logs in during this time (i.e., between member cutoff and close), he or she is directed to a non-editable Placed Orders screen. Members may, however, generally order from club inventory even after a member order cutoff.

If, in step 2714, it is determined that the person is a BC (in addition to being a member) of the club, then execution proceeds to step 2718 in which both the pre-member and post-member cutoff CO's are preferably listed, and/or for any clubs of which that person is a BC, then the BC may open a CO. The BC may select pre-member cutoffs and place orders, and in addition, the BC may also select post-member cutoff COs and place orders. It is noted that members may not select post-member cutoff CO's and place orders, but may only view (not add or edit) post-member cutoff CO's but the BC as a member may place orders all the way up to the earlier of the submitting of the supplier order or the supplier order cutoff.

Figure 28:
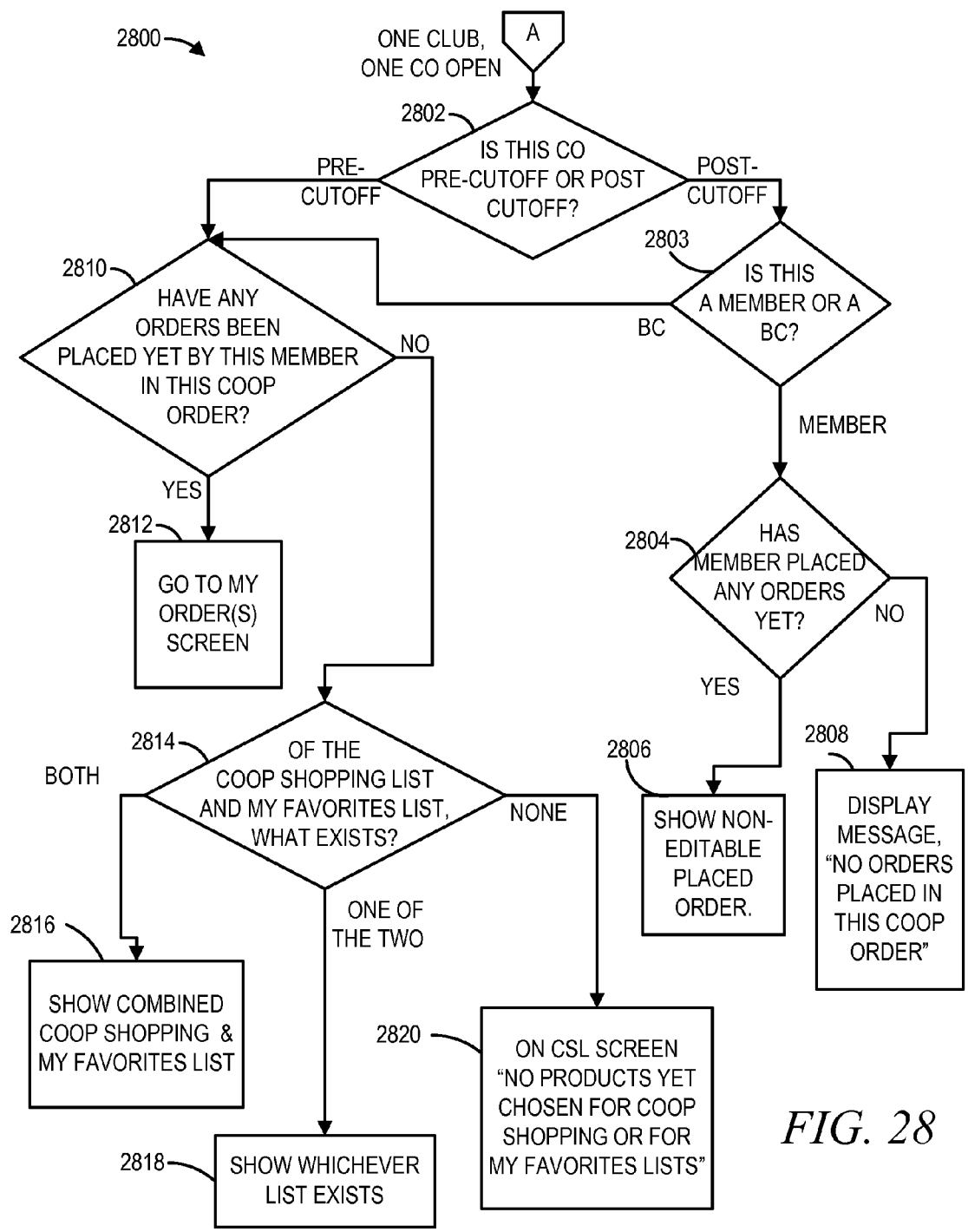

FIG. 28 depicts steps for proceeding when a member (including a BC) is a BC or only a member of a buying club, and the buying club has only one open CO. Accordingly, continuing from step 2712, in step 2802 a determination is made whether the member cutoff to place the CO with a supplier is pending (pre-member cutoff) or has already occurred (post-member cutoff). If the member's order cutoff has not yet occurred (i.e., in the pre-member cutoff period), then execution proceeds to step 2810, in which a determination is made whether the member has placed any orders in the current CO. If the member has placed an order in the current CO, then execution proceeds to step 2812, wherein the member is directed to their My Orders screen, discussed in further detail below. If the member has not placed any orders in the current CO, then execution proceeds to step 2814, wherein a determination is made whether a Coop Shopping List and/or a "My Favorites" list exists. If both a Coop Shopping List and a "My Favorites" list exist, then execution proceeds to step 2816 wherein both the Coop Shopping List and the "My Favorites" list are displayed to the member preferably as a single combined list (which denotes for each SKU whichever list that product is on or both lists) as denoted in step 2816. If only a Coop Shopping List or a "My Favorites" list exists, then whichever list exists is displayed as denoted by step 2818. If neither a Coop Shopping List nor a "My Favorites" list are available, then a message is displayed to indicate that no products have been selected yet for either a Coop Shopping List or a "My Favorites" list as denoted in step 2820.

If, in step 2802, a determination is made that the member order cutoff has passed (i.e., in the post-member cutoff period), then execution proceeds to step 2803, in which a determination is made as to whether the person is a BC or a member for that CO. If the person is a BC, then execution proceeds to step 2810, because a Buyer Coordinator is preferably able to edit or place orders even after the member cutoff. If the person is a member, then execution proceeds to step 2804, in which a determination is made whether the member placed any orders on the CO. If the member has placed orders in the CO, then execution proceeds to step 2806 wherein the order is displayed to the member in a non-editable format. If the member did not place any orders in the CO, then a message is displayed indicating that the member did not place any orders in the subject CO as denoted in 2808.

Figure 29:
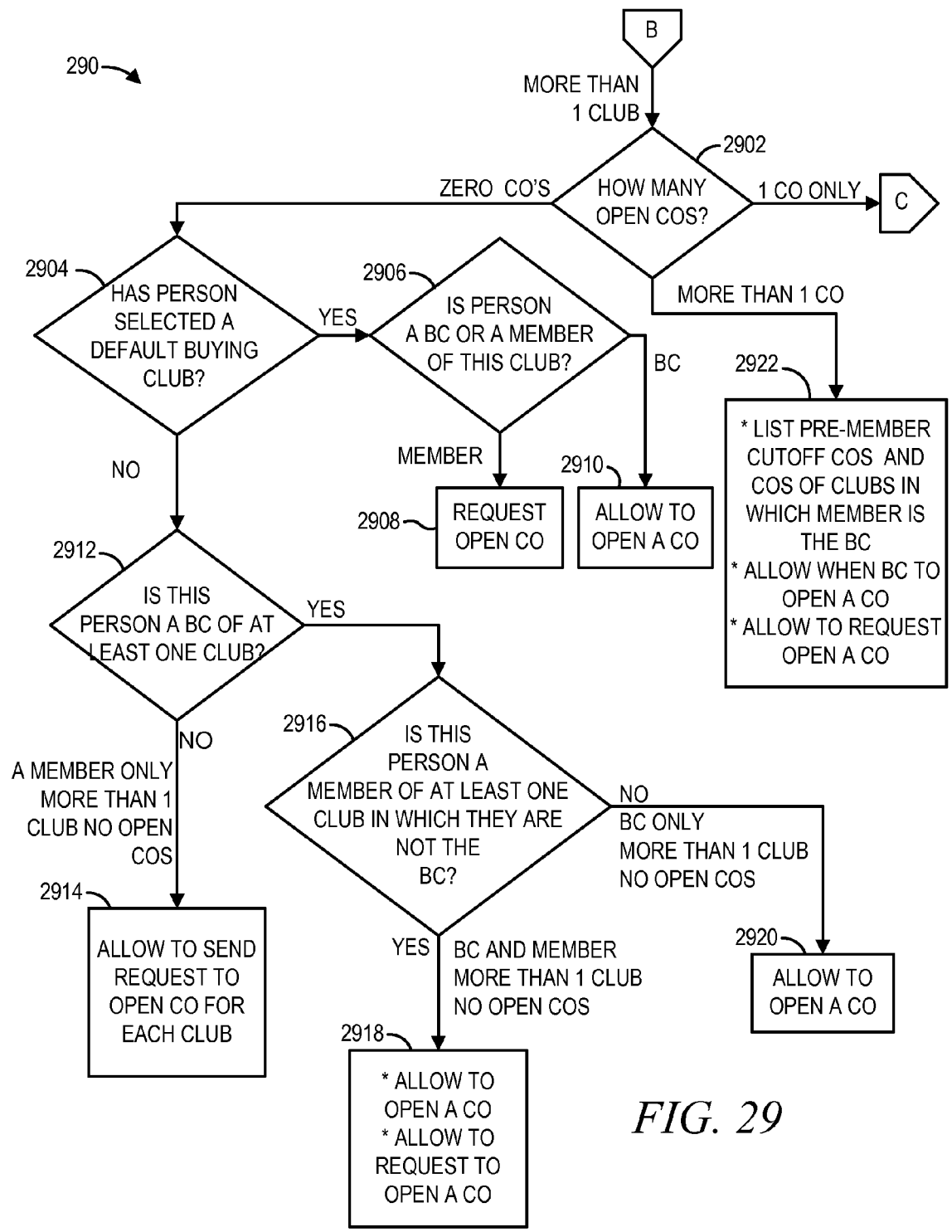

If, in step 2704 of FIG. 27, it is determined that the person is a member or BC of more than one buying club, then execution proceeds to step 2902 of FIG. 29. In step 2902, a determination is made of how many CO's are open. If no CO's are open, then execution proceeds to step 2904, wherein a determination is made whether the person has selected a default buying club. If the person has selected a default buying club, then execution proceeds to step 2906, wherein a further determination is made whether the person is a BC or only a member of the default buying club. If it is determined that the person is a BC, then the person is allowed to open a CO in step 2910; otherwise, if the person is only a member (i.e., not a BC), then the person may request that a CO be opened in step 2908.

If, in step 2904, it is determined that the person has not selected a default buying club, then execution proceeds to step 2912, wherein a further determination is made whether the person is a BC of at least one buying club. If the person is not a BC of at least one buying club (i.e., the person is a member only of more than one buying club, none of which have any open CO's), then execution proceeds to step 2914 in which the person may request that a CO be opened for any club in which the person is a member. If the person is a BC of at least one buying club, none of which buying clubs have any open CO's, then execution proceeds to step 2916 in which a determination is made whether the person is a member of at least one club in which they are not the BC. If the person is a member of at least one club in which they are not the BC, the execution proceeds to step 2918 in which they are allowed to open a CO in any club in which they are the BC or request that a CO be opened for any club in which they are a member as denoted in step 2918; otherwise, they are only allowed to open a CO for any club in which they are the BC as denoted in step 2920.

If in step 2902, a determination is made that there is more than one CO, then execution proceeds to step 2922. As denoted in step 2922 for each club in which the person is the BC and which has a pre-member cutoff CO or a CO for a club then the BC may choose the CO and proceed as per step 2810. Also listed are any clubs for which the person is a BC that are post member cutoff but do not have an open CO so that the BC may open a CO for those clubs. Finally, listed are any clubs for which the person is not the BC so that the member may easily request of the BC that they open a CO.

Figure 30:
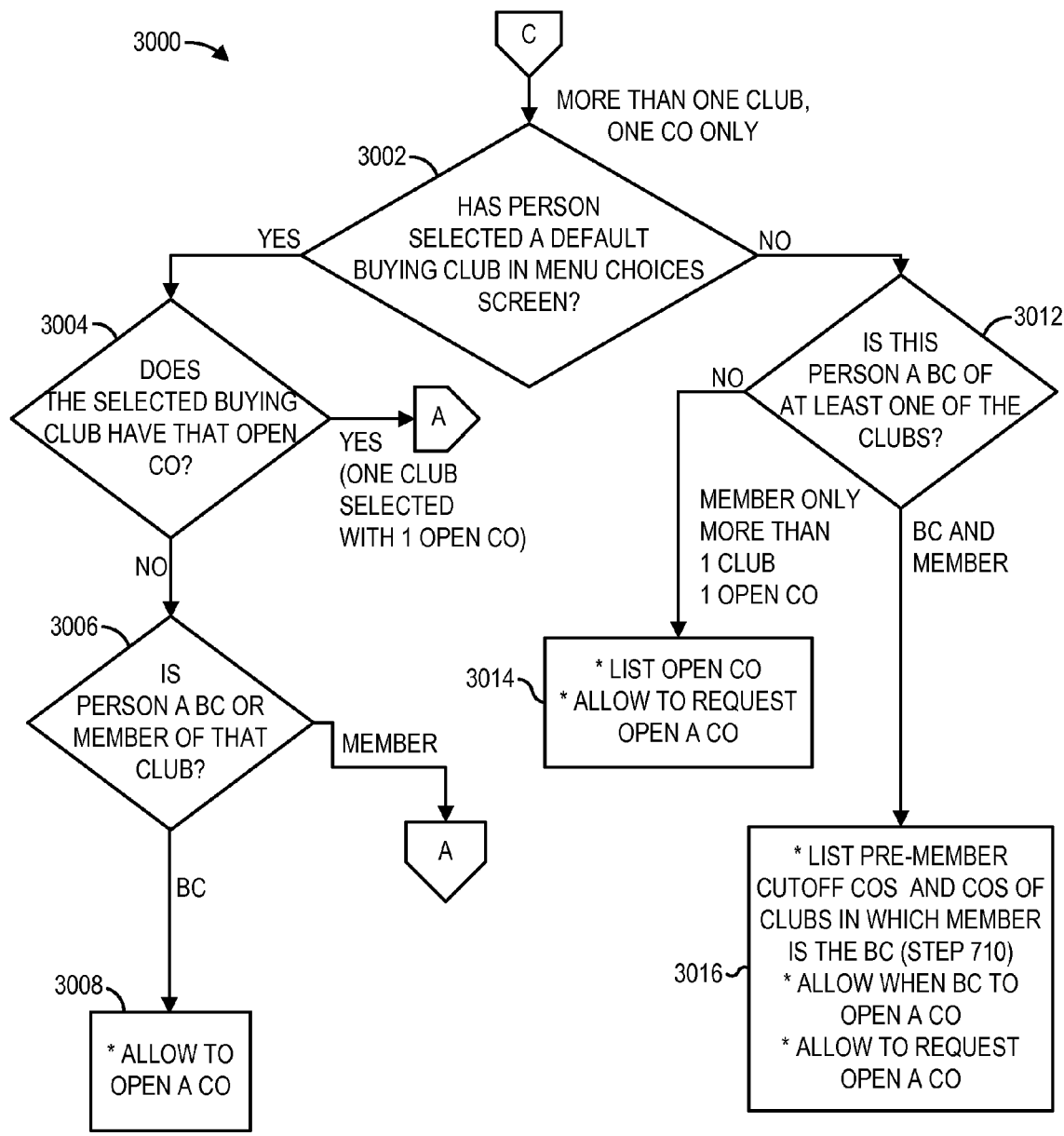

If, in step 2902, it is determined that there is only one CO, then execution proceeds to step 3002 of FIG. 30, wherein a determination is made whether the person has selected a default buying club. If the person has selected a default buying club, then execution proceeds to step 3004 wherein a determination is made whether the selected buying club has the open CO and, if it does, then execution proceeds to step 2802 (FIG. 28). If the selected buying club does not have an open CO, then a determination is made as denoted in step 3006 as to whether the person is a member or a BC of that selected club. If the person is a member (and not a BC), then execution proceeds to step 2802 (FIG. 28). If the person is a BC, then execution next proceeds to step 3008 wherein the BC is allowed to open a CO for that club.

If in step 3002, a person has not selected a default buying club, then in step 3012, a determination is made whether the person is a member of all the clubs, or is a BC of at least one of the clubs. If the person is a member of all the clubs, then the open CO is listed, and the member is allowed to request an open CO for any other club as denoted in step 3014. If the person is a member and a BC of the clubs, then execution proceeds to step 3016. As denoted in step 3016, for each club which has a pre-member cutoff CO or a CO for a club in which the person is the BC then the BC may choose the CO and proceed as per step 2810. Also listed are any clubs for which the person is a BC that are post-member cutoff but do not have an open CO, so that the BC may open a CO for those clubs. Finally, listed are any clubs for which the person is not the BC so that the member may readily request of the BC a CO be opened.

Figure 31:
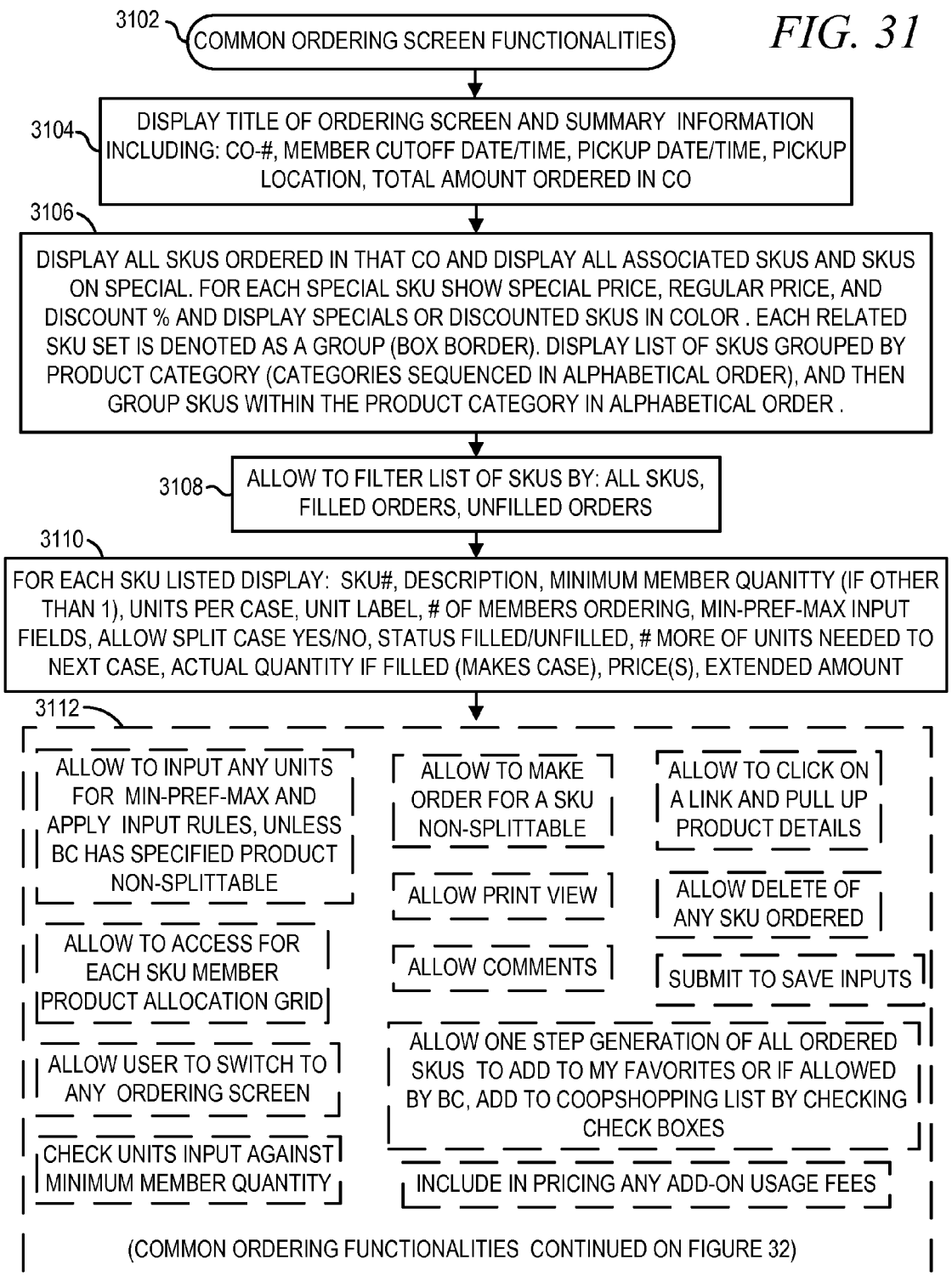
FIGS. 31-32 exemplifies common ordering functionalities which are preferably employed in FIGS. 33-41.

FIG. 31 depicts common ordering screen functionalities 3102 which are generally activated and applied for members who are ordering using the ordering menu choices under the Ordering Tab. Accordingly, in step 3104, on each screen, the title of the ordering screen and summary information is included, said summary information including, for example, the number of the CO, member cutoff date and time, pickup date and time, pickup location, the total amount ordered in the CO, and the like. In item 3106, all displays ordered in a CO and all associated SKUs and SKUs on special are preferably displayed in the screen. For each special SKU, there is shown a specials price, a regular price, and a discount percentage. Specials or discounted SKU's are preferably highlighted in color. Related SKU's are preferably denoted as a group, using, for example, a box line border. The list of SKUs displayed are preferably grouped by category (which categories are preferably sequenced in alphabetical order) and then within each product category, they are preferably sequenced in alphabetical order. In item 3108, the SKU list may show all SKUs, or may be filtered to show only SKUs of filled orders or unfilled orders. In item 3110, for each SKU, there is preferably displayed the SKU number, the description of the product, the minimum member quantity (MMQ, if other than one), the units per case, the unit label, the number of members ordering this particular SKU, the min-pref-max input fields for each SKU, whether the case is allowed to be split, whether the SKU is filled or unfilled, the number of additional units needed to make the next case, the actual quantity of units if filled to make case, the price of the product, and any extended amount, which is simply the quantity of actual units ordered of a SKU times the applicable price for that SKU.

Item 3112 exemplifies a number of functions that are preferably made available to a user. It is considered that the implementation of the functions depicted in item 3112 would be readily apparent to a person skilled in the art and, therefore, will not be described in detail other than to enumerate herein and elsewhere in this description. Accordingly, functions included in item 3112 include the ability to allow a user to input any units for min-pref-max and apply input rules, unless the BC has specified that a product is non-splittable; allow a user to make an order for SKU non-splittable; allow a user to click on a link and pull up product detail; allow for a print view of the items displayed; allow deletion of any SKU order; allow the user to access for each SKU a Member Product Allocation Grid; allow for a user to enter comments; allow the user to save inputs; allow the user to switch to any ordering screen; allow one step generation of all ordered SKUs to add to a member's "My Favorites" or, if allowed by the BC, to add to the Coop Shopping list (by a preferred mode of checking check boxes in conjunction with the order); allow the user to check units input against the MMQ; include in pricing any add-on usage fees; allow the user to add a SKU by SKU number, incept a search from the catalog and return to that point, use min-pref-max input fields, test numbers added with input rules, allow the user to add a SKU to "My Favorites" list and, if permitted by the BC, to add a SKU to the Coop ShoppingList in one step; to allow a member to enter a payment mode, payment timing, or whether a fixed fee for order; allow for pick-up scheduling and variables; enable a member to request member credit; allow for box sales; allow for sales taxes, supplier charges, shipping fees, volume discounts, and pickup discounts.

In step 3202, a member may submit the aforementioned selections. In step 3204, a confirmation of the submission is posted for the member. The confirmation preferably includes as applicable, by way of example, the process for setting the preferred pickup times, making or setting a process for payment, and the like, as applicable. In item 3206, the members "My Orders" screen (including an order database 3208 and a payments database 3210 contained in web server 120 and databases 124) are updated with the inputs made by the user in the foregoing. The process is then terminated at step 3212. It is preferable that after placing an order in any of the ordering screens, a member is then advanced to the My Orders screen in which a summary of all that member's orders in that CO are fully updated and presented.

Figure 32:
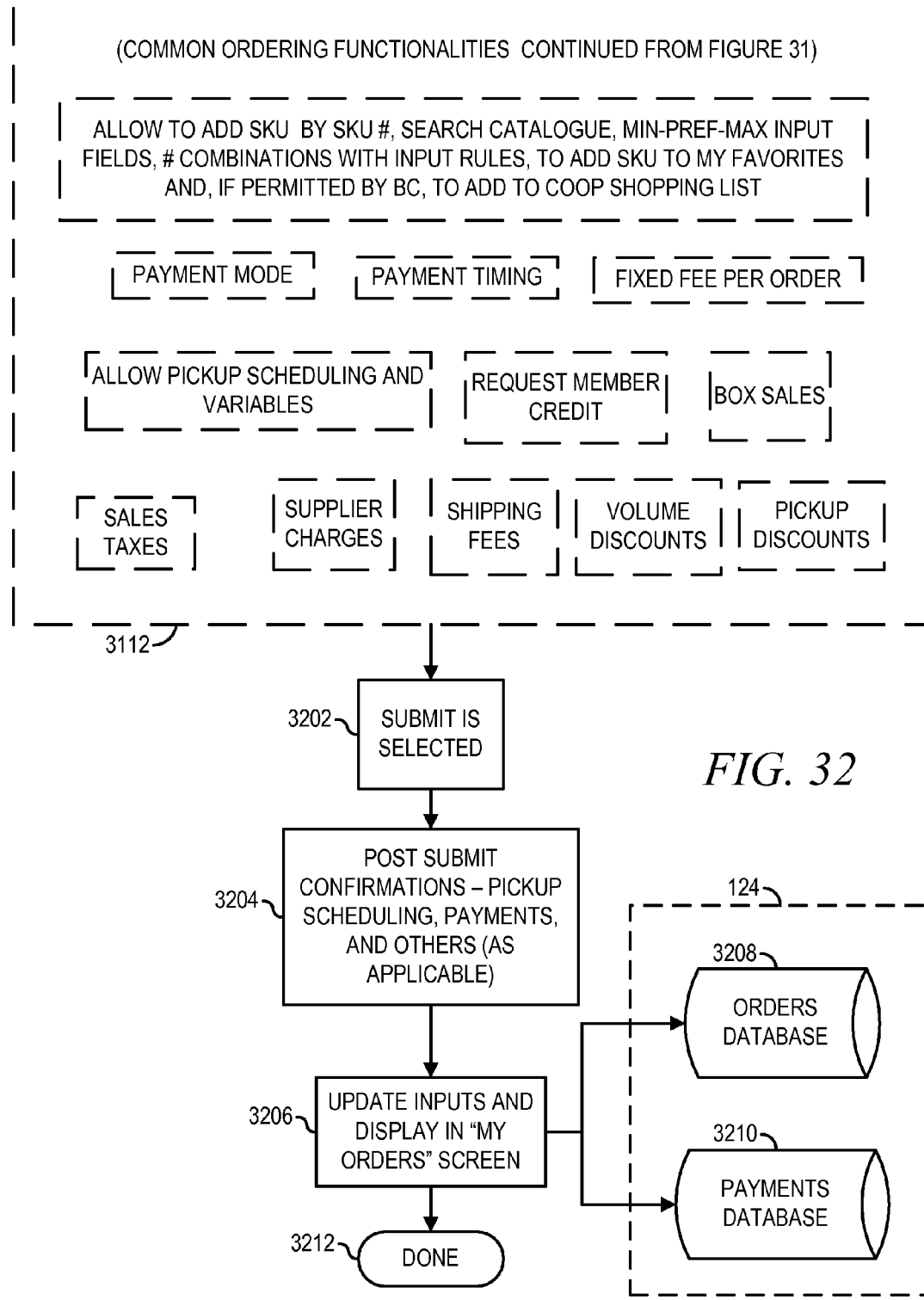
Figure 33:
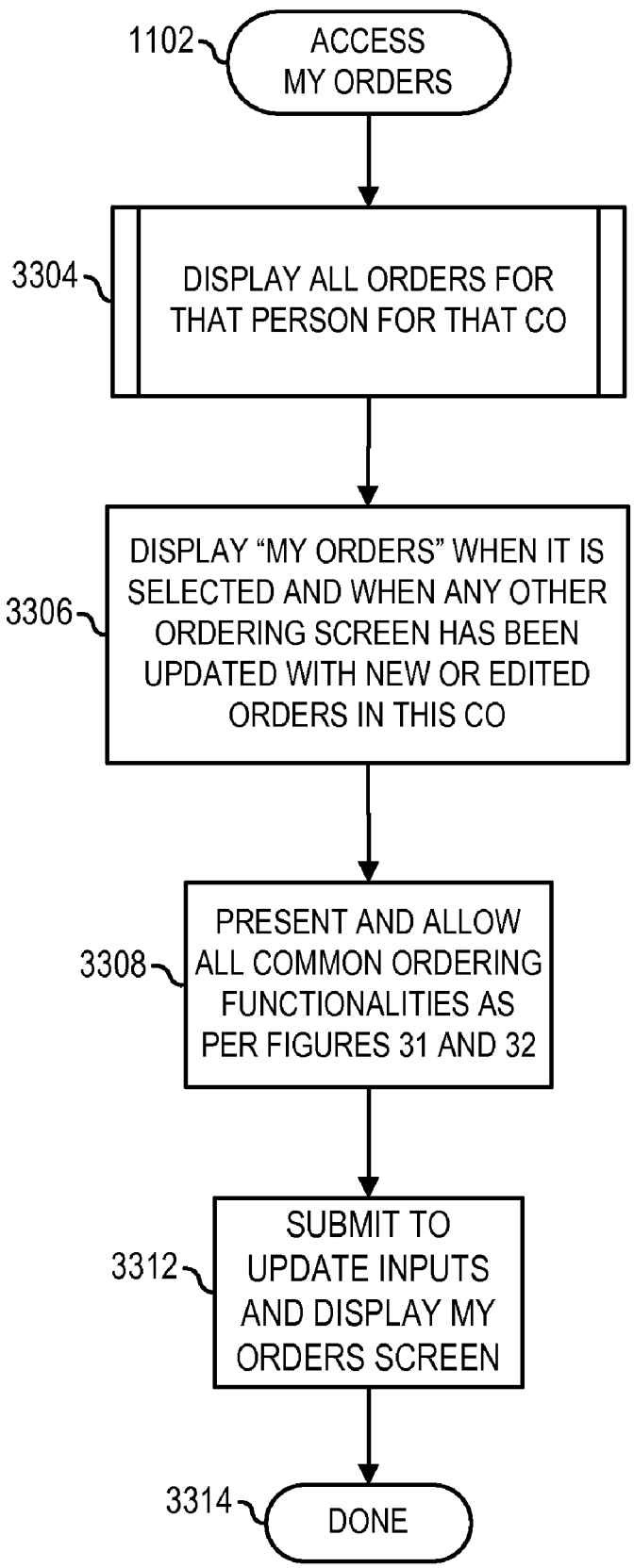
FIG. 33 exemplifies a process for enabling a member to view orders he or she has made.

FIG. 33 depicts how a particular user may access all of his orders placed with a particular CO, beginning with step 1102. In step 3304, all orders for that particular member for a particular CO are displayed, and in step 3306, the "My Orders" screen is displayed whenever it is selected, as well as when any other ordering screen has been updated with new or edited orders in this CO. In step 3308, the common ordering functionalities described above with respect to FIGS. 31 and 32 are preferably presented. In step 3312, the user may submit the inputs made herein and display them on the "My Orders" screen and, execution is terminated in step 3314.

Figure 34:
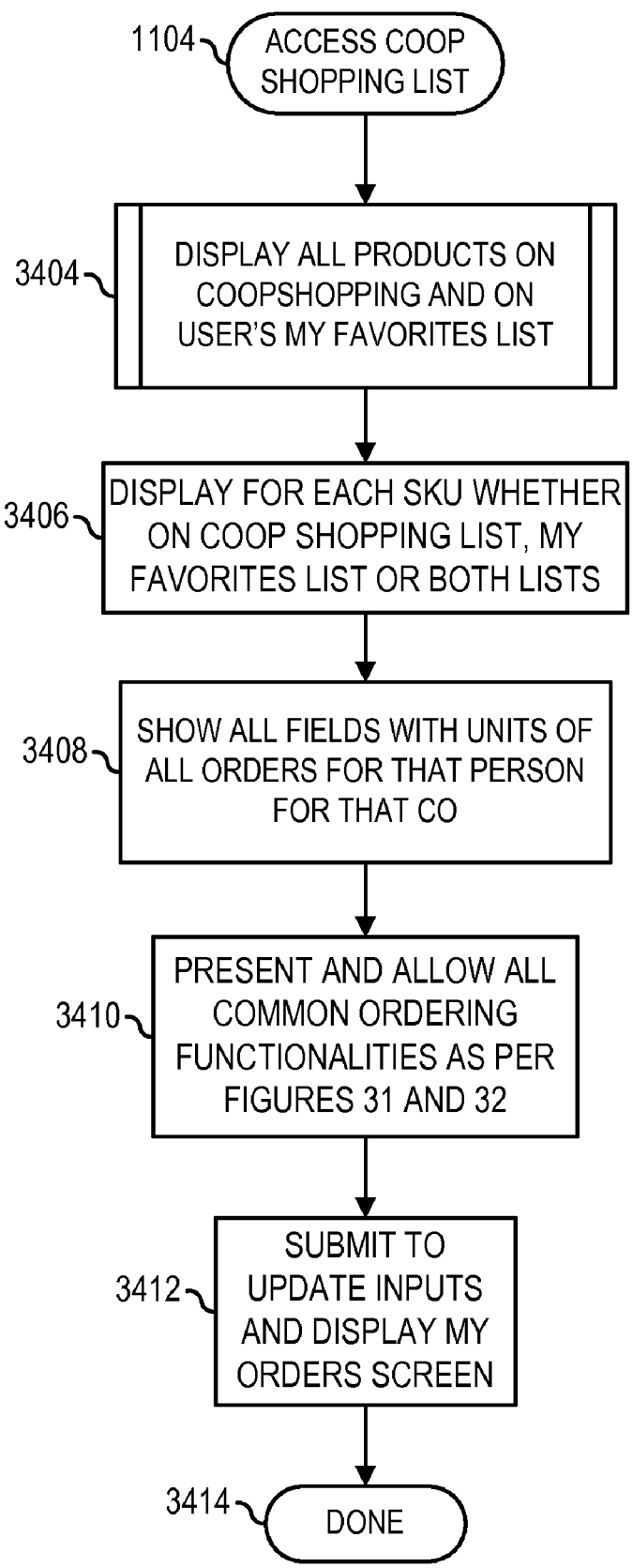
FIG. 34 exemplifies a process for enabling a member to view and order from the Coopshopping list.

FIG. 34 displays steps that a member may execute when accessing the Coop Shopping List in step 1104 (FIG. 11). At step 3404, all products in the Coop Shopping List and on the user's "My Favorites" list are displayed. In step 3406, there is displayed for each SKU, whether the SKU is on the Coop Shopping List, "My Favorites" list, or both lists. In step 3408, all fields with units are shown for all orders for that person or that CO. In step 3410, the common ordering functionality described above with respect to FIGS. 31 and 32 are preferably presented. In step 3412, the user may submit the inputs made to the Coop Shopping List and display the updated "My Orders" screen, and in step 3414, execution is terminated.

FIG. 35 depicts steps that a member would preferably follow when he or she accesses the catalog as discussed above with respect to step 1106 (FIG. 11). In step 3504, a determination is made as to how many catalogs this member has access to. Logically, if it is determined that the member has access to no catalogs then the member is accessing the catalogue from outside (that is not having pre-selected) a CO (since it is preferable that no CO occur without a catalogue from which to place orders), and therefore execution proceeds to step 3506 wherein a message is displayed indicating that there are no catalogs for suppliers of any of the buying clubs to which the member belongs at this time. If, in step 3504, it is determined that the member has access to one catalog, then execution proceeds to step 3508, wherein the one catalog that the member has access to is displayed. If it is determined in step 3504 that the member has access to more than one catalog, then execution proceeds to step 3510 wherein a listing of catalogs to which the member has access is displayed. Logically, this result would most likely indicate that the member is accessing this choice from outside (that is not have pre-selected) a CO since a CO is preferably associated with one catalogue only. It is noted that multiple catalogs are preferably displayed even if they are for the same supplier in different COs and/or different clubs. In step 3412, the member selects which catalog he or she would like to view, and execution proceeds to step 3508, wherein the selected catalog is displayed. In step 3514, the member indicates whether he would prefer to search through the catalog by tiers or by search terms. If the member indicates that he would prefer to search through the catalog by tiers. If the search is to be conducted by tiers, then execution proceeds to step 3516 wherein the upper tier of that catalog is displayed for the supplier to that CO, and in step 3518, a member may continue through a selection of sub-tiers, down to a final selection of a desired SKU. If, in step 3514, a member indicates that he or she would prefer to search through a catalog by search terms, then execution proceeds to step 3520, wherein the member preferably enters one or more selected search terms, such as a SKU number, a vendor name, keywords, and logical connectors, such as AND or OR. In step 3522, a list of all SKUs meeting the search terms is returned and displayed for the member and, in step 3524, the member selects a desired SKU. Following either step 3518, or 3524, execution proceeds to step 3602 as shown in FIG. 36.

With reference to FIG. 36, continuing from FIG. 35, in step 3602, a determination is made as to whether the SKU selected by the member is in an open CO. If it is determined that the SKU selected is not in an open CO, then execution proceeds to step 3604, wherein there is preferably displayed for the selected SKU, the units per case, unit label, one or more prices, the ingredients of the product designated by the SKU, nutritional information, and other relevant product information. It is noted that in step 3604, input fields are not displayed, and pricing is preferably used from the latest CO for that member. If there is no prior CO for that member, then the highest price applicable for that member with that supplier is preferably used. However, if a member should desire, then he may add the SKU to their My Favorites list and, if permitted by the BC (and this is an open CO accessed from step 3614 or 3616), then the member may also add the SKU to the coop shopping list. In step 3606, the member may submit his or her updated inputs and switch to the "My Orders" screen. In step 3608, execution is terminated.

If, in step 3602, it is determined that the selected SKU is in an open CO, then execution proceeds to step 3612, wherein a further determination is made whether the CO pre-member cutoff has or has not occurred. If it is determined that the CO pre-member cut-off has not occurred, then execution proceeds to step 3614, wherein a still further determination is made as to whether the member is a BC. If it is determined that the member is not a BC, then execution proceeds to step 3604, described above. If it is determined in step 3614 that the member is a BC, then execution proceeds to step 3616, wherein a still further determination is made as to whether the CO supplier cut-off has or has not occurred. If it is determined that the CO supplier cut-off has not occurred, then execution proceeds to step 3604 described above. If, in step 3616, it is determined that the pre-supplier cut-off has occurred, then execution proceeds to step 3618, wherein, preferably under the title "Product Details", there is displayed summary information including, by way of example, the CO number, the member cut-off date and time, the pick-up date and time, pick-up location, the total amount ordered in the CO, and the like. In step 3620, there is displayed for the SKU, the units per case, the unit label, one or more prices, ingredients, nutritional information, and other relevant product information. It is noted that, with respect to step 3620, a member may preferably input any of a combination of min-pref-max units based on input rules. The member may preferably also add the SKU to his favorites and, if permitted by the BC, then he may also add the SKU to the coop shopping list. Execution then proceeds to step 3606 and 3608, as described above.

Figure 37:
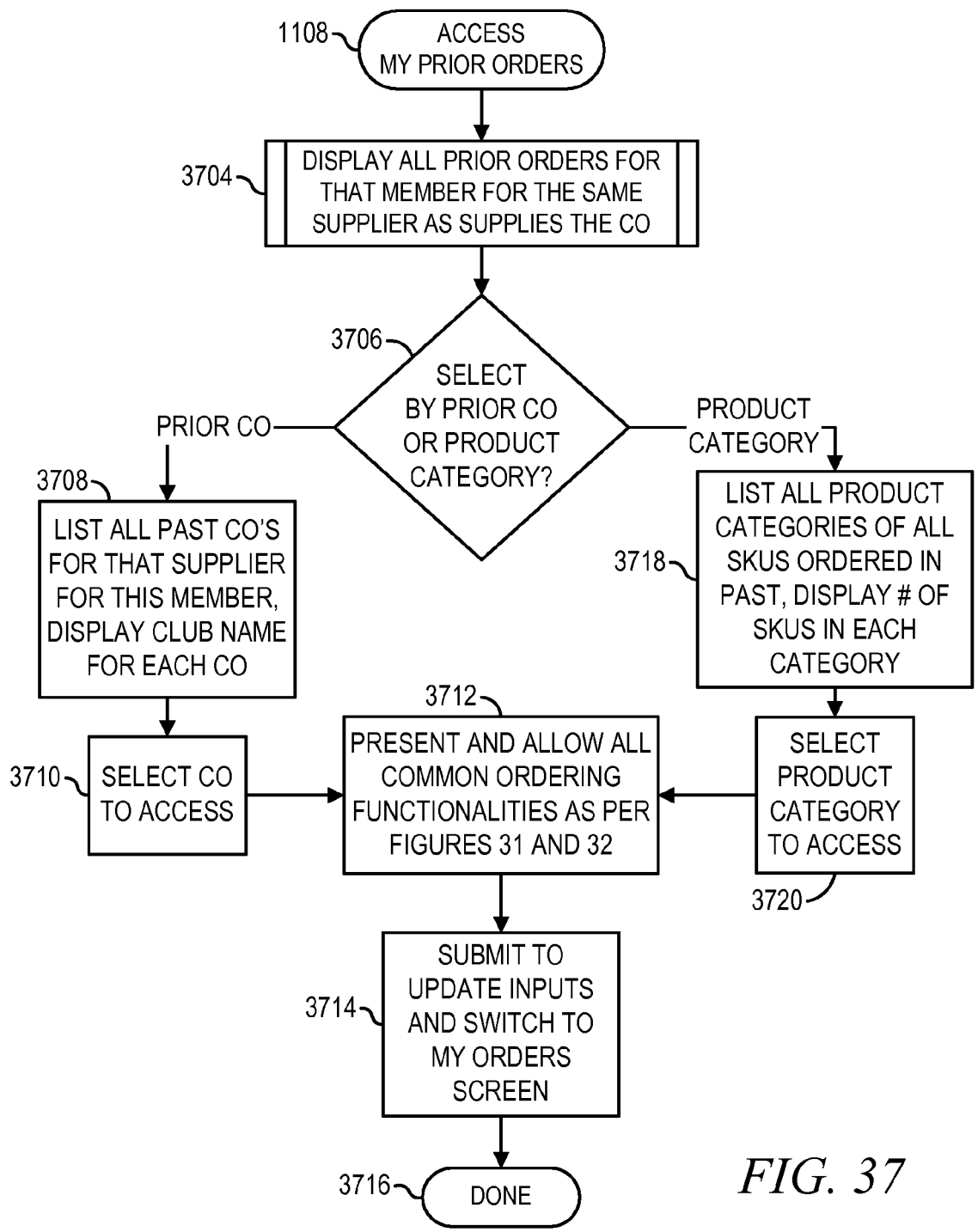
FIG. 37 exemplifies a process for enabling a member to view and order from their own prior orders.

Referring to FIG. 37, when a member accesses "My Prior Orders", described above with respect to step 1108 (FIG. 11), execution proceeds to step 3704, wherein all prior orders for that member for the same supplier as supplies the CO are displayed. In step 3706, a determination is made whether to select a prior order by the prior CO or by the product category. If it is determined that a prior order should be selected by the prior CO, then execution proceeds to step 3708, wherein a list of all past COs for that supplier for this member are displayed, and the club name is also displayed for each CO. In step 3710, the member selects which CO to access and, in step 3712, all common ordering functionalities, described above with respect to FIGS. 31 and 32, are preferably presented to the member. In step 3714, the updates entered by the member are submitted, and the "My Orders" screen is displayed, and in step 3716, execution is terminated.

If, in step 3706, it is determined that a selection of a prior order is to be made by product category, then execution proceeds to step 3718, wherein all product categories of all SKUs ordered in the past are listed, and the number of SKUs in the category are displayed. In step 3720, the member selects a product category to access, and execution proceeds to step 3712, as described above and succeeding steps 3714 and 3716. In an alternative mode, the member may access each tier that is listed which will then display the sub-categories or products within it, and for each tier shall have the option of showing all SKUs in that tier in a list or selecting the tier and proceeding to the level below.

Figure 38:
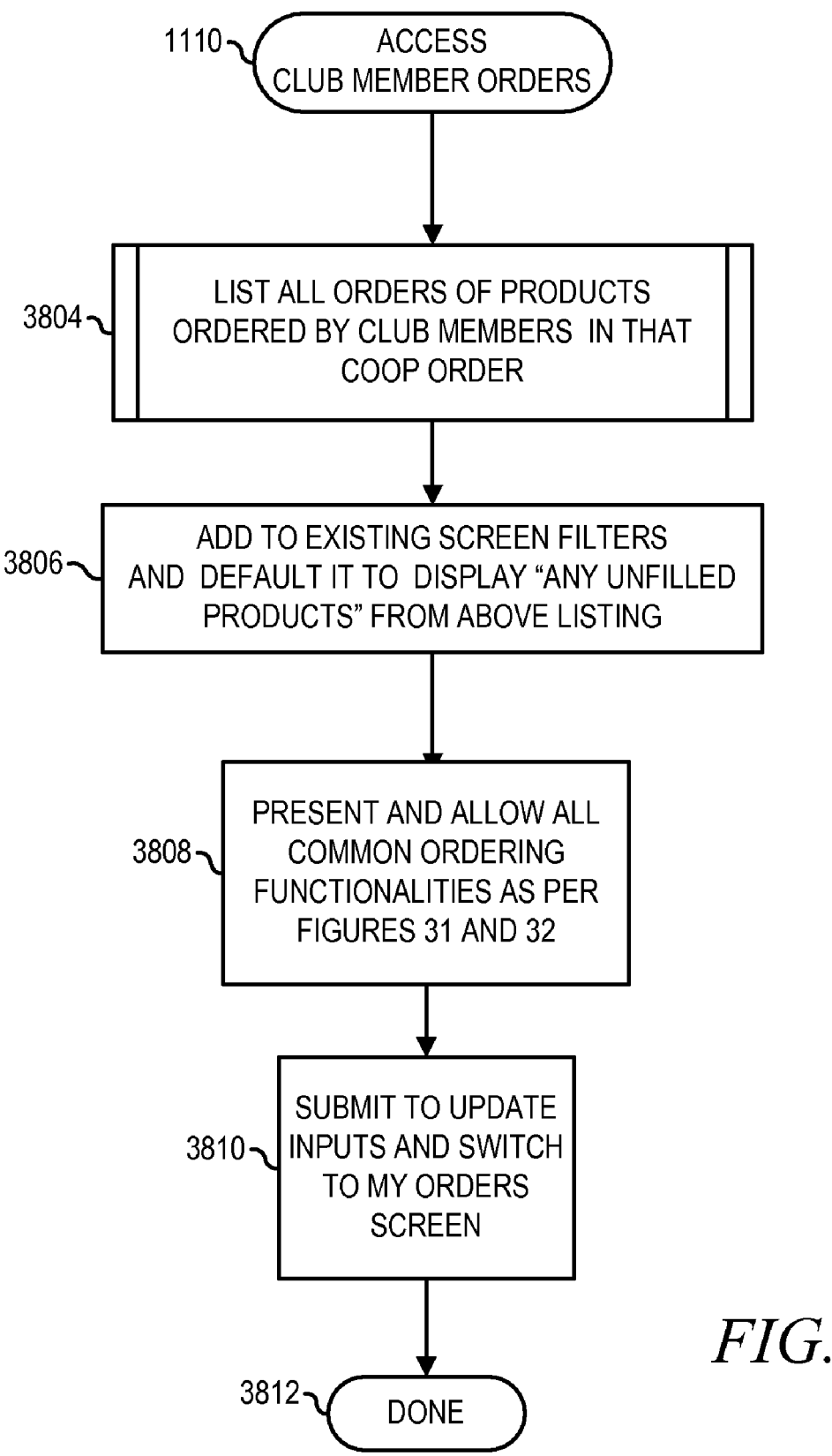
FIG. 38 exemplifies a process for enabling a member to view and order for themselves products which will complement orders for those same products placed by other Members.

Referring to FIG. 38, when a member accesses club member order, per step 1110 above, execution proceeds to step 3804, wherein all orders of products ordered by club members in that CO may be listed. As has been noted previously, Club Member Orders has an added filter option which is All Unfilled Orders, and this is defaulted so that the member on accessing Club Member Orders is preferably presented with a listing of all the SKUS ordered by all members that are not currently going to be filled. In step 3808, all common ordering functionalities described above with respect to FIGS. 31 and 32 are presented to the member. In step 3810, inputs made by the user are submitted and the "My Orders" screen is displayed and, in step 3812, execution is terminated.

Figure 39:
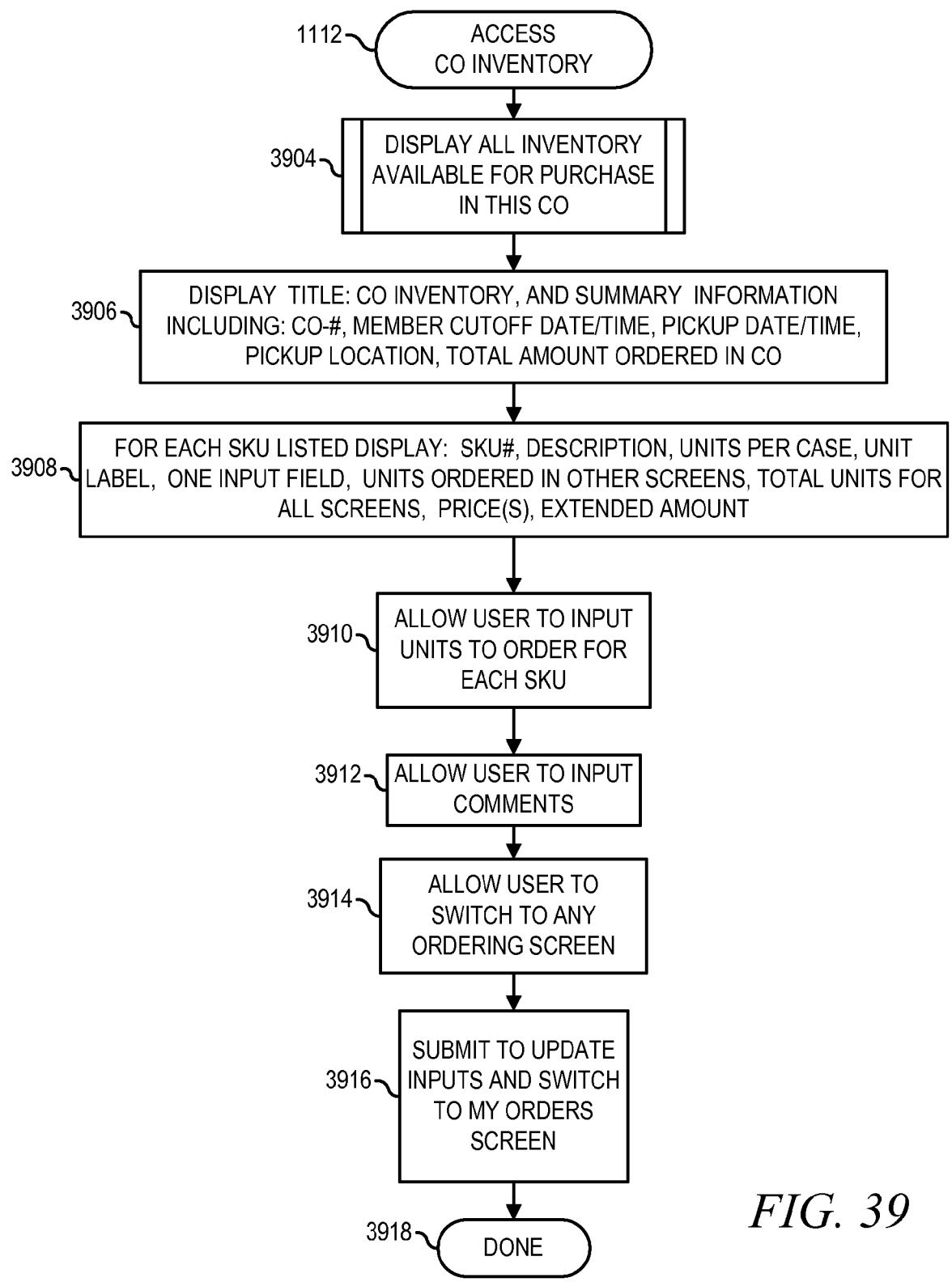
FIG. 39 exemplifies a process for enabling a member to view and order inventory.

Referring to FIG. 39, when a member accesses club inventory in step 1112 (FIG. 11), then execution proceeds to step 3904, wherein all inventory available for purchasing in this CO is displayed. In step 3906, under a title such as "CO Inventory", there is displayed summary information such as the CO number, the member cut-off date and time, the pickup date and time, pickup location, total amount ordered in CO, and the like.

In step 3908, for each SKU listed, there is displayed, by way of example, the SKU number, description of the product represented by the SKU, units per case, unit label, one input field, units ordered in other screens, total units for all screens, one or more prices, extended amount, and the like. In step 3910, a user is allowed to enter units to order for each SKU in the one input field. In step 3912, a user is permitted to enter comments. In step 3914, a user is permitted to switch to any other ordering screen. In step 3916, a user may submit any updated inputs he has made and to also switch to the "My Orders" screen. In step 3918, execution is terminated.

Figure 40:
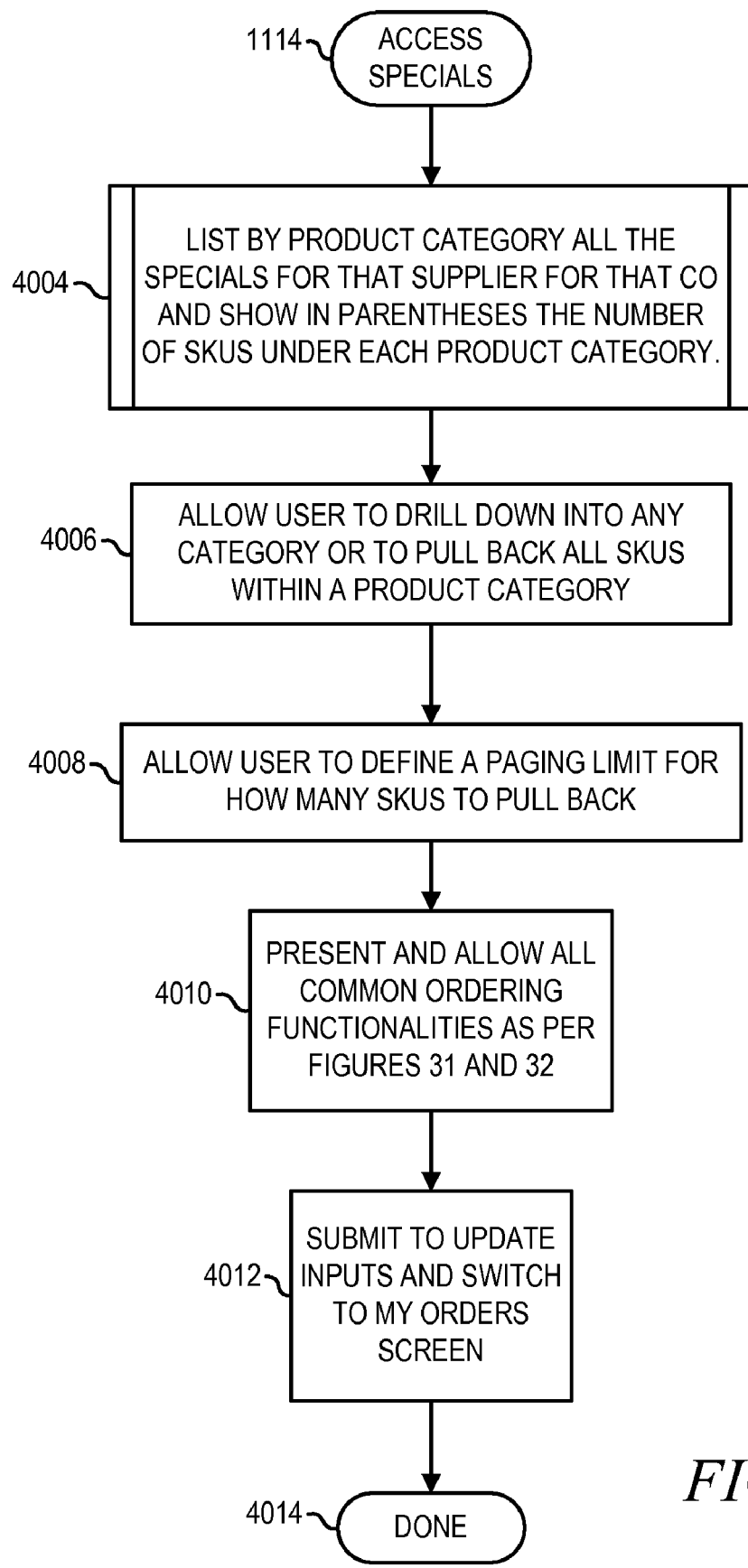
FIG. 40 exemplifies a process for enabling a member to view and order specials.

Referring to FIG. 40, when a member accesses the Specials in step 1114 (FIG. 11), then execution proceeds to step 4004, wherein all specials for a particular supplier for a CO are listed by product category, and the number of SKUs under each product category is preferably shown parenthetically. In step 4006, a user may "drill down" into any category, or retrieve all the SKUs within a product category that are on special. In step 4008, a user may be permitted to define a paging limit for how many SKUs to pull back. In step 4010, all common ordering functionalities described above with respect to FIGS. 31 and 32 are presented to the member. In step 4012, the updated inputs entered by the user herein may be submitted, and the "My Orders" screen displayed. In step 4014, execution is terminated.

Figure 41:
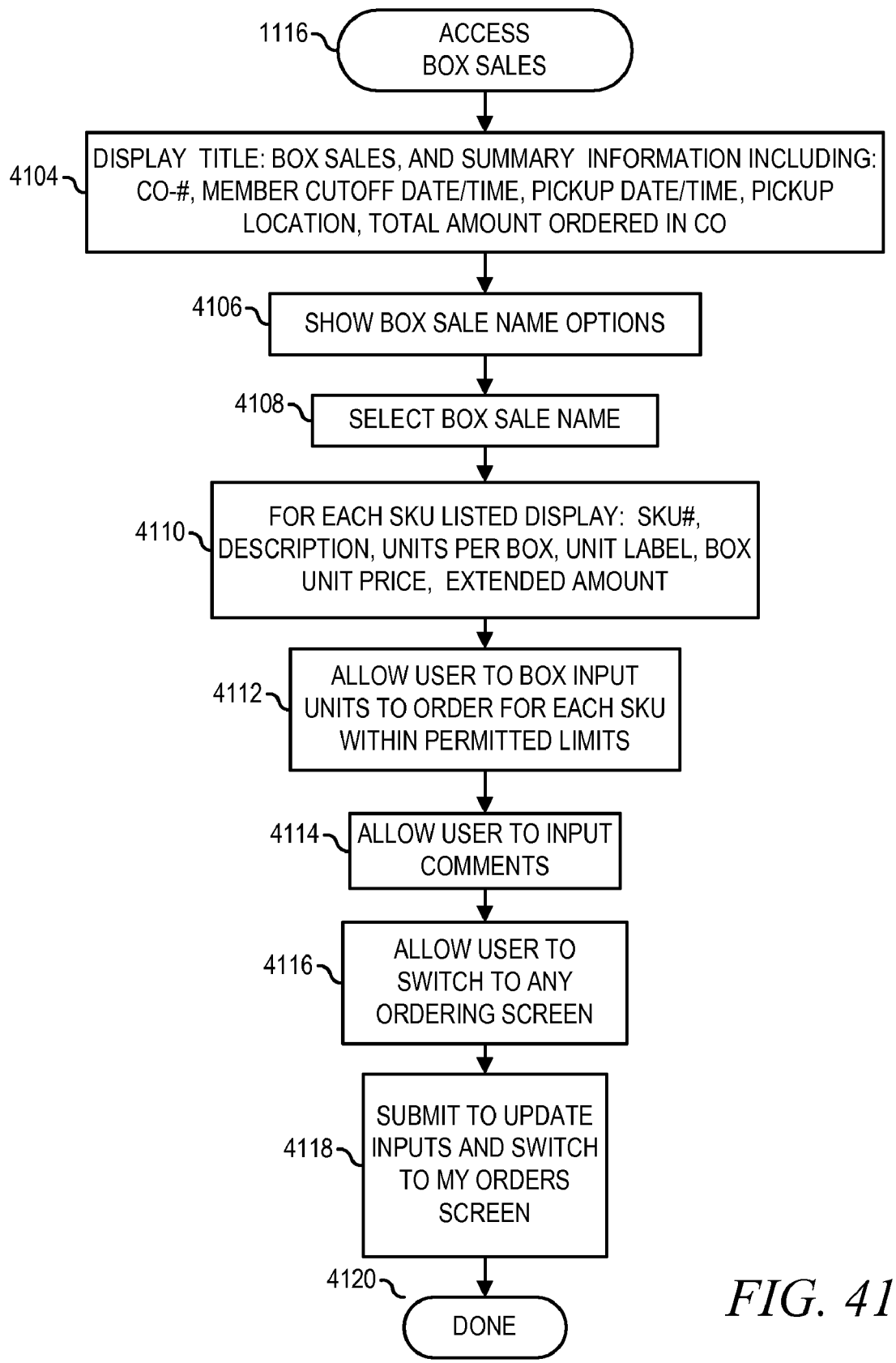
FIG. 41 exemplifies a process for enabling a member to view and order box sales.

Referring to FIG. 41, when a user accesses Box Sales, in step 1116 (FIG. 11), then execution proceeds to step 4104, wherein there is displayed, preferably under a title such as "Box Sales", summary information including, by way of example, the CO number, member cutoff date and time, pickup date and time, pickup location, total amount ordered in CO, and the like. In step 4106, the box sale name options for this CO are displayed and, in step 4108, the member selects the box sale name. In step 4110, for each SKU listed, there is displayed, by way of example, the SKU number, description of the product represented by the SKU, units per box, unit label, box unit price, extended amount, and the like. In step 4112, a user may, if permitted by the BC as set up in CO settings, deviate from the units per box specified and order an alternative quantity for each SKU within the permitted limits set by the BC (if any). In step 4114, a user is permitted to enter comments and, in step 4116, a user is permitted to switch to any other ordering screen. In step 4118, updates entered by the user may be submitted and the "My Orders" displayed. In step 4120, execution is terminated.

Figure 42:
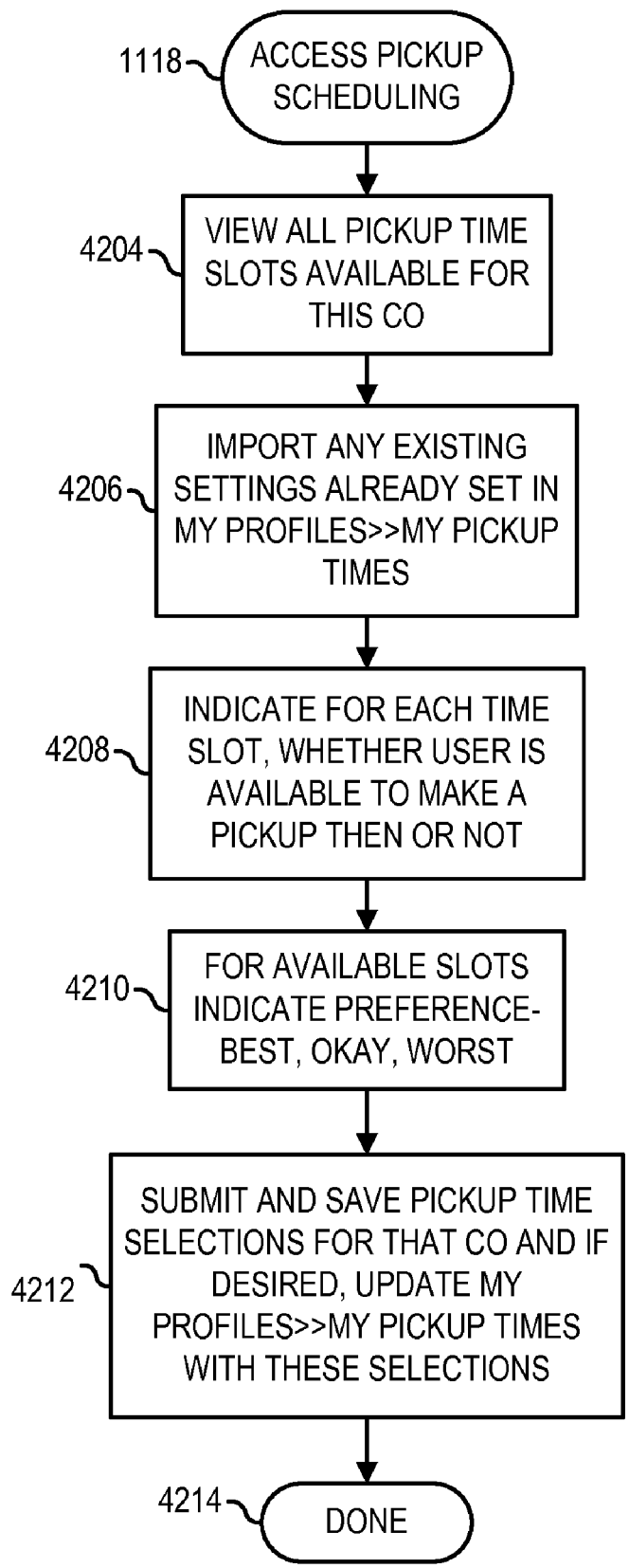
FIG. 42 exemplifies a process for enabling a member to denote their preferred pick-up time slots from within a predefined pickup time period.

Referring to FIG. 42, when a member accesses Pickup Scheduling in step 1118 (FIG. 11) either directly or having been presented with this screen as a requirement set by the BC, then execution proceeds to step 4204, wherein all pickup time slots available for this CO are displayed for viewing by the member. In step 4206, any existing settings under the "My Pickup Times" under the "My Profiles" are imported for the time periods of the pickup are imported so that the user does not have to re-create these. In step 4208, there is then indicated for each pickup time slot whether or not the user is available to make a pickup at that time. In step 4210, for available pickup time slots, the member then selects and designates as desired any time slot preferences such as whether the time slot is a best time slot, an okay (i.e., acceptable) time slot, or a worst time slot. In step 4212, the pickup time selections for that CO may be submitted and saved and, if desired, the "My Profiles">>"My Pickup Times" may be updated with these selections. In step 4214, execution is terminated.

Figure 43:
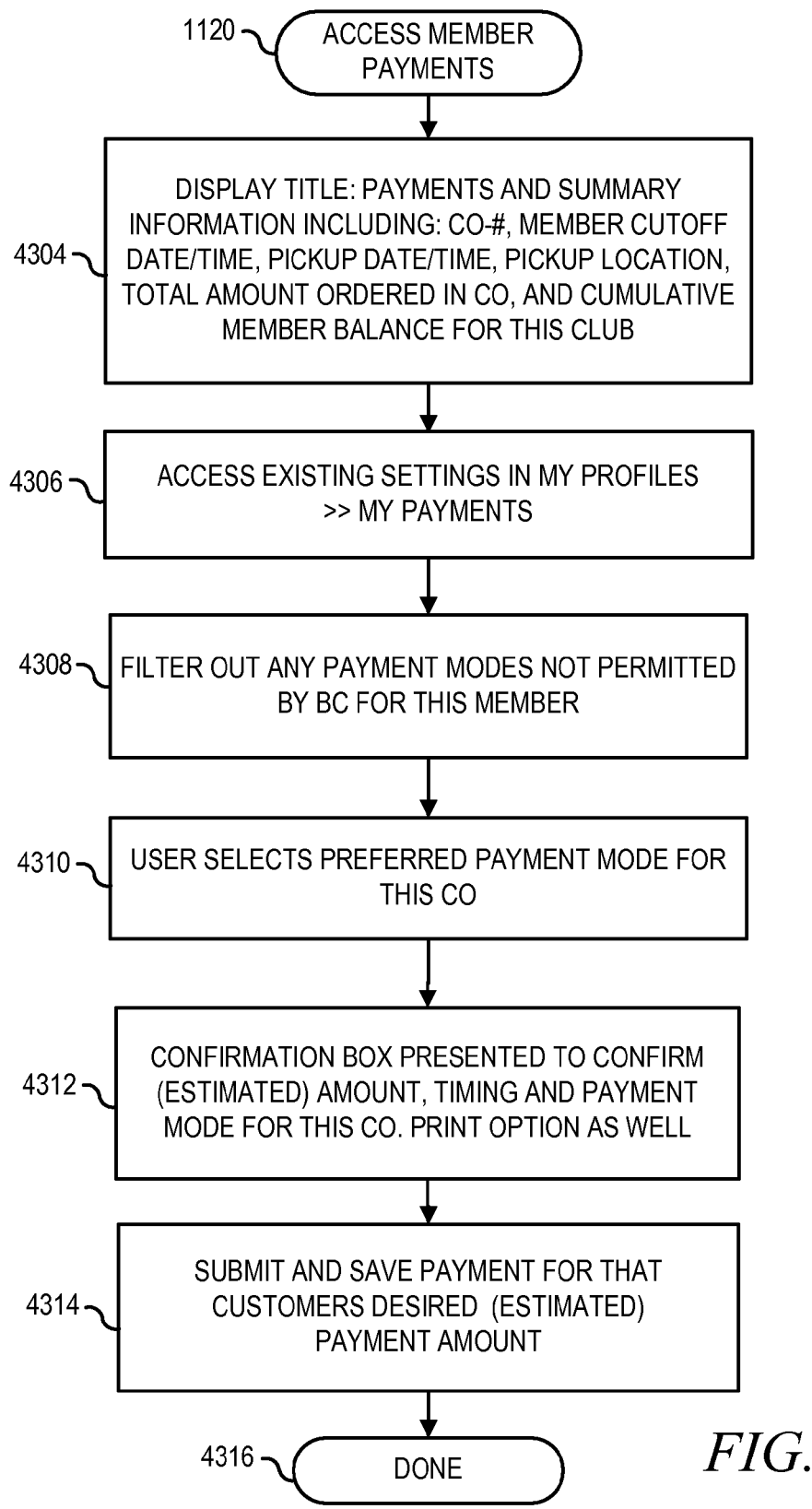
FIG. 43 exemplifies a process for enabling a member to make payments.

Referring to FIG. 43, when a member accesses Member Payments in step 1118 (FIG. 11), then execution proceeds to step 4304, wherein there is displayed, preferably under a title such as "Payments", summary information including, by way of example, the CO number, member cutoff date and time, pickup date and time, pickup location, total amount ordered in the CO, and cumulative member balance for this buying club, and the like. In step 4306, a member may access existing settings in his "My Profiles">>"My Payments" screen. In step 4308, any payment modes not permitted by the BC for this member are filtered out. In step 4310, a member may select a preferred payment mode for this CO. In step 4312, a confirmation box is presented to permit the member to confirm an estimated amount, timing, and payment mode for this CO, and a print option is preferably presented as well so that the ordering and payment estimates may be saved by the member as of that point in time. In step 4314, the payment for that member's desired (estimated) payment amount may be submitted and saved. In step 4316, execution is terminated.

Referring to FIG. 44, when a member accesses Member Credits, in step 1122 (FIG. 11), then execution proceeds to step 4402, wherein a determination is made whether the CO is subsequent to the supplier delivery date and time and prior to the member credit deadline date and time. If the CO is not subsequent to the delivery and prior to the member credit deadline, then execution proceeds to step 4403, wherein a message is displayed indicating that member credits may not be requested, and execution is terminated.

If, in step 4402, the CO is subsequent to the delivery date and time and prior to the member credit request deadline, then execution proceeds to step 4404, wherein there is displayed, preferably under a title such as "Member Credits", summary information such as, by way of example, the CO number, member cutoff date and time, pickup date and time, pickup location, total amount ordered in the CO, and cumulative member balance for this club, and the like. In step 4406, a member indicates whether he would desire to add a member credit or edit an existing member credit. If the member desires to edit an existing credit, then execution proceeds to step 4408, wherein the member selects an existing member credit for editing. In step 4410, if a member desires, then he or she may change the amount of the requested member credit. In step 4412, if desired by the member, then the member may change the reason for the member debt. In step 4414, any edited member credits for that member's account are preferably submitted and saved and the BC's requested member credits are then updated with that edited member credit request. Then in step 4416 execution is terminated.

If, in step 4406, the member indicates that he would prefer to request a new member credit, then execution proceeds to step 4418, wherein the member selects the product to which the member credit is to be requested. In step 4420, the amount of the requested member credit is provided and, in step 4422, the reason for the requested member credit is optionally provided and, a print of the request may be made. In step 4424, the requested member credit to that member's account are preferably submitted and saved and the BC's requested member credits are then updated with that new member credit request. Then, in step 4426 execution is terminated.

Figure 45:
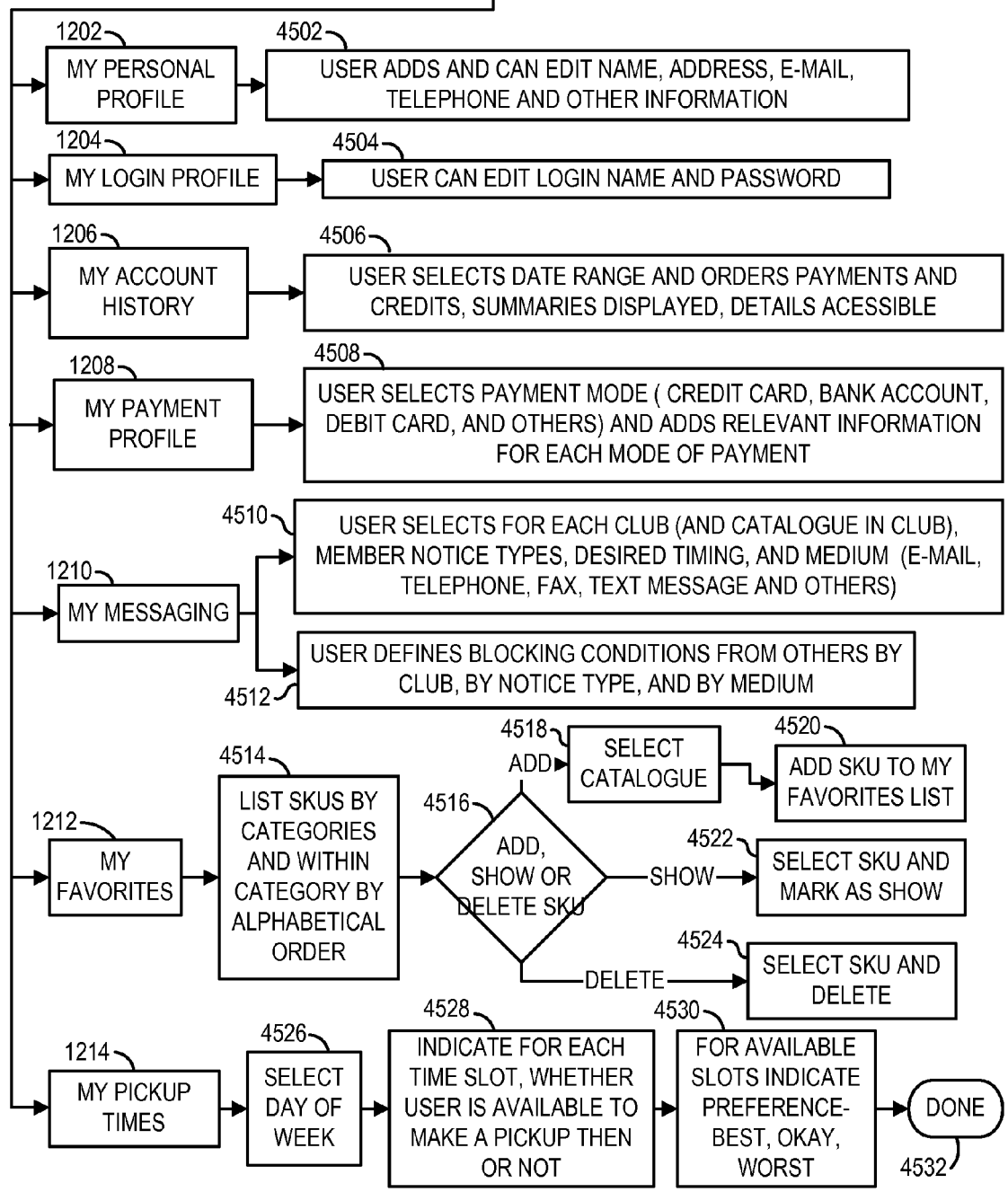
FIG. 45 exemplifies a process for enabling a member to view and adjust his or her profile information, consisting of biographical data, product favorites, general pickup times and other personal information.

Referring to FIG. 45, when a user accesses the "My Profiles" tab 906, he or she may make a selection from a number of choices, namely, by way of example, a choice 1202 for "My Personal Profiles", choice 1204 for "My Login Profile", a choice 1206 for "My Account History", a choice 1208 for "My Payment", a choice 1210 for "My Messaging", a choice 1212 for "My Favorites", and a choice 1214 for "My Pickup Times". More specifically, if a member selects choice 1202 for "My Personal Profile", then in step 4502, the member may add and edit a number of fields, such as, for example, the member's name, address, email, telephone, and the like, type of information. If a member selects choice 1204 for "My Login Profile", then in step 4504, the member may edit his login name and password. If the member selects choice 1206 for "My Account History", then in step 4506, the user may select a date range and order payments and credits for that date range and summaries may then be presented by transaction and, if desired, details may be accessed for each transaction. If a member selects choice 1208 for "My Payment Profile", then in step 4508, the member may select his payment mode (e.g., a credit card, bank account, debit card, and the like), and the member add relevant information for each mode of payment. If a user selects choice 1210 for "My Messaging", then a member may, in step 4510, select for each club of which he is a member, (and including each catalog in each club), member notice types, desired timing, and messaging medium (e.g., email, telephone, fax, text message, and the like). Alternatively, if a member selects choice 1210 for "My Messaging", then in step 4512, the member may define blocking conditions to prevent messages from others being conveyed, by club, by notice type, and by medium. If a member selects choice 1212 for "My Favorites", then in step 4514, SKUs are preferably listed by the categories and, within each category, by alphabetical order. In step 4516, the member indicates whether he or she would prefer to add, show, or delete an SKU. If, in step 4516, the user indicates that he or she would prefer to add an SKU, then execution proceeds to 4518, wherein the member selects the catalog from which to select a SKU and, in step 4520, having completed the search process by means described above for searching the catalogue, the member may add the SKU to his My Favorites list. If, in response to step 4516, the user indicates a desire to show or not show a SKU, then execution proceeds to step 4522, wherein a member may select a SKU, and mark it as to show or not to show. If, in response to step 4516, a user indicates a desire to delete a SKU, then execution proceeds to step 4524, wherein the member selects a SKU and may delete it from their My Favorite list. If a member selects choice 1214 for "My Pickup Times", then execution proceeds to step 4526, wherein a member may select a day of the week for pickup. In step 4528, for the selected day of the week, the member may indicate for each time slot whether or not the user is available to make a pickup then. In step 4530, for the available slots, the member may indicate a preference for that time slot such as a best time slot, an okay time slot, or a worst time slot. In step 4532, execution is terminated.

Figure 46:
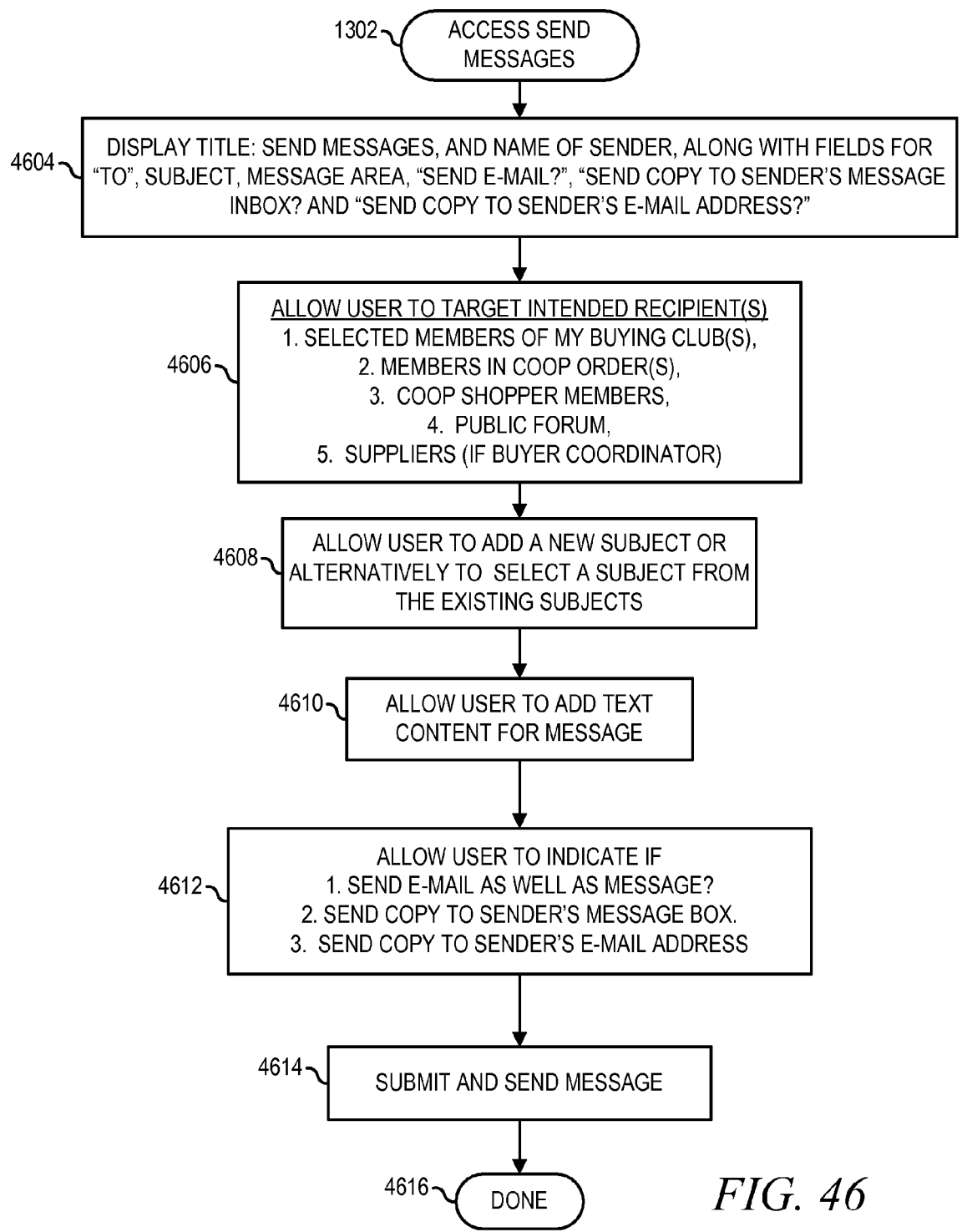
FIG. 46 exemplifies a process for enabling a member to send messages.

Referring to FIG. 46, when a user accesses "Send Messages" at step 1302 (FIG. 13), then execution proceeds to step 4604, wherein there is displayed, preferably under title such as "Send Messages", then the name of the sender, along with a number of other fields, such as a "To" field, a subject line, a message area, a send email button, a check box to send copy to sender's message inbox, and a check box to send copy to sender's email address. In step 4606, a user may target intended recipients based on various criteria, such as, for example, (1) selected members of the member's one or more buying clubs, (2) members in one or more co-op orders, (3) co-op shopper members, (4) in the public forum, (5) suppliers (if user is a BC), and the like. In step 4608, the member is permitted to add a new subject or, alternatively, to select a subject from existing subjects. In step 4610, a member is permitted to add text content to the message. In step 4612, a member may indicate whether to send an email as well as a message, to send a copy to the sender's message box, and/or to send a copy to the sender's email address. In step 4614, the member may submit and send the message, and in step 4616, execution is terminated.

Figure 47:
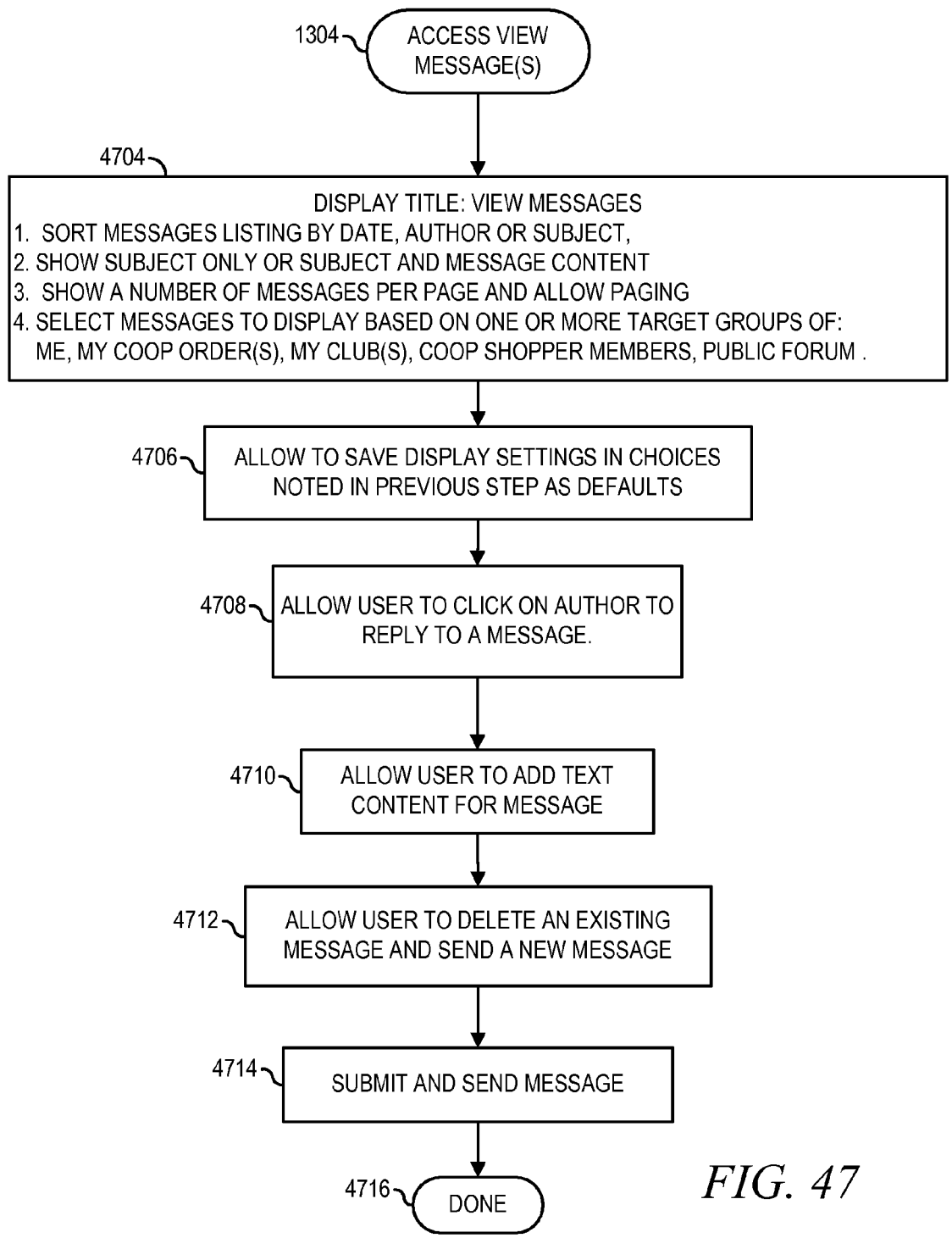
FIG. 47 exemplifies a process for enabling a member to view messages

Referring now to FIG. 47, when a user accesses "View Messages" from step 1304 (FIG. 13), execution proceeds to step 4704. In step 4704, a number of options are displayed under a title such as "View Messages". For example, one option would enable a member to sort messages listed by date, author, or subject. Another option would enable a member to, for example, show the subject only, or the subject and message content both. Another option would enable the member to show a number of messages per page and allow for paging. Yet another option would enable a member to select messages to display based on one or more target groups of, for example, the member himself, any messages sent regarding an open CO, buying clubs of which the member is a member, co-op shopping members, public forum, and the like. In step 4706, a member may save display settings in choices noted in step 4704 as defaults. In step 4708, a user may click on an author to reply to a message. In step 4710, a user may add text content to a message. In step 4712, a user may delete an existing message and send a new message. In step 4714, a member may submit and send a message. In step 4716, execution of the "View Messages" option 1304 is terminated.

Figure 48:
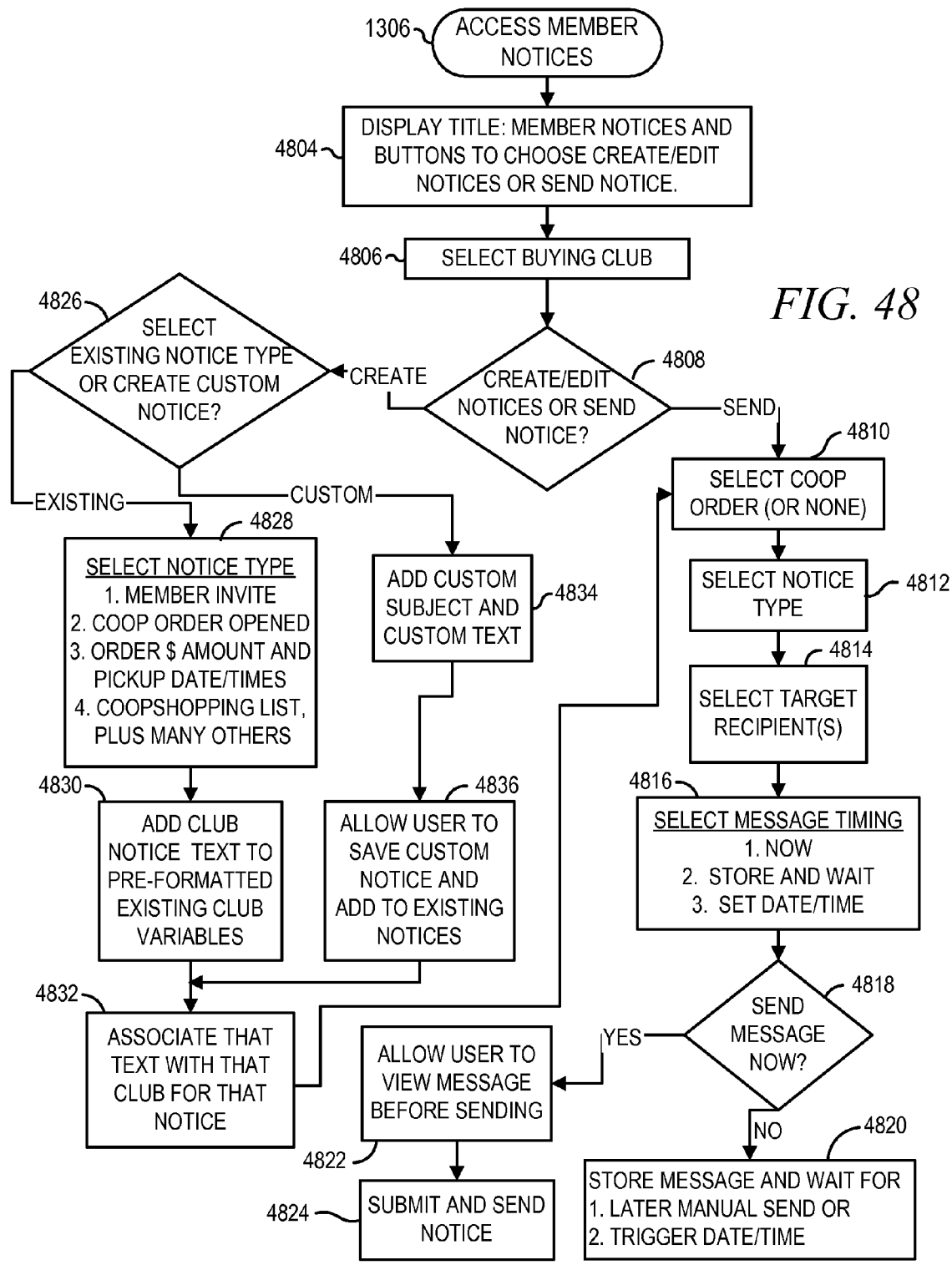
FIG. 48 exemplifies a process for enabling a Buyer Coordinator to view, create, edit, and send Club notices to members.

Referring to FIG. 48, when a BC (not just a member) accesses the "Member Notices" at step 1306, described above with respect to FIG. 13, execution proceeds to step 4804, wherein there is preferably displayed a title such as "Member Notices" and functions (e.g., "buttons") to choose whether to create and/or edit notices or to send a notice. In step 4806, the BC selects a buying club, and in step 4808, the BC indicates whether he would like to create or edit a notice or send a notice. If the BC indicates that he would desire to send a notice, then execution proceeds to step 4810, wherein the BC selects a CO or NONE. In step 4812, the BC selects a notice type, and in step 4814, the BC selects target recipients for the notice. In step 4816, the BC may select timing for the message such as, for example, whether the message should be sent now, or stored and wait some predetermined amount of time, or whether the message should be sent at some particular date and time in the future. In step 4818, the BC indicates whether the message should be sent now. If the BC indicates that he does not want to send the message now, then execution proceeds to step 4820, wherein the message is stored and the BC may manually send the message later or he may enter a date and time for the message to be sent in the future. If, in step 4818, the BC indicates that he would like to send a message now, then execution proceeds to step 4822, wherein the BC may view the message before sending the message. In step 4824, the BC may submit and send the notice.

If, in step 4808, the BC indicates that he would desire to create a notice, then execution proceeds to step 4826, wherein the BC indicates whether he would like to select an existing notice type or create a custom notice. If the BC indicates that he would desire to use an existing notice type, then execution proceeds to step 4828, wherein the BC may select from a number of different notice types such as, by way of example, a member invite notice, CO opened notice, an order dollar amount and pickup date and times notice, Coop Shopping list (an ability to send the list itself out is thus disclosed), and the like. In step 4830, the BC may add text to the notice, it being noted that the notices include formatted existing club variables or fields. In step 4832, the text entered by the BC is associated with that club for the selected notice, and execution proceeds to step 4810, described above.

If, in step 4826, the BC indicates that he would desire to create a custom notice, then execution proceeds to step 4834, wherein a BC may add a custom subject line and custom text to a notice. In step 4836, the user is permitted to save the custom notice and add it to existing notices. Execution then proceeds to step 4832 described above.

Figure 49:
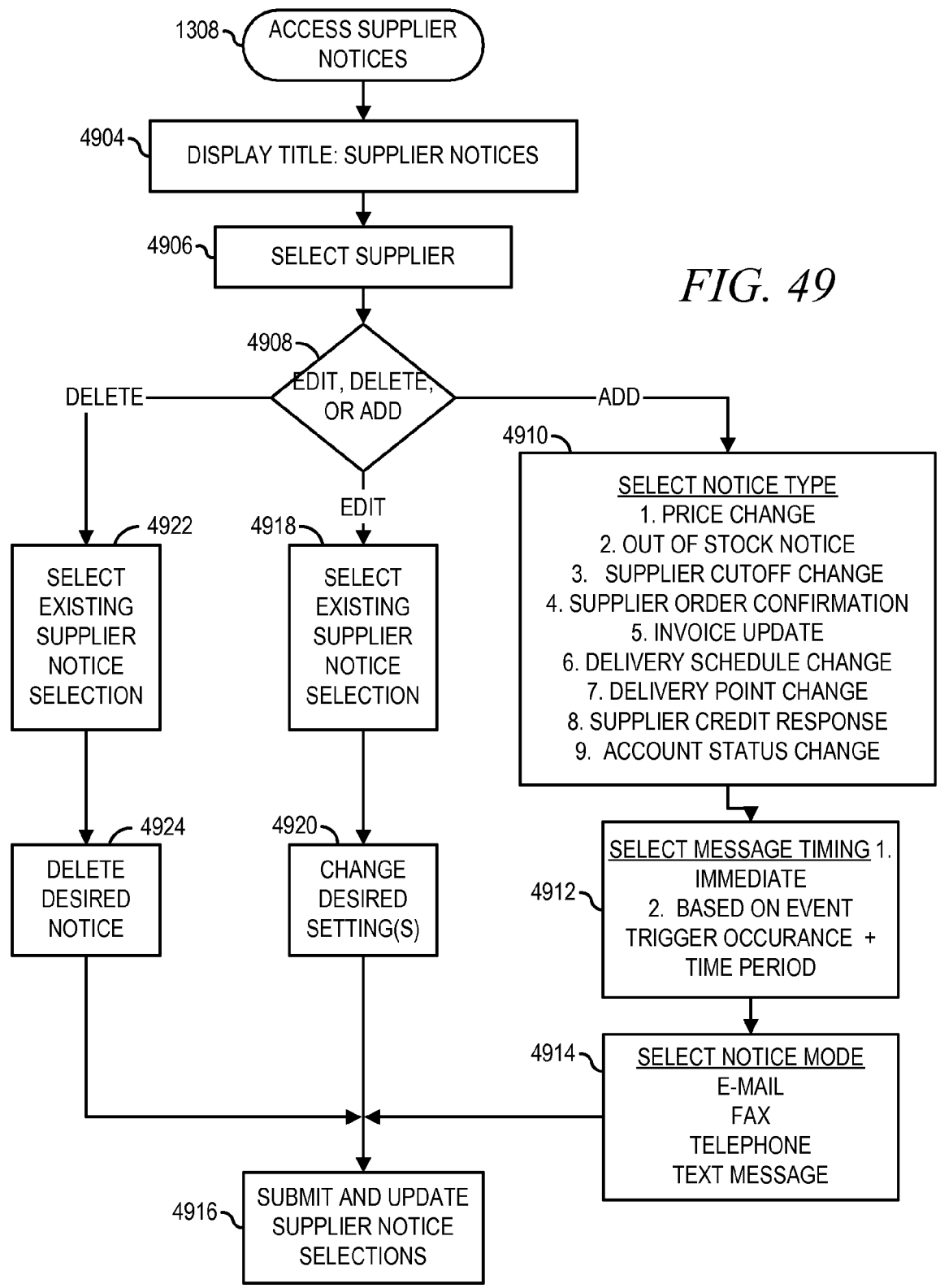
FIG. 49 exemplifies a process for enabling a Buyer Coordinator to view, add, edit, or delete supplier notices.

Supplier notices are utilized by the BC to monitor and receive information as desired about supplier activities. Referring now to FIG. 49, when a BC accesses the "Supplier Notices", step 1308 described above with respect to FIG. 13, then execution proceeds to step 4904, wherein a screen is displayed, preferably under a title, such as "Supplier Notices". In step 4906, the BC selects a supplier, and in step 4908, the BC is queried as to whether he would desire to edit, delete, or add a notice. If, in step 4908, the BC indicates that he would like to add a notice, then execution proceeds to step 4910. In step 4910, the BC may select the notice type from a number of different notice types, such as, by way of example, a price change, an out-of-stock notice, a supplier cutoff change notice, a supplier order confirmation notice, an invoice update, a delivery schedule change, a delivery point change, a supplier credit response, an account status change, and/or the like. In step 4912, the BC may indicate whether he would like to be told immediately about the notice or based on an event timing rule such as, for example, an elapsed time after an event occurs, such as 12 hours after the shipping date/time. In step 4914, the BC may select the notice mode (one or more), such as, by way of example, an email, a fax, telephone, a text message, and the like. In step 4916, the notice is submitted and the supplier notice selections are updated.

If, in step 4908, the BC indicates that he would desire to edit a notice setting, then execution proceeds to step 4918, wherein the BC selects an existing supplier notice. In step 4920, the BC may change desired settings, and execution proceeds to step 4916, described above. If, in step 4908, the BC indicates that he would desire to delete a notice, then execution proceeds to step 4922, wherein the BC selects an existing supplier notice and, in step 4924, the BC may delete the desired notice. Execution then proceeds to step 4916 described above.

Next disclosed are a number of reports that are of use to buying club members and the BC. It is preferable that a member can only access Member Reports but that a BC can access both Member Reports and Club Reports. Referring now to FIG. 50, when a user accesses the Reports tab 910, described above with respect to FIG. 9, execution proceeds to either step 5004 (discussed below), wherein a determination is made whether the user is a BC, or execution may proceed to a Member reports menu 1404, comprising a My Orders report 5006, a Specials report 5007, and a Products list report 5008. More specifically, the My Orders report 5006, provides the account summaries for past COs in which the member participated, and is thus sorted by CO. The Specials report 5007 first requires a selection for the catalogue and then displays pricing information for lists of SKUs by date and by product category. The Products list report 5008 provides a list of products that are on the Coop Shopping List, The My Favorites lists, Club Inventory or all three. The Coop Shopping List is printed to show the SKU, Description, units per case, unit label and price (based on nearest existing or past CO) and also has blank lines for min-pref-max columns on each row, so that the member may fill out quantities off-line and later input these quantities on-line.

If, at step 5004, a user is determined to be a BC, then execution proceeds to make available Club reports 1402, described above with respect to FIG. 14, comprising eleven reports described herein below. A Breakdown report 5010 shows the quantity of products each member has ordered on each CO and is used for allocating a given product to the members who have ordered that product. A Supplier Order report 5012 shows the quantity and price of orders made to a supplier on each CO, and preferably also includes any add-ons (eg applicable charges and discounts such as sales taxes, capitalization charges, shipping charges, volume discounts, pickup discounts and the like). A Member Report 5014, shows, for a CO, all orders by members, payments and credits, and also includes add-ons. A Club Inventory report 5016 shows the inventory held by the club and may be displayed according to combined lots or separate lots and displays the quantities and prices (costs) for all the products in inventory. An Inventory Sales report 5018 shows all products and inventory and the prices in quantity of each product, and also allows for signing sales to customers. A Total Order report 5020 shows, by CO and with a separate row for each product, the total dollars for each product from the supplier and from inventory, and to the members, and also shows sub-totals by product category, plus add-ons. A Retailer Revenue report 5022 lists by CO the total dollars of orders for each product category and shows commissions owed on each product category plus any add-ons. A CO comment report 5024, lists by CO all comments made by club members along with their orders. A Member Information report 5026 lists information on members of the club such as, each member's name, e-mail address, mailing address, telephone number of each member, and the like. A Pricing Breakdown report 5028 shows, for the Coop Shopping Lists and/or Inventory, the case costs, the unit costs, and member price for each product. A Specials Report 5030 shows specials that are offered by catalog by date and by product category, and also shows the dates of sale for a special, the regular price or a product, the sale price, and the discount on the price.

Figure 51:
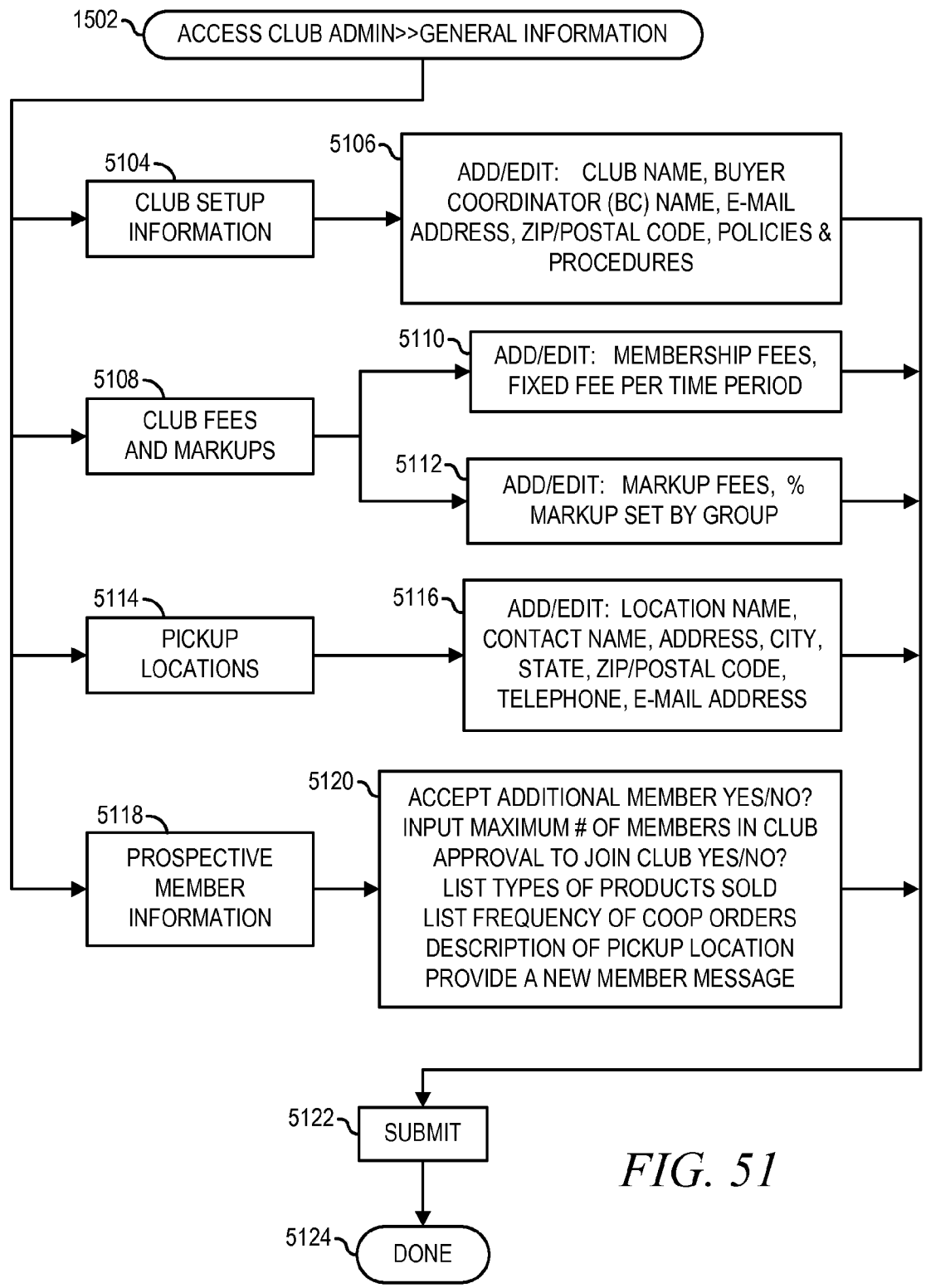
FIG. 51 exemplifies a process for enabling a Buyer Coordinator to view general information.

Referring now to FIG. 51, when a BC accesses general information from the Club Admin tab 914, described above with respect to FIG. 9, an array of menu choices are presented to the BC, such menu choices including, by way of example, Club Setup Information 5104, Club Fees and Markups 5108, Pickup Locations 5114, and Prospective Member Information 5118. More specifically, with respect to Club Setup Information 5104, a BC may add or edit the club name, the BC name, the email address, zip and/or postal code, policies, procedures, and the like related to operations of the buying club. With respect to Club Fees and Markups 5108, a BC in 5110 may add and/or edit membership fees, fixed fee per time period, and the like; or alternatively, with respect to 5112, a BC may add and/or edit markup fees (preferably set as percentages), and the percentage markup as set for each group. In this area, the BC creates groups for the club with each group assigned a markup, and then the BC assigns persons to the groups. By doing this the BC can charge markups that closely approximate the relative costs of servicing the various members. Members with large orders who do not require much time, may be assigned to a group with a low markup (or no markup) and members who place small markups, and/or who require a great deal of handholding may be assigned to groups with higher markups. A default markup group called regular is preferably established with a default markup of zero.

With respect to Pickup Locations 5114, a BC may add and/or edit the location name, contact name, address, city, state, zip and/or postal code, telephone number, e-mail address, and the like for a buying club. With respect to Prospective Member Information 5118, a BC in 5120 may: indicate whether the club will accept additional members, the maximum number of members the club will have at any one point in time, indicate whether approval is required for someone to join the club, indicate the types of products sold through the club, indicate the frequency of coop orders, indicate the pick-up location preferably as a general description and, provide a message for greeting new members and the like. At step 5122, a BC may submit the additions and/or edits he has made and, in step 5124, execution is terminated.

Figure 52:
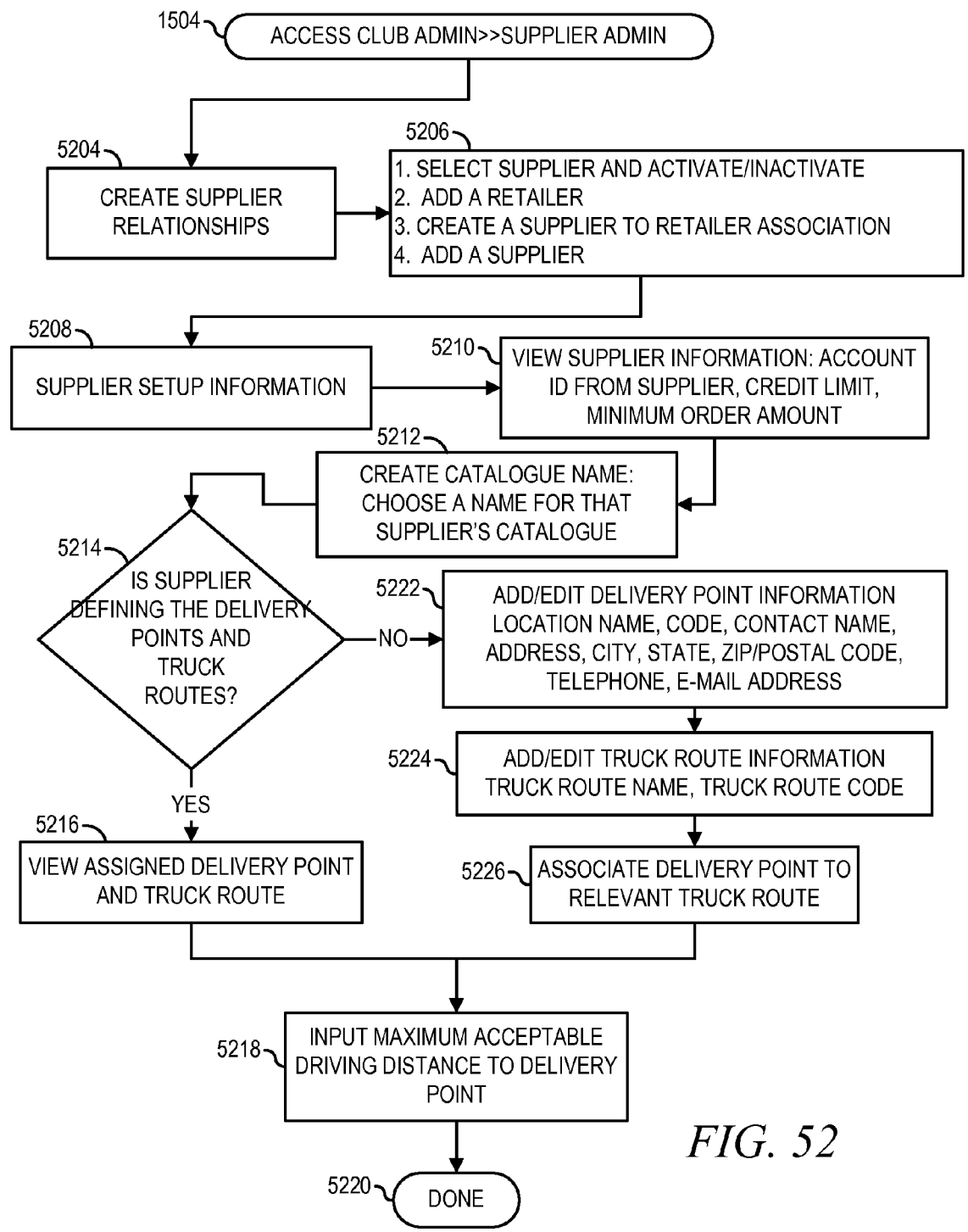
FIG. 52 exemplifies a process for enabling a Buyer Coordinator to handle administration issues with a supplier.

Referring now to FIG. 52, when a BC accesses Supplier Admin 1504 mentioned above with respect to FIG. 15, execution proceeds to step 5204 for creating supplier relationships. In step 5206, a member may (1) select a supplier and activate or inactivate the supplier, (2) add a retailer, (3) create a supplier to retailer association, and/or (4) add a supplier. Step 5208 allows a BC to set up information for a supplier and, step 5210, allows a BC to view supplier information, such as by way or example, the account ID of the supplier, a credit limit with the supplier, a minimum order amount established by the supplier, and the like. In step 5212, a BC may create a catalog name for this supplier's catalog. In step 5214, a determination is made whether the supplier is defining the delivery points and the truck routes or not. If, in step 5214, it is determined that the supplier is defining the delivery points and truck routes, then execution proceeds to step 5216, wherein the BC may view the assigned delivery point and truck route. In step 5218, the BC will preferably enter the maximum acceptable driving distance to a delivery point, and in step 5220, execution is terminated. The maximum acceptable driving distance to the delivery point is helpful if for some reason the supplier needs to re-distribute delivery points to increase delivery efficiency as disclosed in the '694 patent application.

If, in step 5214, the supplier is not defining the delivery points and truck routes, then execution proceeds to step 5222, wherein the BC may add/or edit delivery point information such as, by way of example, location name, the code, the contact name, the address, the city, the state, the zip and/or postal code, the telephone number, an email address, and the like. In step 5224, a BC may add and/or edit truck route information such as truck route name, the truck route code, and the like. In step 5226, the delivery point may be associated with the appropriate truck route, and execution them proceeds to step 5218 as described above.

Figure 53:
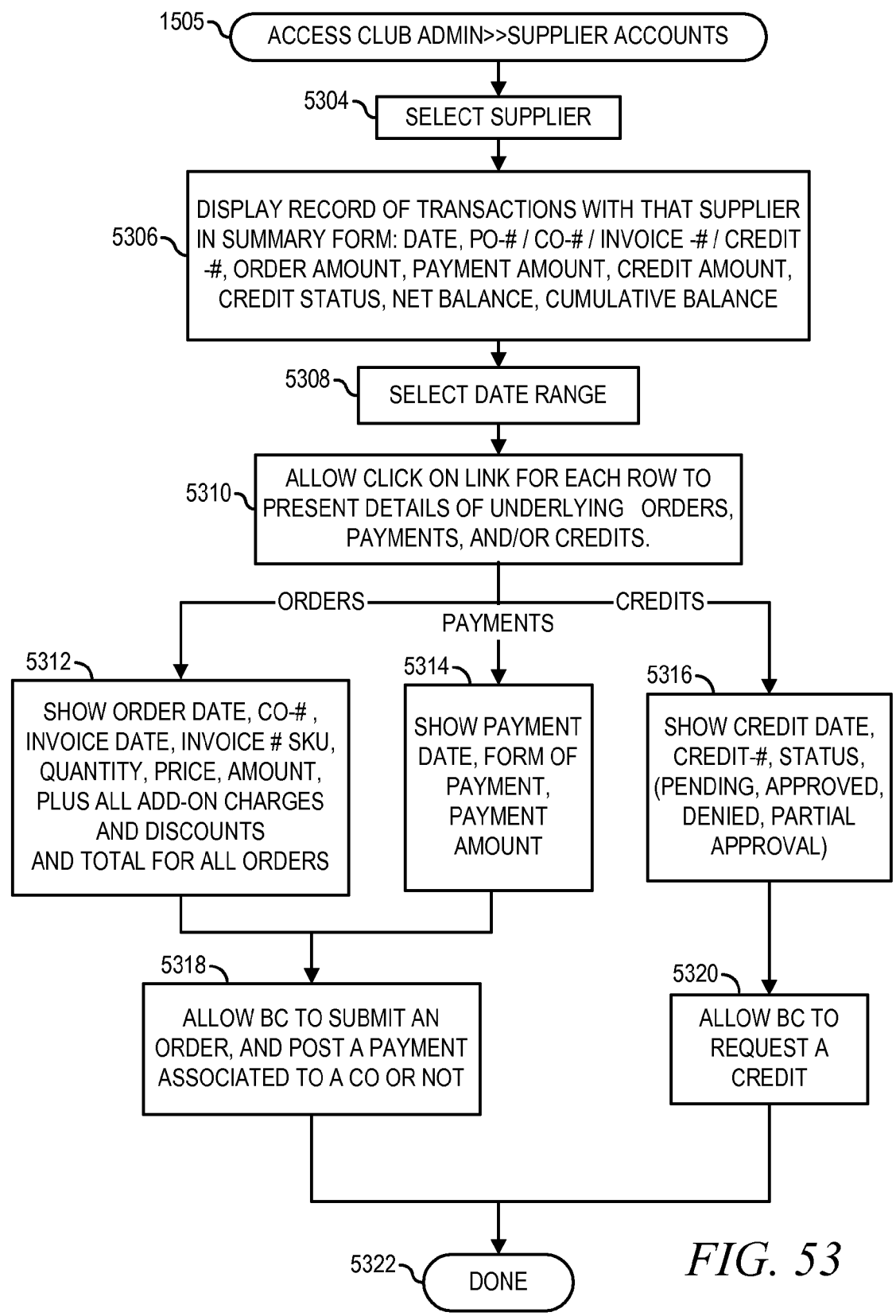
FIG. 53 exemplifies a process for enabling a Buyer Coordinator to administer supplier accounts.

Referring now the FIG. 53, when a BC accesses Supplier Accounts, as per step 1505 mentioned above with respect to FIG. 15, then execution proceeds to step 5304, wherein a BC selects a supplier for whom he would like to review the accounts for the buying club with this supplier. In step 5306, a record of past transactions with that supplier may be displayed in a summary form, including, by way of example, a date, a purchase order number, (or coop order number or an invoice number), an order amount, a payment amount, a credit amount, a credit status, a net balance, and a cumulative balance. In step 5308, the BC may select a date range by which to limit the summaries pulled up since if the relationship has been underway a long time there could be hundreds of transactions. In step 5310, a BC may select a link such as a hyperlink, associated with each supplier account to retrieve the details of underlying Orders, Payments, and/or Credits that create the summary amounts. For example, if a BC selects Orders, then execution proceeds to step 5312, wherein information about an order is displayed such as the order date, the CEO number, the invoice date, the invoice number, the SKU, the quantity of product, the price, the amount, all add-on charges and discounts, and the total for all orders. Execution then proceeds to step 5318, wherein a BC is permitted to submit an order, and post a payment associated with a CO, and execution terminates at step 5322.

If in step 5310, the BC indicates that he would like more details about underlying payments, then execution proceeds to step 5314, wherein various information about payments is displayed such as, by way of example, the payment date, the form of payment, the payment amount, and the like. Execution then proceeds to step 5318, discussed above. If in step 5310, the BC indicates that he would like more details about credits, then execution proceeds to step 5316, wherein various information about credits is displayed such as, by way of example, the credit date, the credit number, and the status, such as whether the credit is pending, approved, denied, partially approved, or the like. Execution then proceeds to step 5320 wherein a BC may request a credit, and in step 5322 execution terminates.

Figure 54:
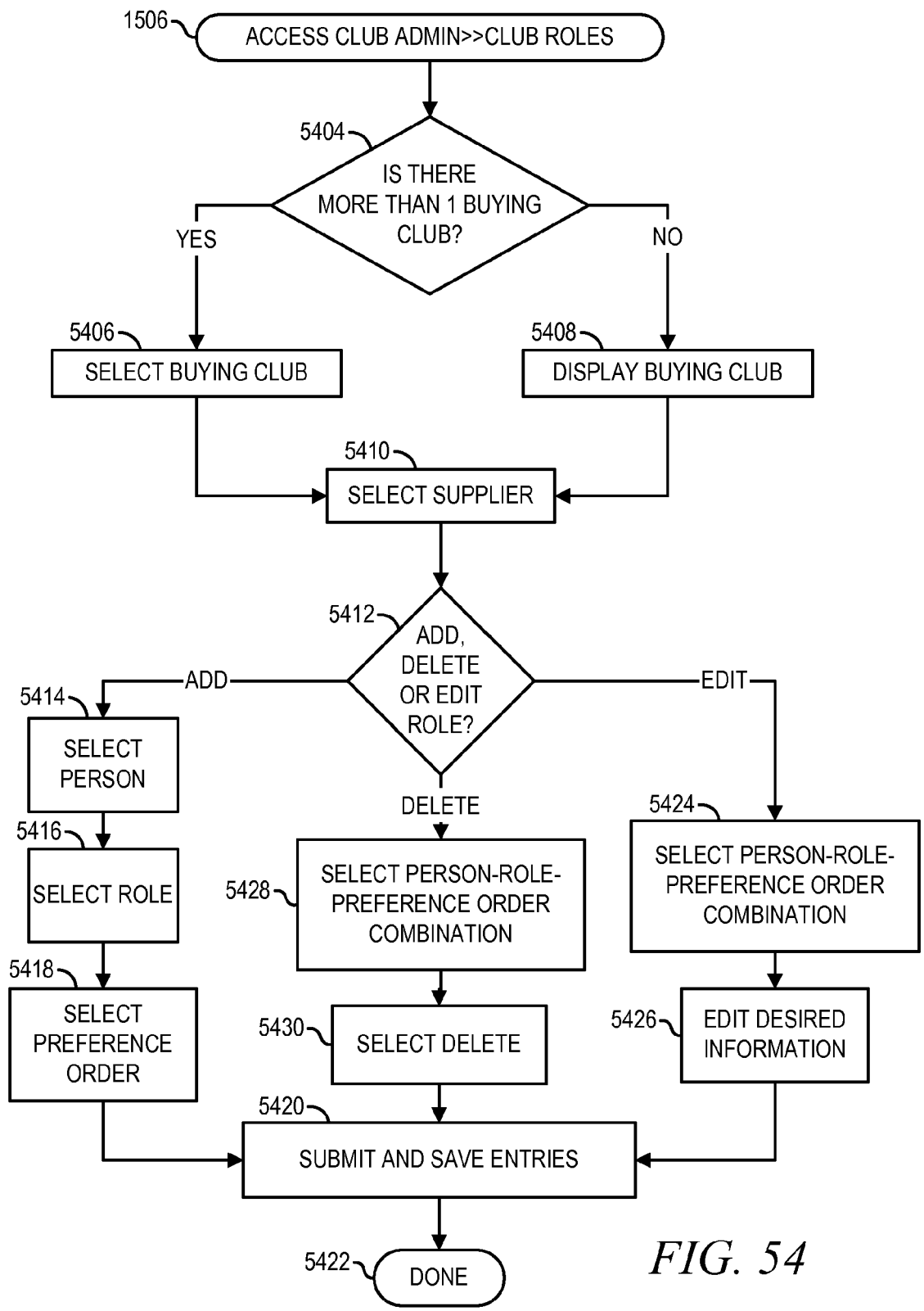
FIG. 54 exemplifies a process for enabling a Buyer Coordinator to manage club roles.

Referring now to FIG. 54, when a BC accesses Club Roles, as per step 1506, mentioned above with respect to FIG. 15, then execution proceeds to step 5404, wherein a determination is made whether the BC is a member or more than one buying club. If the BC is a member of more than one buying club, then execution proceeds to step 5406 wherein the BC selects a buying club; otherwise execution proceeds to step 5408 wherein the buying club of which the BC is a member is displayed. Following either step 5406 or 5408, execution proceeds to step 5410 wherein the BC selects a supplier. In step 5412, a BC indicates whether he would like to add, edit or delete a role (e.g., ordering, deliveries, payments, new membership, pickup, accounting, distribution, and the like) of a member of the club. If the BC indicates that he would like to add a role to a member in the club, then execution proceeds to step 5414, wherein the BC selects a person whose role is to be changed. In step 5416, the BC selects the role for the person selected in step 5414. In step 5418, the BC selects for the person selected in 5414 a preference order, e.g., for example, whether the person should be a primary contact or secondary contact. In step 5420, the BC may submit and save the entries that he has made and, in step 5422, execution of this procedure is terminated.

If, in step 5412, BC indicates that he would like to delete a role, then execution proceeds to step 5428, wherein the BC may select a person-role-preference order combination. In step 5430 the BC selects a delete function to delete the selected person-role-preference order combination, and execution then proceeds to step 5420, discussed above. If, in step 5412, a BC indicates that he would like to edit a role of a person in the club, then execution proceeds to step 5424, wherein the BC selects a person-role-preference order combination to edit. In step 5426 the BC may edit the information as he desires and, execution then proceeds to step 5420, discussed above.

Figure 55:
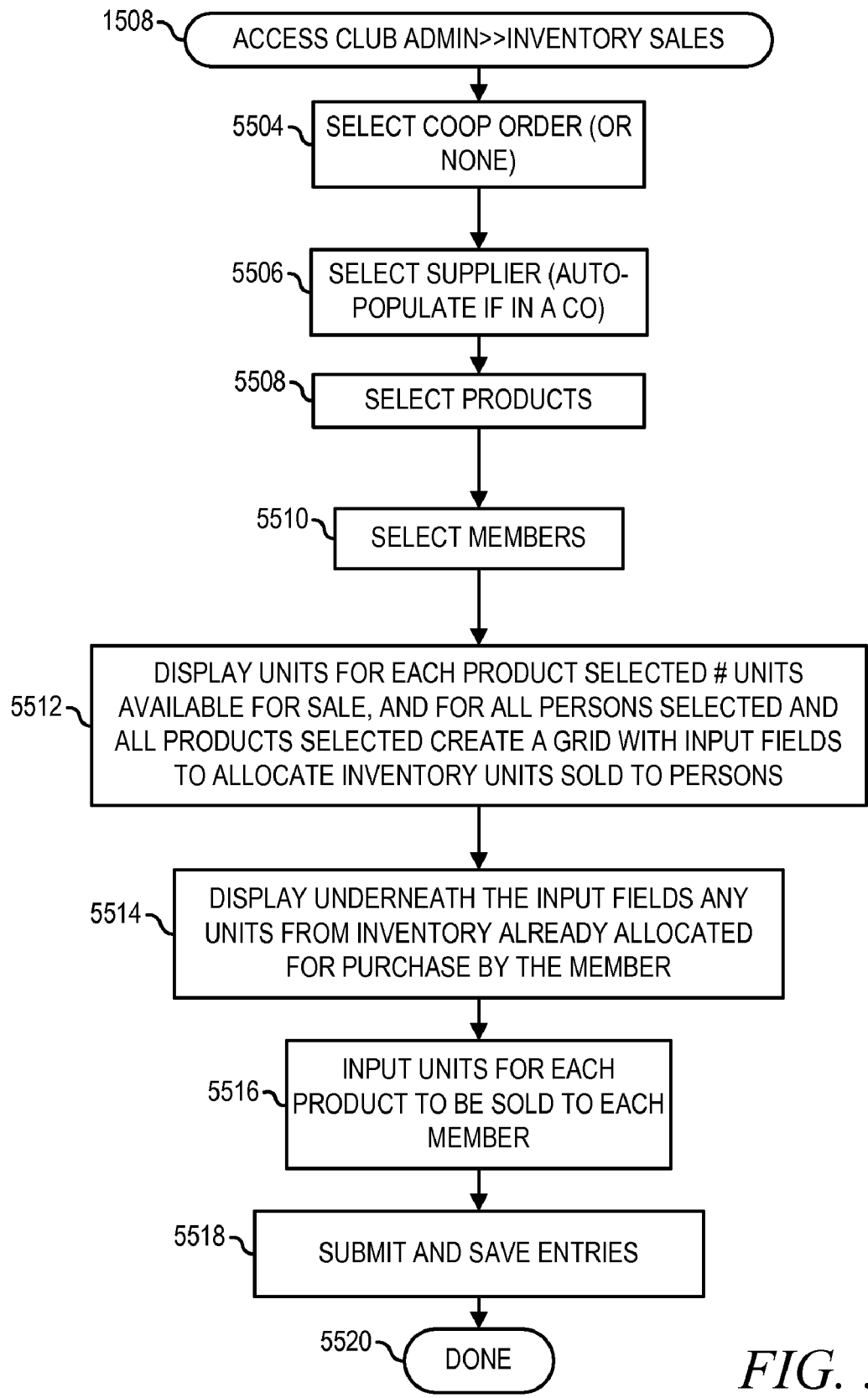
FIG. 55 exemplifies a process for enabling a Buyer Coordinator to manage inventory sales.

It is not always possible when managing pickups to record on-line the products which are sold from inventory. Accordingly it is beneficial for the BC to record which products were sold and to whom during the pickup process and then enter those into the web serve 120 and databases 124 so that the member accounts will properly reflect what was ordered. The preferable mode for recording these sales is described in FIG. 55, when a BC accesses Inventory Sales, as per step 1508 mentioned above with respect to FIG. 15. Execution then proceeds to step 5504 wherein a BC selects a coop order (or none), step 5506 wherein a BC selects a supplier which is preferably auto-populated if a CO was selected in step 5504, step 5508 wherein a BC selects products, and step 5510 wherein a BC selects members. In step 5512, for each product selected, there is displayed the number of units available for sale, and for all persons selected and all products selected, a grid is created with input fields that the BC may use to allocate inventory units sold to members. Preferably the grid is formed with persons for columns and the products in rows. Each intersection of row and column represents how many units to sell to that member. In step 5514, there is preferably displayed under the input field of step 5512, any units from inventory already allocated for purchase by the member. In step 5516, the BC may input units for each product to be sold to each member. It should be noted that if the BC wishes to reduce any units that were prior allocated to a member, then the BC may input a negative number which will subtract those units from whatever units were sold to that member. In step 5518 the BC may submit and save all entries made herein and, in step 5520, execution is terminated.

Figure 56:
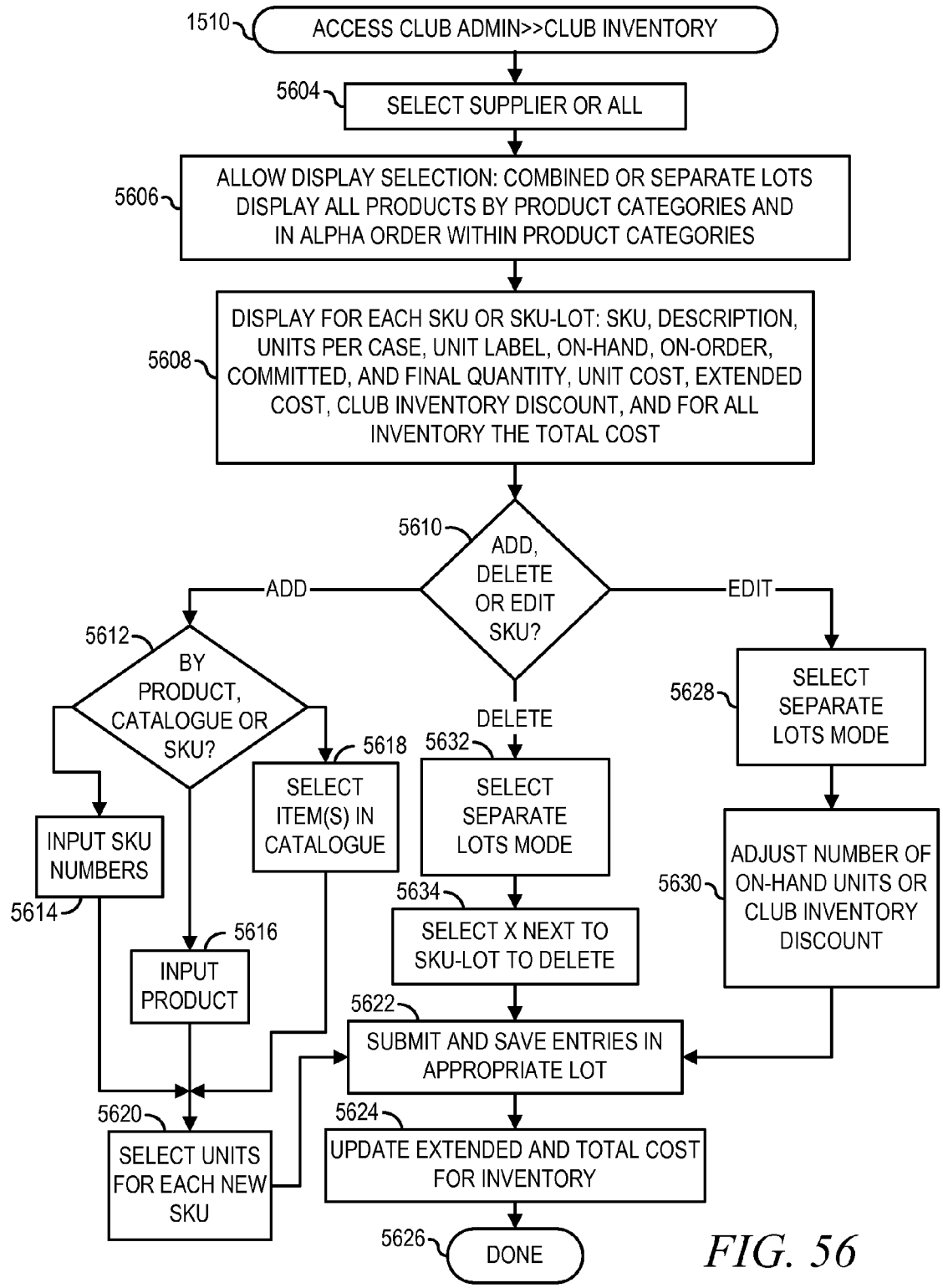
FIG. 56 exemplifies a process for enabling a Buyer Coordinator to manage club inventory.

Referring now to FIG. 56, when a BC accesses the Club Inventory function, as per step 1510 described above with respect to FIG. 15, for maintaining the inventory on hand with the buying club, then execution proceeds to step 5604, wherein a BC selects a supplier or alternatively the BC may select all suppliers. In step 5606, products may be displayed in combined lots or separate lots mode, and all products are preferably displayed by product categories and in alphabetical order within product categories. In step 5608 (combined lots mode) there is displayed the number of lots, SKU, product description, units per case, unit label, quantity on hand, quantity on order, quantity committed, final quantity, unit cost, extended cost (which equals on-hand quantity times unit cost), club inventory discount, and for all inventory displayed for the Club, the total cost.

In step 5610, a BC indicates where he would like to add, edit or delete a SKU. If the BC indicates that he would like to add a SKU then execution proceeds to step 5612, wherein a BC may identify a SKU by product (step 5616), by catalog (step 5618), or by the SKU number itself (step 5614). In step 5620, the BC selects units for each new SKU selected in any one of steps 5614, 5616, or 5618. In step 5622 the BC may submit and save entries made which then preferably update a separate new lot. In step 5624, the extended cost for the product and the total cost for inventory is updated and, in step 5626, execution herein is terminated.

If, in step 5610, a BC indicates that he would desire to edit a SKU, then execution proceeds to step 5628, wherein the BC preferably (but is not required) to select separate lots mode. In step 5630 the BC may adjust the number of on hand units, or adjust the club inventory discount, and then execution proceeds to step 5622, described above. If, in step 5610, the BC indicates that he would desire to delete a SKU, then execution proceeds to step 5632, wherein the BC preferably (but is not required) to select separate lots mode. In step 5634, the BC selects a delete icon (such as an X for the row) next to the SKU lot (or SKU if in combined lots mode) to be deleted, and execution then proceeds to step 5622, described above.

Figure 57:
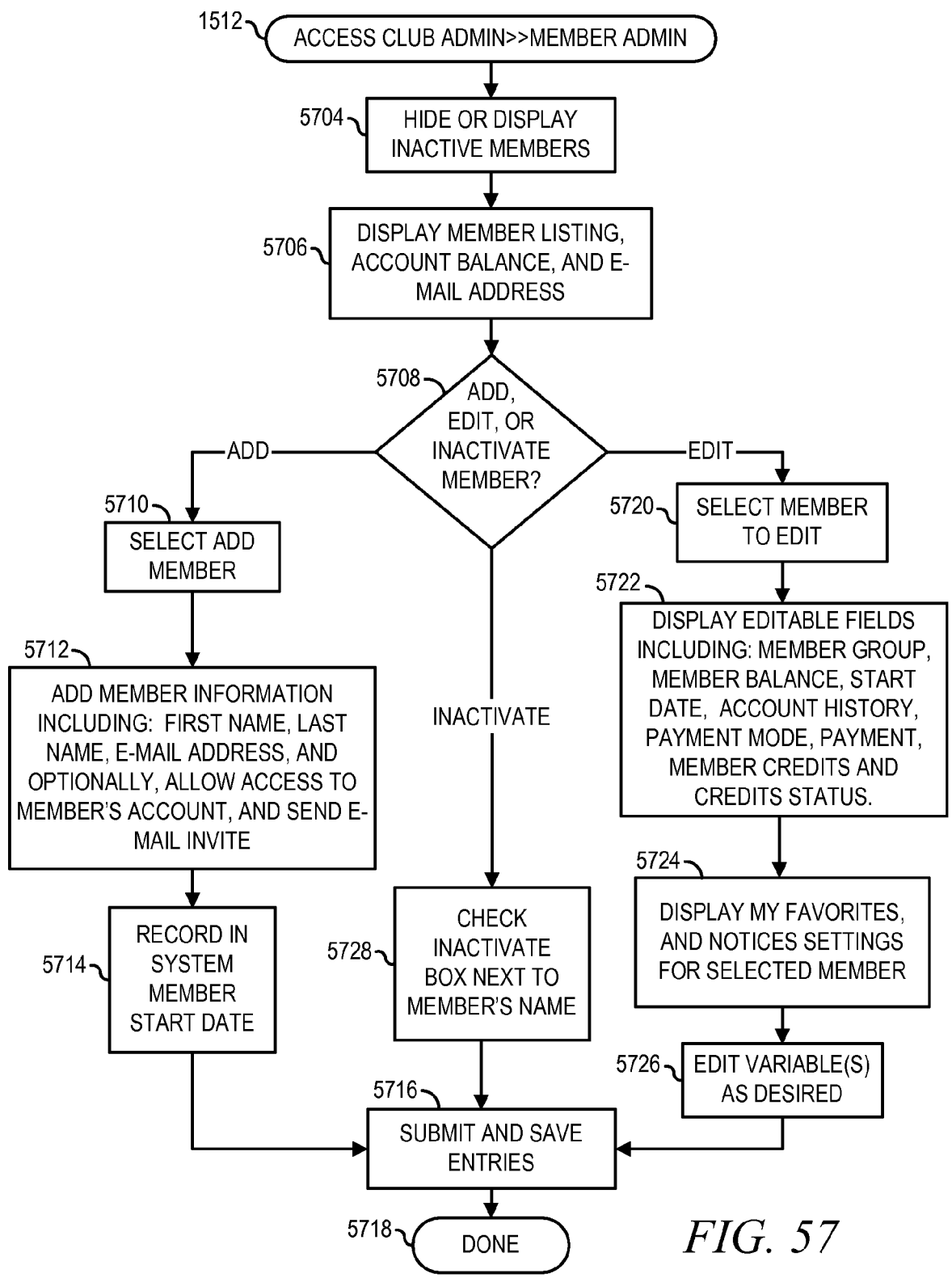
FIG. 57 exemplifies a process for enabling a Buyer Coordinator to manage member data.

Referring now to FIG. 57, when a BC accesses Member Admin, as per step 1512 mentioned above with respect to FIG. 15, then execution proceeds to step 5704, wherein the BC may change the setting for indicating whether inactive members should be included on the screen listing of members or not from wherever it was previous set. In step 5706, a member listing is preferably displayed, including the account balance and e-mail address of each member listed. In step 5708, a BC indicates whether he would like to add, edit or inactivate any members. If the BC indicates that he would like to add a member, then execution proceeds to step 5710, wherein the BC makes a selection to add a member, and in step 5712, member information is added such information including by way of example, the members first name, last name, email address, and optionally, whether the member is allowed access to his account, and to send an e-mail invite. In step 5714, the member start date is preferably recorded, which start date is preferably the current date. In step 5716, the entries made by the BC herein are submitted and saved, and in step 5718, execution is terminated.

If in step 5708, the BC indicates that he would desire to edit member information, then execution proceeds to step 5720, wherein the BC selects the member whose information he would desire to edit. In step 5722, editable fields are displayed including, by way of example, member group, member balance, start date, account history, payment mode, payment, member credits, credit status, and the like. In step 5724, the "My Favorites" and "Notices" settings for the selected member are displayed but are preferably not editable unless the BC has been provided with access rights to this member's account. In step 5726, the BC may edit the information as desired, and execution then proceeds to step 5716, described above. If, in step 5708, a BC indicates that he would desire to inactivate a member, then execution proceeds to step 5728, wherein a BC may check a check box to indicate that the member is to be inactivated. Execution then proceeds to step 5716, described above.

Figure 58:
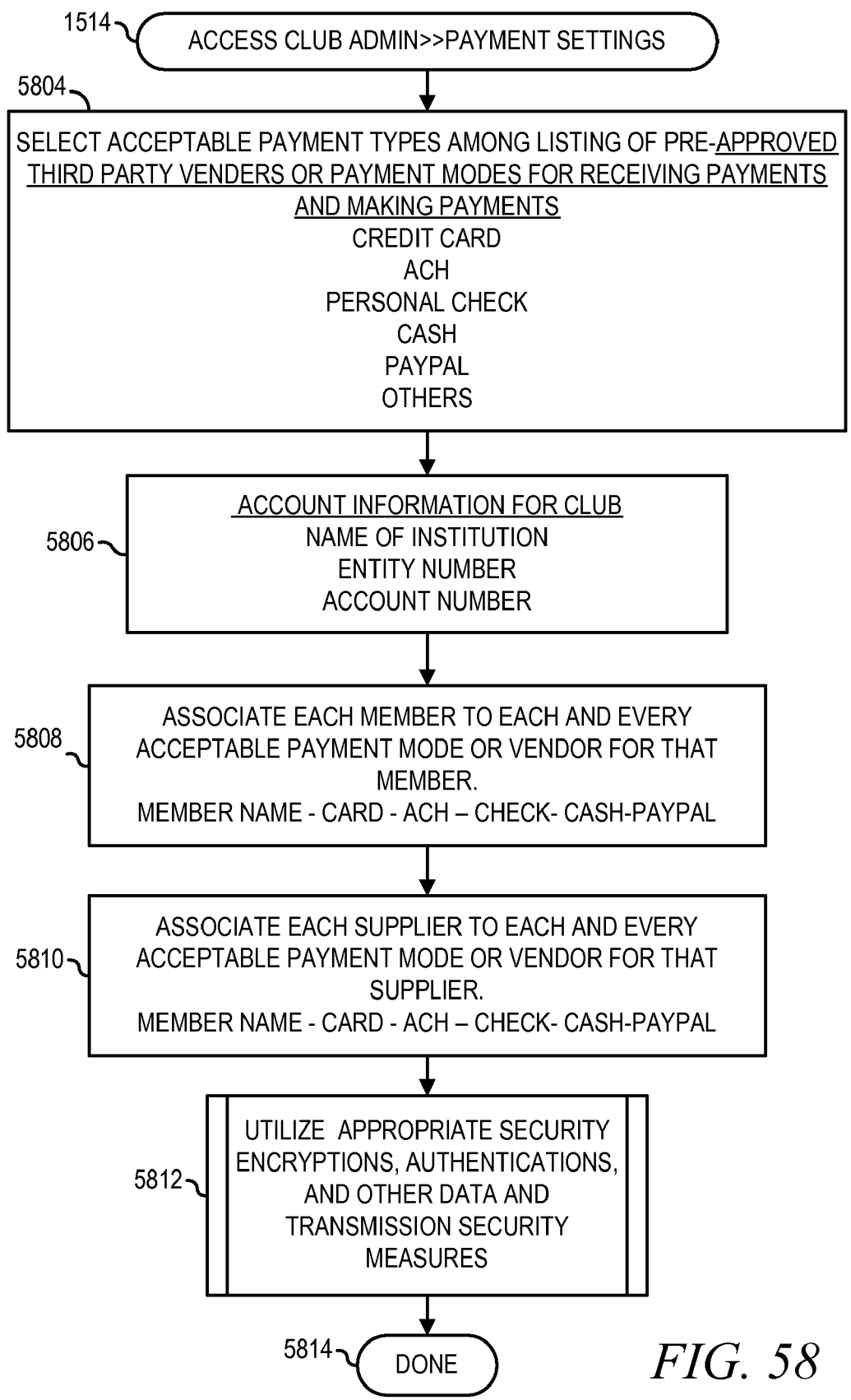
FIG. 58 exemplifies a process for enabling a Buyer Coordinator to manage club payments.

Referring now to FIG. 58, when a BC accesses Payments, as per step 1514 discussed above with respect to FIG. 15, then execution proceeds to step 5804, wherein a BC may select acceptable payment types from a list of pre-approved third party vendors or payment modes for receiving payments and making payments such as, by way of example, credit cards, ACH, personal check, cash, PayPal, and the like. In step 5806, account information for the club may be entered, such information including, by way of example, the name of the institution where the account is being held, the entity number, the account, and the like. In step 5808, each member is associated with each and every acceptable payment mode or vendor for that member. For example, a member may be associated with a credit card, ACH, check, cash, and/or Paypal. In step 5810, each supplier is associated with each and every acceptable payment mode or vendor for making payment to that supplier. For example, a supplier may be accept a credit card, ACH, check, cash, and/or PayPal as suitable payment modes. In step 5812, appropriate security encryptions, authentications, and other data and transmission security measures are utilized to protect information being transmitted herein and, in step 5814, execution is terminated.

Figure 59:
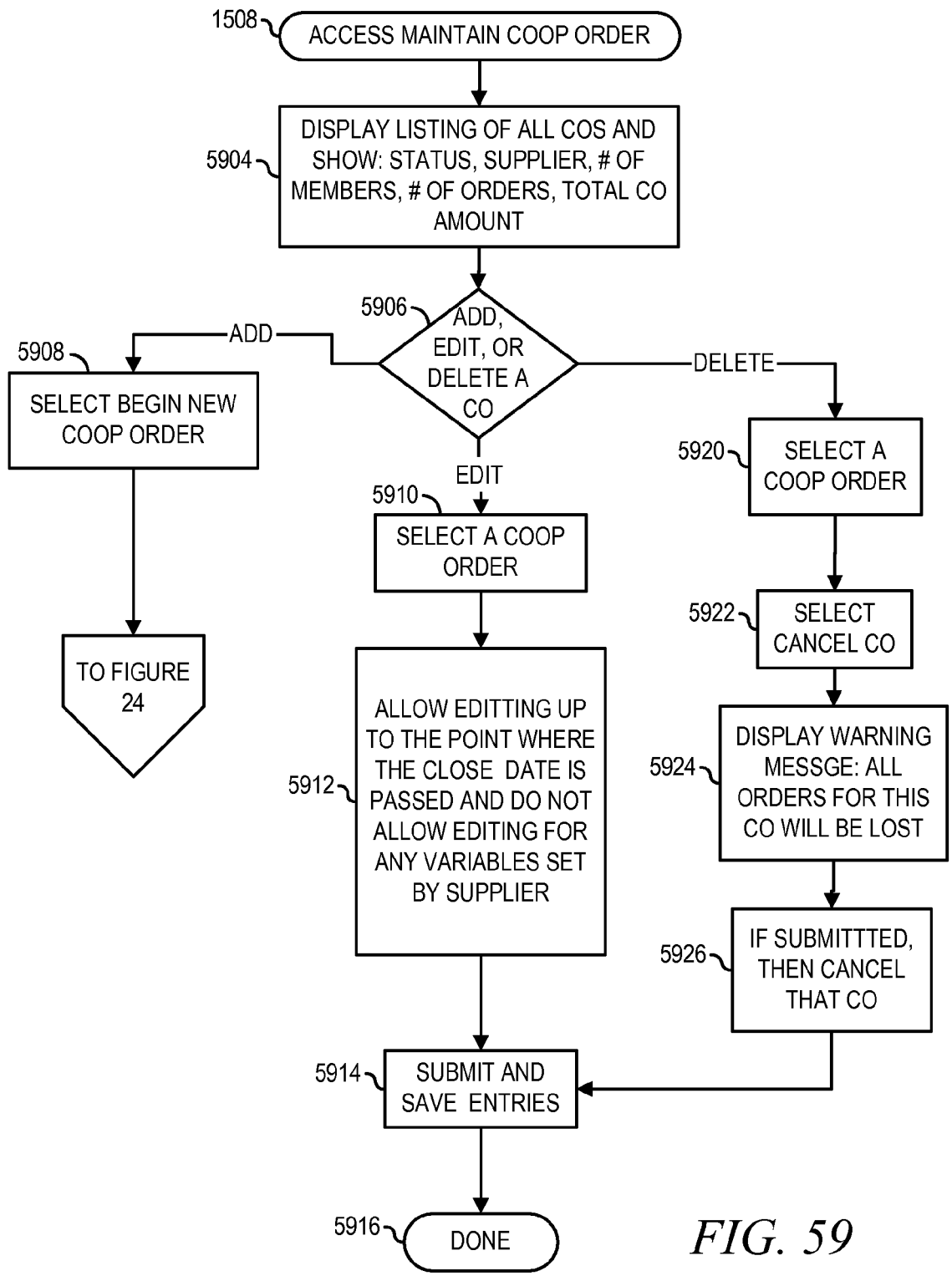
FIG. 59 exemplifies a process for enabling a Buyer Coordinator to maintain coop orders.

Referring now to FIG. 59, wherein a BC accesses, via step 1602, mentioned above with respect to FIG. 16, the area termed maintain coop order, then execution proceeds to step 5904, wherein a listing of all COs is displayed, preferably including for each CO, the status, supplier, number of members, number of orders, total CO amount, and the like. In step 5906, the BC indicates whether he would desire to add, edit or delete a CO. If, in step 5906, the BC indicates a desire to add a new CO, then execution proceeds to step 5908, wherein the BC makes a selection to begin a new CO, and execution then continues with step 2404, described above with respect to FIG. 24. If, in step 5906, a BC indicates a desire to edit a CO, then execution proceeds to step 5910, wherein a BC selects a CO to edit. In step 5912, the BC may generally edit the information in a CO until the close date has passed. However variables which may be established and maintained by a supplier who has assumed control over such dates and times, such as the delivery point if the supplier is maintaining full control over delivery points and truck routes, are not editable by the BC. In step 5914, entries made herein may be submitted and saved and, in step 5916, execution is terminated.

If, in step 5906, a BC indicates a desire to delete a CO, then execution proceeds to step 5920, wherein a BC makes a selection of a CO to delete. And, in step 5922, the BC may select a function to delete (which is preferably termed cancel) the CO. In step 5924, a warning message is displayed to the BC indicating that all orders for this CO will be lost. If, in step 5926, the deletion is submitted, then the CO is canceled and all orders and dates and times and other information for the CO is deleted. Execution then proceeds to step 5914, discussed above.

Figure 60:
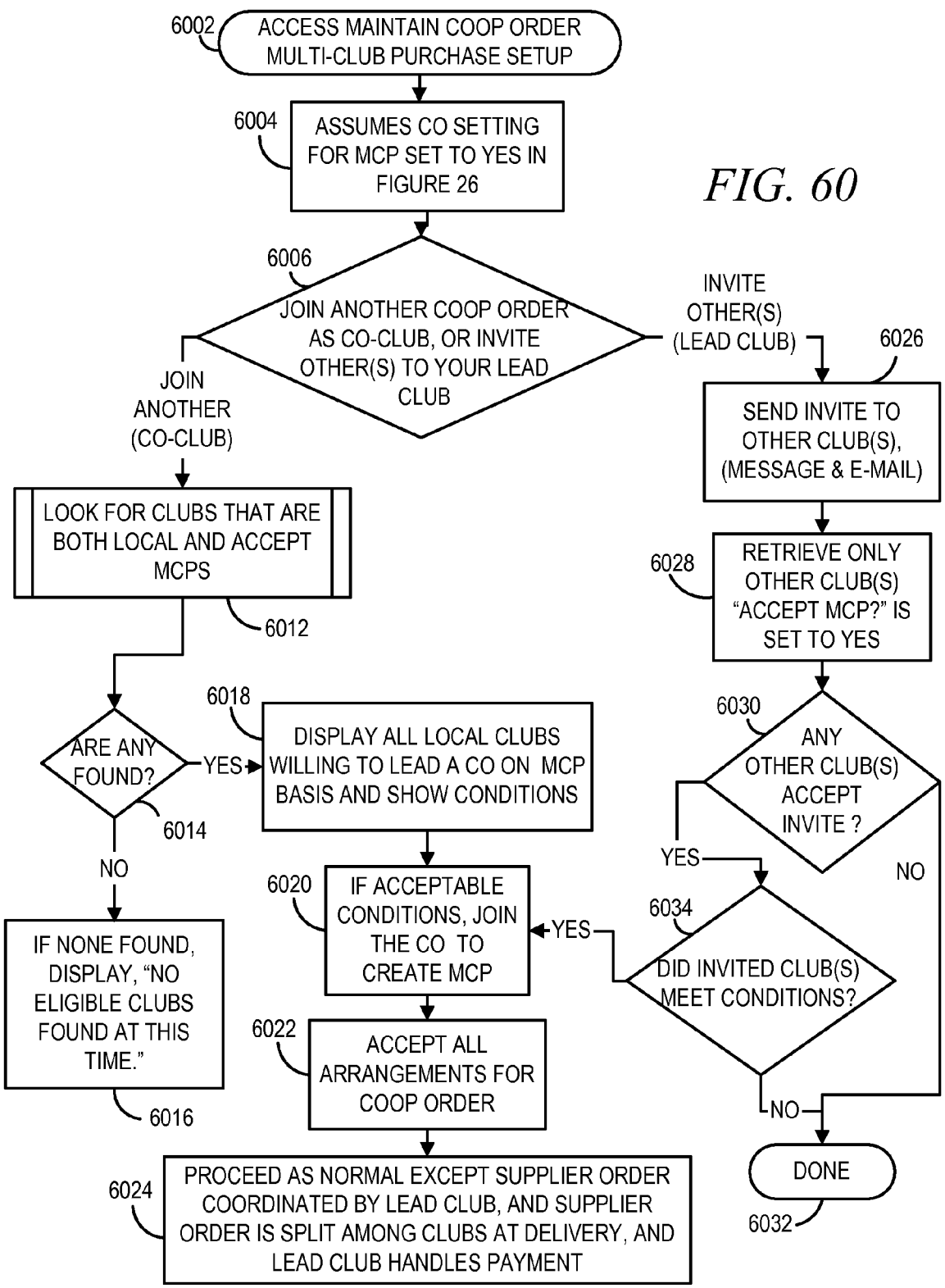
FIG. 60 exemplifies a process for enabling a Buyer Coordinator to manage a multi-club purchase setup.

Referring now to FIG. 60, as per the CO Setting established in FIG. 26, step 2620, a BC may establish a CO as part of a multi-club purchase (MCP). It is noted, in step 6004, that to proceed with an MCP, the CO setting for MCP is set per step 2620 of FIG. 26 to "YES". In step 6006, a BC indicates whether he would like to join his CO to the CO of another buying club, or whether he would like to invite other buying clubs to join with his CO. If the BC indicates that he would like to join another buying club, as a co-club, then execution proceeds to step 6012, wherein the BC looks for clubs that are both local and that accept MCPs. In step 6014, a determination is made as to whether any other buying clubs are found. If no other buying clubs are found, then execution proceeds to step 6016, wherein a message is displayed indicating that no eligible clubs have been found at this time, and execution is terminated. If, in step 6014, there are other buying clubs, then execution proceeds to step 6018, wherein there is displayed a list of all local buying clubs willing to lead a co-op order on a MCP basis, and also conditions are shown by which each club would be willing to do that. In step 6020, if the conditions are acceptable, then the BC may join the CO to create an MCP, and in step 6022, the BC accepts all arrangements for a CO. In step 6024, the BC proceeds as normal, except that a supplier order is coordinated by the lead club, and the supplier order is split among clubs at delivery, and the lead club handles supplier payment and supplier credit request issues.

If, in step 6006, the BC indicates that he would prefer to invite others to join his buying club, then execution proceeds to step 6026, wherein the BC sends an invite to other clubs to join, such invite being, for example, a message, an e-mail, or the like. In step 6028, the BC retrieves a list of other clubs who have indicated that they would accept an MCP, as discussed above in FIG. 26. In step 6030, a determination is made as to whether any other clubs would accept an invite. If no other club were to accept an invite, then execution terminates at step 6032; otherwise, if any other club would accept an invite, then execution proceeds to step 6034, wherein a determination is made as to whether invited clubs would meet conditions for this buying club to join this buying club as an MCP. If the conditions are not met, then execution is terminated at step 6032; otherwise, execution proceeds to step 6020, discussed above.

Figure 61:
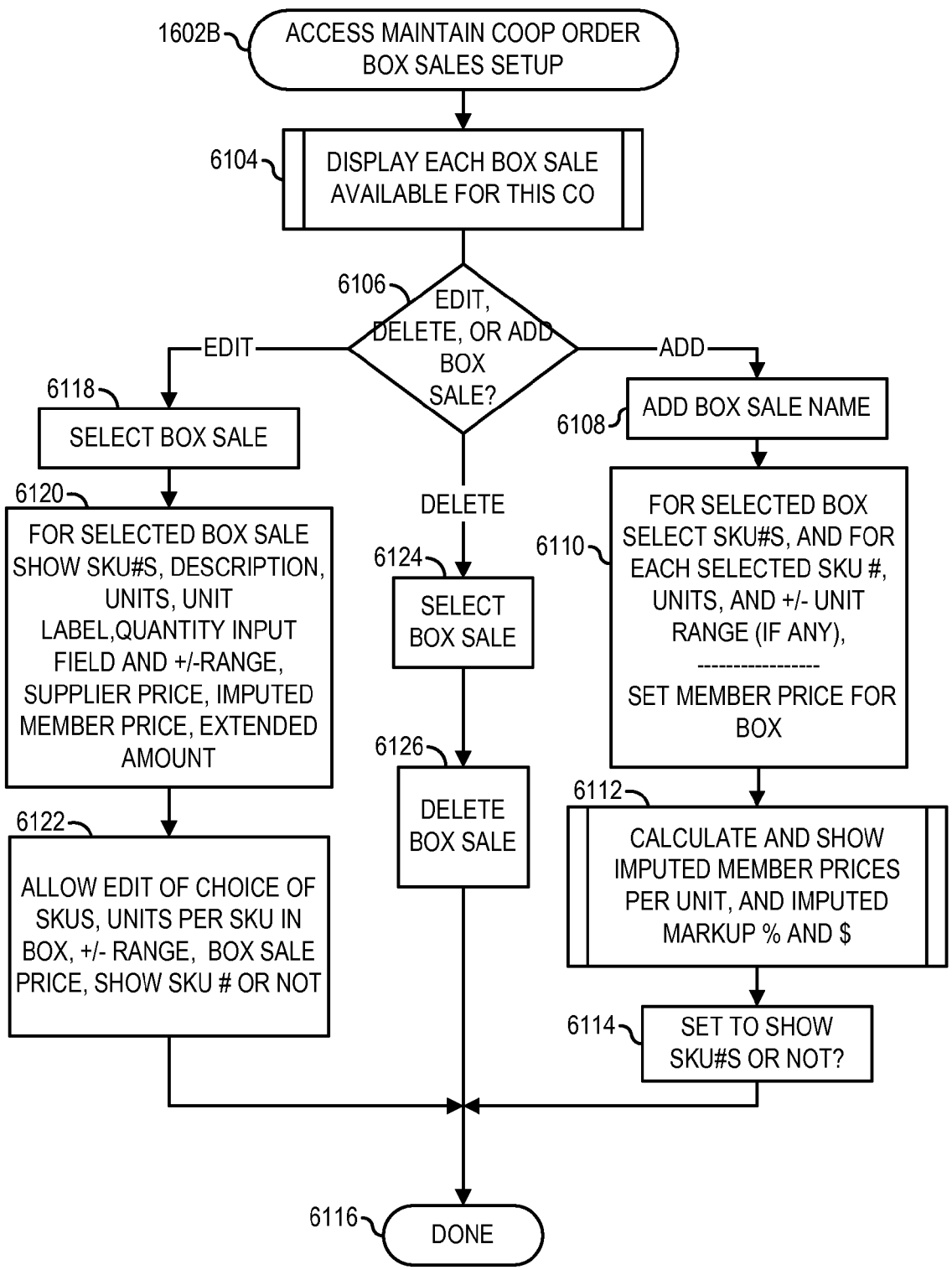
FIG. 61 exemplifies a process for enabling a Buyer Coordinator to set up box sales.

Referring now to FIG. 61, as per the CO Setting established in FIG. 26, step 2618, a BC may offer to members a Box Sale along with all the other products offered in the CO. A Box Sale is a pre-packaged collection of assorted items sold as a (mostly) indivisible single unit. For example a Box Sale might consist of 20 apples, 2 cantaloupe, 4 lbs of oranges, and 2 heads of lettuce all for $12, which might be called "Topps Fresh Produce". As denoted in step 6104, each pre-existing box sale name (eg Topps Fresh Produce) that is available for this CO is displayed. In step 6106, the BC indicates whether he would like to edit, delete or add a box sale. The BC then adds a box sale as denoted in step 6108. In step 6110, for the selected box sale, the BC selects SKU numbers, units, and unit range (if any), the member price for a box, and the like. In step 6112, the member price for the box is then entered, and the associated mark-up percentage and allocated (ie imputed) prices to each of the component box sales products are then calculated and displayed. In step 6114, the BC indicates whether or not the SKU #s should be displayed because it is possible that he/she may preferably wish to just show the descriptive names and unit quantities and unit labels. Then in step 6116, execution is terminated.

If, in step 6106, a BC indicates that he would desire to edit a box sale, then execution proceeds to step 6118, wherein the BC selects a box sale. In step 6120, for the selected box sale, there is displayed the SKU numbers, the description, units, unit label, quantity input field (and range if any), the supplier price, the member price, the imputed markup, and the like. In step 6122, the BC is permitted to edit his choice of SKUs, the units per SKU in a box, the range of units per SKU in a box, the box sale price, and whether or not the SKU number is displayed. Execution is then terminated at step 6116. If, in step 6106, a BC indicates that he would desire to delete a box sale, then execution proceeds to step 6124, wherein the BC selects a box sale. In step 6126, the BC deletes the box sale, and execution is terminated at step 6116.

Figure 62:
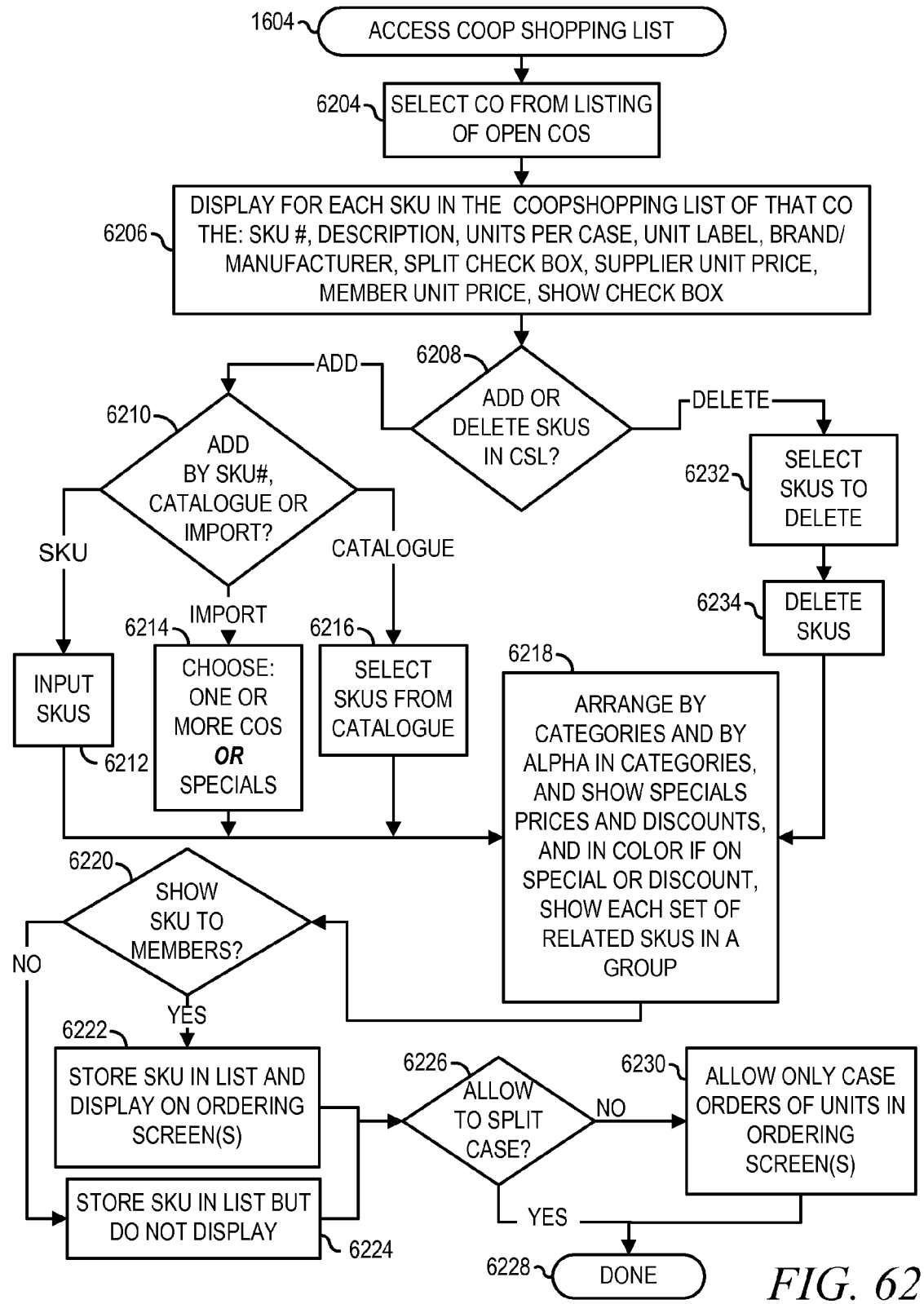
FIG. 62 exemplifies a process for enabling a Buyer Coordinator to manage a coop shopping list.

Referring now to FIG. 62, if a BC accesses the Coop Shopping List, as per step 1604 discussed above with respect to FIG. 16, then execution proceeds to step 6204, wherein the BC selects a CO from a list of open COs. In step 6206, there is displayed for each SKU in the Coop Shopping List, the SKU number, description, units per case, unit label, the brand and manufacturer, whether a case may be split, the supplier unit price, the member unit price, and whether the SKU may be displayed, and the like. In step 6208, a BC indicates whether he would like to add or delete SKUs to the Coop Shopping List (CSL). If the BC indicates that he would like to add a SKU to the CSL, then execution proceeds to step 6210, wherein a BC indicates whether he would like to add a SKU by SKU number, or by reference to a catalog, product, or import a CSL (ie append) from another CO. If the BC indicates that he would like to add a SKU number directly, then execution proceeds to step 6212, wherein the BC enters one or more SKU numbers, depending on how many SKUs that BC has elected to enter at once. If the BC indicates that he would like to select a SKU from the catalog, then execution proceeds to step 6216, wherein the BC selects a SKU from a catalog. If, in step 6210, the BC indicates that he would like to import a CSL from another CO or from specials, then execution proceeds to step 6214, wherein the BC selects a SKU from one or more COs or specials lists (specials lists are preferably designated by product category and have the attendant search and list defining capabilities that were described above).

In step 6218, SKUs are arranged by category and within categories, alphabetically. Specials prices and discounts are preferably displayed in color. Each set of related SKUs are preferably displayed by group. In step 6220, the BC indicates whether SKUs should be displayed to members. If the BC indicates that SKUs should be displayed to members, then execution proceeds to step 6222, wherein the SKU is stored in a list and displayed on ordering screens. If, in step 6220, the BC indicates that the SKUs should not be displayed to members, then execution proceeds to 6224, wherein the SKU is stored in a list, but not displayed. Subsequent to execution of either step 6222 or 6224, execution proceeds to step 6226, wherein the BC indicates whether a case may be split. If the BC indicates that a case may be split, then execution is terminated in step 6228. If the BC indicates that a case may not be split, then execution proceeds to step 6230, wherein only case orders of units are displayed on the ordering screens for members. Execution is then terminated in step 6228.

If, at step 6208, a BC indicates that he would like to delete a SKU from a CSL, then execution proceeds to step 6232, wherein the BC selects the SKUs to delete. In step 6234, the BC deletes the selected SKUs, and execution proceeds to step 6218, discussed above. A check box mode is preferred for accomplishing deletes wherein boxes may be checked and then in one key stroke all SKUs with checked boxes are deleted. Similarly a select all/deselect all capability is preferably offered attendant with the delete function.

Figure 63:
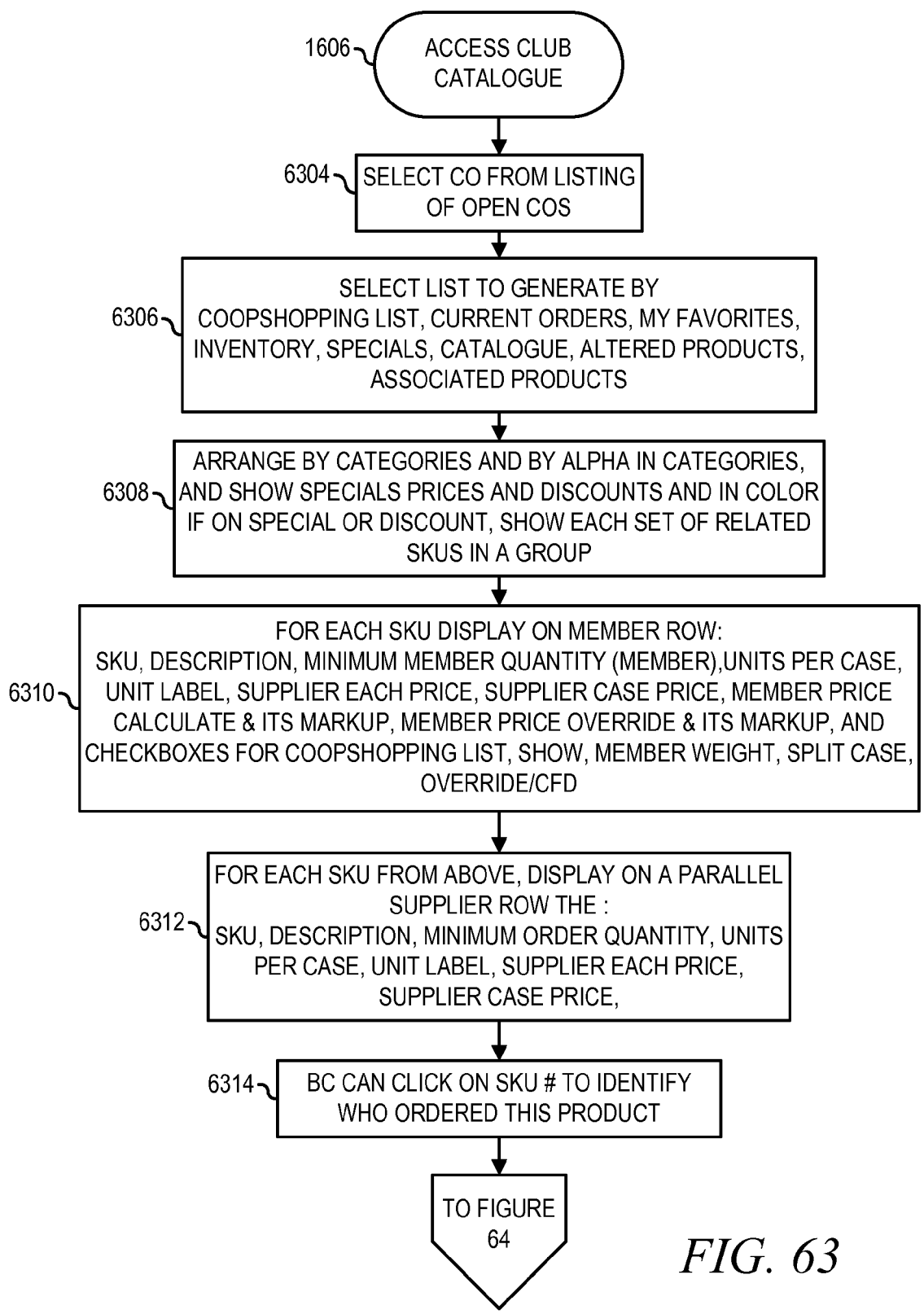
FIGS. 63-64 exemplifies a process for enabling a Buyer Coordinator to manage a club catalogue.

Referring now to FIG. 63, when a BC accesses the Club Catalog, per step 1606 mentioned above with respect to FIG. 16, then execution proceeds to step 6304, wherein a BC selects a CO from a list of open CO's. In step 6306, the BC selects a list to be generated by the Coop Shopping List, current orders, by the "My Favorites" list for all club members, inventory, specials, catalog, altered products, associated products, and/or the like whereupon the list is next generated. In step 6308, products are preferably displayed by categories and, within categories, alphabetically. Specials prices and discounts may also be displayed, and products that are on special or display are preferably displayed in color. Each set of related SKUs in a group are also displayed. In step 6310, for each SKU, there is displayed on a member row: the SKU, description, minimum member quantity (member), units per case, unit label, the supplier price per unit, the supplier price per case, the calculated member price and mark-up, the member price override and mark-up, and check boxes for indicating the co-op shopping list (whether to show), member weight (as per random weight from the supplier), whether the cases can be split, and override/CFD. In step 6312, for each SKU from the foregoing, there is displayed on a parallel supplier row, the SKU, description, minimum order quantity, units per case, unit label, supplier price for each unit and supplier price for each case, and the like. In step 6314, the BC may click on a SKU number to identify who has ordered the product represented by the SKU.

Figure 64:
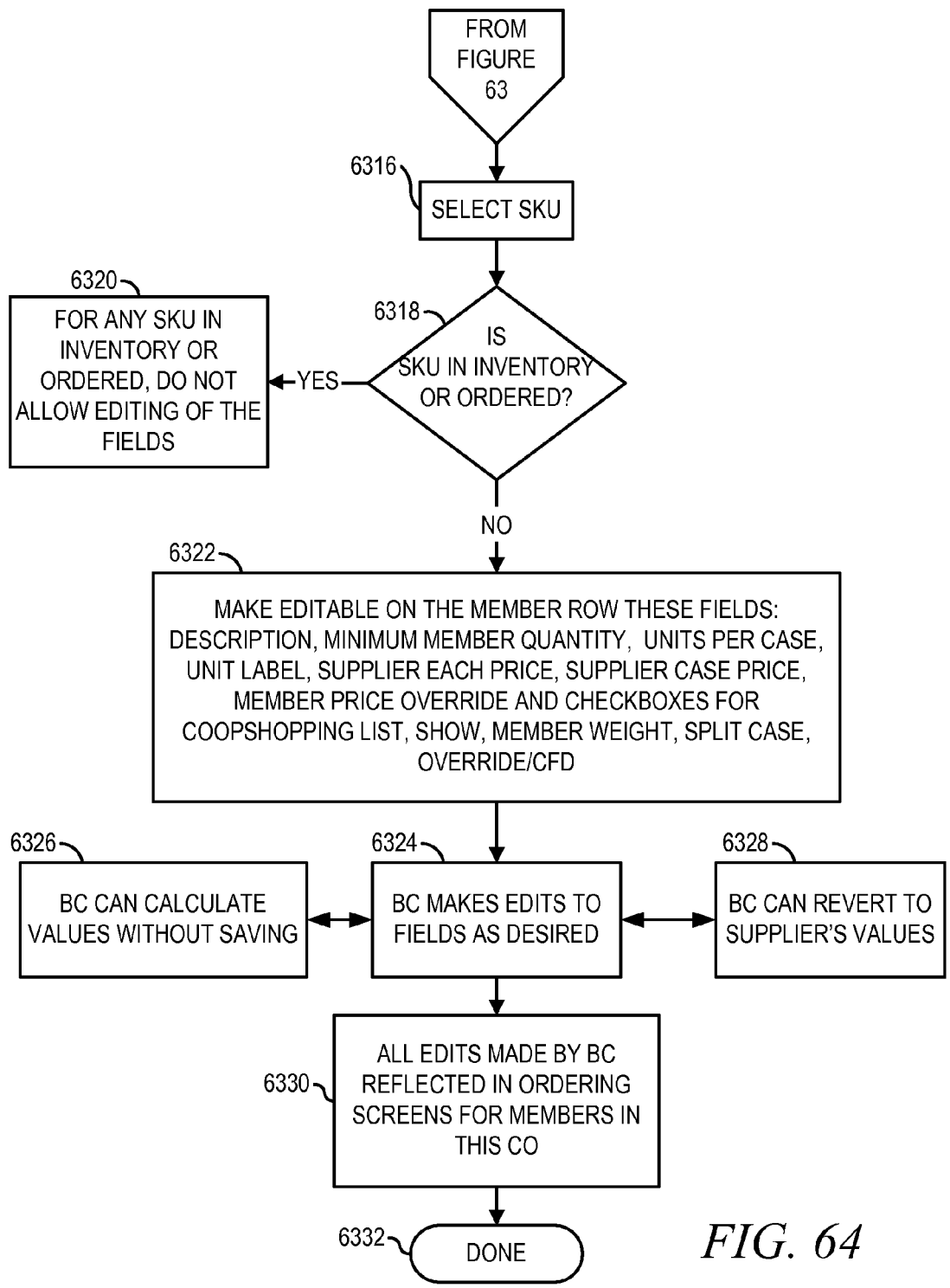

Continuing in FIG. 64, at step 6316, the BC selects a SKU. In step 6318, a determination is made as to whether the SKU is in inventory or has been ordered. If it is determined that it is in inventory or has been ordered, then execution proceeds to step 6320, wherein for any SKU in inventory or ordered, no editing of fields related thereto is allowed, and execution terminates. If, in step 6318, it is determined that the selected SKU is not in the inventory and not ordered, then execution proceeds to step 6322, wherein a number of fields are made editable on the member row, such fields including, by way of example, the description, minimum member quantity, units per case, unit label, supplier, price for each unit, supplier price per case, the member price override, and check boxes for indicating the co-op shopping list, whether to show, the member weight, whether the case may be split, the override/CFD, and the like. In step 6324, the BC makes edits to fields as desired. While making edits, in step 6326, a BC may calculate values without saving them, and/or, in step 6328, he may also revert to supplier values as default values. In step 6330, all edits made by the BC are reflected in ordering screens for members in the CO, and execution is terminated in step 6332.

Figure 65:
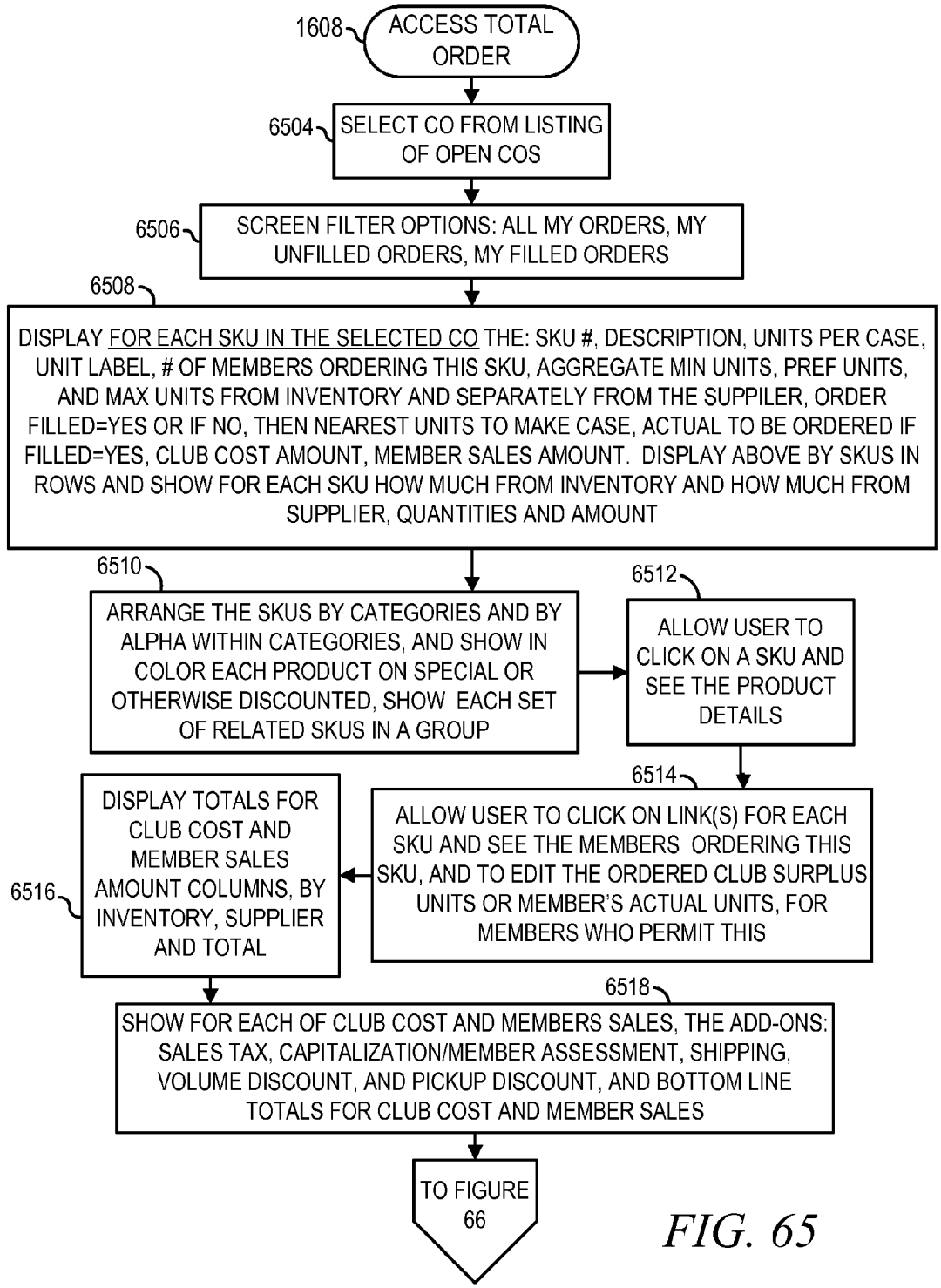
FIGS. 65-66 exemplify a process for enabling a Buyer Coordinator to manage total orders.

Referring now to FIG. 65, when a BC accesses Total Order, per step 1608 discussed above with respect to FIG. 16, then execution proceeds to step 6504, wherein the BC selects a CO from a list of open COs. In step 6506, a BC is given the option to filter the list by All SKUs, Filled SKUS Only, or Unfilled SKUs only. In step 6508, there is displayed, for each SKU in the selected CO, the SKU number, description, units per case, unit label, number of members ordering this SKU, the aggregate minimum units, the preferred units, and maximum units, the status as to whether the order is filled or, if the order is not filled, then the nearest number of units that would be required to make case (whether up or down), the actual number to be ordered if the order is filled, the club cost amount, the member sales amount, and the like. There is also displayed for each SKU, how much of the product is from the inventory and how much is from the supplier, including both the quantities and the amount. In step 6510, the SKUs are arranged by categories and, within categories, alphabetically. Each product which is on special or otherwise discounted, is preferably shown in color. Each set of related SKUs in a group is also displayed preferably highlighted in a box. In step 6512, the BC is permitted to click on a SKU and view details about the product represented by the SKU to obtain the same information for this SKU as would appear in the SKU Allocation screen for the BC. In step 6514, a BC may click on a link for each SKU and view the members that have ordered this SKU, and edit the ordered club surplus units or a member's actual units, for members who permit this as would be afforded by viewing the same product in the SKU Allocation screen for the BC. In step 6518, there is displayed for each of club cost and member sales: add-ons such as, by way of example, sales tax, capitalization and member assessment, shipping, volume discount, pickup discount, and the consolidated totals for club costs and member sales from inventory and from the supplier and the grand totals for costs from the supplier and from inventory and for amounts the members for the supplier provided products and for the products sourced from inventory, and the like. Execution for Total Order then proceed to FIG. 66.

Figure 66:
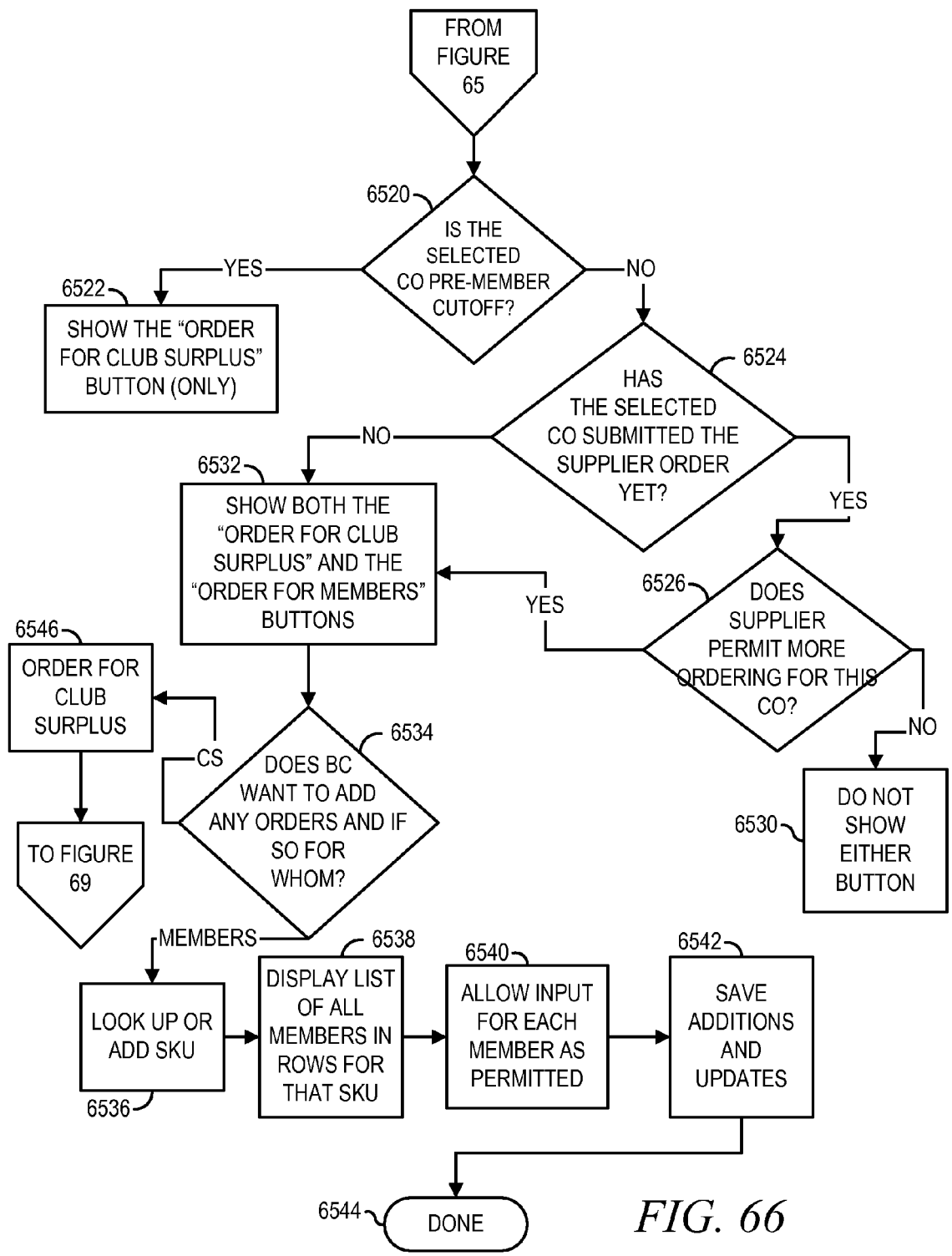

In FIG. 66, at step 6520 a determination is made whether the selected CO is in the period preceding the member cutoff. If it is pre-member cutoff, then execution proceeds to step 6522 wherein the BC is enabled to order products for club surplus (only). If the member order cutoff has passed, then in step 6524 a determination is made as to whether the supplier order for the selected CO has been submitted yet. If the supplier order for the selected CO has been submitted, then execution proceeds to step 6526, wherein a further determination is made as to whether the supplier will permit more ordering for this CO even after the supplier order has been submitted. If the supplier does permit more ordering, then execution proceeds to step 6532, with the subsequent process described below.

If, in step 6526, the supplier does not permit additional orders after the supplier order has been submitted, then execution proceeds to step 6530, wherein the BC is not permitted to order anything further from the supplier. If, in step 6524, the selected CO has not submitted the supplier order, then execution proceeds to step 6532, wherein the BC is permitted to order for the club surplus and/or for individual members. In step 6534, the BC has the option of adding orders for either the Club Surplus and for members. If the BC wants to add orders for members, then execution proceeds to step 6536, wherein the BC may look up or add a SKU. In step 6538, there is displayed a list of all members in rows for that SKU. In step 6540, the BC is allowed to input for each member as permitted. In step 6542, any additions and updates made by the BC may be saved. Execution is then terminated in step 6544. If, in step 6534, the BC wants to add orders for club surplus, then execution proceeds to step 6546, wherein the BC may order for club surplus, as discussed further below with respect to FIG. 69.

Figure 67:
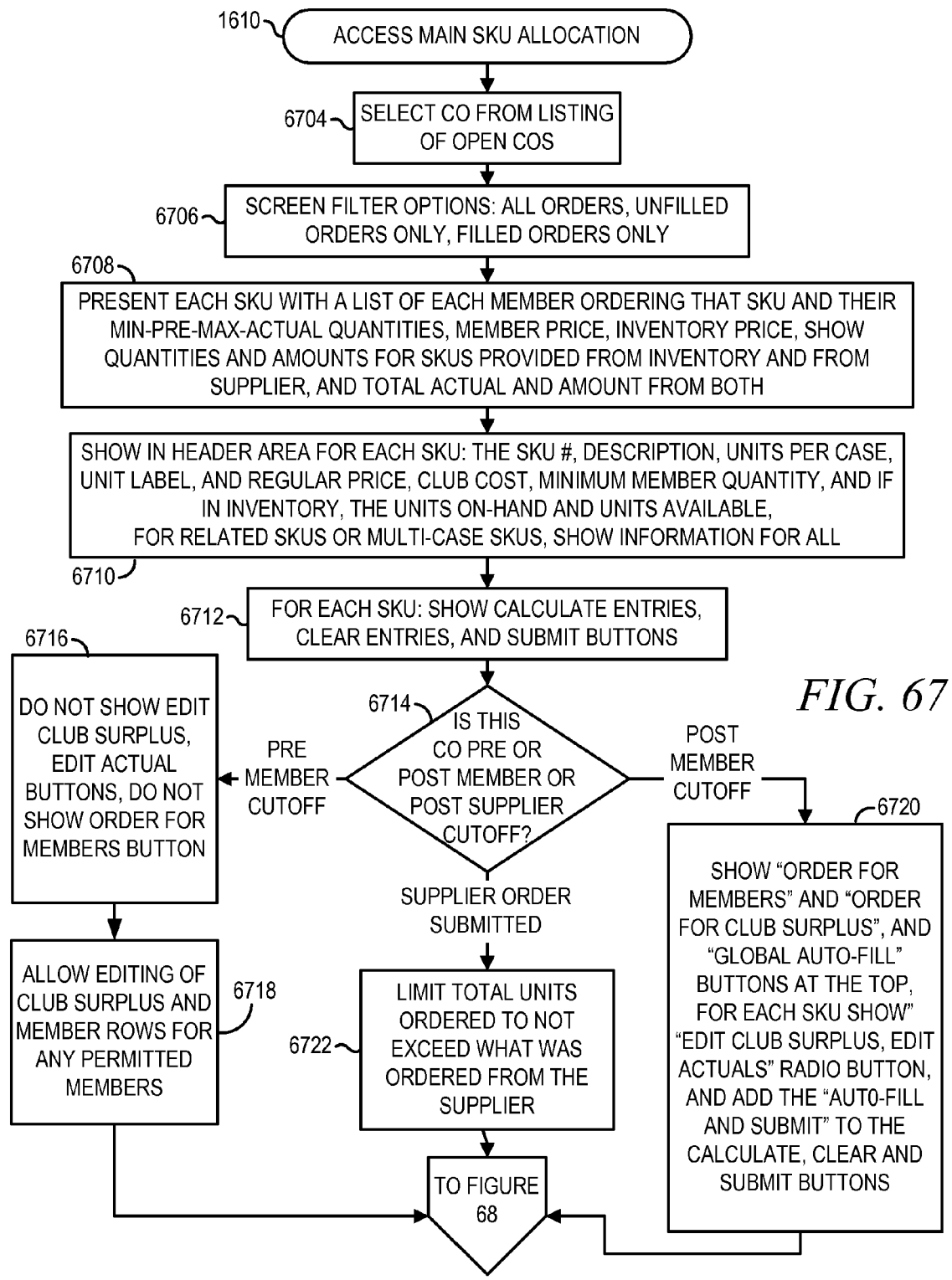
FIGS. 67-68 exemplifies a process for enabling a Buyer Coordinator to manage SKU allocations.

Referring now to FIG. 67, when a BC accesses the Main SKU Allocation screen, as per step 1610 mentioned above with respect to FIG. 16, execution proceeds to step 6704, wherein a BC selects a CO from a list of open CO's. In step 6706, the SKUs to be listed may be filtered to All Order, Unfilled Orders Only, or Filled Orders Only. After selecting the filter or allowing the default selection to execute, a listing of SKUs of the desired filter condition is preferably generated for the selected CO.

As described above previously in detail with respect to the Main SKU Allocation screen in step 1610, in step 6708 each SKU is presented with a list of each member ordering that SKU and that member's minimum, preferred, maximum, and actual quantities, the member price, the inventory price, and quantities and amounts are displayed for SKUs provided from inventories and from suppliers, and total actual and amount from both. In step 6710, there is displayed in the header area for each SKU, the SKU number, description, units per case, unit label, and regular price, club cost, minimum member quantity and, if in inventory, the units on hand and units available for related SKUs or multi-case SKUs, and information is displayed for all. In step 6712, for each SKU, there are displayed three functions termed, Calculate Entries and Clear Entries, and Submit Entries, preferably invoked by buttons. In step 6714, a determination is made as to whether the CO is in the pre-member, post-member, or post-supplier cutoff period. If it is determined that the CO is in the pre-member cutoff period, then execution proceeds to step 6716, wherein the BC is disabled from editing club surplus, editing actual quantities, or ordering for individual members. In step 6718, the BC is permitted only to edit club surplus unit quantities and the member actual fields for any members who permit ordering for them by the BC.

If, in step 6714, it is determined that the subject CO is in a post-member cut-off period, then execution proceeds to 6720, wherein the BC may order for members and for club surplus. An "Auto-fill & Submit" function is also provided with the Calculate, Clear, and Submit functions as was described previously. And for a global order to be calculated which makes case for all unfilled orders, global auto-fill function is provided for each SKU with functionality as was described earlier in this specification. If, in step 6714, it is determined that the CO is in a post-supplier cutoff period, then execution proceeds to step 6722, wherein the total units ordered is limited to not exceed what was ordered from the supplier. Execution then proceeds to FIG. 68.

Figure 68:
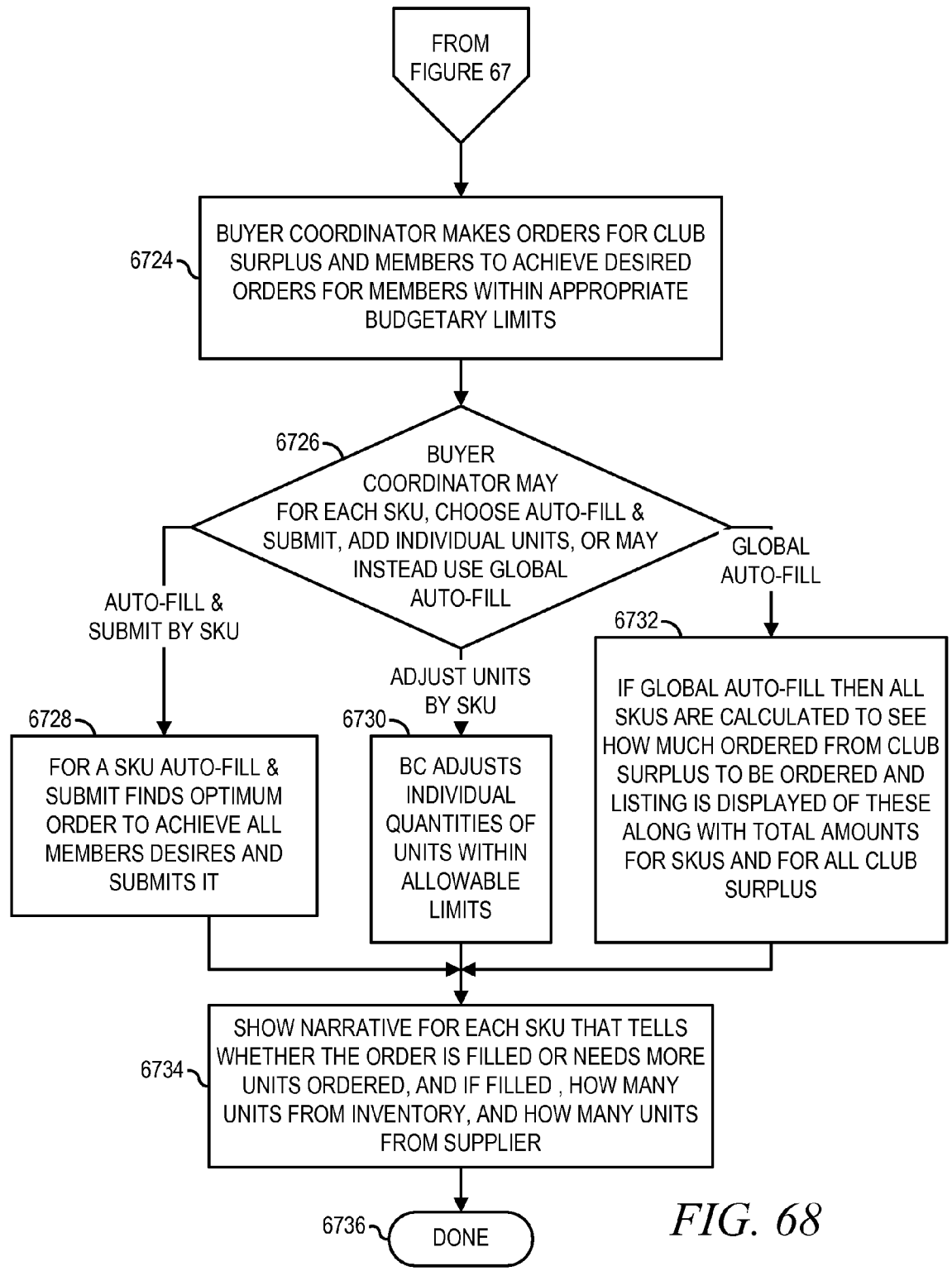

Continuing in FIG. 68, subsequent to execution of steps 6718, 6720, or 6722, execution proceeds to step 6724, wherein a BC may input orders for club surplus and members to achieve desired orders for members within whatever are the appropriate budgetary limits. In step 6726, a BC may choose to auto-fill each SKU, add individual units to each SKU, or instead use a Global auto-fill function for all SKUs. If the BC should decide to auto-fill and submit by SKU, then execution proceeds to step 6728, wherein an optimum order is identified to achieve all members' desires, and it is submitted. If, in step 6726, the BC should desire to adjust units by SKU, then execution proceeds to step 6730, wherein the BC adjusts individual quantities of units within allowable units as set forth by each respective member. If, in step 6726, a BC should desire to use the global auto-fill function, then execution proceeds to step 6732, wherein all SKUs are calculated to determine the quantity order from the club surplus which is to be ordered to fill all unfilled SKUs, and a list is then displayed of what is ordered along with total amounts for SKUs and for all club surplus, which list may be pared back on a SKU by SKU basis to reduce the amount ordered for Club Surplus. Subsequent to execution of step 6728, 6730, or 6732, execution proceeds to step 6734, wherein a narrative for each SKU is displayed that indicates whether the order is filled or needs more units ordered to be filled and, if filled, how many units from inventory and how many units from supplier are needed. Execution is then terminated in step 6736.

Figure 69:
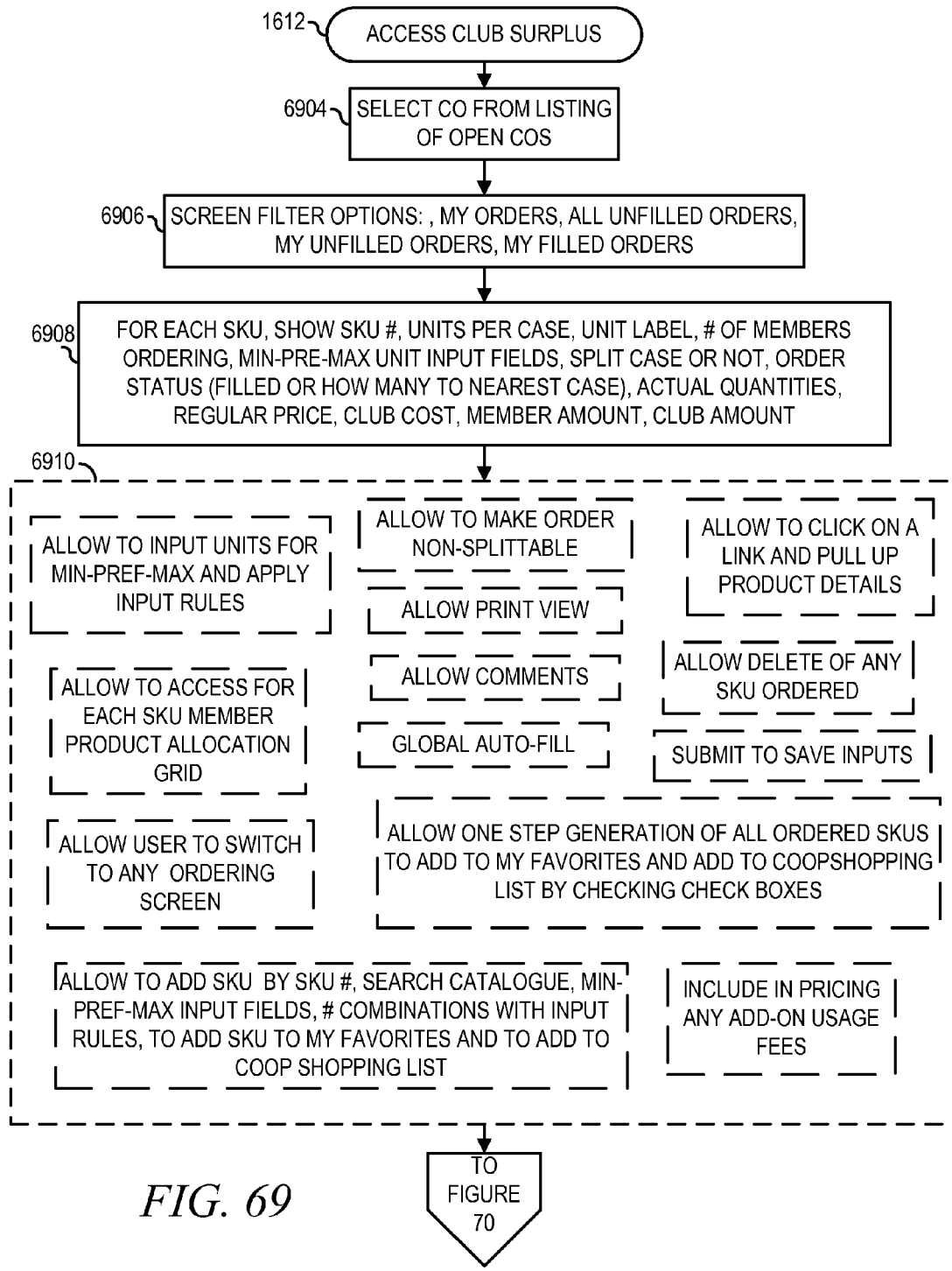
FIGS. 69-70 exemplifies a process for enabling a Buyer Coordinator to manage club surplus.

Referring now to FIG. 69, when a BC accesses Club Surplus, per step 1612 discussed above with respect to FIG. 16, then execution proceeds to step 6904, wherein the BC may select a CO from a list of open COs. In step 6906, the BC may view all of the SKUs that were generated in step 6904, or he may filter the SKUS to view My Orders, All Unfilled Orders, My Unfilled Orders, My Filled Orders. Then a listing is preferably generated of all SKUs meeting the criteria so that in step 6908, for each SKU, there is displayed a SKU number, units per case, unit label, number of members ordering, the minimum, preferred, and maximum unit input fields, whether the case may be split or not, the status of the order (e.g., filled or how many are needed to fill a case), actual quantities, regular price, club cost, member amount, club amount.

In step 6910, set forth are ordering rules that apply with respect to club surplus. The same input rules as were specified for min-pref-max for members preferably apply for the Club Surplus screen. Also orders may be made non-splittable, a click on a link will preferably pull up product details, print view is provided, a Member Product Allocation Grid can be activated for each sku with one click, comments may be made, allow for global auto-fill, allow deletion of any SKU ordered, a submit will save input, the BC may switch to any ordering screen, a one step generation of an ordered SKUs can be added to my favorites and to the Coop Shopping List by checking check boxes, allow members to add one or more SKUs by the SKU number and also for each SKU incept a catalog search and add the minimum, preferred, and max input fields and to add a SKU to their favorites and the co-op shopping list all in one new row each, and preferably show in this screen any add-on usage fees. Execution next proceeds to FIG. 70

Figure 70:
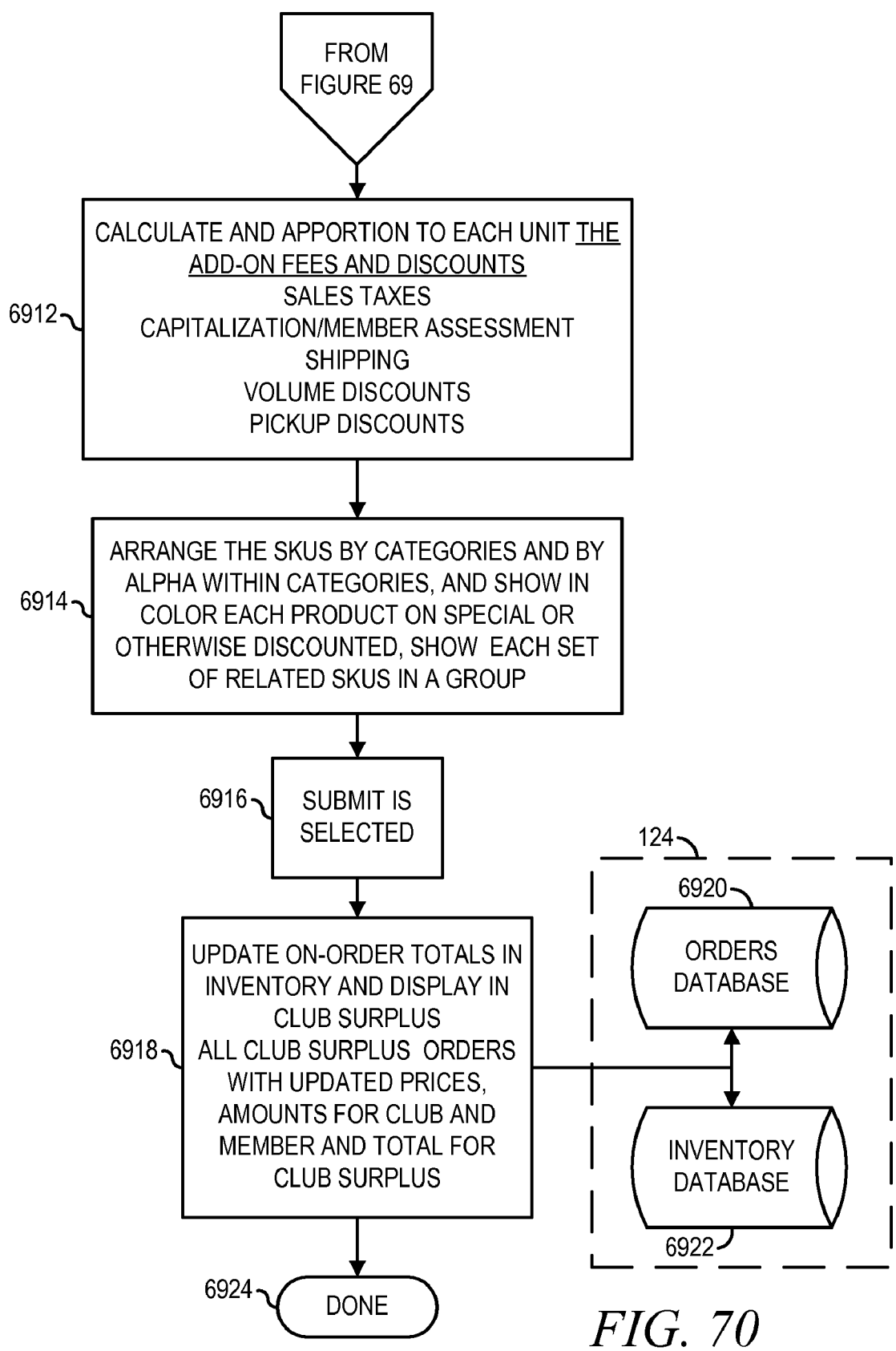

Continuing in FIG. 70, in step 6912, the system 100 will preferably calculate and apportion to each unit the add-on fees and discounts, the sales tax, the capitalization/member assessment, shipping charges, volume discounts, and pick-up discounts, and the like so the cost per unit for each unit added to inventory via Club Surplus will properly reflect all the add-on charges and discounts. In step 6914, all the SKUs are preferably arranged by categories and, within each category, alphabetically. Each product that is a special or otherwise discounted is preferably shown in color. Each set of related SKUs in a group is preferably shown together in a highlighted box. In step 6916, the BC may submit any orders entered herein in connection with club surplus. In step 6918, the system 100 will preferably next update on order totals to Club Inventory and display in club surplus all orders with updated prices, the amounts for clubs and members, and the total for the club surplus. The updating performed in step 6918 is performed in connection with the database 124 and, more specifically, in orders database 6920 and in inventory database 6922. In step 6924, execution is terminated.

Figure 71:
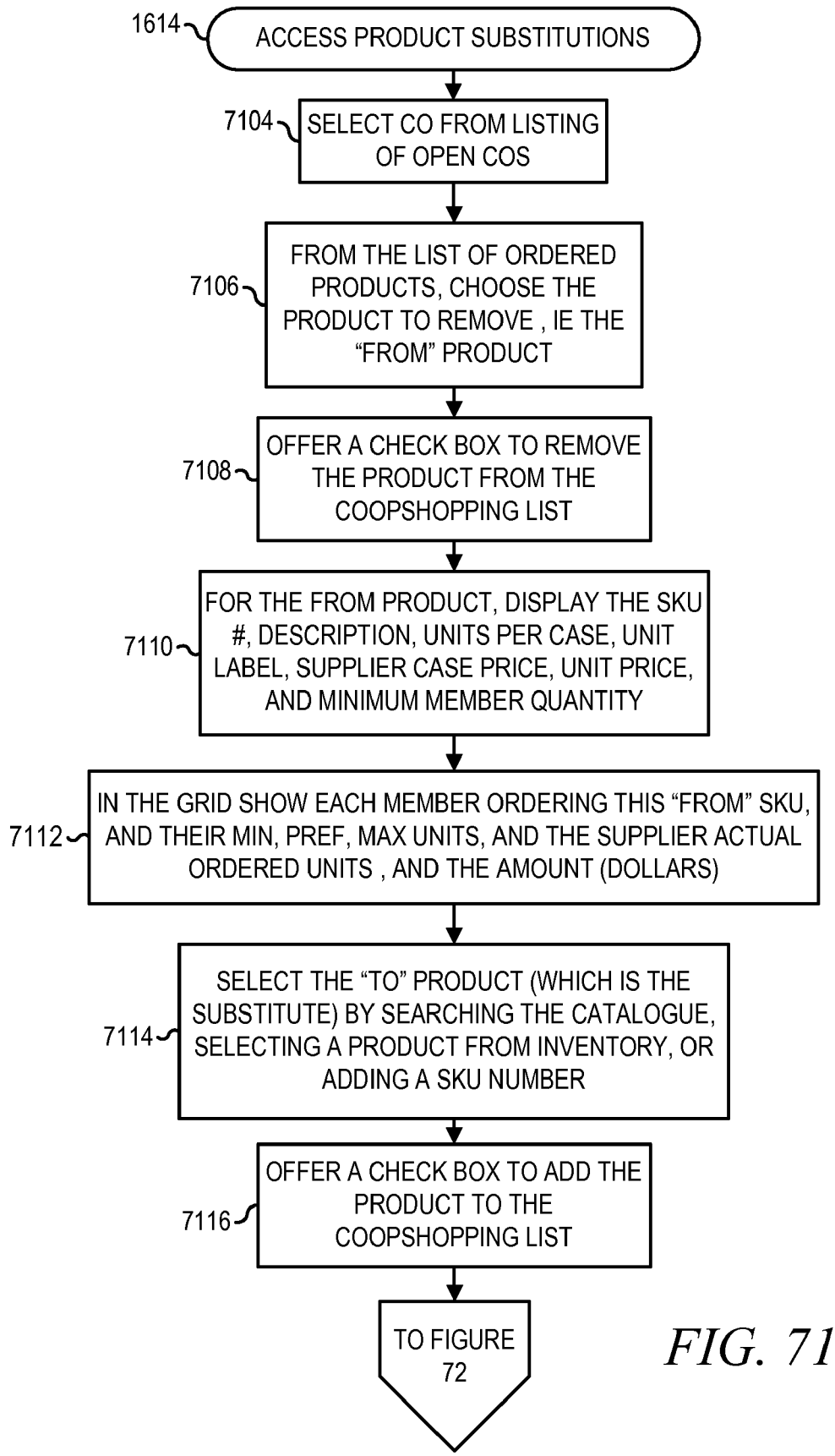
FIGS. 71-72 exemplifies a process for enabling a Buyer Coordinator to manage substitutes.

Referring now to FIG. 71, when a BC accesses Product Substitutes, as per step 1614 mentioned above with respect to FIG. 16, then execution proceeds to step 7104, wherein a BC selects a CO from a list of open CO's. In step 7106, from the list of ordered products, the BC may choose a product to remove (i.e., the "from" product). In step 7108, a BC may optionally check a check box to remove the product from the Coop Shopping List. In step 7110, for the "from" product, there is preferably displayed the SKU number, description, units per case, unit label, supplier case price, unit price, and minimum member quantity (if any). In step 7112, each member who is ordering the "from" SKU is displayed along with their respective minimum, preferred, and maximum units, and the supplier actual ordered units, and their monetary amount. In step 7114, the BC selects a "to" product (which is to be a substitute for the "from" product) by searching the catalog, selecting the product from inventory, or by adding a SKU number. In step 7116, the BC is offered a check box to add the product to the Coop Shopping List.

Figure 72:
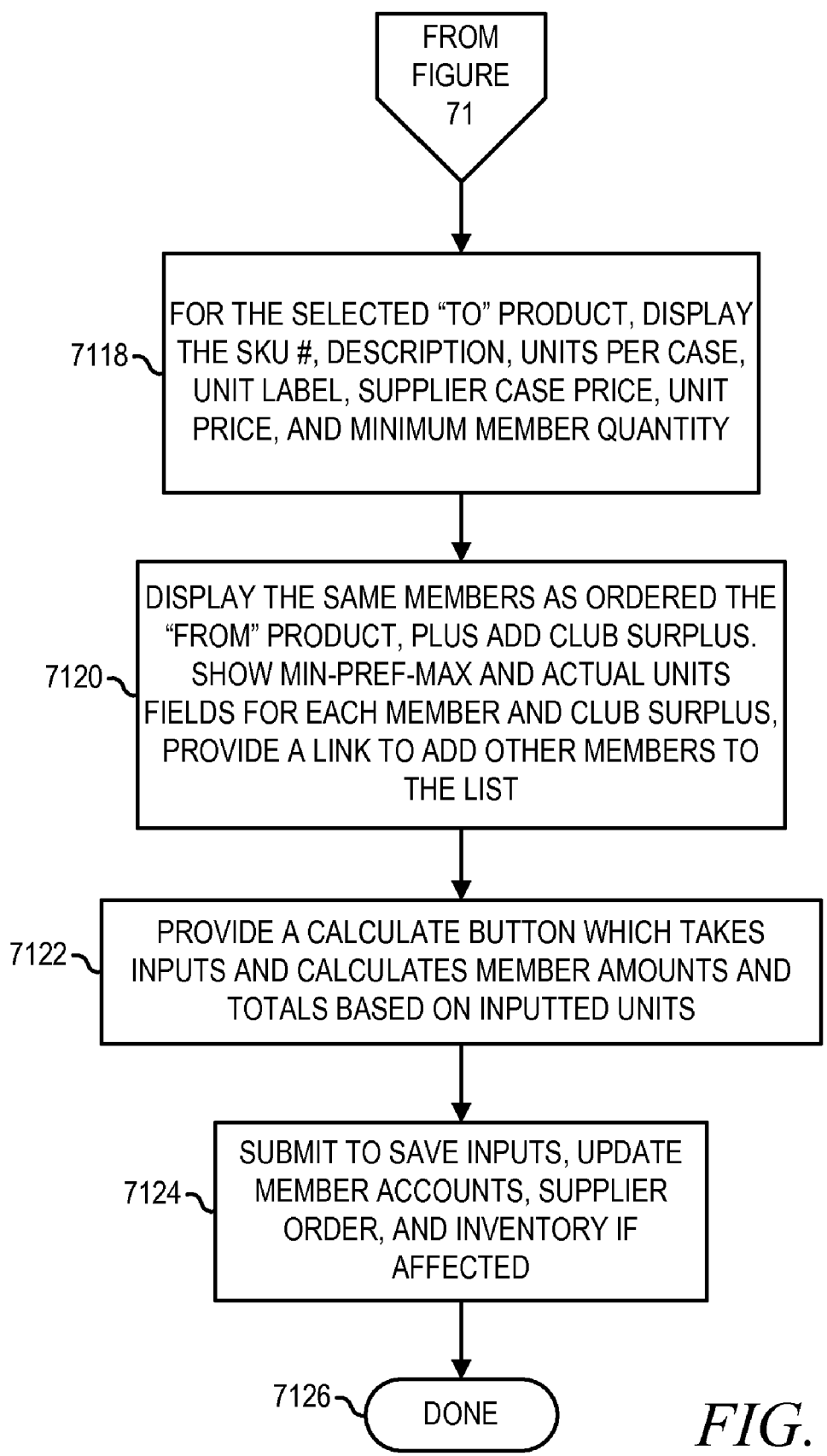

Continuing in FIG. 72, in step 7118, for the selected "to" product, there is displayed the SKU number, the product description, units per case, unit label, supplier case price, unit price, and minimum member quantity (if any). In step 7120, there is displayed the same members as ordered from the "from" product, and in addition there is also displayed the club surplus. There is also displayed the minimum, preferred, and maximum and the actual units for each member and club surplus, and a link is provided to add other members to the list. In step 7122, a calculation function is provided which receives inputs and calculates member amounts and totals based on inputted unit quantities. In step 7124, the BC may submit the data he has inputted, and also have member accounts, supplier order, and inventory updated if they have been affected. In step 7126, execution is terminated.

Figure 73:
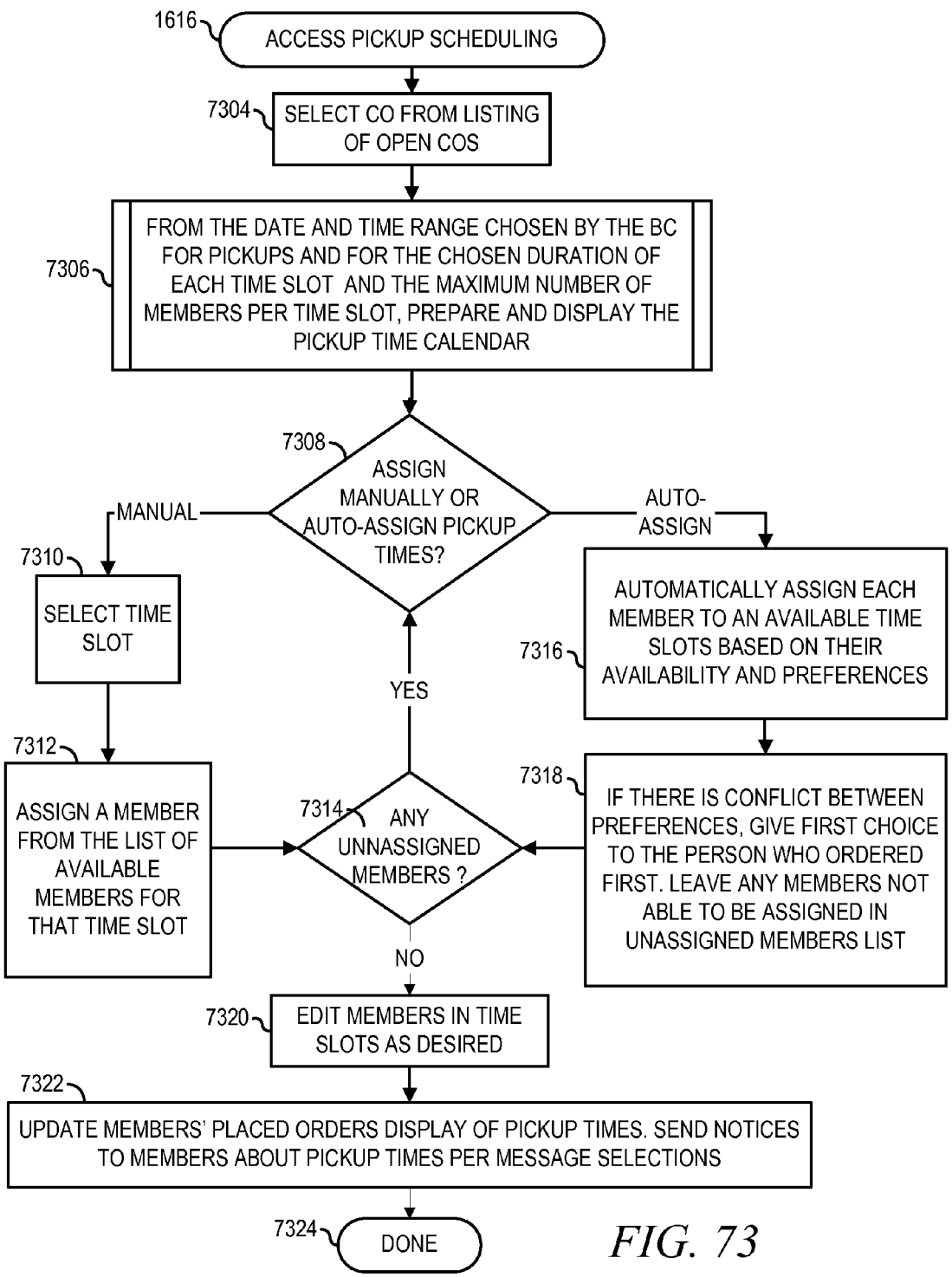
FIG. 73 exemplifies a process for enabling a Buyer Coordinator to schedule pickups.

Referring now to FIG. 73, when a BC accesses the pick-up scheduling, as per step 1616 mentioned above with respect to FIG. 16, then execution proceeds to step 7304, wherein the BC may select a CO from a list of open COs. In step 7306, from the date and time range selected by the BC for pickups and for the chosen duration of each time slot and the maximum number of members for each time slot, preferably prepared and displayed is the pickup time calendar. In step 7308, a BC indicates whether he would prefer to assign pickup times manually or automatically. If the BC decides he would prefer to assign pickup times manually, then execution proceeds to step 7310, wherein the BC selects a time slot and, in step 7312, a BC may assign a member from a list of available members for that time slot. In step 7314, a determination is made whether there are any members that are not assigned. If it is determined that there are unassigned members, then execution returns to step 7308, discussed above.

If, in step 7308, the BC indicates he would desire to have pickup times automatically assigned, then execution proceeds to step 7316, wherein each member is automatically assigned to an available time slot based on their availability and preferences. In step 7318, if there is a conflict between preferences of members, then the first choice of preference is given to the person who ordered first. Any members that are not able to be assigned are left in an unassigned members list. Execution then proceeds to step 7314, discussed above. If, in step 7314, there are no unassigned members, then execution proceeds to step 7320, wherein members may be edited as to the time slots selected for the final schedule which is acceptable to the BC. In step 7322, the members' pickup times are updated, and notices are sent to members regarding the new pickup times per message selections. In step 7324, execution is terminated.

Figure 74:
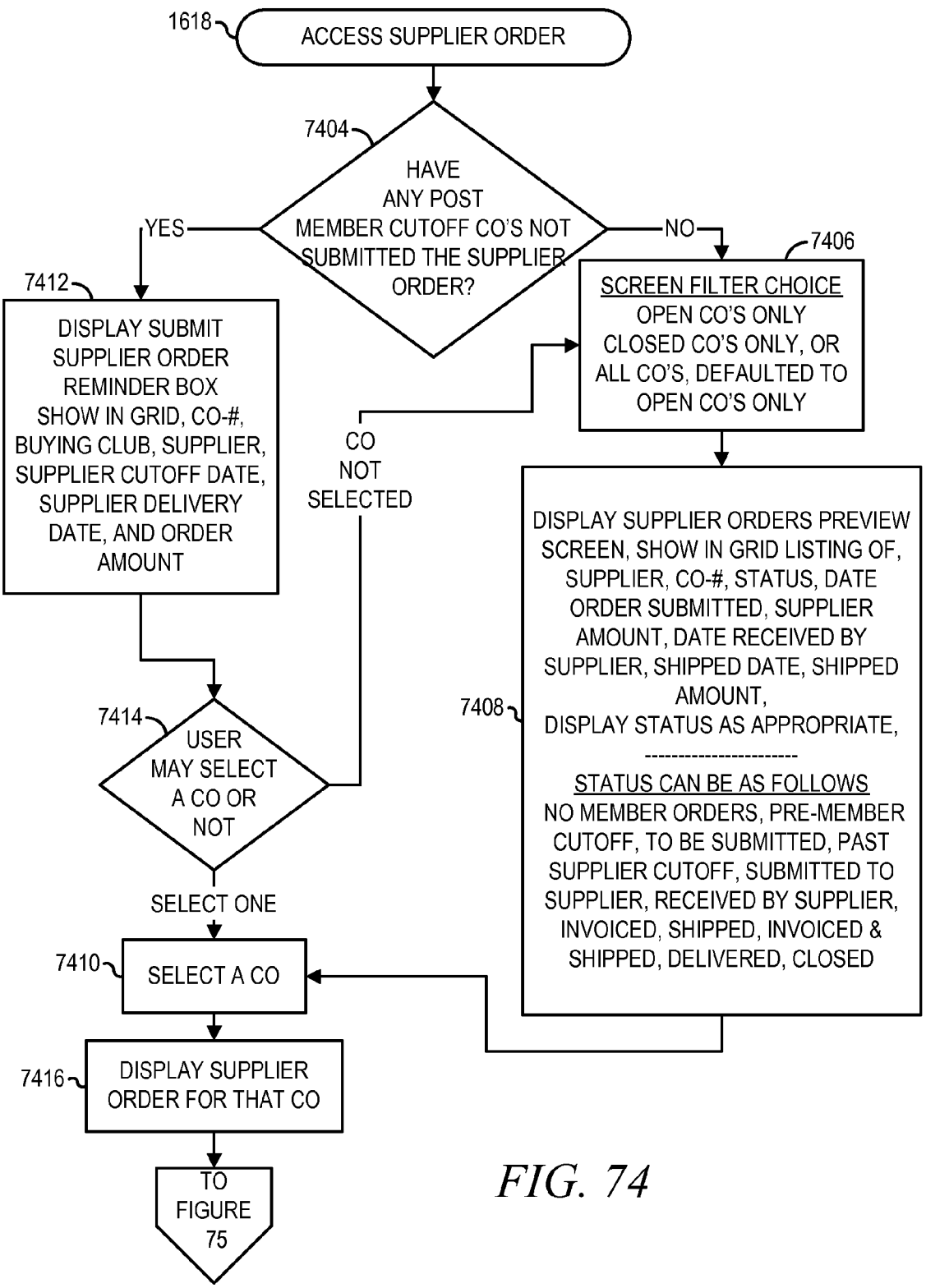
FIGS. 74-81 exemplifies a process for enabling a Buyer Coordinator to manage supplier orders.

Referring now to FIG. 74, when a BC accesses Supplier Order, as per step 1618, mentioned above with respect to FIG. 16, execution proceeds to step 7404, wherein a determination is made whether there are supplier orders that need to be submitted for any post-member cutoff CO's. If it is determined that there are post-member cutoff COs for which the supplier order has not yet been submitted, then execution proceeds to step 7412, wherein a submit supplier order reminder box is displayed, and there is further preferably displayed the CO number, the buying club, the supplier, the supplier cutoff date, the supplier delivery date, the order amount, and the like. In step 7414, the BC decides whether to select a CO from that reminder box. If, in step 7414, a the BC decides to not select a CO, or if, in step 7404, it is determined that there are no post-member cutoff for which supplier orders have not yet been submitted, then execution proceeds to step 7406, wherein a BC may specify a filter condition that only open CO's are displayed, or only closed CO's are displayed, or all CO's are displayed, the default being to display only open CO's.

In step 7408, there is displayed the supplier order's previous screen, preferably showing in a grid listing, the supplier, the CO number, the status, the date the order was submitted, the supplier amount, the date the supplier order was received by the supplier, the date the order was shipped, the ship amount, and the appropriate status. The status may include, by way of example, no member orders, pre-member cutoff, to be submitted, past supplier cutoff, submitted to supplier, received by supplier, invoiced, shipped, invoiced and shipped, delivered, closed, and the like. Upon completion of step 7408, or if, in step 7414, a BC decides to select a CO, then execution proceeds to step 7410, wherein the BC selects a CO. In step 7416, the supplier order for the selected CO is displayed. Execution then proceeds to FIG. 75.

Figure 75:
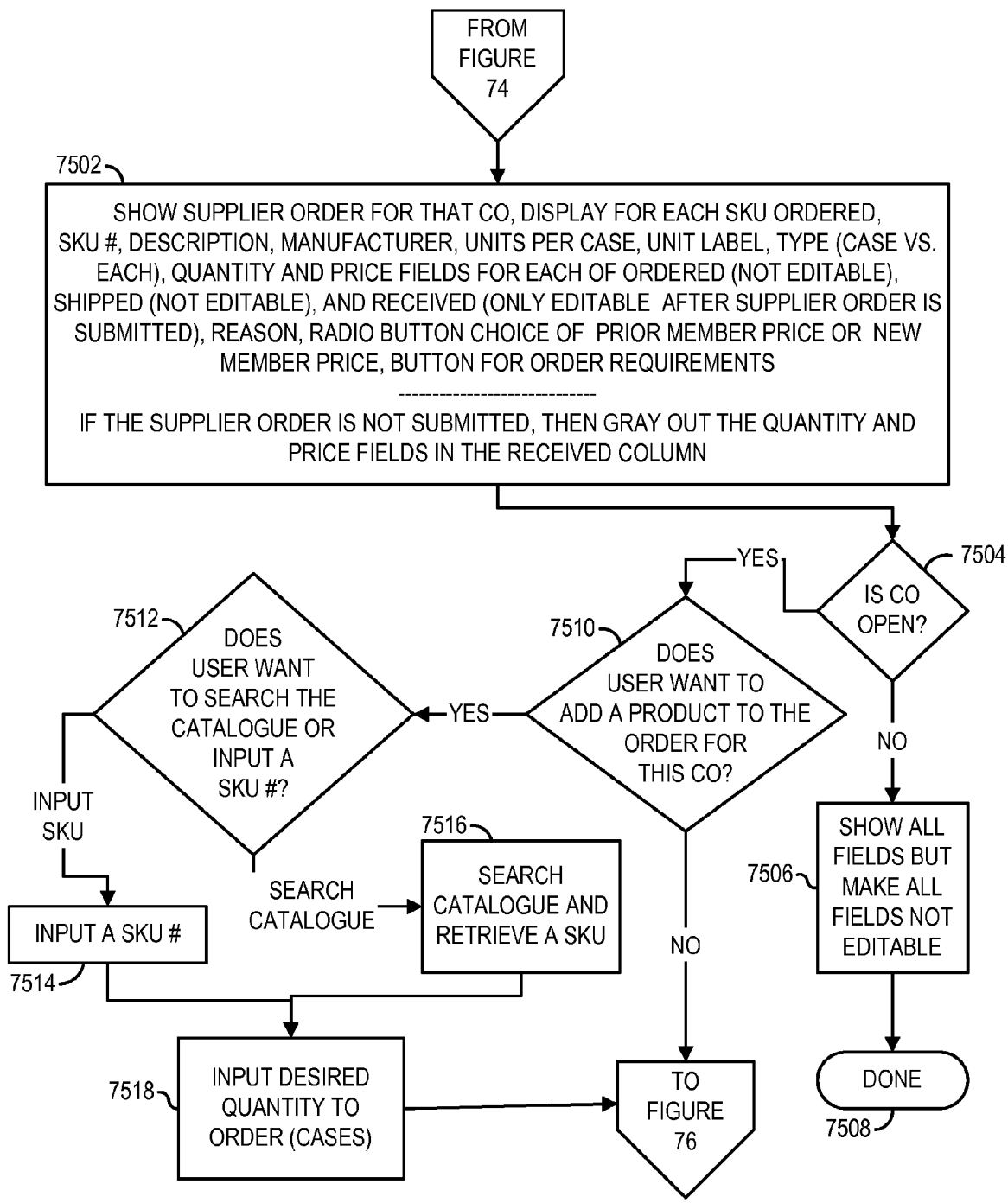

Continuing in FIG. 75, at step 7502, the supplier order for the selected CO is displayed, and each SKU in the supplier order is also displayed, including for each SKU, the SKU number, description, manufacturer, units per case, unit label, whether the SKU is ordered by case or individual units, the quantity, and price of each SKU ordered (not editable), whether the SKU has been shipped (not editable), and whether the SKU has been received (editable only after supplier order is submitted), reason (to be completed if a discrepancy exists between what was ordered and what received), a "radio button" to permit a BC to choose a prior or new member price (which enables a changed price from the supplier to be passed on to members or not) and the like. A function is also provided for displaying order requirements. If the supplier order is not submitted, then the quantity and price fields are grayed out. In step 7504, a determination is made whether the CO is open. If the CO is open, then execution proceeds to step 7506, wherein all fields are displayed, but no fields are editable. In step 7508, execution is terminated.

If, in step 7504, it is determined that the CO is open, then execution proceeds to step 7510, wherein the BC indicates whether he would desire to add a product to the order for this CO. If the BC indicates that he would like to add a product to the order for this CO, then execution proceeds to step 7512, wherein the BC indicates whether he would like to search the catalog for a SKU or enter a SKU number directly. If the BC decides he would like to enter a SKU number directly, then execution proceeds to step 7514, wherein the BC inputs a SKU number directly. If, in step 7512, the BC decides he would prefer to search the catalog to identify the SKU number, then execution proceeds to step 7516, wherein the BC searches a catalog for the desired product, retrieves the SKU number for the product from the catalog, and enters the SKU number. Upon completion of either step 7514 or 7516, execution proceeds to step 7518, wherein the BC enters the quantity that he would like to order (e.g., cases). Upon completion of step 7518, or if, in step 7510, the BC indicates that he does not want to add a product to this order for the CO, then execution proceeds to step 7602 (FIG. 16). Execution next proceeds to FIG. 76.

Figure 76:
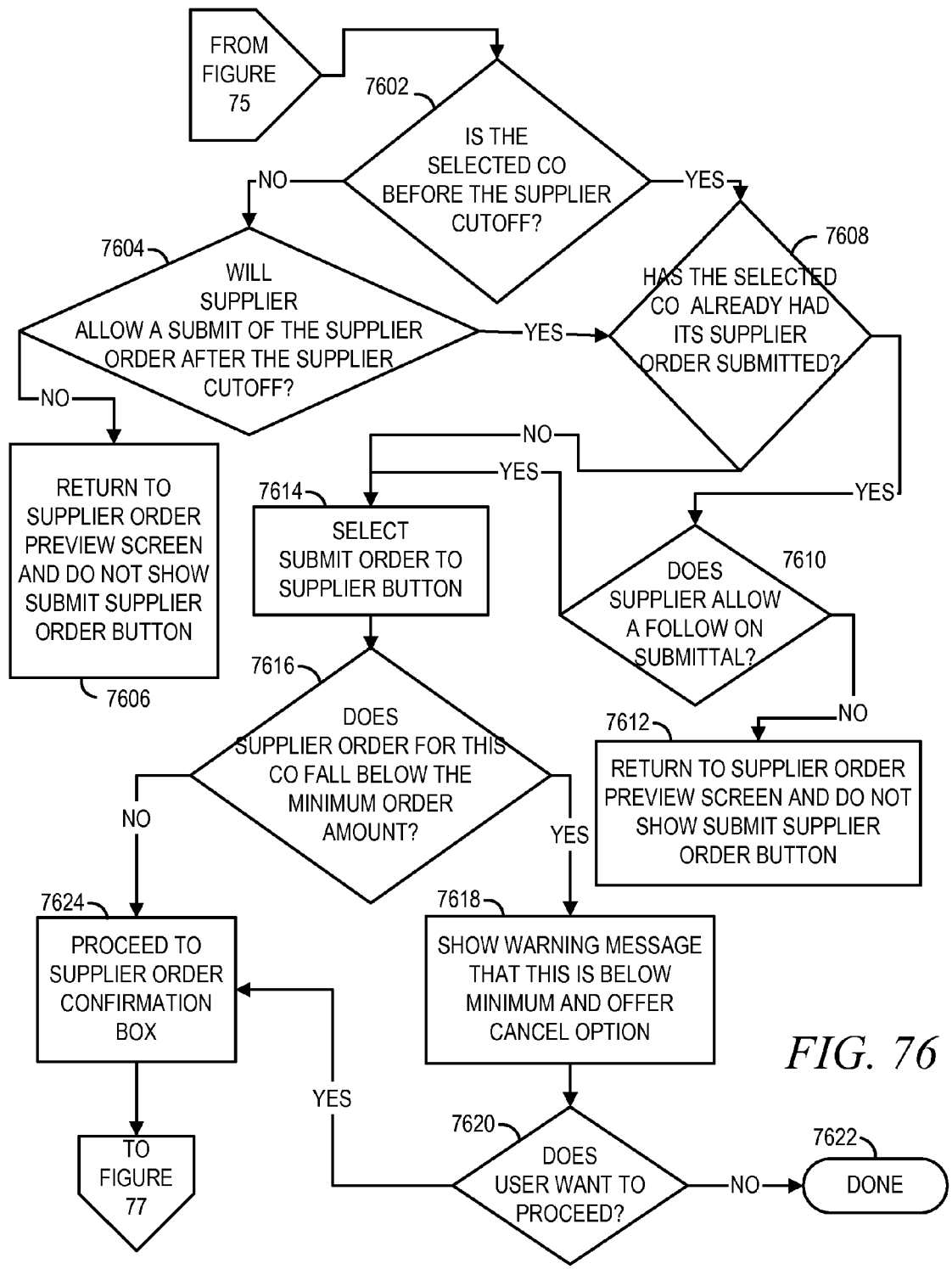

Referring now to FIG. 76, in step 7602 a determination is made as to whether the selected CO is in the period prior to the supplier cut-off. If it is determined that the selected CO is not prior to the supplier cut-off, then execution proceeds to step 7604, wherein a determination is made as to whether the supplier will permit the BC to submit the supplier order after the supplier cut-off. If the supplier does not permit the supplier order to be submitted after the supplier cut-off, then execution proceeds to step 7606, wherein the BC is returned to the supplier order preview screen, and the submit supplier order function (invoked by a button) is made not available to the BC. If, in step 7602, it is determined that the selected CO is before the supplier cut-off or, in step 7604, if the supplier will permit the BC to submit a supplier order after the supplier cut-off, then execution proceeds to step 7608, wherein a further determination is made as to whether the selected CO has already had its supplier order submitted. If the selected CO has already had its supplier order submitted, then execution proceeds to step 7610, wherein a further determination is made as to whether the supplier permits a follow-on submittal to an earlier supplier order. If the supplier does not permit a follow-on submittal, then execution proceeds to step 7612, wherein the BC is returned to the supplier order preview screen, and is not permitted to submit the supplier order. If, in step 7610, the supplier does permit a follow-on submittal, or, in step 7608, the selected CO has not already had its supplier order submitted, then execution proceeds to step 7614, wherein the BC preferably initiates submittal of the supplier order to the supplier. In step 7616, a determination is made as to whether the supplier order for this CO falls below the minimum order amount. If the supplier order for this CO does fall below the minimum order amount, then execution proceeds to step 7618, wherein a warning message is displayed indicating that the supplier order for the CO is below the minimum order amount, and the BC may optionally therefore cancel the order as denoted in step 7620. If, in step 7620, the BC indicates that he would like to proceed further, or, in step 7616, the supplier order for the CO does not fall below the minimum order amount, then execution proceeds to step 7624, wherein a supplier order confirmation box is presented to the BC. Execution next proceeds to FIG. 77.

Figure 77:
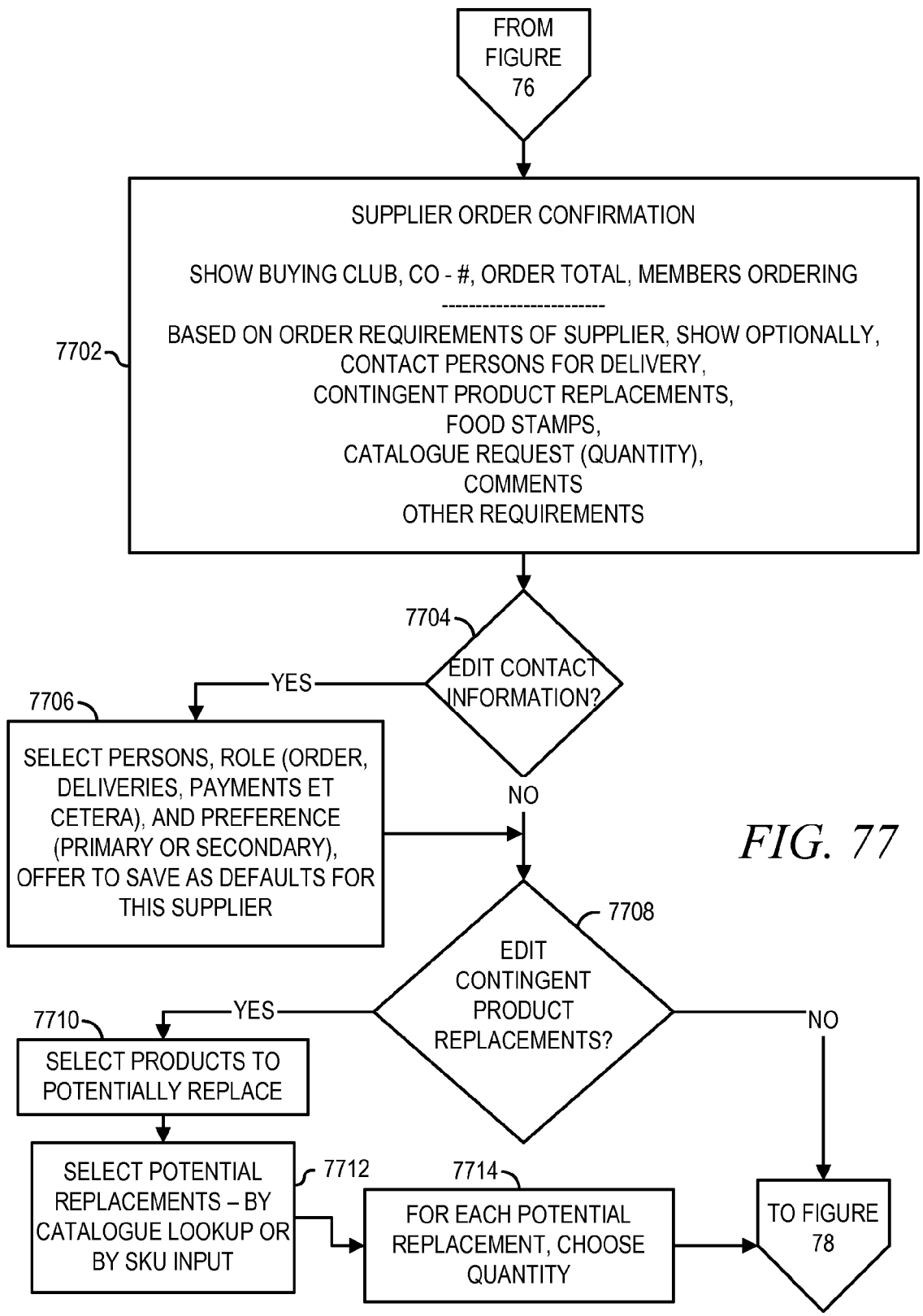

Continuing in FIG. 77, at step 7702, the supplier order confirmation is displayed, identifying the buying club, and showing the CO number, the order total, and the number of members ordering in that supplier order. Depending on the pre-established order requirements or permitted requests of the supplier, the supplier order confirmation message may optionally also display the contact persons for delivery, the contingent product replacements, a Food Stamps (yes or no) designation, catalog requests (quantity), comments, and other requirements, and the like. For purposes of illustration, presented is a supplier configuration in which all the above are applicable.

In step 7704, the BC indicates whether he would like to edit contact information. If the BC indicates that he would like to edit contact information, then in step 7706, the BC selects persons for whom he would like to edit their contact information including, by way of example, their role (e.g., order, deliveries, payments, and the like) and the person's preference (e.g., primary or secondary). The BC is also given the option to save the edits for this person as defaults with this supplier. Subsequent to execution of step 7706, or, if in step 7704, the BC indicates that he does not desire to edit any contact information, then execution proceeds to step 7708, wherein the BC indicates whether he would desire to edit contingent product replacements. If the BC indicates a desire to edit contingent product replacements, then execution proceeds to step 7710, wherein the BC selects products to potentially replace. In step 7712, the BC selects potential replacements, by way of example, by catalog lookup or by SKU input. In step 7714, for each potential replacement, a quantity is chosen. Subsequent to execution of step 7714, or if, in step 7708, the BC indicates that he does not desire to edit any contingent product replacements, then execution proceeds to step 7802 in FIG. 78.

Figure 78:
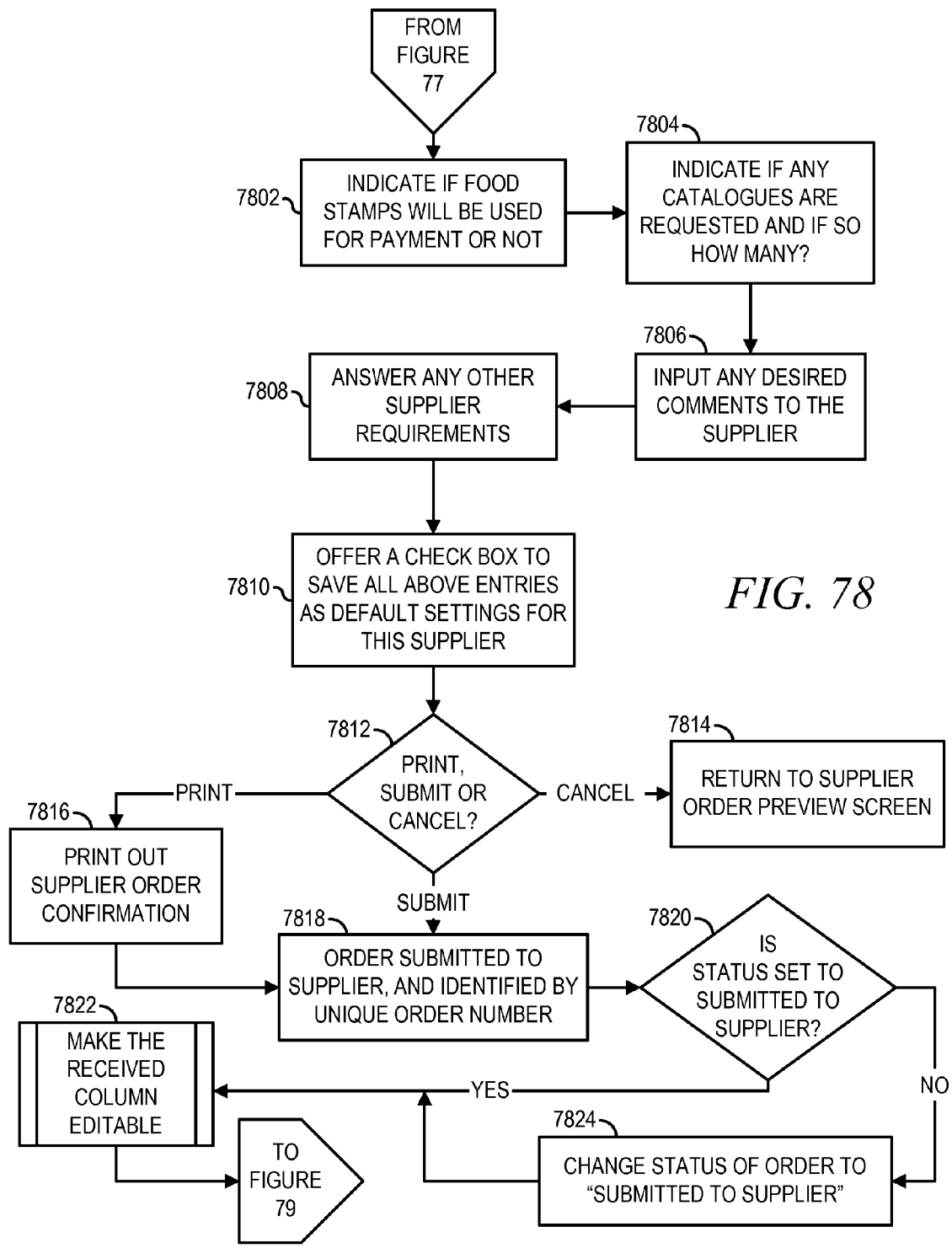

Continuing in FIG. 78, in step 7802 the BC indicates whether food stamps will be used for payment or not. In step 7804, the BC indicates whether any catalogs are requested and, if so, how many catalogs are requested. In step 7806, the BC enters any desired comments to be made to the supplier. In step 7808, the BC responds to any other supplier requirements. In step 7810, the BC may indicate via a check box whether all of the foregoing entries related to the supplier order should be saved as default settings for the supplier. In step 7812, a BC indicates whether he would desire to print, submit, or cancel the supplier order. If the BC should decide to print the supplier order, then execution proceeds to step 7816 wherein the supplier order and confirmation are printed out. If, in step 7812, the BC should desire to cancel the order, then execution proceeds to step 7814, wherein the BC is returned to the supplier order preview screen. Subsequent to execution of step 7816, or if in step 7812 a BC indicates that he would prefer to submit the supplier order, then execution proceeds to step 7818, wherein the order is submitted to the supplier, and whereupon it is identified by a unique order number. The unique order number is disclosed as a preferred mode of matching the order that is submitted with the invoice that is received back from the supplier. In step 7820, a determination is made as to whether the status is set to indicate that the supplier order has been submitted to the supplier. If the status is set to indicate that the supplier order has been submitted to the supplier, then execution proceeds to step 7822, wherein the received column is made editable. If, in step 7820, status is not set to indicate that supplier order has been submitted to the supplier, then execution proceeds to step 7824, wherein the status of the order is changed to indicate that the supplier order has been submitted to the supplier whereupon execution next proceeds to step 7822. Upon completion of step 7822, execution proceeds to step 7902 in FIG. 79.

Figure 79:
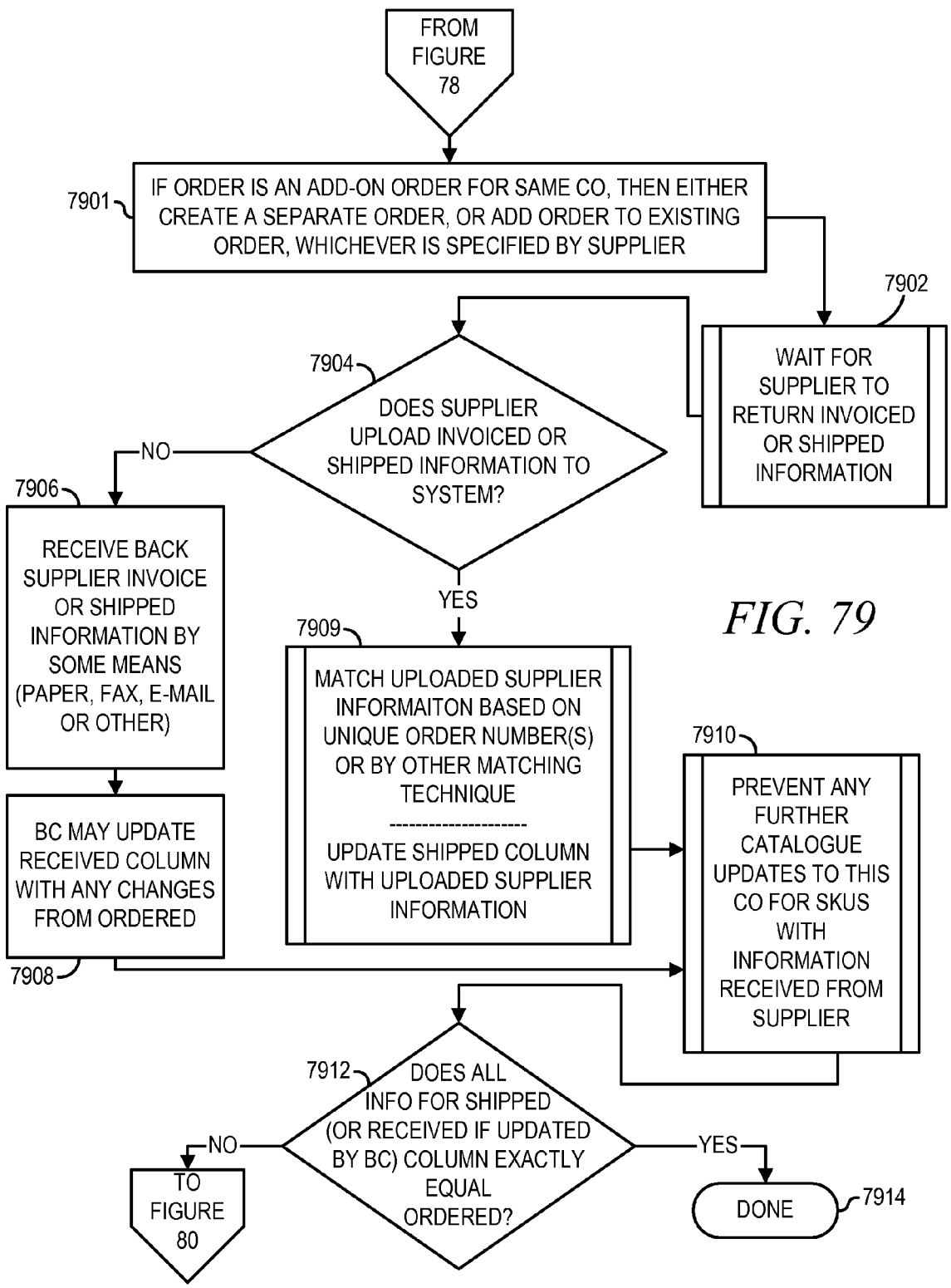

Continuing in FIG. 79, in step 7901 if an order is an add-on order for the same CO, then pursuant to specifications from a respective supplier, a separate order is created, or an order is added (ie appended) to an existing order. In step 7902, the BC then waits for the supplier to return an invoice or the shipping information. In step 7904, a determination is made as to whether the supplier uploads the invoice directly to into databases 124 on web server 120 in an electronic update, or is the information received in a non-integrated medium. If it is determined that the supplier has not uploaded invoiced or shipped information to the system, then execution proceeds to step 7906, wherein the BC receives a supplier invoice or shipping information by some means, such as paper, fax, e-mail, or the like. In step 7908, the BC preferably updates the received information with any changes from the order. In step 7910, the supplier is then prevented from making any other catalog updates to this CO for SKUs ordered in this CO. If, in step 7904, the supplier uploads the invoice or shipping information to the system, then execution proceeds to step 7909, wherein the uploaded supplier information is matched based on unique order numbers or by other matching techniques. Shipping information available to the BC is updated with the uploaded supplier information, and execution proceeds to step 7910 discussed above (and the received column for the Supplier Order screen for this CO preferably becomes editable for the BC). In step 7912, a determination is made as to whether all shipping information, or received information if updated by the BC, exactly equals the order data. If the shipping information or received information equals the order data, then execution proceeds to step 7914, wherein further execution is terminated; otherwise, execution proceeds to step 8002 in FIG. 80.

Figure 80:
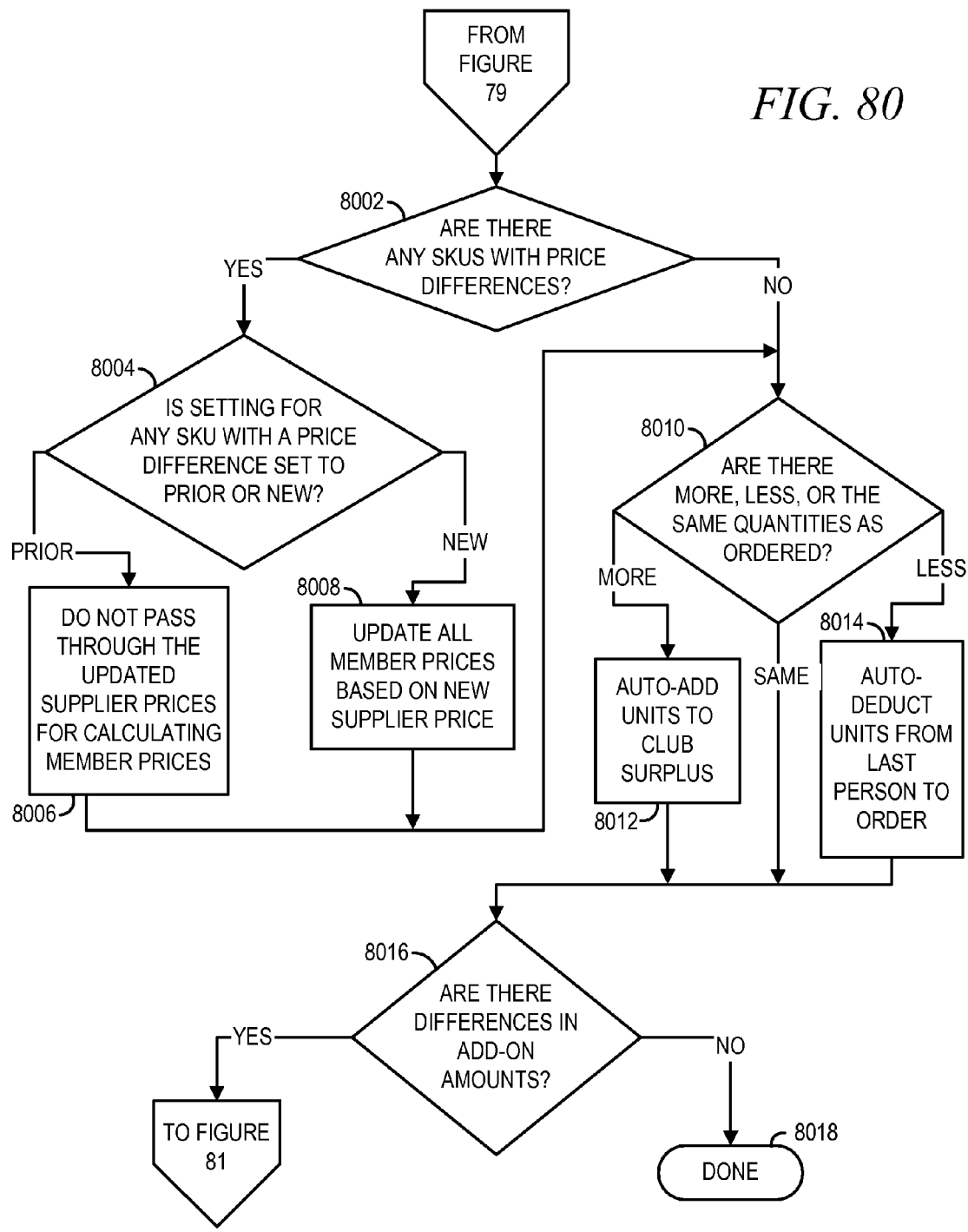

Continuing in FIG. 80, in step 8002 a determination is made as to whether there are any SKUs with price differences. If there are SKUs with price differences, then execution proceeds to step 8004 wherein a further determination is made as to what setting exists for any SKU with a price difference, ie is said price difference SKU set to prior or new? If it is determined that a SKU is set to prior, then execution proceeds to step 8006, wherein updated supplier prices are not passed through for calculating member prices. If, in step 8004, the setting for any SKU with a price difference is set to new, then execution proceeds to step 8008, wherein all member prices affected by that SKU are updated based upon the new supplier price. Subsequent to execution of steps 8006 or 8008 or, if in step 8002, there are no SKUs with price differences, then execution proceeds to step 8010, wherein a determination is made as to whether the quantities in the shipped information or the received information is more, less, or the same, as were ordered in the supplier order. If it is determined that the quantities in the shipped or received information are more than were ordered, then execution proceeds to step 8012, wherein units are automatically added to the club surplus. If, in step 8010, it is determined that the quantities in the shipped or received information are less than the quantities ordered, then execution proceeds to step 8014, wherein the units are automatically deducted from the last person to order. Upon completion of steps 8012 or 8014 or, if, in step 8010, it is determined that the quantities in the shipped or received information are the same as was ordered, then execution proceeds to step 8016, wherein a further determination is made as to whether there are any differences in the add-on amounts. If, in step 8016, it is determined that there are no differences in the add-on amounts, then, in step 8018, execution is terminated; otherwise, execution proceeds to step 8102 in FIG. 81.

Figure 81:
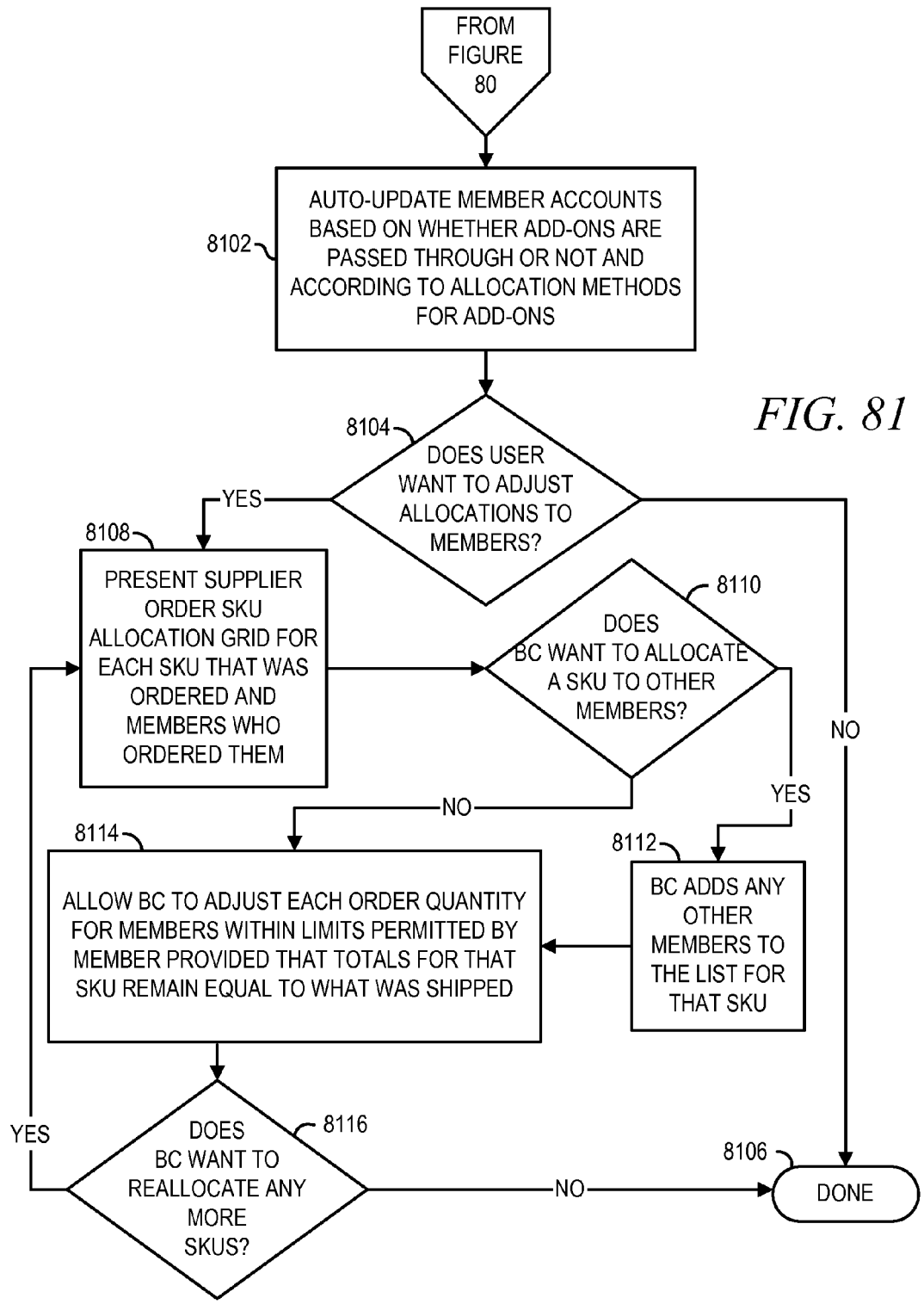

Continuing in FIG. 81, in step 8102 member accounts are automatically updated based on whether or not add-ons are passed through and according to allocation methods for add-ons as will be further explained in the pricing area of this specification below. In step 8104, a BC indicates whether he would like to further adjust quantity allocations of units to members. If the BC does not want to adjust allocations to members, then execution is terminated in step 8106. If, in step 8104, the BC does indicate a desire to adjust allocations to members, then execution proceeds to step 8108, wherein the supplier order SKU allocation grid is presented to the BC for each SKU that was ordered and for members who ordered them. (The Supplier Order SKU allocation grid has been described above). In step 8110, the BC indicates whether he would like to allocate a SKU to other members. If the BC would like to allocate a SKU to other members, then execution proceeds to step 8112, wherein the BC adds any other members to the list for that SKU. Upon completion of step 8112, or if in step 8110 the BC indicates that he would not want to allocate a SKU to other members, then execution proceeds to step 8114, wherein the BC is permitted to adjust each order quantity for members within limits permitted by each respective member, provided that the totals for that SKU remain equal to what was shipped. In step 8116, the BC indicates whether he would like to reallocate any more SKUs. If the BC does indicate a desire to reallocate any more SKUs, then execution returns to step 8108, discussed above; otherwise, execution is terminated at step 8106.

Figure 82:
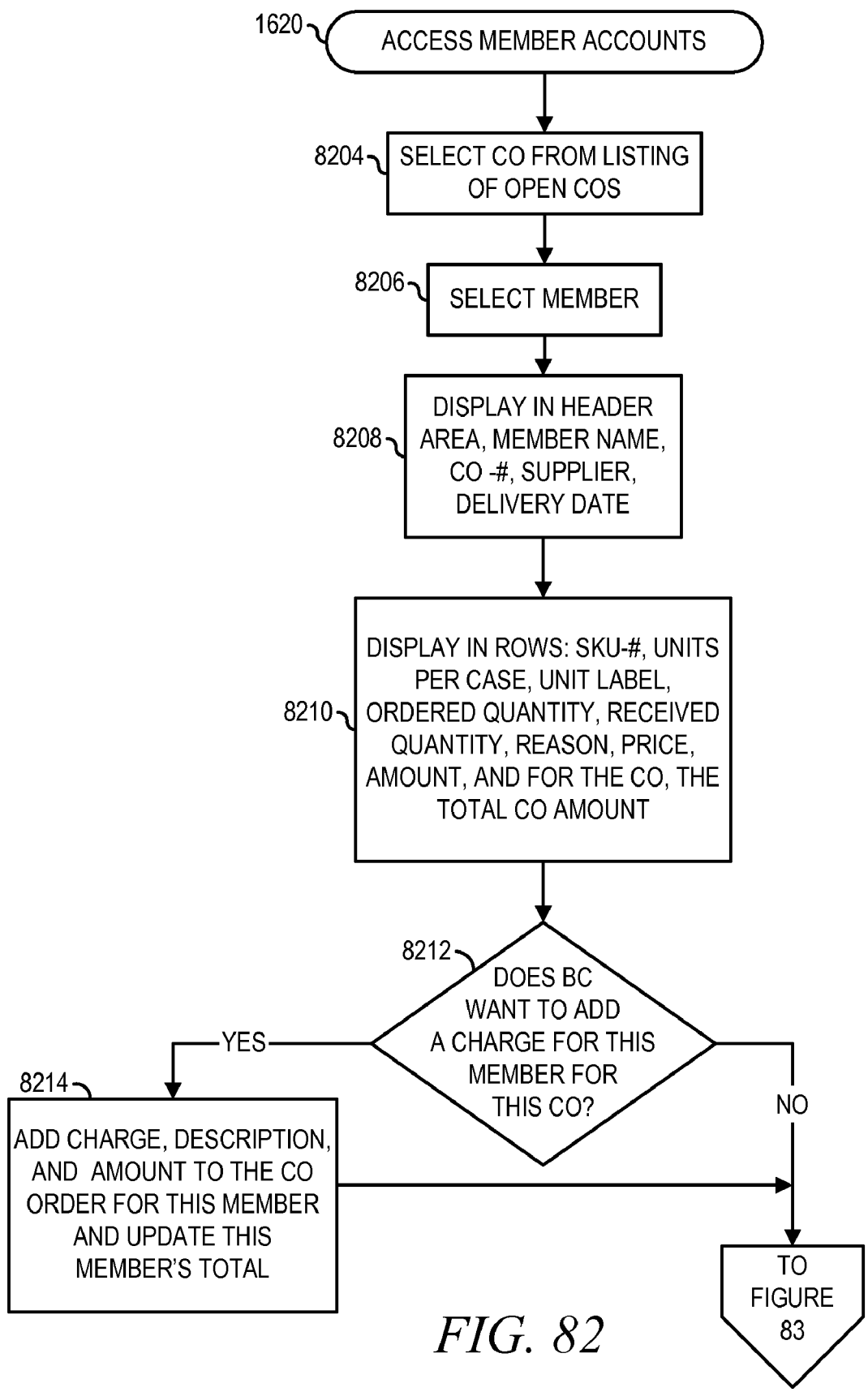
FIGS. 82-83 exemplifies a process for enabling a Buyer Coordinator to manage member accounts.

Referring now to FIG. 82, when a BC accesses Member Accounts, per step 1620 mentioned above with respect to FIG. 16, execution proceeds to step 8204, wherein the BC selects a CO from a list of open CO's. In step 8206, the BC selects a member whose account he would like to access. In step 8208, there is displayed the member name, the CO number, the supplier, and the delivery date, for the selected CO. In step 8210, there is displayed for each product, the SKU number, the units per case, the unit label, the order quantity, received quantity, the reason (to explain what discrepancies between what was ordered and received may be ascribed to), the price, the amount, and for the CO, the total CO amount. In step 8212, the BC indicates whether he would like to add a charge for this member for this CO. If the BC does want to add a charge for this member for this CO, then execution proceeds to step 8214, wherein the BC adds the charge, description, and amount to the CO for this member, and the member's total is also updated. Upon completion of step 8214, or, in step 8212, if the BC does not want to add a charge for this member for this CO, then execution proceeds to step 8302 in FIG. 83.

Figure 83:
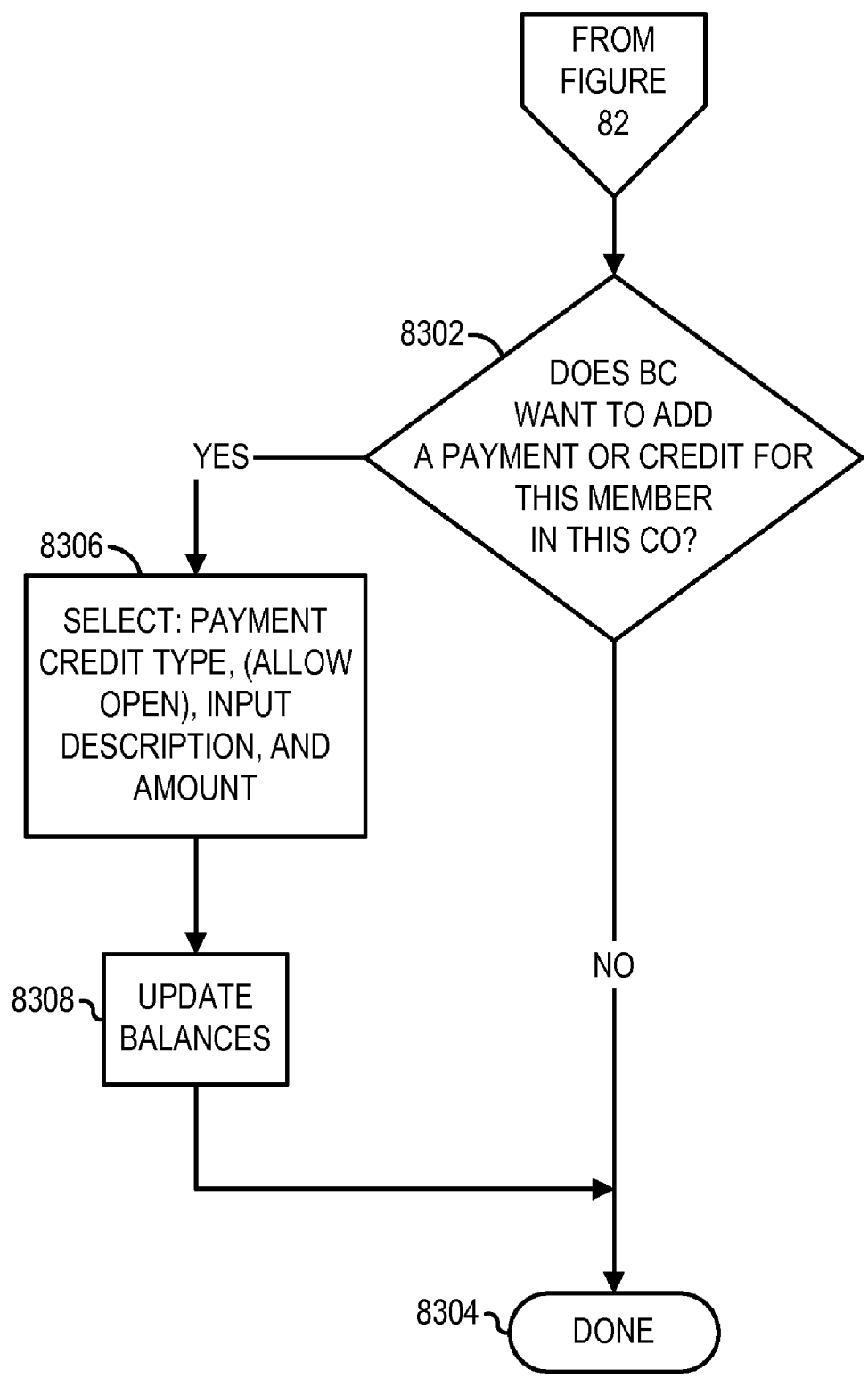

Continuing with FIG. 83, in step 8302, the BC indicates whether he would like to add a payment or a credit for this member in the CO. If the BC does not want to add a payment or credit for this member in this CO, then execution is terminated in step 8304. If, in step 8302, the BC does indicate a desire to add a payment or credit for this member in this CO, then execution proceeds to step 8306, wherein the BC selects a payment credit type (which may be allowed to remain open ie not applied to a CO), and the description and amount are entered. In step 8308, the balances are updated, and execution is terminated at step 8304.

Figure 84:
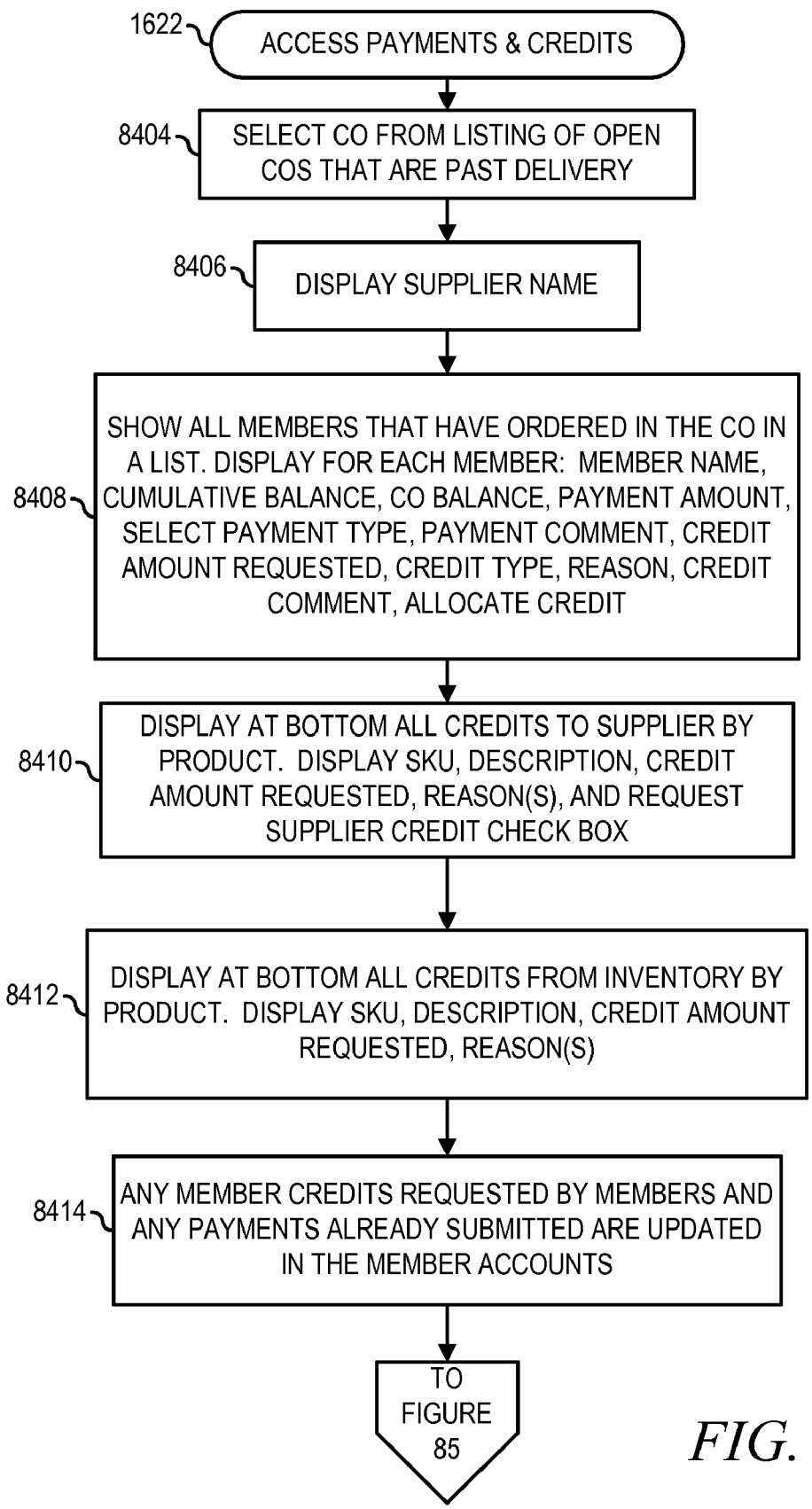
FIGS. 84-86 exemplifies a process for enabling a Buyer Coordinator to manage payments and credits.

Referring now to FIG. 84, when a BC accesses Payments and Credits, via step 1622 mentioned above with respect to FIG. 16, then execution proceeds to step 8404, wherein the BC selects a CO from a list of open COs that have passed their delivery date/time. In step 8406, the supplier name is displayed. In step 8408, all members that have ordered in the CO are displayed in a list. For each member, there is displayed the member name, the cumulative balance, the CO balance, the payment amount, the payment type selection, any payment comments, credit amount requested, credit type, reason, credit comments, and allocation credit. At step 8410, there is displayed all credits to the supplier by product. For each product, there is displayed the SKU, description, credit amount requested, reasons (why the credit was requested), and also provided is a supplier credit check box which triggers the credit request for this product to the supplier along with the reason for the request. At step 8412, there is displayed all credits from inventory by product. For each product, there is displayed the SKU, description, credit amount requested, reasons. In step 8414, any member credits requested by members and any payments already submitted and accepted are updated in the member accounts. Execution then proceeds to FIG. 85.

Figure 85:
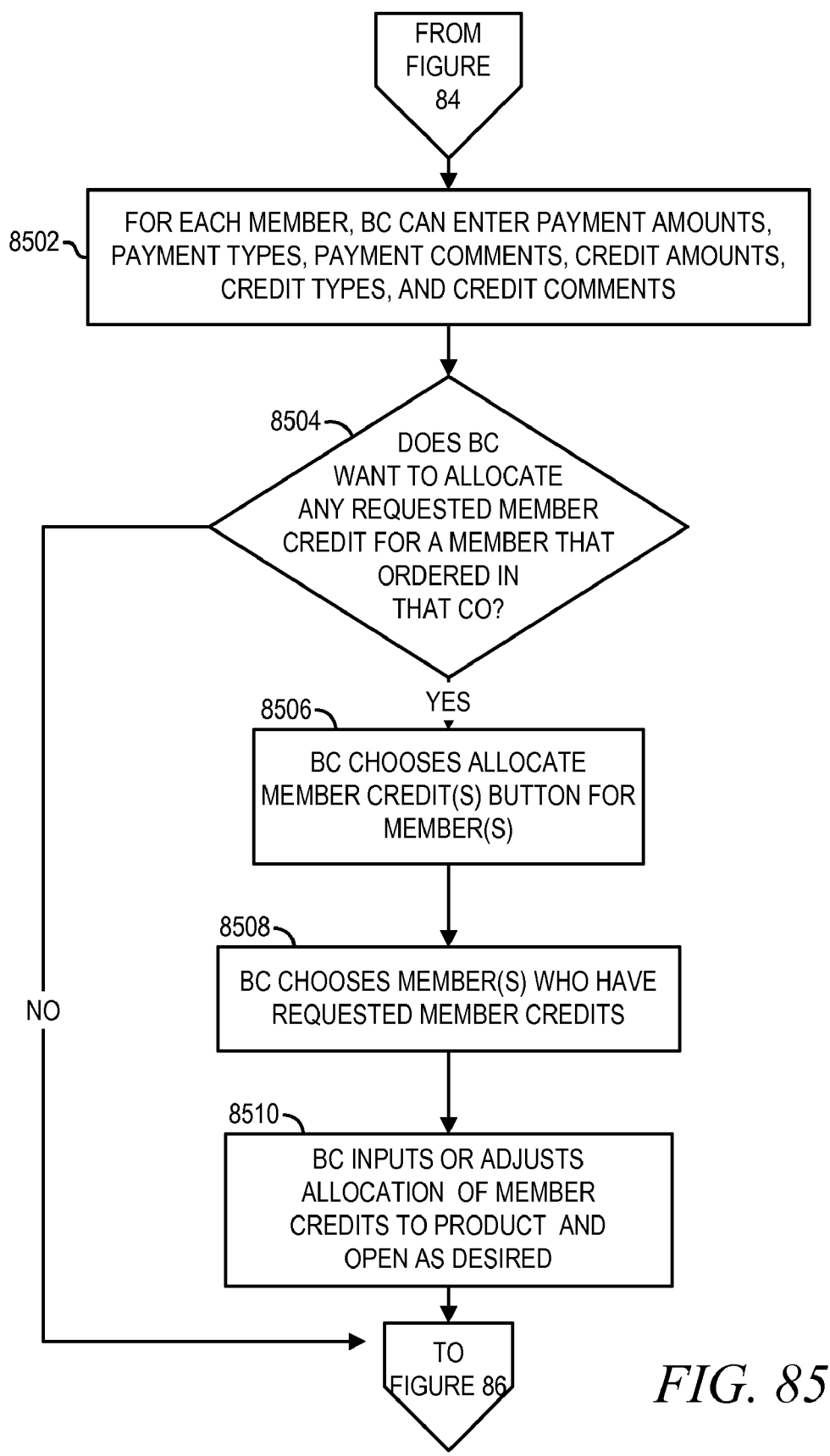

Continuing in FIG. 85, in step 8502 for each member, the BC may enter a payment amount, payment types, payment comments, credit amounts, credit types, and credit comments. In step 8504, the BC indicates whether he would like to allocate any requested member credit for a member that ordered in that CO. If the BC would like to allocate any requested member credit for a member that ordered in that CO, then execution proceeds to step 8506, wherein the BC indicates same. Execution then proceeds to step 8508, wherein each member who has made a credit request for a product is listed in a row along with the requested product credit. In that same row are shown to the right four other columns, the first being the dollar amount ordered for that product for that member, the second being the dollar amount of the credit request, the third being an editable field in which the BC may post the credit request to the product and the fourth being an editable field for posting the credit to the member as open. In step 8510, the BC then enters the member credit amount to the products or, optionally, on open account, as desired. Upon completion of step 8510 or, if, in step 8504, the BC indicates that he would not desire to allocate any requested member credits for a member that ordered in that CO, then execution proceeds to step 8602 in FIG. 86.

Figure 86:
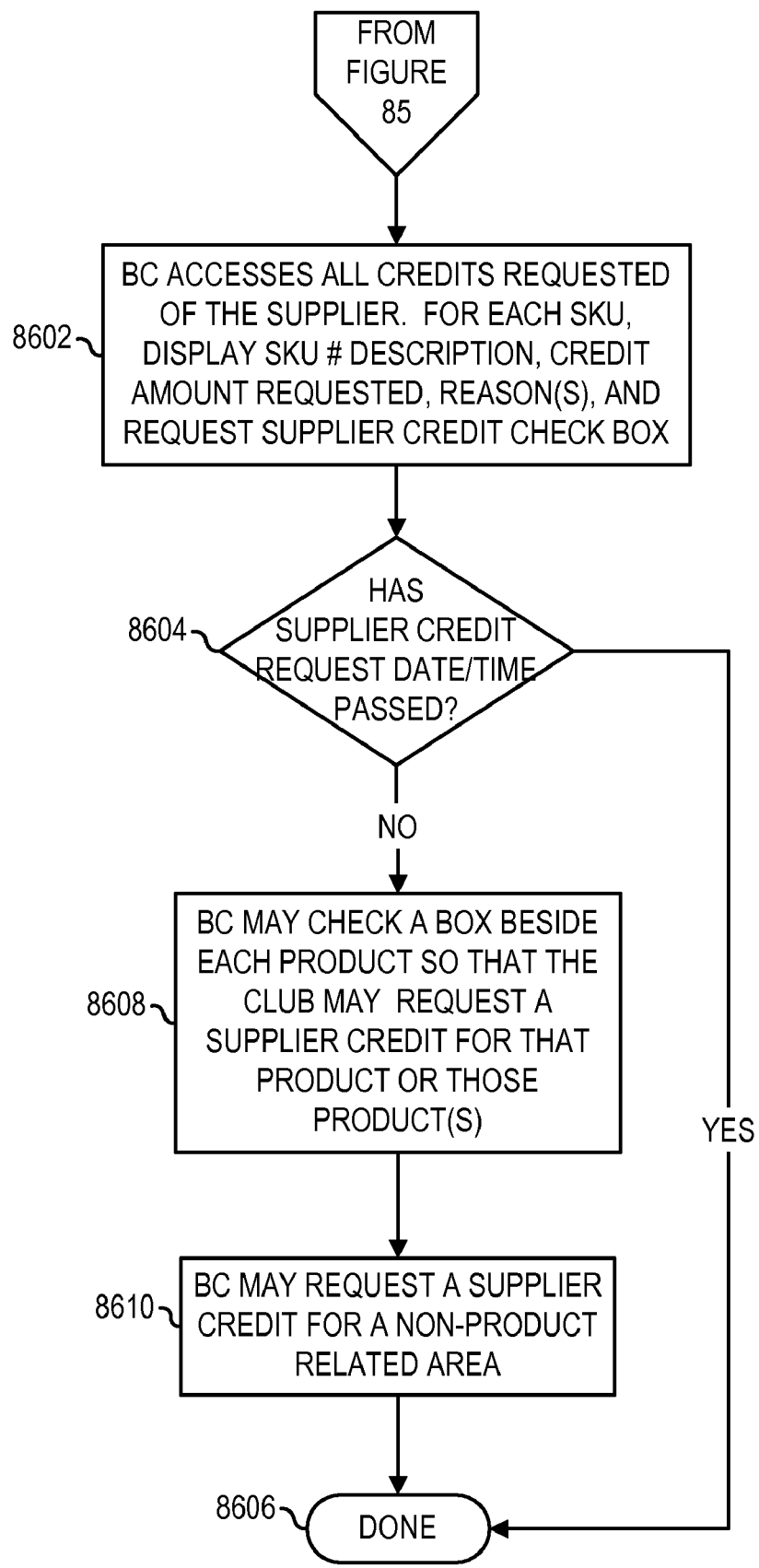

Continuing in FIG. 86, at step 8602, the BC accesses all credits requested of the supplier. More specifically, for each SKU, there is displayed the SKU number, the description, the credit amount requested, reasons, and also provided is a request supplier credit check box. In step 8604, a determination is made whether the supplier credit request date time has passed. If the supplier credit request date time has passed, then execution is terminated at step 8606. If, in step 8604, the supplier credit request date time has not passed, then execution proceeds to step 8608, wherein the BC may indicate via a check box associated with each product so that the buying club may request a supplier credit for that product or those products. At step 8610, the BC may request a supplier credit for a non-product related area. In step 8606, execution is terminated.

Discussion now turns to a detailed explanation of a preferred mode for determination of pricing and amounts owed for products ordered by members in buying clubs.

FIGS. 87-98 describe the pricing and amount calculations and the add-on costs and discounts that are associated with calculating the amounts owed for products ordered by members of a customer (such as a buying club) from a supplier through a CO. Also described is the process for determining the cost for products that are to be added to inventory within that CO as part of a Club Surplus order. The members of the buying club in this example may be one or more individual persons, the club surplus account of a buying club, a retailer ordering in conjunction with members of a buying club, or any combination of the above.

Figure 87:
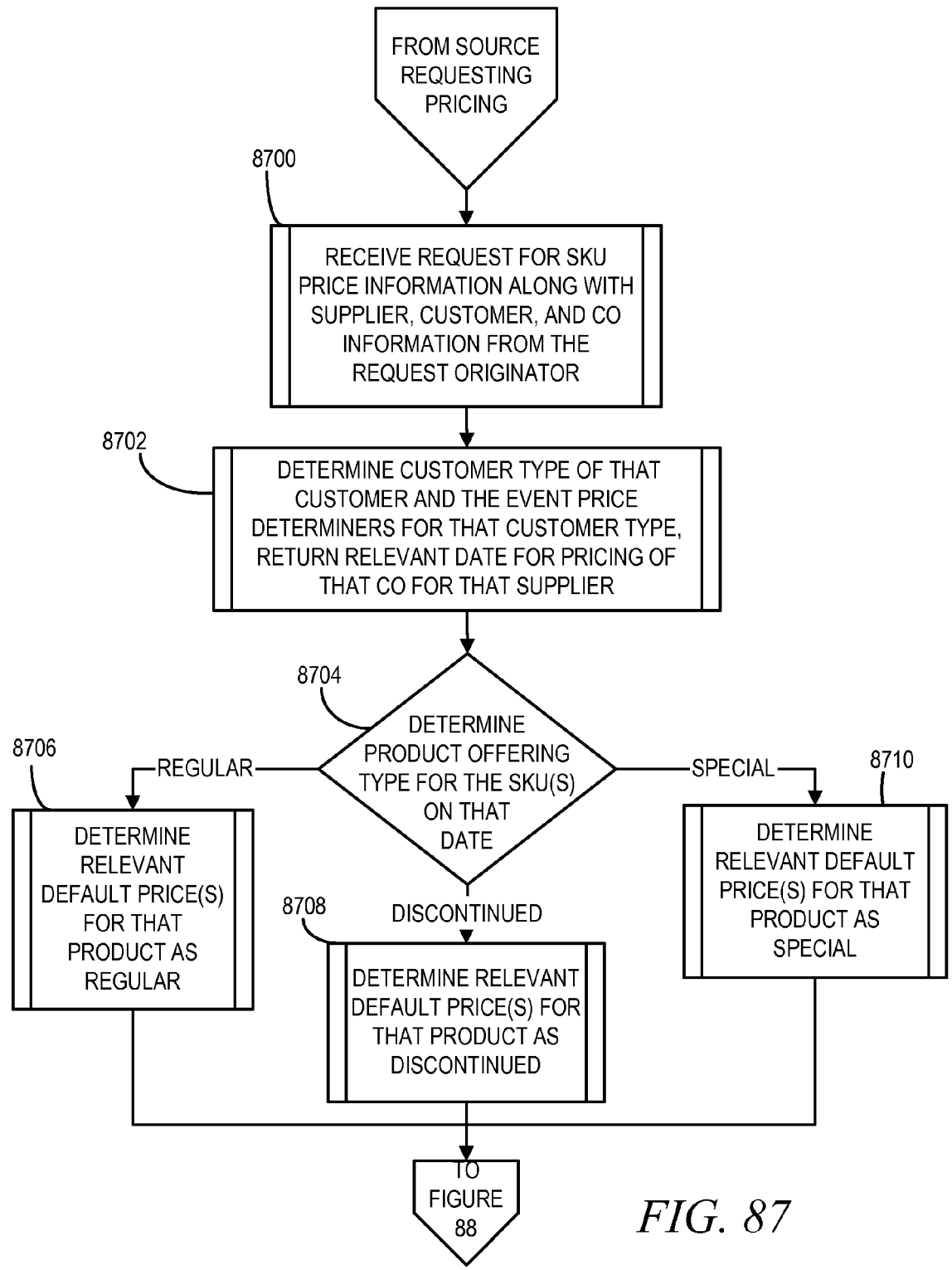
FIG. 87 is a flow chart showing the receipt of the request for pricing from a customer and the process steps for determination of the corresponding default supplier price to the customer.

FIG. 87 initiates the pricing process by means of an order of a customer generating a request for pricing of the product being ordered. Step 8700 denotes the receipt of the request for pricing which includes the supplier, customer, and CO information (such as the order, ship, and expected invoice date of the CO), which are received along with the SKU number identifying the product. As denoted in Step 8702, a customer type for that customer with that supplier is identified and the specific event price determiners (such as order date, ship date, or invoice date) for that customer type are retrieved which in turn enables determination of the specific dates under which the pricing information is to be obtained. Using those dates, then as denoted in Step 8704, the product offering type for that SKU (such as regular, discontinued, or special) is identified and a relevant default price is then obtained for that date of that SKU number. For example, if the SKU is a regular priced SKU on that date, then as denoted in step 8706 the regular price is returned as the default price. If the SKU is a discontinued SKU on that date, then as denoted in step 8708 the discontinued price is returned as the default price. If the SKU is a special SKU on that date, then as denoted in step 8708 the special price is returned as the default price.

Figure 88:
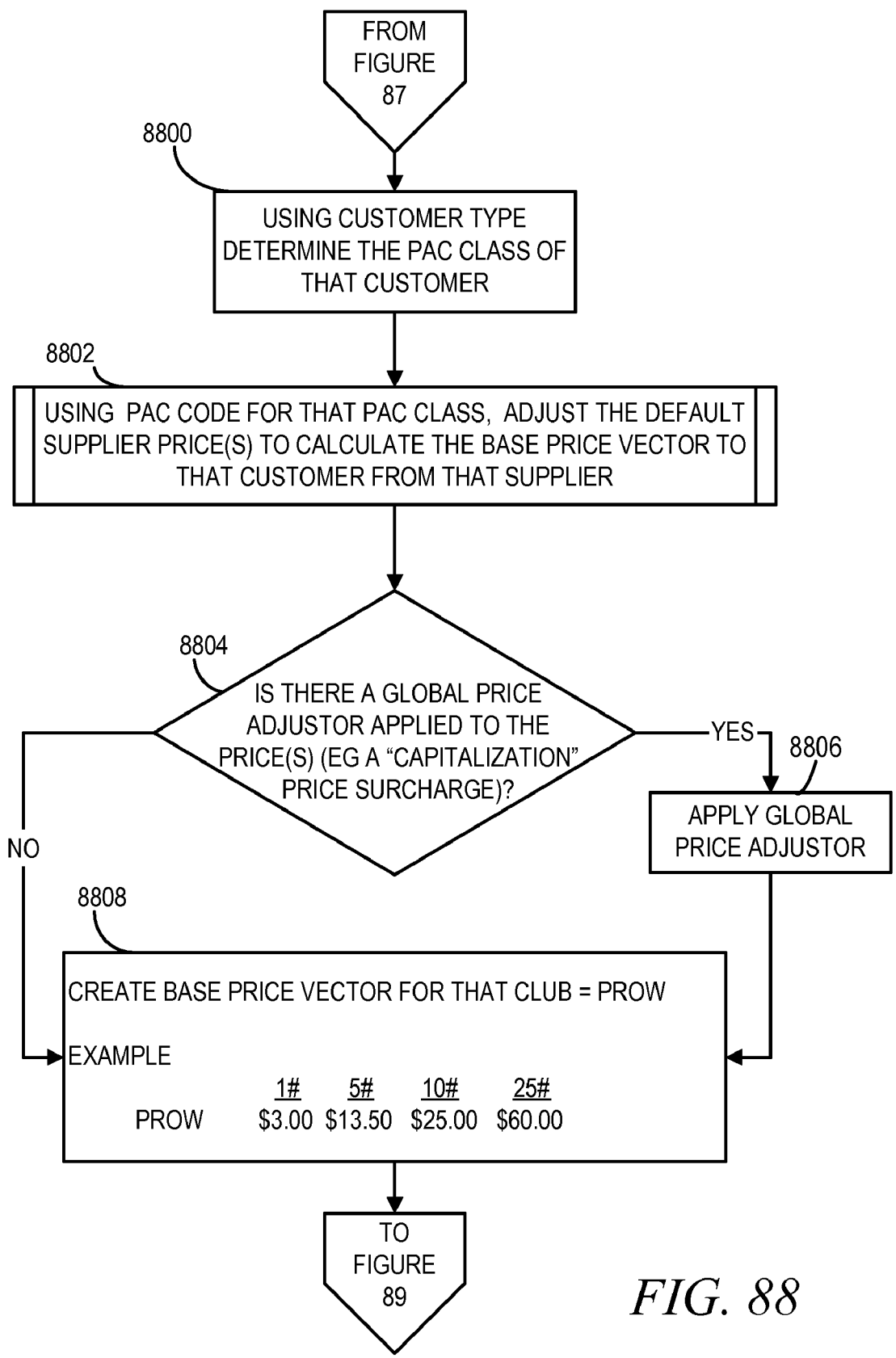
FIG. 88 is a flow chart illustrating the PAC adjustments to the default price and the resulting creation of a Base Price Vector for the ordered product(s) for that Customer.

In FIG. 88, the customer type of the customer is used to determine the PAC Class of the customer as denoted in step 8800. In step 8802 the PAC Code associated with the PAC Class is used to adjust the default supplier price to calculate the base price vector to that customer from that supplier. Then if a global price adjustor is applicable as denoted in step 8804, it is then applied as denoted in step 8806. A global price adjustor may be for example a capitalization charge of say 2% levied on every sale to a customer in the form of a price increase. Or it may be a global cost adjustor to prices for another reason such as a cost increase to one or more cost categories (fuel, labor). Or it may be a combination of more than one of these factors. If a global price adjustor is applied or not, the process creates a base price vector for that customer, which is designated as Prow and is found in step 8808, signifying those prices that are applicable at the varied units per case levels for a given product. This base price vector may be applied for a single SKU that is sold in different units per case increments (called multi-case SKUs), or a set of different SKUs that are the same product, excepting that the different SKU numbers are associated with different unit per case increments (called related SKUs). An example of a Prow vector for a multi-case SKU, SKU # 123456 of Garbonzo beans is:

| Base Price Vector 123456 GARBONZO BEANS | | | | |
|---|---|---|---|---|
| | 1# | 5# | 10# | 25# |
| PROW | $3.00 | $13.50 | $25.00 | $60.00 |

Figure 89:
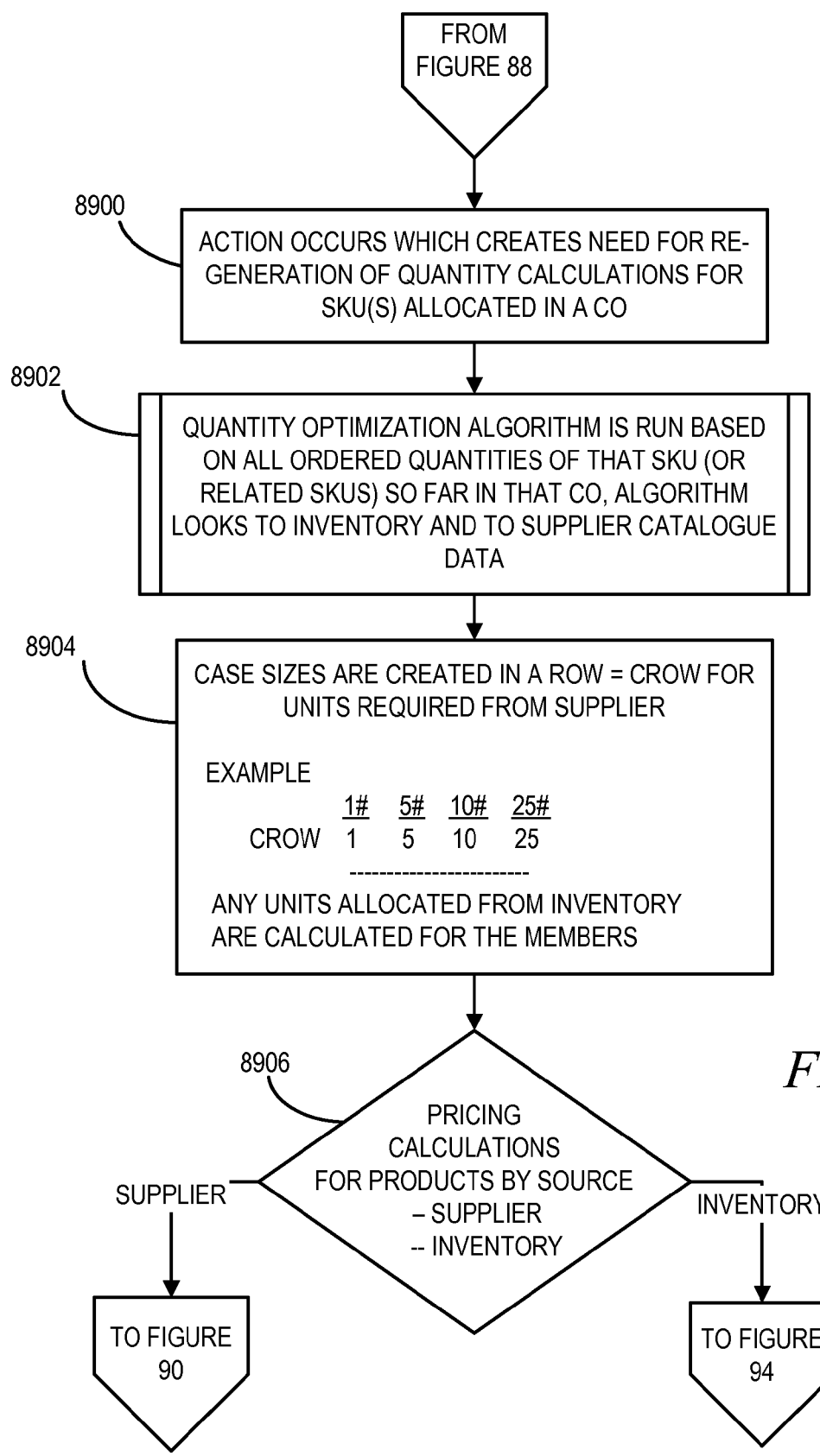
FIG. 89 is a flow chart referencing the Quantity Optimization Algorithm and the resultant Case Quantity Vector for the ordered product(s)

FIG. 89 turns to the quantities of orders being generated which are associated with the order. As noted in step 8700 of FIG. 87, an order has created a request for pricing. As denoted in step 8900, that same order preferably triggers a calculation of quantities ordered from the supplier and, if available, from inventory as is described in co-pending OPTIMIZATION PATENT. Alternatively other conditions may cause a re-calculation of quantities and prices including, but not limited to, one of a set of related SKU's being discontinued by a supplier, a change in any optimization criteria for a CO, a change in the order of a different member in the CO, an increase or decrease to a quantity of inventory, or a change in the price. In any event, the quantity optimization algorithm is run and this looks to the supplier catalogue information and the inventory information as denoted in step 8902. As denoted in step 8904 the case sizes for the set of units per case of the product are used to create a Case Size Vector denoted as CRow. An example of a Crow vector for a multi-case SKU # 123456 of Garbonzo beans is

| Case Size Vector 123456 GARBONZO BEANS | | | | |
|---|---|---|---|---|
| | 1# | 5# | 10# | 25# |
| CROW | 1 | 5 | 10 | 25 |

Figure 94:
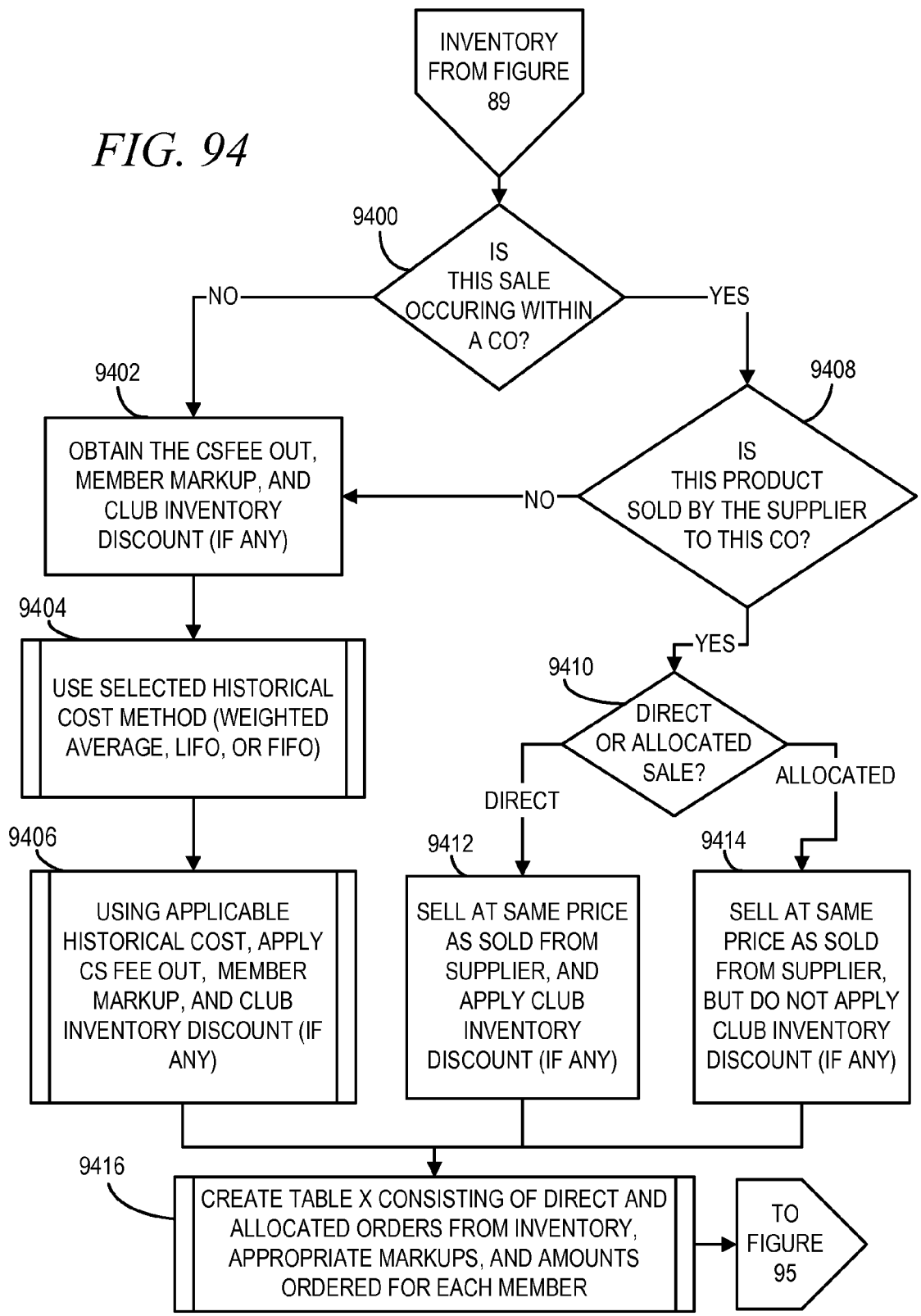
FIG. 94 is a flow chart illustrating calculation of member prices by historical cost method for products sold from inventory outside of a CO or that are no longer stored in the catalogue of the supplier.

In step 8906, a determination is made as to what portions of the orders are to be sourced from the supplier and what portions are to be sourced from inventory. FIG. 94 describes the process for pricing products sourced from inventory and FIG. 90 describes the process for pricing products to be sourced from the supplier.

Figure 90:
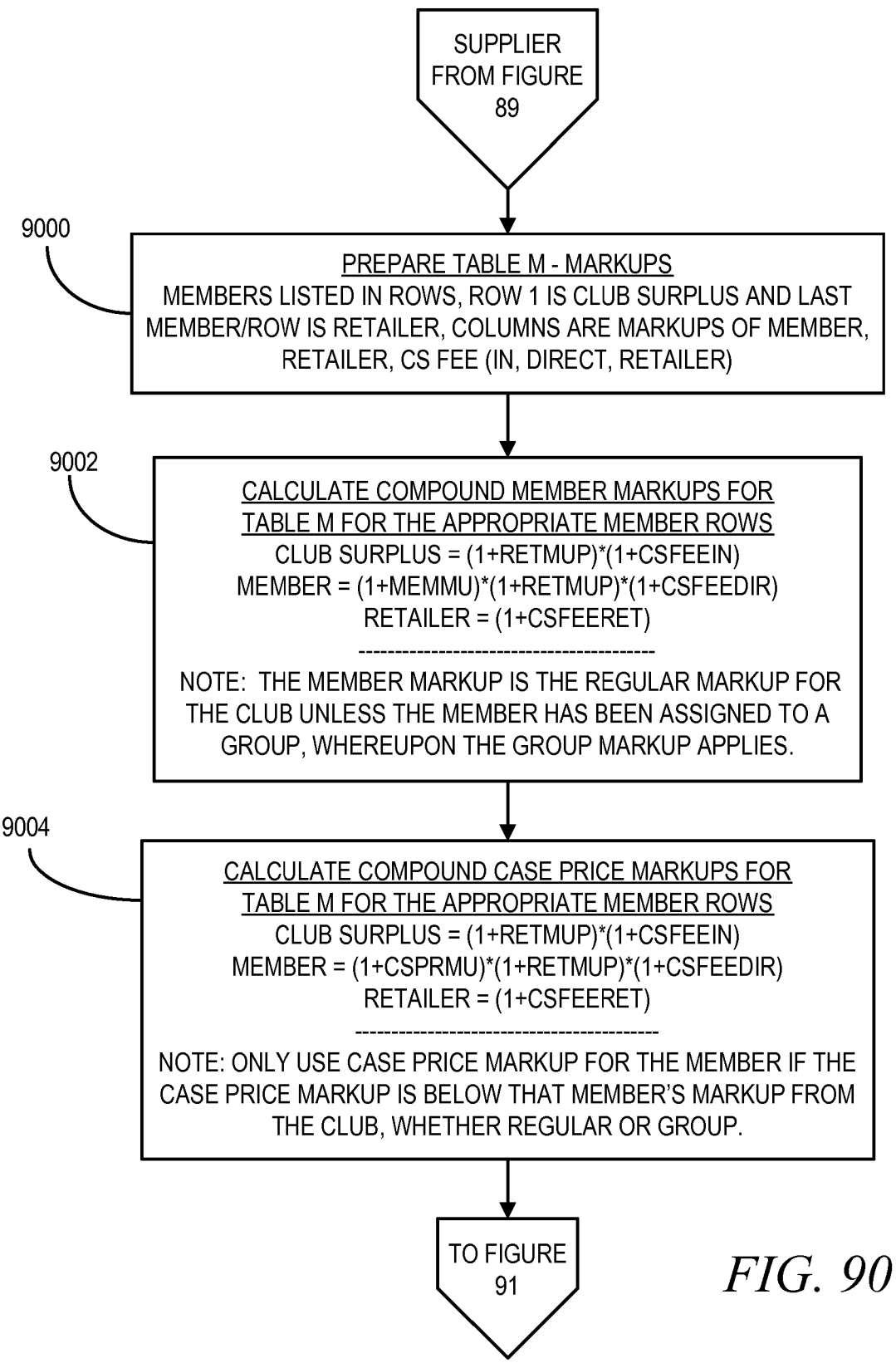
FIG. 90 is a flow chart referencing a Table M created to store and calculate Customer Markups, including compounded markups for when a case price markup is in effect or is not in effect.

In FIG. 90, a table M is prepared as denoted in step 9000 detailing all the associated markups for each member for the sourcing of that product from that supplier in that CO. Markups include Regular/Member Markup, Retailer Markup, the applicable CS Fee, and under certain criteria a Case Price Markup instead of the Regular/Member Markup. These markups are intended to be illustrative and are not in any way intended to limit the type or number of markups that may be applied. The Members that have placed orders for the product in this CO are listed in rows. For the rows, a Member 1 is assumed to be a Club Surplus and the last member is assumed to be a Retailer.

Markups are preferably expressed as percentages, but alternatively may be set as a fixed amount (such as $0.10 per unit, or $0.25 per product ordered by a member). These markups are those that are associated with the CO and are listed in the columns of Table M. The Regular or Member Markup is assessed by the club to its members as a means to help cover costs for the club. The Regular Markup is preferably the default markup set by the Buyer Coordinator for members of the club. The Member markup is an alternative markup to the Regular Markup which the Buyer Coordinator may set for members of the club who are to be assessed a different markup than the regular markup as determined by the group to which the member was assigned. The Member markup set by the Buyer Coordinator for a member may be higher or it may be lower than the Regular Markup.

The Retailer Markup is used for any commissions that are to be paid for retailers who are providing some level of service to the order process. The Retailer Markup may be assessed as a single percentage for all categories of products or it may be assessed as one markup for one category (such as groceries at 10%), another markup for another category (such as dairy 7%) and markups for other categories as well, or a single markup for all remaining categories (such as 12%). The retailer markup to be included in this table M for this product is the appropriate retailer markup for whatever category the product to be priced belongs, in this example Garbanzo Beans, and it would likely fall in a category called Grocery and thus receive a 10% markup.

The CS Fee is a charge to the club from a third party that is providing the order service technology or other processing services for members. The CS Fee is preferably classified and its value may change depending on the category or function of the person placing the order. For example, Club Surplus, Member, and Retailer are three classifications that preferably incur different fees. For example, the CS Fee for Club Surplus is called CS Fee In and is applied to all products ordered for the inventory of the Club (in the example below the CS Fee In is 1.5%). The fee to be assessed to members ordering from the supplier is called the CS Fee Direct, because this is assessed only on direct orders from the supplier to the member (in the example below the CS Fee Direct is 3.0%). The CS Fee for members who are ordering or are allocated a product from inventory is called the CS Fee Out (inventory sales are not displayed in the table below but are addressed separately in FIG. 94). The CS Fee for a retailer is assessed to any person who is deemed a retailer who is placing orders to the supplier (in the example below the CS Fee for a Retailer is 1.0%).

A further markup that may be associated with a CO is called the Case Price Markup. A Buyer Coordinator of a CO may preferably elect to charge a lower markup to any person ordering a case through the club, as these require less handling and processing. If a Case Price Markup is allowed, it may be further qualified between case orders marked as being non-splittable only, or relaxed to also include those products in which a member orders a minimum to maximum unit range which includes an integer multiple of cases of a product (thus a 12 unit per case product would receive the case price markup if the member indicated 21 to 25 units since 24 units is 2 cases). The case price markup is preferably only charged to a member if it is less than their regular or member markup. If the member markup is less than the case price markup, then the markup preferably used is the member markup.

As denoted in step 9002, Table M consists of two columns at the far right hand side which are all the markups compounded, the second to last right hand column on the right being all the compound markups excluding the case price markup, and the last right hand column being the compound markups including the case price markup in lieu of the regular/member markup. The case price markup is denoted to be 5% and is found above the far right hand column in which the compounding calculation including case price markup is made. As noted above, the case price markup, when one is established, is used in lieu of the Regular or Member markup. A depiction of a Table M is found below.

TABLE M

STORED AND COMPOUND MARKUPS
Case Price
Markup = 5%

|  | Member Markup* | Retailer Markup | CSFee** | Compound Member Markup | Compound Case Price Markup |
|---|---|---|---|---|---|
| Club Surplus | 0.0% | 10.0% | 1.5% | 1.11650 | 1.11650 |
| Member2 | 10.0% | 10.0% | 3.0% | 1.24630 | 1.18965 |
| Member3 | 20.0% | 10.0% | 3.0% | 1.35960 | 1.18965 |
| Member4 | 15.0% | 10.0% | 3.0% | 1.30295 | 1.18965 |
| Member5 | 15.0% | 10.0% | 3.0% | 1.30295 | 1.18965 |
| Retailer | 0.0% | 0.0% | 1.0% | 1.01000 | 1.01000 |

*This defaults to the regular club markup unless the member is assigned a group markup.
**CS Fee Direct for Members, CSFee In for Club Surplus, CS Fee Retailer for retailer.

As may be noted in Table M and is denoted is steps 9002 and 9004, orders for Club Surplus are preferably not charged any Regular or Member markup since they are orders for the club itself. Similarly orders for a retailer are not charged a Regular or Member markup, nor a retailer markup but are only charged a markup for the applicable CS Fee Retailer, which in the Table M example noted above is 1.0%.

The compound member markup for Member 2 is $$(1+0.10\%)*(1+0.10\%)*(1+0.03\%)=1.24630$$

The compound case price markup for Member 2 is $$(1+0.05\%)*(1+0.10\%)*(1+0.03\%)=1.18965$$

Figure 91:
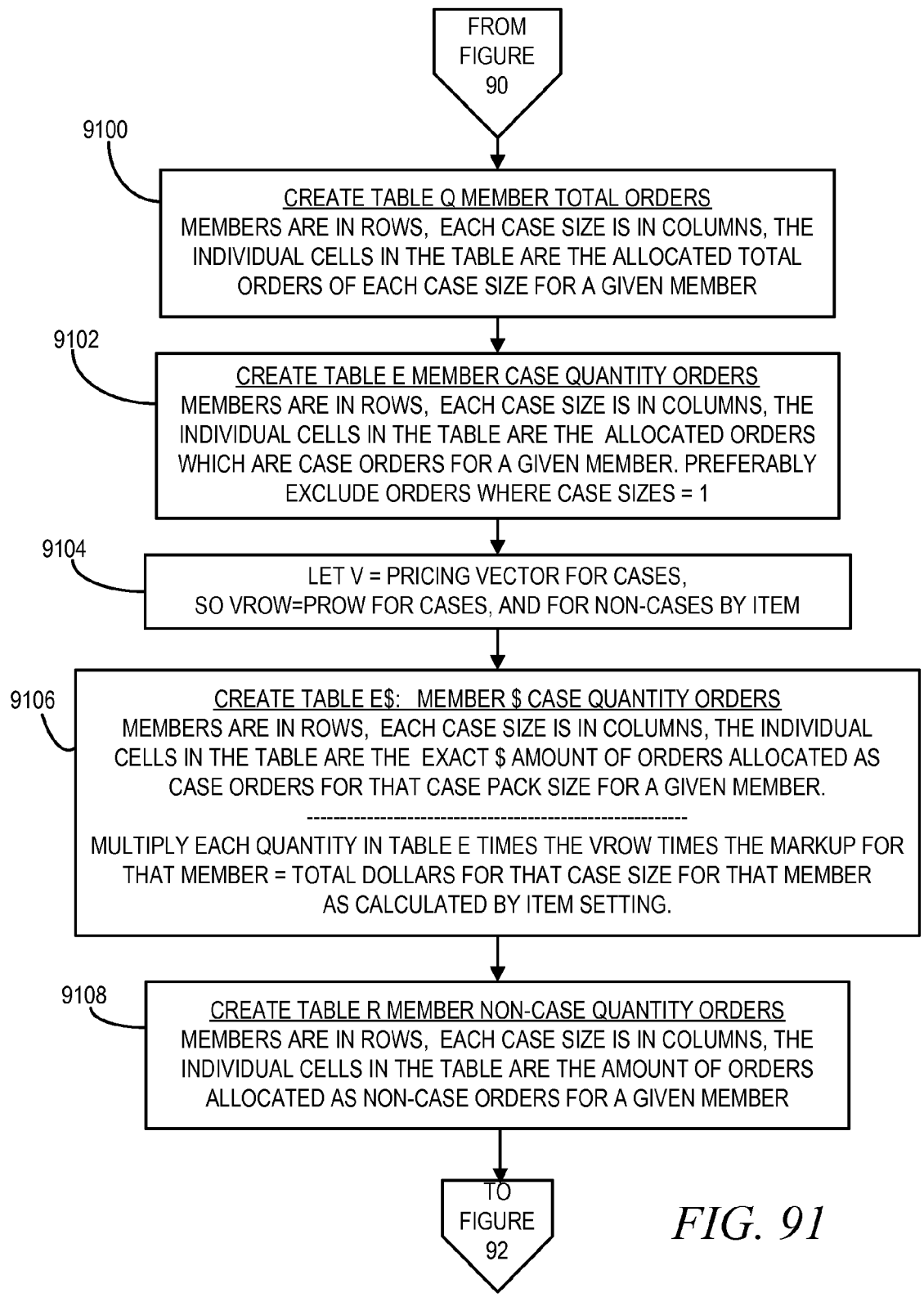
FIG. 91 is a flow chart referencing a Table Q for storing all customer orders, a Table E for storing the quantities of customer case orders, a Table E$ for storing dollar amounts of case orders for customers, and a Table R for storing Member non-case quantity orders.

Turning to FIG. 91, a Table Q is created as denoted in step 9100 consisting of each of the members in rows and the case sizes in columns with the cells of the table filled in for each of the quantities of that case size allocated to that member.

TABLE Q

123456 GARBONZO BEANS
TOTAL ORDERS

|  | 1# | 5# | 10# | 25# |
|---|---|---|---|---|
| Club Surplus | 3 | 0 | 0 | 0 |
| Member2 | 0 | 1 | 1 | 0 |
| Member3 | 1 | 0 | 0 | 1 |
| Member4 | 2 | 1 | 0 | 2 |
| Member5 | 0 | 1 | 0 | 1 |
| Retailer | 2 | 0 | 0 | 0 |
| Sum Total: Orders | 8 | 3 | 1 | 4 |

A Table E is created as denoted in step 9102 in which each case quantity order for a member is found. Table E is a subset of the orders from Table M, but in Table E only the quantity of cases allocated to a member are stored. A business rule is noted that a case quantity of 1 is deemed to be a single unit and therefore is not stored as a case in Table E. This is due to the fact that although the presented design does not distinguish between units per case of greater than 1 and 1, the likelihood is that allowing the preferably lower case price markup than the regular or member markups for products ordered in single units is not a desirable outcome. Therefore when the units per case is equal to 1 these are preferably not deemed to be case quantity orders.

TABLE E

123456 GARBONZO BEANS
CASE QUANTITY ORDERS

|              | 1# | 5# | 10# | 25# |
|--------------|----|----|-----|-----|
| Club Surplus | 0  | 0  | 0   | 0   |
| Member2      | 0  | 1  | 1   | 0   |
| Member3      | 0  | 0  | 0   | 1   |
| Member4      | 0  | 0  | 0   | 0   |
| Member5      | 0  | 1  | 0   | 1   |
| Retailer     | 0  | 0  | 0   | 0   |
| Sum Case orders | 0 | 2 | 1  | 2   |

Next illustrated is creation of a Table E$, the dollar amount of the case quantity orders. To do this, a determination of price is made which is denoted in step 9104 which is preferably to state that the base price for the cases (before markups are applied) will be the same as the price established for the Prow back in step 8808. An alternative methodology may set a different base price for cases and that is why Vrow is not simply determined to be Prow. Using the pricing determination denoted in step 9104 and the case quantity orders defined in Table E and the applicable (in this example) case price markup of 5%, a Table E is created as denoted in step 9106 (remembering that a case size of 1 is preferably not deemed to be a case). For easy reference, the Compound Case Price Markup from Table M is found in the far right hand column.

TABLE E$

123456 GARBONZO BEANS
DOLLAR AMOUNTS OF CASE QUANTITY ORDERS

| Vrow         | $3.00 | $13.50 | $25.00 | $60.00 | Compound Case |
|--------------|-------|--------|--------|--------|---------------|
| Crow         | 1#    | 5#     | 10#    | 25#    | Price Markup  |
| Club Surplus | $-    | $-     | $-     | $-     | 1.11650       |
| Member2      | $-    | $16.06 | $29.74 | $-     | 1.18965       |
| Member3      | $-    | $-     | $-     | $71.38 | 1.18965       |
| Member4      | $-    | $-     | $-     | $-     | 1.18965       |
| Member5      | $-    | $16.06 | $-     | $71.38 | 1.18965       |
| Retailer     | $-    | $-     | $-     | $-     | 1.01000       |

A Table R is created as denoted in step 9108 for storing the quantities of orders that remain from Table Q. Effectively for each position in the respective tables, R=Q−E. It should be noted that there may be other separate designations beside case quantities for another specialized treatment for some sub-set of the total orders, although only the case price markup treatment is described herein. If one or more other specialized treatment situations were utilized, then R would equal the subtraction not only of the case price markup quantities from Table Q, but also each additional specialized treatment situation. It is also possible that a case may be allocated to a member and would appear in Table R, which includes only non-case orders, because the optimization algorithm initially allocated a case quantity to the member, but the units for the order submitted by the member did not meet any criteria by which the order qualified for receipt of the case price markup (for example a member ordered 57 units as a minimum, preferred, and maximum quantity of a product which included a 25 unit per case product). Member 4 in Table R illustrates such a result. Table R is illustrated next below.

TABLE R

123456 GARBONZO BEANS
MEMBER NON-CASE QUANTITY ORDERS

|              | 1# | 5# | 10# | 25# |
|--------------|----|----|-----|-----|
| Club Surplus | 3  | 0  | 0   | 0   |
| Member2      | 0  | 0  | 0   | 0   |
| Member3      | 1  | 0  | 0   | 0   |
| Member4      | 2  | 1  | 0   | 2   |
| Member5      | 0  | 0  | 0   | 0   |
| Retailer     | 2  | 0  | 0   | 0   |
| Sum Rrow     | 8  | 1  | 0   | 2   |

Figure 92:
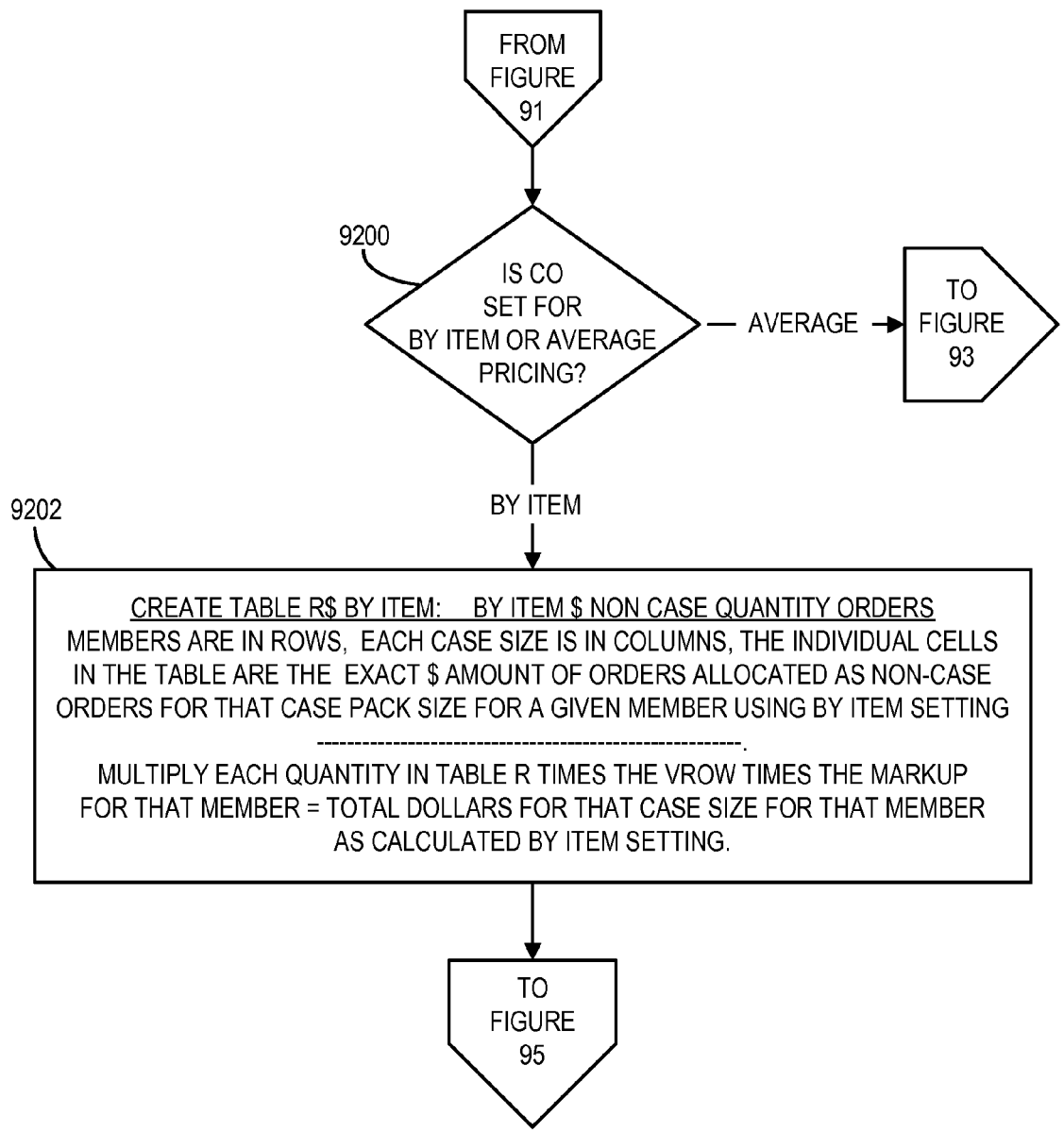
FIG. 92 is a flow chart referencing a Table R$—By Item that under a selection of By Item stores the dollar amounts for the non-case quantity orders.

As denoted in FIG. 92, step 9200, next a determination is made as to whether the CO is to be processed under By Item pricing or Average Pricing for the non-case quantity orders. In step 9202, a Table R$—By Item is created, which stores the dollar quantities of the non-case quantity orders calculated on a By Item basis. On the By Item basis, the Vrow is again set equal to the Prow so that each member receives the same base price as was noted in the Base Price Vector in step 8808. For easy reference, the Compound Regular/Member Markup from Table M is found in the far right hand column.

TABLE R$

By Item
123456 GARBONZO BEANS
BY ITEM - $ NON-CASE QUANTITY ORDERS

| Vrow         | $3.00  | $13.50 | $25.00 | $60.00  | Regular/Member |
|--------------|--------|--------|--------|---------|----------------|
| Crow         | 1#     | 5#     | 10#    | 25#     | Markup         |
| Club Surplus | $10.05 |        |        |         | 1.11650        |
| Member2      |        |        |        |         | 1.24630        |
| Member3      | $4.08  |        |        |         | 1.35960        |
| Member4      | $7.82  | $17.59 |        | $156.35 | 1.30295        |
| Member5      |        |        |        |         | 1.30295        |
| Retailer     | $6.06  |        |        |         | 1.01000        |

Figure 93:
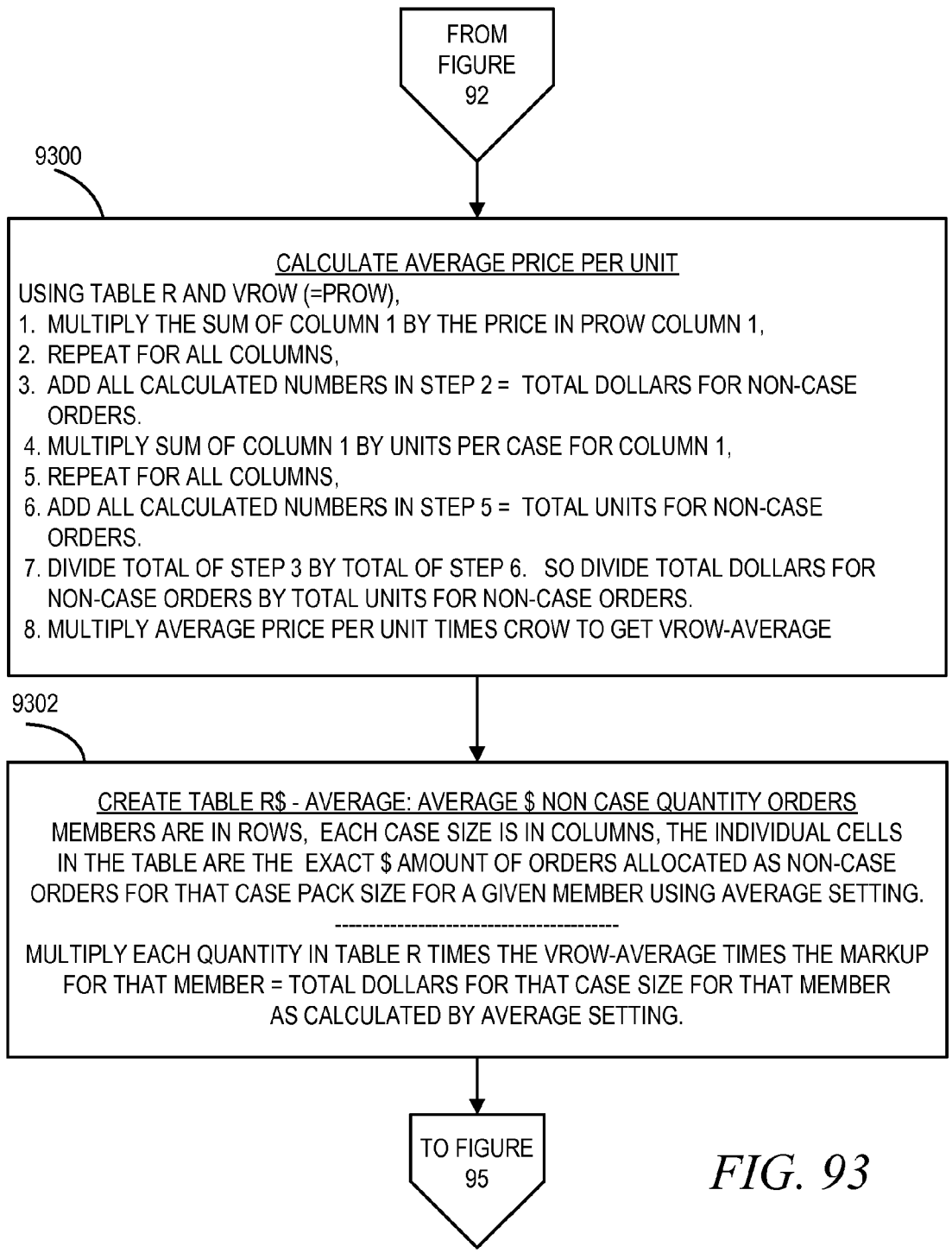
FIG. 93 is a flow chart detailing the calculation of an Average Price Per Unit for all non-case orders, and referencing a Table R$ —Average that under a selection of Average, stores the dollar amounts for the non-case quantity orders.
Figure 95:
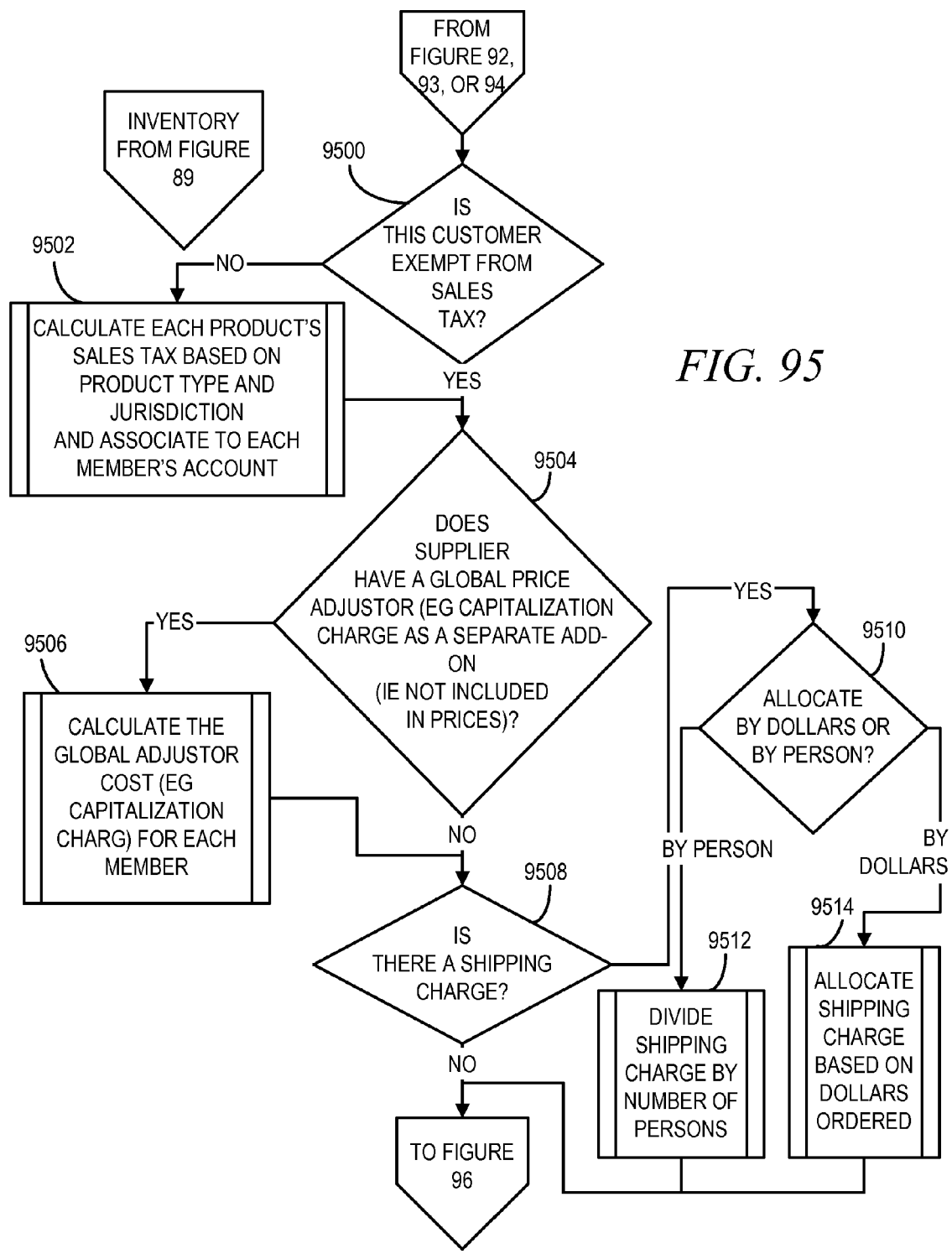
FIG. 95 is a flow chart illustrating Add-On costs and allocations for members for sales tax, a global price adjuster (such as a capitalization fee), and shipping charges.

Processing next proceeds to FIG. 95 for the calculation of add-ons charges and discounts. Before proceeding to FIG. 95, the alternative denoted in step 9200, the average method calculation for non-case orders is described in FIG. 93. FIG. 93 describes the calculation of the pricing for non-case quantity orders in the circumstance where Average has been selected by the Buyer Coordinator as the preferred method for calculating the pricing of non-case quantity orders. The key difference in the generation of the dollar amounts for non-case orders under the Average method is the calculation of the Average Price Per Unit as is denoted in step 9300.

The Average Price Per Unit is calculated by a multi-step process which first creates a sum of each column in Table R (called SumR row in Table R). Next it multiplies the SumR of each column times the prices to calculate the total of all dollars ordered for each case size. Next it aggregates each of those dollar totals across all the case sizes to achieve a total dollars ordered for that product for non-case quantities. Then it divides that total dollar number by the sum of all the units ordered.

123456 GARBONZO BEANS
Calculation of Average Price Per Unit

SumR = sum of rows in R, thus total R cases = Total Cases

| 8 | 1 | 0 | 2 | |
|---|---|---|---|---|

SumRrow times Pcolumn = Total Non-case $

| $24.00 | $13.50 | | $120.00 | $157.50 |
|---|---|---|---|---|

SumRrow times Ccolumn = Total Units

| 8 | 5 | 0 | 50 | 63 |
|---|---|---|---|---|

Then to calculate the price per case size under the average method setting, the Average Price per unit is multiplied by the units per case and this become the Vrow in the Table R$-Average as denoted in step 9302 and Table R-$ Average below.

TABLE R$

Average
123456 GARBONZO BEANS
AVERAGE - $ NON-CASE QUANTITY ORDERS

| Vrow-Average<br>Crow | $2.50<br>1# | $12.50<br>5# | $25.00<br>10# | $62.50<br>25# | Regular/<br>Member<br>Markup |
|---|---|---|---|---|---|
| Club Surplus | $8.37 | | | | 1.11650 |
| Member2 | | | | | 1.24630 |
| Member3 | $3.40 | | | | 1.35960 |
| Member4 | $6.51 | $16.29 | | $162.87 | 1.30295 |
| Member5 | | | | | 1.30295 |
| Retailer | $5.05 | | | | 1.01000 |

The above figures describe pricing for products sourced from the supplier. It is often advisable to sell and therefore price products sourced from inventory. FIG. 94 describes the pricing for products that are allocated to be sold from inventory. As denoted in step 9400 it is first determined if the sale of the inventory that is to be priced is occurring within a CO. If Yes, then it is next determined in step 9408 if the product is sold by the supplier in the CO. If Yes, then a calculation is preferably made as denoted in step 9410 which is to utilize the current pricing for the product in that CO from that supplier and to sell the inventory at the same price as that product is being sold from the supplier.

The Club Inventory Discount is a price reduction (preferably expressed as a percentage) under which the product will be sold from inventory and is an incentive to help move product out of inventory. For example, a product which would otherwise be sold for $1.00 that carries a 25% Club Inventory Discount would then sell for $0.75 as a direct sale from inventory. A Buyer Coordinator may elect to share (or not) the Club Inventory Discount even with members who are allocated the product from inventory instead of sharing this only with members who purchase the inventory directly, although for purposes of equity in pricing between members the Club Inventory Discount is preferably not included for quantities which are allocated to members.

If the answer to step 9400 is no, ie the sale is occurring outside of a CO, or the answer to step 9408 is no, ie the product is not sold by the supplier in the CO, the processing turns to step 9402 which is to obtain the CS Fee Out, the Member Markup and the Club Inventory Discount. The CS Fee Out is the fee which is charged by a third party processor for use of the system or for other services which is levied on sales of products from inventory.

As denoted by step 9404, the next step is to determine the historical cost per unit for the product as recorded in inventory. Historical cost may be calculated by any one of a number of established costing methodologies commonly known such as First in, First Out (FIFO), Last in First Out (LIFO), or Weighted Average Cost. Any such method will use the lot date, lot number, units per lot, and cost per lot to make such determination as is commonly known by accounting convention. For purposes of determining the unit cost to be used as historical cost it is preferable that the weighted average cost of all on-hand units be utilized as this will prevent inventory from being over or undervalued and best apportion the cost to purchases. On-hand units (versus the net available are commitments) are used so as to prevent rapid changes in prices based on other committed orders that would affect the quantity of units available and thus the cost per unit. The member price is then calculated using the applicable markups of the CS Fee Out, Member Markup and Club Inventory Discount (CID), if any, as applied to the historical cost as denoted in step 9406.

If the determination reached in step 9400 is that the product to be sold from inventory is part of a CO then the next determination is whether the product is sold in a CO or not as denoted in step 9408. If the supplier no longer carries that product for sale, then the sale effectively occurs independently of the CO and processing proceeds to steps 9402, 9404, and 9406 just as though that product were being sold outside of a CO.

If the product is being sold within a CO then the product is preferably priced using the same pricing as that product is made available from the supplier. Whether or not the Club Inventory Discount may be applied is preferably determined by whether the product is purchased directly or is allocated as denoted in step 9410. A direct sale is when a member specifically orders a product from inventory. An allocated sale is when the quantity optimization algorithm allocates to members that product from inventory. As denoted in step 9412, for products purchased directly from inventory, the club inventory discount set by the Buyer Coordinator is preferably applied to reduce the price to the members. If the product is allocated, then the club inventory discount is preferably not applied to the price as denoted in step 9414.

Table I below presents an example of inventory pricing for the product Garbanzo Beans used above with an assumed historical cost (obtained by one of various methods) of $3.25 per unit and a club inventory discount of 25% which may be viewed in the context of FIG. 94 referenced above. It is unlikely that Club Surplus, which is the account of the club, would purchase inventory from itself, and so these rows are marked nm for not meaningful. Similarly, it is unlikely although not impossible that a retailer would preferably elect to purchase product from the buying club. If this occurred, the retailer would preferably not incur a retail markup (from itself) nor a member fee (from the club).

TABLE I

Inventory Pricing
123456 GARBONZO BEANS
Inventory Cost $3.25 Discount (CID) 25%

| | 1 | 2 | 3 | 4 | 5 | 6 | 7 | 8 | 9 | 10 |
|---|---|---|---|---|---|---|---|---|---|---|
| | | | | | | Inventory Prices | | | Dollar Amounts | |
| | | | | | | Inside | | | | |
| Club Surplus | Qty Ord nm | Qty Alloc. nm | Member Markup nm | CS Fee Out nm | Out-side a CO nm | a CO Direct (with CID) nm | Inside a CO Allocated (without CID) nm | Outside a CO nm | Inside a CO Direct (with CID) nm | Inside a CO Allocated (without CID) nm |
| Member2 | | | 10% | 2% | $2.73 | $2.80 | $3.74 | | | |
| Member3 | 1 | 1 | 20% | 2% | $2.98 | $3.06 | $4.08 | | $3.06 | $4.08 |
| Member4 | 2 | 1 | 15% | 2% | $2.86 | $2.93 | $3.91 | | $5.86 | $3.91 |
| Member5 | | | 15% | 2% | $2.86 | $2.93 | $3.91 | | | |
| Retailer | | | 0% | 2% | $2.49 | $2.27 | $3.03 | | | |

The formulas for the pricing calculations underlying columns 5, 6 and 7 of Table I are as follows:

5. Outside a CO

Inventory Cost X(1+Member Markup)X(1+CS Fee Out)X(1−Club Inventory Discount)

6. Inside a CO—Direct with Club Inventory Discount

Supplier cost X(1+Member Markup)X(1+Retailer Markup)X(1+CS FeeDirect)X(1−Club Inventory Discount)

7. Inside a CO—Allocated without Club Inventory Discount

Supplier cost X(1+Member Markup)X(1+Retailer Markup)X(1+CS FeeDirect)

In column 5 both the member's price and the charge for using the system are based on the CS Fee Out. In columns 6 and 7, although the member price for the inventory is based in part on the CS Fee Direct, the charge to the club for this transaction will be calculated by multiplying the Member's price times the CS Fee Out. So while the CS Fee Direct is used for calculating member pricing, the CS Fee Out is used for calculating the amount actually owed for the system processing fee.

The formulas for the amount calculations underlying columns 8, 9 and 10 of Table I are as follows. These formulas are illustrative and show the total amounts that will be achieved if the quantities ordered in column 1 and allocated in column 2 are applied to the columns 5, 6 or 7 showing the applicable prices. The formula for a product in column 8 is simply the ordered quantity as noted in column 1 times the historical price noted in column 5. More generally, any product that is ordered, as noted in Column 1, will be multiplied by the prices in Columns 5 and 6 which refer to products ordered outside and inside a CO respectively.

Column 2 denotes products that are allocated for sale from inventory and will be multiplied by Column 7 for calculating the amounts owed for these products. Since a member may order inventory and be allocated inventory both from inside a CO, two different prices may be generated for the same product ordered by the same member at the same time because the Club Inventory Discount is preferably applied to a direct inventory order but is preferably not applied to an allocated inventory quantity. In summary, the formulas for calculating amounts ordered from inventory are as follows Column 1 (quantity ordered) times Column 5 (direct price outside a CO)

Column 1 (quantity ordered) times Column 6 (direct price inside a CO)

Column 2 (quantity allocated) times Column 7 (allocated price)

The aforementioned describes the pricing mechanisms for purchasing products from suppliers and from inventory. However, to fully calculate the amount a customer owes it is necessary to include various add-on fees and discounts that are not reflected in pricing. These add-ons include, but are not necessarily limited to, sales taxes, global price adjustors (such as capitalization charges and member assessments), shipping charges, volume discounts and pickup discounts. These add-on charges and discounts are intended to be illustrative and not in any way intended to limit the number or type of add-on charges or discounts that may be applicable to an order.

Figure 96:
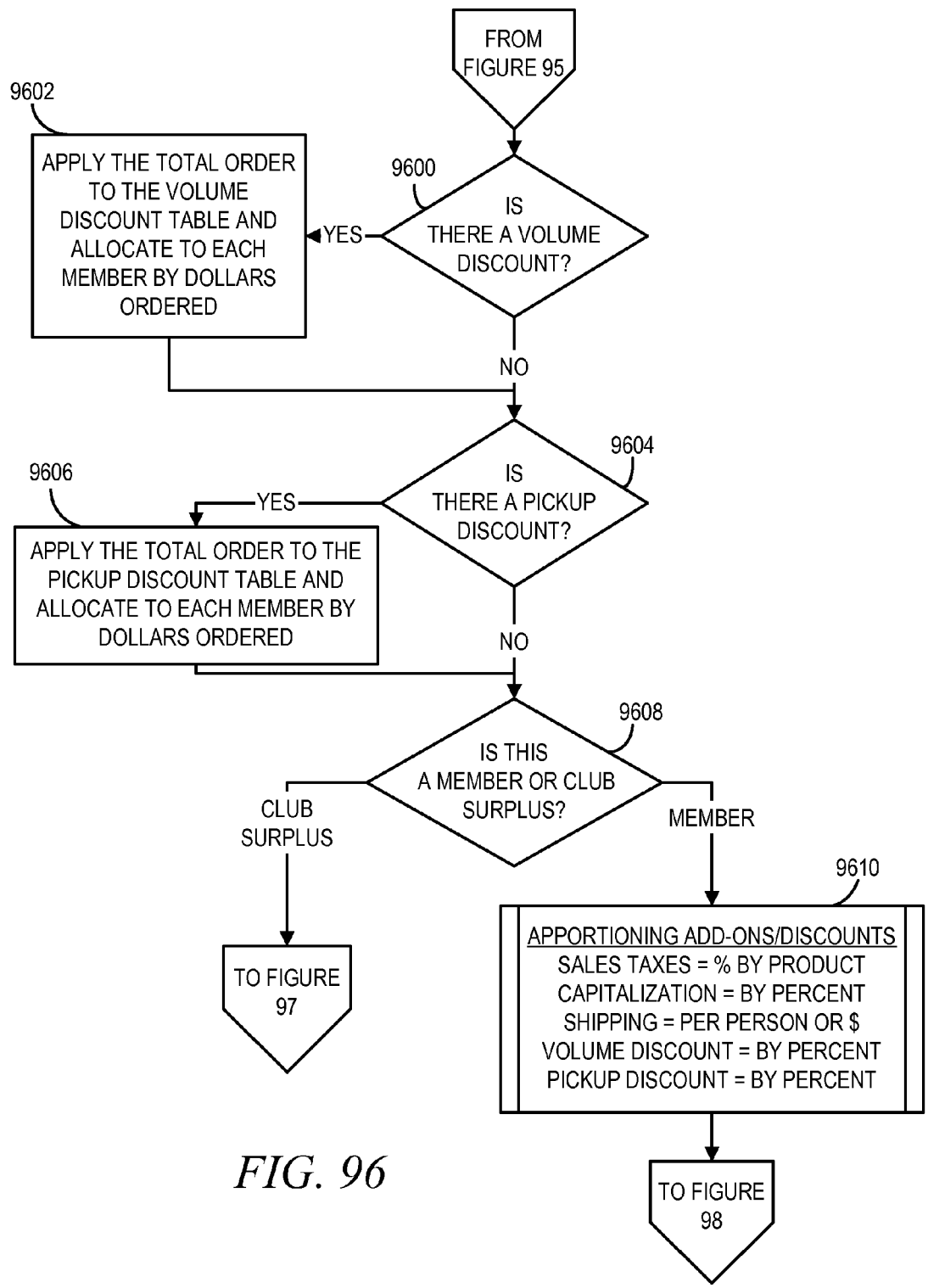
FIG. 96 is a flow chart illustrating Add-On discounts and allocations that may be obtained for Volume purchases or for purchases picked up from the supplier, as well as the presentation of these in screens and reports.

FIGS. 95 and 96 describe the procedures for handling add-ons to pricing that affect the amount that is owed by the customer to the supplier. In step 9500 it is noted whether or not a customer is subject to sales tax. If so, then as denoted in 9502 sales tax is calculated based on the appropriate jurisdiction and product tax type. Next in step 9504 a determination is made as to whether there is a global price adjustor which has not been included in pricing but which must be paid for separately from pricing. An example of this is a capitalization charge or member assessment from a supplier that is fixed at a certain percentage (say 2%) of all dollars submitted in orders to that supplier. Next in step 9508 a determination is made as to whether a shipping charge is incurred, and if so, then as denoted in step 9510 whether such shipping charge is allocated based on each individual person who has ordered or is portioned based on the total dollars ordered.

In FIG. 96, step 9600 a determination is made as to whether a volume discount is applicable. If one is, then the dollar amount of the order is calculated and a table with the applicable discount (preferably a percentage) is referenced and the dollar amount of the volume discount is calculated as denoted in step 9602. As denoted in step 9604, a determination is made as to if a pickup discount is associated with the order if the customer intends to pick up the order at the supplier's origination point. If there is, then as denoted in step 9606, the pickup discount (preferably a percentage) may be calculated and then applied to the total order to determine the amount of the pickup discount. In step 9608, a determination is made as to whether the add-ons are to be applied for Club Surplus, in which case processing proceeds to FIG. 97, or for Members in which case determination is made for how to apportion the club add-ons and discounts to members. A preferable method for apportioning the various club add-ons and discounts to the members is denoted in step 9610. From step 9610, processing proceeds to FIG. 98. Each of these add-on charges or discounts are preferably presented in the various screens and reports so that the member can see not only the total amounts of what they have ordered for each product, but also the add-on charges and discounts which will be included in calculations of the total amount owed by a member to the club for a CO.

Figure 97:
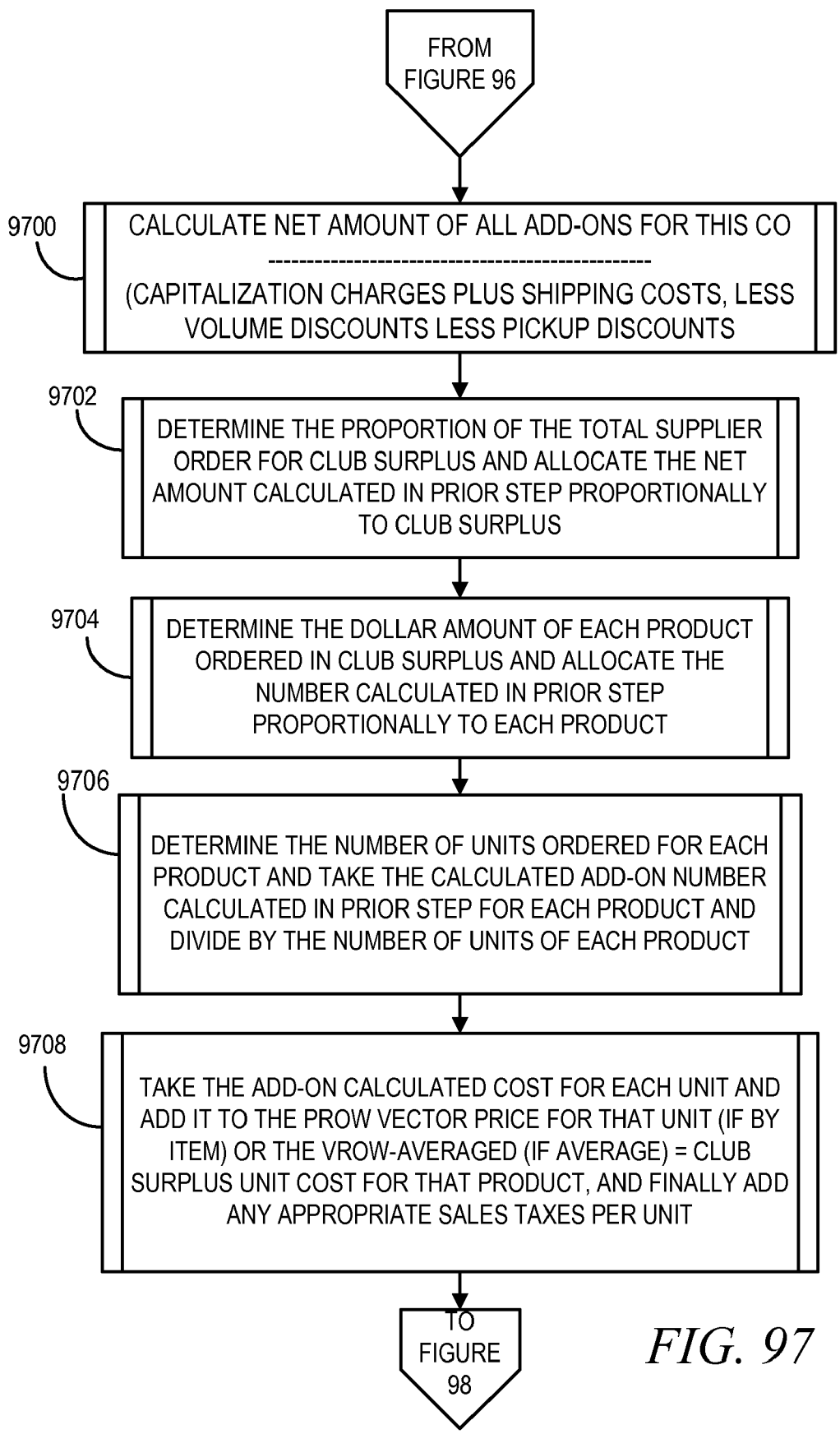
FIG. 97 is a flow chart presenting how the Add-On costs and discounts should be allocated to the Club Surplus per unit prices to create an accurate cost per unit for a product added to inventory via Club Surplus.

To accurately calculate the cost for a product ordered that is placed into Club Inventory it is necessary to include the add-ons and discounts and charges above for Club Surplus. FIG. 97 describes a preferred means for apportioning the add-on charges and discounts for the club to club inventory to determine the appropriate cost per unit to adjust club inventory with respect to the add-ons. In step 9700 a calculation is made for the discounts and add-ons of capitalization charge, shipping, volume discounts, and pickup discounts. For illustrative purposes, let us assume the figure for these 4 add-on charges and discounts is $25. In step 9702 a determination is made as to what portion of the order to the supplier is represented by Club Surplus. For illustrative purposes, let us assume that the Supplier Order is $500, and the Club Surplus order is $100, and thus Club Surplus represents 20% of the $500. Allocating this proportionally then results in 20% of the $25 add-on discounts and charges, or $5, being allocated to Club Surplus.

Next a determination is made as to the costs for each of the products ordered from the supplier by Club Surplus as denoted in step 9704. Further, as denoted in step 9706 a determination is made as to the number of units of each of these products ordered for purposes of defining a cost per unit. For illustrative purposes, let us assume that the Club Surplus order includes three products with the units per case as noted below.

| Product | Amount Ordered | Cost Per Unit before Adjustment | Dollar Ordered |
|---|---|---|---|
| Product A | 4 units | $6.25 | $25 |
| Product B | 1 unit | $30.00 | $30 |
| Product C | 3 units | $15.00 | $45 |

In the above example, Product A is 25% of the total Club Surplus, Product B is 30% and Product C is 45% by dollar volume. Distributing the $5 charge across the three and dividing the distributed number by the units of each product gives the following allocation of the $5.

| Product | Units Ordered | % | Adjustment Amount | $ Per Unit |
|---|---|---|---|---|
| Product A | 4 units | 25% | $1.25 | $0.31 |
| Product B | 1 unit | 30% | $1.50 | $1.50 |
| Product C | 3 units | 45% | $2.25 | $0.75 |
| | | 100% | $5.00 | |

As denoted in step 9708, the final adjustments are to add the cost per unit before the adjustment and with the adjustment amount per unit and the appropriate sales taxes. Note that sales taxes, which are calculated separately as denoted in step 9502, are further added to complete the final cost per unit for the addition of this product to club inventory.

| Product | Cost Per Unit Before Adjustments | Adjustment Amount Per Unit | Cost Per Unit After Adjustments | Sales Taxes | Final Cost Per Unit |
|---|---|---|---|---|---|
| Product A | $6.25 | $0.31 | $6.56 | $0.22 | $6.78 |
| Product B | $30.00 | $1.50 | $31.50 | $1.30 | $32.80 |
| Product C | $15.00 | $0.75 | $15.75 | $0.55 | $16.30 |

Figure 98:
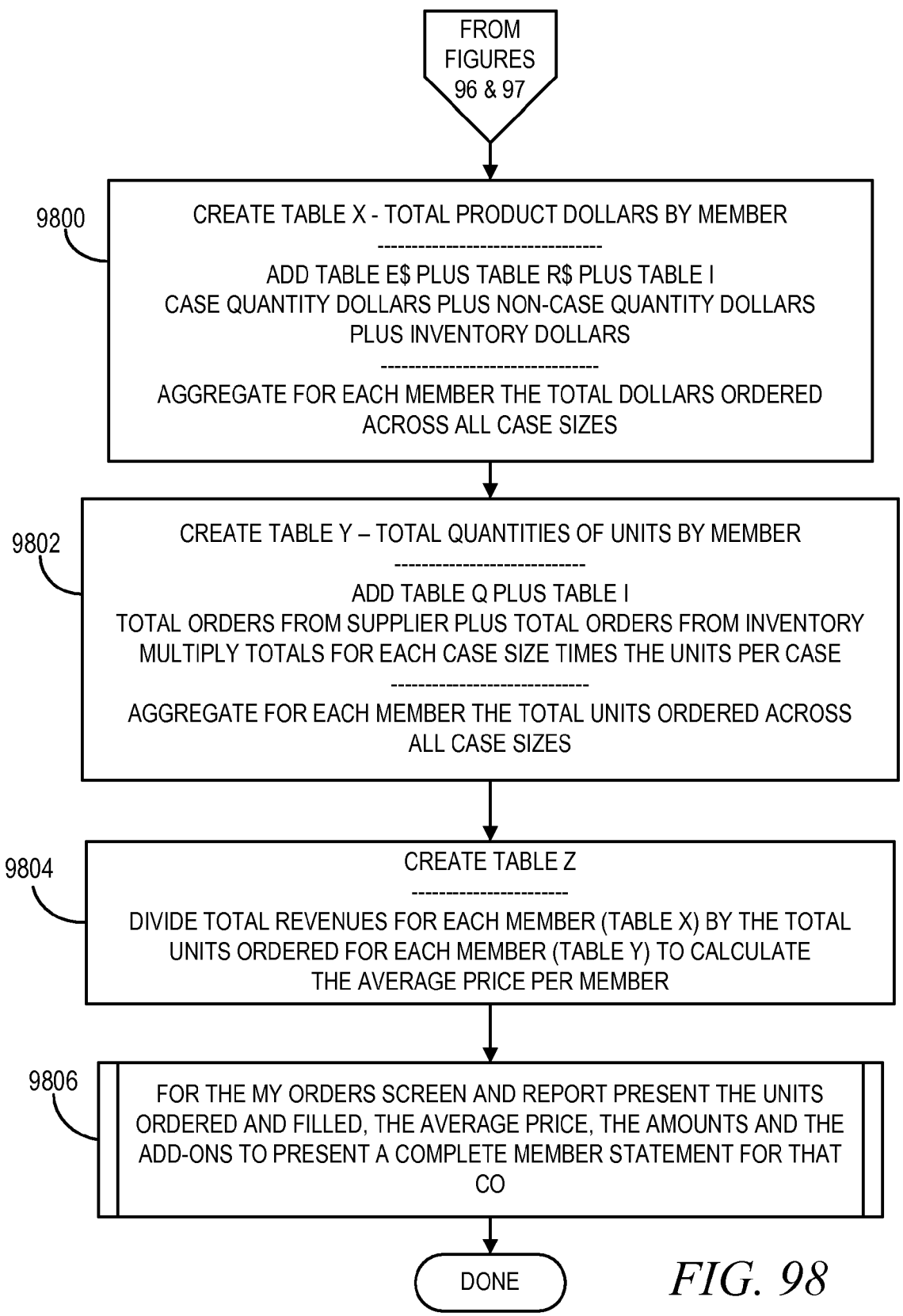
FIG. 98 is a flow chart summarizing the Tables needed to calculate the average price per unit for each member for product sales occurring inside a CO.

At this point, we have generated the total amounts and the various add-ons charges and discounts and all that remains is to generate the prices which will be charged to the members for the ordered products. FIG. 98 describes a preferred mode for generating the average pricing a member owes for a product whether that product is sourced from the supplier as a case order or a non-case order or sourced from inventory, or both. The average price is important to note because in virtually all ordering screens, a quantity amount of units ordered or allocated to a member is accompanied by a dollar amount total (in addition to the price), and the average price enables the price times the units to equal the dollar amount owed for the product. The average price is also important in that buyers are interested in knowing what the cost is for the product after having taken into account all markups and discounts.

To generate the average pricing per unit, first one must calculate the total dollar amount of orders for a product by each member and then next it is necessary to calculate the total units for each member. Finally simple division of total dollars by the units achieves the average price for each member. The following presents the process for generating the average price for members in a CO.

As denoted in step 9800, Table X is created and calculates the total dollar order for a product across all cases sizes for each member within a CO. Table X consists of the vector addition of Tables E$ (member dollar amounts of case quantities) which was created in step 9106, plus Table R$ (member dollar amount for non-case quantities, for this example using R$—By Item, but either By Item or Average Price method may be assumed) which was created in step 9202, plus Table I (quantities, price, and amounts ordered from inventory) and which was created in step 9416. Table X is found below.

TABLE X

Total Product Dollars By Member

| Crow | 1# | 5# | 10# | 25# | Member Total $ |
|---|---|---|---|---|---|
| Club Surplus | $10.05 | | | | $10.05 |
| Member2 | | $6.06 | $29.74 | | $45.80 |
| Member3 | $11.22 | | | $71.38 | $82.60 |
| Member4 | $17.59 | $17.59 | | $156.35 | $191.53 |
| Member5 | | $16.06 | | $71.38 | $87.44 |
| Retailer | $6.06 | | | | $6.06 |
| | | | | | $423.48 |

Step 9802 denotes the creation of Table Y in which is stored the total quantities of units ordered by or allocated to members. Table Y consists of the vector addition of the amount of products ordered or allocated from the supplier in Table Q as well as the products ordered or allocated from inventory as noted in Table I.

TABLE Y

Quantities Ordered By or Allocated to Members

| Crow<br>Crow Vector | 1#<br>1 | 5#<br>5 | 10#<br>10 | 25#<br>25 | Member<br>Total<br>Units |
|---|---|---|---|---|---|
| Club Surplus | 3 | 0 | 0 | 0 | 3 |
| Member2 | 1 | 5 | 10 | 0 | 16 |
| Member3 | 4 | 0 | 0 | 25 | 29 |
| Member4 | 4 | 5 | 0 | 50 | 59 |
| Member5 | 0 | 5 | 0 | 25 | 30 |
| Retailer | 2 | 0 | 0 | 0 | 2 |
| | | | | | 139 |

Finally, as noted in step 9804 the total dollar amounts for each member are divided by the total quantities ordered or allocated to each member to calculate the average price per unit. This is illustrated below in Table Z.

TABLE Z

Member Average Price Per Unit

| Crow | 1# | 5# | 10# | 25# | |
|---|---|---|---|---|---|
| Club Surplus | $3.35 | | | | $3.35 |
| Member2 | | $3.21 | $2.97 | | $2.86 |
| Member3 | $2.80 | | | $2.86 | $2.85 |
| Member4 | $4.40 | $3.52 | | $3.13 | $3.25 |
| Member5 | | $3.21 | | $2.86 | $2.91 |
| Retailer | $3.03 | | | | $3.03 |
| | | | | | $3.05 |

As may be noted from the above, the system 100 and web server 120 provides a number of major efficiencies and added capabilities to club members. Various modifications of the disclosed embodiments, as well as alternative embodiments of the invention, will become apparent to persons skilled in the art upon reference to the description of the invention without departing from the spirit or the scope of the invention. For example, in the system 100, some of the supplier data stored and manipulated on the web server 120 may instead, or additionally, be accessed from databases which are not located on the web server; some of the data that is represented on the web server 120 could be stored locally on a computer (not shown) as opposed to the web server 120. Provided that the program code may access the local supplier data as needed, then a system including local data storage may perform adequately, but not optimally. Although local data storage of supplier data is not a preferred embodiment of the invention, it is encompassed within the scope of the invention wherein such supplier local data is accessible with no further action required on the part of the user (e.g., buyer 107) of the web server 120 to access such local supplier data. It is understood that the present invention may take many forms and embodiments. Accordingly, several variations may be made in the foregoing without departing from the spirit or the scope of the invention. For example, more than one buying club 104 may collaborate (as in a buying club group 105, FIG. 1) to place concurrent orders together in a single order cycle, the purchase from such a collaboration of buying clubs being referred to herein as a Multi-Club Purchase, or MCP (as previously referred to in co-pending U.S. patent application Ser. No. 10/125,097 as a Multi-Group Purchase, or MGP, which application is incorporated herein by reference in its entirety). Thus, in an MCP, the ordered quantities of products from the supplier are the aggregation of all the products ordered by all buyer's of all buying clubs that are participating in the MCP into one single larger composite order. It implies that all buying clubs participating in an MCP preferably have a common supplier and delivery point, typically a common final order cutoff and single responsible party for making payment. Although the specific mechanics of the MCP arrangement are not provided in the flow diagrams of the present description of the invention, the modifications would primarily lie in the range of buyers over which the aggregation and quantity optimizations are performed, and would follow generally the process depicted in the flow diagrams of the present invention with respect to a single buying club system. Thus modifying the disclosed invention to include the MCP capability is believed to be well within the capability of one skilled in the art of generating computer programs to accomplish the actions set forth in the present flow diagrams for the placement of coop orders of a single buying club.

In another example of a variation, the supplier 128 or middleman/hosting entity 126 may utilize and offer the functionality deployed on the central web server 120 to buying clubs 104 through a computer that is not connected to the network 102, via, for example, a bulletin board system, a full time on-line direct dial-up capability, a third party network, or the like (not shown in FIG. 1). Therefore, the supplier 128 (in addition to, or separately from, supplying products to buying clubs 104) or middleman/hosting entity 126 may thus also provide the functionality, described above with respect to the central web server 120, through any standalone private network that allows for a real time, electronic collaborative interface between buyers 107, buying clubs 104, and suppliers 128.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention and that the claims will therefore cover any such modifications or embodiments that fall within the true scope and spirit of the invention.

The invention claimed is:

1. A system for passing through shipping costs, said system including a computer having at least a processor and a memory operatively coupled to said processor, said memory being configured for storing a computer program executable by said processor, said computer program comprising:
  computer program code for requesting a selection to pass though shipping costs to a buying club or to members of said buying club;
  computer program code for receiving and storing said selection; and
  computer program code for passing through said shipping costs according to said selection.

2. The system of claim 1, further comprising:
computer program code for determining whether said selection was to pass through shipping costs to members of said buying club; and
upon a determination that selection was to pass through shipping costs to members of said buying club, computer program code for performing steps of:
   requesting a second selection to pass through shipping costs substantially equally to each order of said coop order, or to each member of said buying club in proportion to the monetary amount ordered by each respective member; and
   passing through shipping costs according to said second selection.

3. A method of associating information between a supplier and a buying club, the method comprising steps of:
   receiving buying club information, and a selection of a supplier, from a buying club;
   sending said information to said selected supplier;
   receiving setup parameters from said selected supplier;
   sending to said buying club from a web server said setup parameters for said buying club; and
   associating and storing on a web server said buying club with said setup parameters.

4. The method of claim 3, wherein said setup parameters comprise at least one of account ID, delivery point, truck route, minimum order amount, and credit limit.

5. The method of claim 3, wherein said buying club information comprises at least one of a buying club name and a buying club location.

\* \* \* \* \*